US008916668B2

(12) United States Patent
Parker et al.

(10) Patent No.: US 8,916,668 B2
(45) Date of Patent: *Dec. 23, 2014

(54) PROTEIN-CONTAINING ADHESIVES, AND MANUFACTURE AND USE THEREOF

(75) Inventors: Anthony A. Parker, Newtown, PA (US); Joseph J. Marcinko, West Deptford, NJ (US)

(73) Assignee: Biopolymer Technologies, Ltd., Tel Aviv (IL)

( * ) Notice: Subject to any disclaimer, the term of this patent is extended or adjusted under 35 U.S.C. 154(b) by 496 days.

This patent is subject to a terminal disclaimer.

(21) Appl. No.: 13/154,607

(22) Filed: Jun. 7, 2011

(65) Prior Publication Data
US 2011/0311833 A1 Dec. 22, 2011

Related U.S. Application Data

(60) Provisional application No. 61/352,211, filed on Jun. 7, 2010.

(51) Int. Cl.
| C08L 97/02 | (2006.01) |
| C09J 189/00 | (2006.01) |
| C09J 175/04 | (2006.01) |
| C08H 1/00 | (2006.01) |
| C08G 18/40 | (2006.01) |
| C08L 23/08 | (2006.01) |

(52) U.S. Cl.
CPC .............. *C08H 1/00* (2013.01); *G08G 18/6446* (2013.01); *C09J 175/04* (2013.01); *C08L 23/0853* (2013.01); *C08G 18/4081* (2013.01); *C09J 189/00* (2013.01); *C08L 97/02* (2013.01)
USPC ............................ 527/100; 156/328; 523/449

(58) Field of Classification Search
None
See application file for complete search history.

(56) References Cited

U.S. PATENT DOCUMENTS

| 1,460,757 | A | | 7/1923 | Johnson et al. | |
| 2,727,869 | A | * | 12/1955 | Ash et al. | 524/15 |
| 2,881,076 | A | | 4/1959 | Sair | |
| 3,053,784 | A | * | 9/1962 | Herrick et al. | 524/596 |
| 3,075,930 | A | * | 1/1963 | Stewart et al. | 521/102 |
| 3,258,436 | A | * | 6/1966 | Stephens | 524/15 |
| 3,441,528 | A | * | 4/1969 | Dede, Jr. | 524/9 |
| 3,450,651 | A | * | 6/1969 | Carstensen | 524/15 |
| 3,489,633 | A | * | 1/1970 | Holmquist | 156/312 |
| 3,629,162 | A | | 12/1971 | Richardson et al. | |
| 3,658,731 | A | | 4/1972 | Richardson et al. | |
| 3,805,532 | A | * | 4/1974 | Kistner | 405/264 |
| 3,931,088 | A | * | 1/1976 | Sakurada et al. | 524/501 |
| 3,965,051 | A | * | 6/1976 | Markusch et al. | 521/100 |
| 3,965,056 | A | * | 6/1976 | Stout et al. | 524/14 |
| 3,966,658 | A | * | 6/1976 | Robitschek et al. | 524/376 |
| 3,966,971 | A | | 6/1976 | Morehouse et al. | |
| 3,981,831 | A | * | 9/1976 | Markusch et al. | 521/159 |
| 3,983,081 | A | * | 9/1976 | Dieterich et al. | 521/100 |
| 4,052,347 | A | * | 10/1977 | Dieterich et al. | 521/155 |
| 4,097,422 | A | * | 6/1978 | Markusch | 521/154 |
| 4,097,423 | A | * | 6/1978 | Dieterich | 521/154 |
| 4,098,645 | A | | 7/1978 | Hartdegen et al. | |
| 4,105,594 | A | * | 8/1978 | Dieterich et al. | 521/100 |
| 4,109,057 | A | * | 8/1978 | Nakamura et al. | 428/528 |
| 4,129,696 | A | * | 12/1978 | Markusch et al. | 521/154 |
| 4,144,205 | A | * | 3/1979 | Hartman et al. | 524/16 |
| 4,153,764 | A | * | 5/1979 | Blount | 521/155 |
| 4,170,697 | A | * | 10/1979 | Blount | 521/82 |
| 4,185,147 | A | * | 1/1980 | Blount | 521/154 |
| 4,211,848 | A | * | 7/1980 | Blount | 521/154 |
| 4,220,757 | A | * | 9/1980 | Blount | 536/84 |
| 4,226,982 | A | * | 10/1980 | Blount | 536/101 |
| 4,241,194 | A | * | 12/1980 | Blount | 521/82 |
| 4,243,757 | A | * | 1/1981 | Blount | 521/154 |
| 4,246,360 | A | | 1/1981 | Brown et al. | |
| 4,247,657 | A | * | 1/1981 | Blount | 521/175 |
| 4,251,638 | A | * | 2/1981 | Reischl | 521/128 |
| 4,283,311 | A | * | 8/1981 | Blount | 524/733 |
| 4,293,456 | A | * | 10/1981 | Reischl | 524/589 |
| 4,316,745 | A | * | 2/1982 | Blount | 106/287.34 |
| 4,320,208 | A | * | 3/1982 | Reischl et al. | 521/102 |
| 4,322,364 | A | | 3/1982 | Hughes et al. | |
| 4,327,195 | A | * | 4/1982 | Cioca et al. | 521/102 |
| 4,336,340 | A | * | 6/1982 | Blount | 521/84.1 |
| 4,339,366 | A | * | 7/1982 | Blount | 527/100 |
| 4,367,326 | A | * | 1/1983 | Blount | 527/303 |
| 4,376,173 | A | * | 3/1983 | Blount | 521/137 |
| 4,377,646 | A | * | 3/1983 | Blount | 521/154 |
| 4,377,659 | A | * | 3/1983 | Blount | 524/457 |

(Continued)

FOREIGN PATENT DOCUMENTS

| CN | 1698453 A | 11/2005 |
| EP | 1268702 B1 | 9/2005 |

(Continued)

OTHER PUBLICATIONS

Kretschmer et al. (1957) "Infrared Spectroscopy and Optical Rotatory Dispersion of Zein, Wheat Gluten and Gliadin," *J. Phys. Chem.* 61:1627-1631.
Allen et al. (2010) "Investigations of the Molecular Interactions of Soy-Based Adhesives," *Forest Products Journal* 60(6):534-540.
Hettiarachchy et al. (1995) "Alkali-Modified Soy Protein with Improved Adhesive and Hydrophobic Properties," *JAOCS* 72(12):1461-1464.
Hettiarachchy et al. (1996) "Preparation and Functional Properties of a Protein Isolate from Defatted Wheat Germ," *Cereal Chem.* 73(3):363-367.

(Continued)

*Primary Examiner* — James J Seidleck
*Assistant Examiner* — Peter A Salamon
(74) *Attorney, Agent, or Firm* — Goodwin Procter LLP

(57) ABSTRACT

The invention provides protein adhesives and methods of making and using such adhesives. The protein adhesives contain ground plant meal or an isolated polypeptide composition obtained from plant biomass.

58 Claims, 33 Drawing Sheets

(56) References Cited

U.S. PATENT DOCUMENTS

| | | | |
|---|---|---|---|
| 4,377,674 A * | 3/1983 | Blount | 527/301 |
| 4,380,592 A * | 4/1983 | Blount | 521/151 |
| 4,382,136 A * | 5/1983 | Blount | 527/305 |
| 4,383,049 A * | 5/1983 | Blount | 521/135 |
| 4,383,089 A * | 5/1983 | Blount | 525/476 |
| 4,390,450 A | 6/1983 | Gibson et al. | |
| RE31,340 E * | 8/1983 | Blount | 524/650 |
| 4,451,638 A * | 5/1984 | Blount | 528/205 |
| 4,497,862 A | 2/1985 | Cioca et al. | |
| 4,528,154 A * | 7/1985 | Nguyen et al. | 264/109 |
| 4,609,690 A * | 9/1986 | Gruber et al. | 523/334 |
| RE32,476 E * | 8/1987 | Kistner | 405/264 |
| 4,689,381 A * | 8/1987 | Krinski et al. | 527/201 |
| 4,711,911 A * | 12/1987 | Blount | 521/123 |
| 5,035,902 A | 7/1991 | Bilinski et al. | |
| 5,130,404 A | 7/1992 | Freeland | |
| 5,133,991 A | 7/1992 | Norman et al. | |
| 5,348,760 A | 9/1994 | Parker et al. | |
| 5,366,550 A | 11/1994 | Schad | |
| 5,506,285 A * | 4/1996 | Timm et al. | 524/13 |
| 5,523,293 A | 6/1996 | Jane et al. | |
| 5,607,633 A | 3/1997 | Sleeter et al. | |
| 5,648,420 A | 7/1997 | Fujiwara et al. | |
| 5,656,689 A | 8/1997 | Fujiwara et al. | |
| 5,681,505 A | 10/1997 | Phillips et al. | |
| 5,703,157 A | 12/1997 | Fujiwara et al. | |
| 5,710,190 A | 1/1998 | Jane et al. | |
| 5,719,301 A | 2/1998 | Sleeter | |
| 5,962,541 A | 10/1999 | Peterson et al. | |
| 5,968,995 A | 10/1999 | Rizk et al. | |
| 6,080,405 A | 6/2000 | Ishibashi et al. | |
| 6,176,891 B1 * | 1/2001 | Komoriya et al. | 71/11 |
| 6,231,985 B1 * | 5/2001 | Chen et al. | 428/425.1 |
| 6,306,997 B1 | 10/2001 | Kuo et al. | |
| 6,335,043 B1 | 1/2002 | Jiang et al. | |
| 6,352,661 B1 * | 3/2002 | Thompson et al. | 264/109 |
| 6,365,650 B1 | 4/2002 | Chen et al. | |
| 6,420,443 B1 | 7/2002 | Clark et al. | |
| 6,465,569 B1 | 10/2002 | Kurth | |
| 6,489,391 B1 | 12/2002 | Schilling et al. | |
| 6,495,056 B2 | 12/2002 | Kubo et al. | |
| 6,518,387 B2 | 2/2003 | Kuo et al. | |
| 6,649,667 B2 | 11/2003 | Clatty | |
| 6,730,299 B1 | 5/2004 | Tayot et al. | |
| 6,797,318 B2 * | 9/2004 | Takeuchi et al. | 427/152 |
| 6,841,101 B2 | 1/2005 | Nakos et al. | |
| 6,852,407 B2 | 2/2005 | Yasue | |
| 6,866,880 B2 | 3/2005 | Bhattacharya et al. | |
| 6,884,756 B2 | 4/2005 | Lynch et al. | |
| 6,893,579 B2 | 5/2005 | Espiard et al. | |
| 7,049,269 B2 * | 5/2006 | Hara | 503/226 |
| 7,060,798 B2 | 6/2006 | Li et al. | |
| 7,071,248 B2 | 7/2006 | Chen et al. | |
| 7,081,159 B2 | 7/2006 | Thames et al. | |
| 7,153,812 B2 * | 12/2006 | Hara | 503/200 |
| 7,175,701 B2 | 2/2007 | Oyasato et al. | |
| 7,226,615 B2 | 6/2007 | Yuksel et al. | |
| 7,252,735 B2 | 8/2007 | Li | |
| 7,253,244 B2 | 8/2007 | Gruenewaelder et al. | |
| 7,265,169 B2 | 9/2007 | Li et al. | |
| 7,285,583 B2 | 10/2007 | Stumphauzer et al. | |
| 7,345,136 B2 | 3/2008 | Wescott et al. | |
| 7,387,795 B2 | 6/2008 | Hollenberg et al. | |
| 7,393,930 B2 | 7/2008 | Li et al. | |
| 7,410,744 B2 * | 8/2008 | Watanabe et al. | 430/138 |
| 7,416,598 B2 | 8/2008 | Sun et al. | |
| 7,625,441 B2 | 12/2009 | Gagnon et al. | |
| 7,704,537 B2 | 4/2010 | Lopez et al. | |
| 7,722,712 B2 | 5/2010 | Li | |
| 7,736,559 B2 | 6/2010 | Rivers et al. | |
| 7,772,313 B2 | 8/2010 | Stumphauzer et al. | |
| 7,781,501 B2 | 8/2010 | Dopico et al. | |
| 7,785,440 B2 | 8/2010 | Li | |
| 7,789,932 B2 | 9/2010 | Anderson et al. | |
| 7,803,855 B2 | 9/2010 | Kintzley et al. | |
| 8,057,892 B2 | 11/2011 | Yang et al. | |
| 8,147,968 B2 | 4/2012 | Brady et al. | |
| 8,378,010 B2 | 2/2013 | Browning et al. | |
| 8,399,544 B2 | 3/2013 | Varnell et al. | |
| 8,465,581 B2 | 6/2013 | Wescott et al. | |
| 8,519,031 B2 * | 8/2013 | Parker et al. | 524/17 |
| 2002/0005251 A1 | 1/2002 | Sun et al. | |
| 2002/0010233 A1 | 1/2002 | Yasue | |
| 2003/0203136 A1 * | 10/2003 | Takeuchi | 428/32.6 |
| 2003/0212227 A1 * | 11/2003 | Stroobants et al. | 527/301 |
| 2003/0219615 A1 * | 11/2003 | Kikuchi et al. | 428/537.1 |
| 2003/0224179 A1 * | 12/2003 | Skinner et al. | 428/425.1 |
| 2004/0025657 A1 * | 2/2004 | Hosoi et al. | 83/72 |
| 2004/0170670 A1 * | 9/2004 | Smith et al. | 424/443 |
| 2005/0070635 A1 | 3/2005 | Breyer et al. | |
| 2005/0113257 A1 | 5/2005 | Lynch et al. | |
| 2005/0165220 A1 | 7/2005 | Barker et al. | |
| 2005/0222358 A1 | 10/2005 | Wescott et al. | |
| 2005/0234156 A1 | 10/2005 | Thames et al. | |
| 2005/0250900 A1 | 11/2005 | Stofko | |
| 2005/0257905 A1 * | 11/2005 | Shoseyov | 162/72 |
| 2005/0272892 A1 | 12/2005 | Hse et al. | |
| 2005/0277733 A1 | 12/2005 | Wescott et al. | |
| 2005/0282988 A1 | 12/2005 | Li | |
| 2006/0116288 A1 * | 6/2006 | Mori et al. | 503/216 |
| 2006/0135368 A1 | 6/2006 | Anderson et al. | |
| 2006/0156954 A1 | 7/2006 | Li et al. | |
| 2006/0194010 A1 | 8/2006 | Hiscock | |
| 2006/0231968 A1 | 10/2006 | Cowan et al. | |
| 2007/0020476 A1 | 1/2007 | Kintzley et al. | |
| 2007/0128542 A1 * | 6/2007 | Watanabe et al. | 430/270.1 |
| 2007/0148339 A1 | 6/2007 | Wescott et al. | |
| 2007/0180877 A1 | 8/2007 | Anderson et al. | |
| 2007/0244300 A1 | 10/2007 | Schweizer et al. | |
| 2007/0281145 A1 | 12/2007 | Khabbaz | |
| 2008/0021187 A1 | 1/2008 | Wescott et al. | |
| 2008/0027159 A1 | 1/2008 | Rivers et al. | |
| 2008/0050602 A1 | 2/2008 | Spraul et al. | |
| 2008/0063759 A1 | 3/2008 | Raymond et al. | |
| 2008/0063760 A1 | 3/2008 | Raymond et al. | |
| 2008/0064852 A1 | 3/2008 | Ddamulira et al. | |
| 2008/0095914 A1 | 4/2008 | Deak et al. | |
| 2008/0125577 A1 | 5/2008 | Gosnell et al. | |
| 2008/0213597 A1 | 9/2008 | Li | |
| 2008/0234458 A1 | 9/2008 | West | |
| 2008/0255333 A1 | 10/2008 | Trocino | |
| 2008/0281069 A1 * | 11/2008 | Jennissen | 527/200 |
| 2008/0287635 A1 | 11/2008 | Sun et al. | |
| 2008/0292886 A1 | 11/2008 | Allen et al. | |
| 2009/0013743 A1 | 1/2009 | Lynch et al. | |
| 2009/0098387 A1 | 4/2009 | Brady et al. | |
| 2009/0197036 A1 | 8/2009 | Hwang et al. | |
| 2010/0048875 A1 | 2/2010 | Segall et al. | |
| 2010/0063255 A1 | 3/2010 | Logie et al. | |
| 2010/0069533 A1 | 3/2010 | Brady et al. | |
| 2010/0069534 A1 | 3/2010 | Wescott et al. | |
| 2010/0258033 A1 | 10/2010 | Yang et al. | |
| 2010/0305227 A1 | 12/2010 | Parker et al. | |
| 2010/0310877 A1 | 12/2010 | Parker et al. | |
| 2011/0048280 A1 | 3/2011 | Wescott et al. | |
| 2011/0132551 A1 | 6/2011 | Klapdohr et al. | |
| 2011/0293934 A1 | 12/2011 | Allen et al. | |
| 2012/0183794 A1 | 7/2012 | Guo et al. | |
| 2013/0131231 A1 | 5/2013 | Bouguettaya et al. | |
| 2013/0224482 A1 | 8/2013 | Brady et al. | |
| 2013/0252007 A1 | 9/2013 | Khabbaz | |

FOREIGN PATENT DOCUMENTS

| | | |
|---|---|---|
| EP | 1588628 A1 | 10/2005 |
| EP | 973640 B1 | 9/2007 |
| EP | 1900642 A1 | 3/2008 |
| EP | 1900650 A1 | 3/2008 |
| EP | 1268702 B2 | 9/2009 |
| EP | 2163590 A1 | 3/2010 |
| EP | 2236578 A1 | 10/2010 |
| EP | 1742542 B1 | 11/2011 |
| GB | 1065015 | 4/1967 |
| JP | 04214475 B2 | 1/2009 |

(56) References Cited

FOREIGN PATENT DOCUMENTS

| WO | WO-9319125 A1 | 9/1993 |
|---|---|---|
| WO | WO-02062866 A1 | 8/2002 |
| WO | WO-2005035665 A1 | 4/2005 |
| WO | WO-2005072260 A2 | 8/2005 |
| WO | WO-2005099477 A2 | 10/2005 |
| WO | WO-2005100451 A2 | 10/2005 |
| WO | WO-2005113700 A1 | 12/2005 |
| WO | WO-2006041469 A1 | 4/2006 |
| WO | WO-2006112672 A1 | 10/2006 |
| WO | WO-2006132785 A2 | 12/2006 |
| WO | WO-2007008385 A1 | 1/2007 |
| WO | WO-2007064970 A1 | 6/2007 |
| WO | WO-2007086632 A1 | 8/2007 |
| WO | WO-2008011455 A1 | 1/2008 |
| WO | WO-2008024444 A2 | 2/2008 |
| WO | WO-2008118741 A1 | 10/2008 |
| WO | WO-2009013482 A2 | 1/2009 |
| WO | WO-2009048598 A1 | 4/2009 |
| WO | WO-2010065758 A2 | 6/2010 |
| WO | WO-2010102284 A2 | 9/2010 |
| WO | WO-2010102297 A2 | 9/2010 |
| WO | WO-2011025911 A1 | 3/2011 |
| WO | WO-2011097364 A1 | 8/2011 |
| WO | WO-2011150203 A2 | 12/2011 |
| WO | WO-2012076566 A2 | 6/2012 |

OTHER PUBLICATIONS

International Preliminary Report on Patentability and Written Opinion of the International Searching Authority of International Patent Application No. PCT/US2010/026526, issued on Sep. 6, 2011 (11 pages).
International Preliminary Report on Patentability and Written Opinion of the International Searching Authority of International Patent Application No. PCT/US2010/026553, issued on Sep. 6, 2011 (7 pages).
International Search Report and Written Opinion dated Feb. 7, 2012 for International Application No. PCT/US2011/039453, International Filing Date Jun. 7, 2011.
International Search Report of International Patent Application No. PCT/US2010/026526, mailed Mar. 15, 2011 (6 pages).
International Search Report of International Patent Application No. PCT/US2010/026553, mailed Nov. 16, 2010 (4 pages).
Javni et al. (2003) "Effect of Different Isocyanates on the Properties of Soy-Based Polyurethanes," *Journal of Applied Polymer Science* 88:2912-2916.
Kumar et al. (2002) "Adhesives and plastics based on soy protein products," *Industrial Crops and Products* 16:155-172.
Lambuth, A.L., Soybean Glues, in *Handbook of Adhesives*, 2nd ed., Van Nostrand Reinhold, New York, 1977, pp. 172-180.
Lin et al. (1996) "Physical, Mechanical and Thermal Properties of Water-Blown Rigid Polyurethane Foam Containing Soy Protein Isolate," *Cereal Chem.* 73(2):189-196.
Lin et al. (1997) "Water-Blown Flexible Polyurethane Foam Extended with Biomass Materials," *Journal of Applied Polymer Science* 65(4):695-703.
Mo et al. (1999) "Effects of Molding Temperature and Pressure on Properties of Soy Protein Polymers," *Journal of Applied Polymer Science* 73:2595-2602.
Park et al. (1999) "Physical and Mechanical Properties of Soy Protein-Based Plastic Foams," *JAOCS* 76:1201-1205.
Shih (1994) "Interaction of Soy Isolate with Polysaccharide and Its Effect on Film Properties," *JAOCS* 71(11):1281-1285.
Swain et al. (2005) "Biodegradable Polymers. Part II. Thermal degradation of biodegradable plastics cross-linked from formaldehyde-soy protein concentrate," *J. Therm. Anal. Cal.* 79:33-38.
Wang et al. (2007) "Soy Protein Adhesion Enhanced by Glutaraldehyde Crosslink," *Journal of Applied Polymer Science* 104:130-136.
Wang et al. (2009) "Improved Water Resistance of Soy Protein Adhesive at Isoelectric Point," *Transactions of the ASABE* 52(1):173-177.
Weimer et al. "Wood adhesives prepared from lucerne fiber fermentation residues of *Ruminococcus albus* and *Clostridium thermocellum*," *Appl. Microbiol. Biotechnol.*, vol. 66, pp. 635-640, 2005.
Wu et al. (2001) "Effects of the Molecular Weight on the Properties of Thermoplastics Prepared from Soy Protein Isolate," *Journal of Applied Polymer Science* 82:3373-3380.
Zhang et al. (2003) "Ways of Strengthening Biodegradable Soy-Dreg Plastics," *Journal of Applied Polymer Science* 88:422-427.
Zhong et al. (2001) "Properties of soy protein isolate/polycaprolactone blends compatibilized by methylene diphenyl diisocyanate," *Polymer* 42:6961-6969.
Zhong et al. (2007) "Isoelectric pH of Polyamide-Epichlorohydrin Modified Soy Protein Improved Water Resistance and Adhesion Properties," *Journal of Applied Polymer Science* 103:2261-2270.
Chinese Office Action dated Oct. 10, 2013 for Chinese Patent Application No. 201080019599.3 (14 pages).

\* cited by examiner (Soak Time = 30 minutes)

(Soak Time = 30 minutes)

(Soak Time = 48 hours)

PROTEIN-CONTAINING ADHESIVES, AND MANUFACTURE AND USE THEREOF

RELATED APPLICATIONS

This application claims the benefit of and priority to U.S. Provisional Patent Application Ser. No. 61/352,211, filed Jun. 7, 2010, the contents of which are hereby incorporated by reference for all purposes.

FIELD OF THE INVENTION

The invention relates to protein adhesives, and to methods of making and using such adhesives. The protein adhesives contain ground plant meal or an isolated polypeptide composition obtained from plant biomass, and are useful in the preparation of various wood products.

BACKGROUND

Adhesive compositions are used extensively in the wood products industry to make composites such as chipboard, fiberboard, and related composite wood products. Adhesive compositions are also used to make engineered lumber composites. Traditionally, these composites have been made using a urea formaldehyde (UF) resin or a phenol formaldehyde (PF) resin. More recently, polymeric methylenediphenyl diisocyanate (PMDI) has been used to make these composites. UF resin, PF resin and PMDI are made from petroleum feedstock and can require high temperature conditions to facilitate cure. For example, heating the resin-wood mixture to temperatures exceeding 100° C., and often 200° C., while exerting pressure on the mixture in order to form the composite. These high-temperature conditions are problematic in certain structural (or engineered) lumber applications when UF and PF resins are used because it is often impractical to reach such high temperatures necessary to cure the adhesive due to the large size and inadequate heat transfer throughout the engineered wood composite. The high-temperature conditions are generally less problematic for PMDI resins because alternative heat transfer mechanisms can be used. However, PMDI resins are more costly that UF and PF resins. Thus, lower resin loadings must be used in the composite to make these composites on economical terms, but the lower loading of resin can itself be problematic for certain prior PMDI-based resins because it can be difficult to efficiently disperse small quantities of resin in the wood.

Recent environmental concerns emphasize the need for adhesive compositions that are environmentally friendly. Adhesive compositions frequently used in the wood products industry, however, are not environmentally friendly. For example, UF resin and PF resin contain the toxic and volatile chemical formaldehyde, which is harmful to the environment and can cause health problems for individuals. Furthermore, UF resin and PF resin require a petroleum feedstock. Thus, the need exists for adhesive compositions that reduce the need for petroleum feedstock, minimize use of toxic chemicals, and are amenable to the cure conditions and performance requirements for wood products.

In response to the need for environmentally friendly adhesive compositions, there has been renewed interest in using certain soy products to form adhesive compositions. However, there are multiple challenges in developing an adhesive composition from soy products. For example, the adhesive composition when cured to form a binder must have sufficient bond strength. The adhesive composition when cured to form a binder should, for certain applications, be sufficiently resistant to moisture. Another challenge is that the adhesive composition must have sufficient pot life so that it does not cure before being applied to components in the wood product. It is also important that the soy product be capable of production on large scale at economically feasible terms, and that it is amenable to cure conditions used to form the wood product.

Various reports describe efforts at developing an adhesive composition using certain soy products. U.S. Patent Application publication 2008/0021187 describes an adhesive composition containing urea-denatured soy flour. U.S. Pat. No. 7,416,598 describes an adhesive composition containing a protein ingredient and a modifying ingredient. Zhong and coworkers describe an adhesive composition containing certain soy protein material that has been modified. Zhong et al. in *J. Appl. Polym. Sci.* (2007) 103: 2261-2270. Yet, despite these efforts, the need exists for an environmentally friendly adhesive composition that meets the demands for widespread industrial application in the wood products industry.

The present invention addresses this need, and provides other related advantages.

SUMMARY OF THE INVENTION

The invention provides protein adhesive compositions, methods of making and using such adhesives, and articles prepared using such adhesives. The protein adhesive compositions contain a prepolymer and a protein component that is ground plant meal or an isolated polypeptide composition obtained from plant biomass. The protein component contributes to the performance of the adhesive in several aspects. For example, the protein component aids dispersion of the prepolymer, which reduces the amount of prepolymer necessary to form a strong binder composition. In addition, the protein component can protect the prepolymer from premature reaction with nucleophiles. The protein components described herein provide the further advantage that they are prepared from plant biomass, a renewable feedstock that is generally a waste by-product of the agricultural industry. The isolated polypeptide composition can be, for example, a water-insoluble/water-dispersible protein fraction obtained by washing plant meal to remove certain water-soluble components, or the isolated polypeptide composition can be a water-insoluble/water-dispersible protein fraction obtained using isolation procedures described in FIG. 2.

Another feature of the adhesive compositions is that, under certain circumstances, they may also contain a formaldehyde scavenging agent. Formaldehyde is a volatile, toxic chemical released from wood particles during the formation of composite wood products. Because exposure to formaldehyde has been attributed to certain health problems, wood products used in human dwellings should desirably release little or no formaldehyde. The adhesive compositions described herein address this need by providing an adhesive composition that, when used to prepare a composite wood product, reduces the amount of formaldehyde released from the composite wood product.

The invention provides adhesive compositions that are a one-part adhesive (a single mixture that, without the addition of other components, functions as an adhesive) or a two- or multi-part adhesive (adhesives created by mixing together two or more parts, which when mixed together function as an adhesive). The invention also provides additional uses for the protein components described herein, such as use in dispersing or emulsifying oils during the clean up of oil spills or during tertiary oil recovery.

In one aspect, the invention provides an adhesive composition comprising: (a) from about 1% to about 90% (w/w) of a reactive prepolymer; and (b) ground plant meal. The amount of ground plant meal in the adhesive composition can be adjusted to meet the performance properties desired for a particular application. For example, the amount of ground plant meal can be adjusted to provide an amount sufficient to disperse the reactive prepolymer in an aqueous medium. Alternatively, or in addition, the amount of ground plant meal can be adjusted to provide an adhesive composition where no more than about 1 mole percent, 5 mole percent, or 10 mole percent of the prepolymer undergoes reaction with a nucleophile within one minute after the reactive prepolymer contacts the nucleophile. The amount of prepolymer that undergoes reaction with a nucleophile can be determined by measuring the rate at which the prepolymer undergoes reaction with the nucleophile at ambient temperature in a sample of the adhesive composition.

Particle size of the ground plant meal can be adjusted to optimize performance properties of the adhesive composition for a particular application. For example, in certain embodiments, the ground plant meal has a particle size in the range of from 1 µm to about 200 µma, from about 10 µm to about 90 µm, or from about 10 µm to about 70 µm.

As noted above, the adhesive composition can be characterized according to whether the ground plant meal is present in an amount sufficient to disperse the reactive prepolymer. In certain embodiments, the ground plant meal is present in an amount sufficient to disperse the reactive prepolymer in an aqueous medium to form a dispersion or emulsion that exhibits no phase separation by visual inspection for at least 5 minutes after mixing the reactive prepolymer with the ground plant meal. In certain other embodiments, the dispersion or emulsion exhibits substantially no phase separation by visual inspection for at least 10, 15, 20, 25, or 30 minutes, or even 1, 2, 3, 4, 5, or 6 hours or more after mixing the ground plant meal with the reactive prepolymer.

The adhesive composition also can be characterized according to changes in viscosity over time. For example, in certain embodiments, the ground plant meal is present in an amount such that the viscosity of the adhesive formulation increases by no more than about 25% within about 20 minutes, or no more than about 50% within about 20 minutes, after mixing the prepolymer and ground plant meal with a nucleophile.

In the foregoing aspects, the nucleophile can be water, a urea, a hydroxyl-containing compound, an amine-containing compound, an amide-containing compound, a sulfhydryl-containing compound, or a mixture thereof. In certain other embodiments, the nucleophile is urea. In certain other embodiments, the nucleophile is glycerin, water, or both.

Further yet, the adhesive composition can be characterized according to the weight percent of the ground plant meal in the composition. In certain embodiments, the ground plant meal is present in an amount from about 5% to about 35% (w/w) of the adhesive composition.

Ground plant meal can be derived from renewable agricultural biomass. Exemplary agricultural biomass includes corn, wheat, sunflower, cotton, rapeseed, canola, castor, soy, camelina, flax, jatropha, mallow, peanuts, algae, sugarcane bagasse, tobacco, whey, or a combination thereof. In certain embodiments, the ground plant meal is soy meal or canola meal.

The adhesive composition may be in the form of a liquid or particulate solid. In certain embodiments, the composition is in the form of a liquid.

The adhesive composition can be further characterized according to the product formed upon curing the adhesive. For example, in certain embodiments, upon curing, the composition forms a solid binder composition. The solid binder composition may have one or more of the following features: (i) it comprises from about 5% to about 75% (w/w) of ground plant meal; (ii) it comprises from about 5% to about 75% (w/w) of a polymeric material formed from the reactive prepolymer; and (iii) it is a thermoset solid. In certain other embodiments, the solid binder composition has one or more of the following features: (i) it comprises from about 5% to about 65% (w/w) of ground plant meal; (ii) it comprises from about 5% to about 65% (w/w) of a polymeric material formed from the reactive prepolymer; and (iii) it is a thermoset solid.

A variety of nucleophiles can react with a prepolymer. The nucleophile may be an additive or a component of the ground meal. In certain embodiments, the nucleophile is water, an urea, a hydroxyl-containing compound, an amine-containing compound, an amide-containing compound, a sulfhydryl-containing compound, or a mixture thereof. In certain embodiments, the nucleophile is urea, i.e., $H_2NC(O)NH_2$.

The adhesive composition may further comprise a formaldehyde scavenging agent. The formaldehyde scavenging agent is a compound that will undergo reaction with formaldehyde, particularly formaldehyde generated from wood particles used in preparation of a composite. A variety of formaldehyde scavenging agents are known in the art and are contemplated to be amenable for use in the present invention. Further description of formaldehyde scavenging agents is described herein below.

In another aspect, the invention provides an adhesive composition comprising: (a) from about 1% to about 90% (w/w) of a reactive prepolymer; and (b) from about 10% to about 98% (w/w) of an isolated polypeptide composition capable of dispersing the reactive prepolymer in an aqueous medium, for example, water or a water-based solution; and (c) at least about 1% (w/w) of a formaldehyde scavenging agent. The water-based solution can contain a plurality of dissolved components and/or can contain a dispersed or emulsified latex polymer. The identity and amount of the formaldehyde scavenging agent can be selected in order to optimize the performance characteristics of the adhesive for particular applications, as described in more detail below. In certain embodiments, the adhesive composition comprises from about 5% to about 90% (w/w) of a reactive prepolymer.

In certain circumstances, the reactive prepolymer is a polyisocyanate-based prepolymer, an epoxy-based prepolymer, a latex prepolymer, or is a combination thereof. Depending upon the components of the adhesive, the prepolymer and isolated polypeptide composition can be mixed and stored as a mixture until use (for example, when an activator or catalyst is added to the mixture, or where the mixture is stored under conditions so that curing does not occur). Alternatively, when no other additives are needed to initiate a reaction between the reactive prepolymer and the isolated polypeptide composition, the reactive prepolymer and the polypeptide composition are mixed immediately prior to use.

In another aspect, the invention provides a two-part adhesive composition comprising: (a) a first part (Part A) comprising from about 5% to about 90% (w/w) of a reactive prepolymer, wherein the reactive prepolymer is a polyisocyanate-based prepolymer, an epoxy-based prepolymer, or a combination thereof; and (b) a second part (Part B) comprising from about 10% to about 99% (w/w) of an isolated polypeptide composition capable of dispersing the reactive prepolymer in an aqueous medium; and wherein at least one of Part A or Part B comprises at least about 1% (w/w) of a formaldehyde scavenging agent.

Depending upon the composition of Part A and Part B, Parts A and B are mixed immediately prior to use. In one embodiment, the adhesive, when cured, comprises from about 1% to about 95% (w/w) of non-volatile moieties of Part A and from about 5% to about 99% (w/w) of non-volatile moieties of Part B. Furthermore, depending upon the application and functionality of the adhesive composition, the weight ratio of solids in Part B to the prepolymer can be in the range of from 100:0.1 to 0.1:100.

In another aspect, the invention provides an adhesive composition comprising: (a) from about 1% to about 90% (w/w) of a reactive prepolymer, for example, a reactive prepolymer selected from the group consisting of an organic polyisocyanate, a reaction product between an organic polyisocyanate and a polypeptide, a polyol, an amine based polyol, an amine containing compound, a hydroxy containing compound, or a combination thereof; (b) from about 10% to about 98% (w/w) of an isolated polypeptide composition capable of dispersing the reactive prepolymer in an aqueous medium; and (c) at least about 1% (w/w) of a formaldehyde scavenging agent, and (d) an optional catalyst. In certain embodiments, the adhesive comprises from about 5% to about 90% (w/w) of a reactive prepolymer selected from the group consisting of an organic polyisocyanate, a reaction product between an organic polyisocyanate and a polypeptide, a polyol, an amine based polyol, an amine containing compound, a hydroxy containing compound, or a combination thereof.

In each of the aspects of the invention, the isolated polypeptide composition can be derived from renewable agricultural biomass. Starting material for the isolated polypeptide composition, which can be a meal or a protein isolate, can be derived from one or more of corn, wheat, sunflower, cotton, rapeseed, canola, castor, soy, camelina, flax, jatropha, mallow, peanuts, algae, sugarcane bagasse, tobacco, whey, or a combination thereof. The isolated polypeptide composition can be isolated by extraction under neutral or basic conditions, by enzyme digestion, or a combination thereof. Furthermore, in certain embodiments, the isolated polypeptide composition is substantially free of primary amines, carboxylic acids, amine salts, and carboxylate salts.

Depending upon the processing steps employed, the isolated polypeptide composition can comprise digested or hydrolyzed protein. Digestion can be facilitated using one or more enzymes, and hydrolysis can be facilitated using one or more chemicals, for example, acid- or alkali-based hydrolysis. With regard to enzymatic hydrolysis, a number of enzymes may be used including, for example, serine-, leucine-, lysine-, or arginine-specific proteases.

In foregoing aspects of the invention, the isolated polypeptide composition is capable of dispersing the reactive prepolymer in the aqueous medium to produce a stable dispersion or a stable emulsion. The dispersion or emulsion exhibits substantially no phase separation by visual inspection for at least 5 minutes after mixing the isolated polypeptide composition with the reactive prepolymer. In certain embodiments, the dispersion or emulsion exhibits substantially no phase separation by visual inspection for at least 10, 15, 20, 25, or 30 minutes, or even 1, 2, 3, 4, 5, or 6 hours or more after mixing the isolated polypeptide composition with the reactive prepolymer.

In certain embodiments, the isolated polypeptide composition is a water-insoluble polypeptide composition dispersible in water or another solvent and facilitates the dispersion of oil-in-water or water-in-oil to produce a stable dispersion or a stable emulsion. The dispersion or emulsion exhibits substantially no phase separation by visual inspection for at least 5 minutes after mixing the isolated polypeptide composition with the oil. In certain embodiments, the dispersion or emulsion exhibits substantially no phase separation by visual inspection for at least 10, 15, 20, 25, or 30 minutes, or even 1, 2, 3, 4, 5, or 6 hours or more after mixing the isolated polypeptide composition with the oil. Exemplary oils that can be emulsified or dispersed by the isolated polypeptide fraction include, for example, an organic polyisocyanate (for example, PMDI, 4,4'-methylenediphenyl, diisocyanate (4,4'-MDI), 2,4-methylenediphenyl, diisocyanate (2,4-MDI), 2,2-methylenediphenyl diisocyanate (2,2-MDI), monomeric MDI, or PMDI that has been reacted with a hydroxyl-functional compound such as a polyol), mineral oil, soybean oil, derivatized soybean oil, motor oil, castor oil, derivatized castor oil, dibutyl phthalate, epoxidized soybean oil, corn oil, vegetable oil, caprylic triglyceride, Eucalyptus oil, tributyl o-acetylcitrate, linseed oil, an adipate ester, a sebacate ester, a phthalate ester, and a citrate ester. Further exemplary oils that can be emulsified or dispersed by the isolated polypeptide fraction include, for example, an azelaic ester, a benzoate ester, a glycol derivative, an epoxy derivative, a phosphate ester. Other dispersible materials include the following hydrophobic liquids and hydrophobic solids: a silicone (e.g., a silicone oil or a silicone gel), a fluorocarbon (e.g., a solid wax fluorocarbon or a liquid oil fluorocarbon), a fluorinated polyol, a wax (e.g., a solid carboxylic acid ester, a salt of a carboxylic acid, a hydrocarbon wax, and a fluorinated hydrocarbon wax), a liquid carboxylic acid ester that is hydrophobic, and a liquid hydrocarbon. In certain cases where the dispersible hydrophobic material is a solid (e.g., a fluoroalkyl wax or an alkyl wax), the solid can be first melted and then mixed with the isolated polypeptide fraction in water to form a stable dispersion wherein the molten emulsified hydrophobic material remains dispersed while the mixture is cooled and even after the hydrophobic material is allowed to recrystallize. In an exemplary assay, 14 parts (by weight) of a protein sample of interest is mixed with 86 parts (by weight) of water and the resulting solution or dispersion is mixed with 14 parts (by weight) of oil, for example, PMDI. Under these conditions, the water-insoluble protein fraction facilitates the creation of a dispersion or emulsion that exhibits substantially no phase separation by visual inspection for at least 5 minutes after mixing the polypeptide composition with the oil. The same assay can be conducted using the other oils.

In certain embodiments, the isolated polypeptide composition comprises one or more of the following features: (i) an amide-I absorption band between about 1620 cm$^{-1}$ and 1642 cm$^{-1}$ and an amide-II band between approximately 1514 cm$^{-1}$ and 1540 cm$^{-1}$, as determined by solid state Fourier Transform Infrared Spectoscopy (FTIR); (ii) a prominent 2° amide N—H stretch absorption band centered at about 3272-3278 cm$^{-1}$, as determined by solid state FTIR, and (iii) is capable of dispersing an oil-in-water or water-in-oil to produce a homogeneous emulsion that is stable for least 5 minutes.

In certain other embodiments, the isolated polypeptide composition is a water-insoluble/water-dispersible protein fraction comprising one or more of the following features: (i) an amide-I absorption band between about 1620 cm$^{-1}$ and 1632 cm$^{-1}$ and an amide-II band between approximately 1514 cm$^{-1}$ and 1521 cm$^{-1}$, as determined by solid state FTIR, (ii) a prominent 2° amide N—H stretch absorption band centered at about 3272 cm$^{-1}$, as determined by solid state FTIR, (iii) an average molecular weight of between about 600 and about 2,500 Daltons, (iv) two protonated nitrogen clusters defined by $^{15}$N chemical shift boundaries at about 86.2 ppm and about 87.3 ppm, and $^{1}$H chemical shift boundaries at about 7.14 ppm and 7.29 ppm for the first cluster, and $^{1}$H chemical shift boundaries at about 6.66 ppm and 6.81 ppm for the second cluster, as determined by solution state, two-dimensional proton-nitrogen coupled NMR, and (v) is capable of dispersing an oil-in-water or water-in-oil to produce a homogeneous emulsion that is stable for least 5 minutes.

In certain embodiments, the oil referenced above is selected from the group consisting of PMDI, mineral oil, soybean oil, derivatized soybean oil, motor oil, castor oil, derivatized castor oil, dibutyl phthalate, epoxidized soybean oil, corn oil, vegetable oil, caprylic triglyceride, Eucalyptus oil, tributyl o-acetylcitrate, linseed oil, an adipate ester, a sebacate ester, a phthalate ester, and a citrate ester.

The invention embraces isolated polypeptide compositions that comprise a mixture of i) a water-insoluble/water-dispersible protein fraction and ii) a water-soluble protein fraction. The ratio of i) water-insoluble/water-dispersible polypeptide fraction to ii) water-soluble protein fraction can be selected in order to optimize the performance properties of the adhesive composition. For example, in certain embodiments, the ratio of i) water-insoluble/water-dispersible polypeptide fraction to ii) water-soluble protein fraction can be in the range of from about 1:0 to about 2:3. In certain other embodiments, the i) water-insoluble/water-dispersible polypeptide fraction to ii) water-soluble protein fraction can be at least 1:1. An exemplary isolated water-soluble polypeptide composition can be characterized as comprising one or more of the following features: (a) an amide-I absorption band between about 1633 $cm^{-1}$ and 1680 $cm^{-1}$, as determined by solid state Fourier Transform Infrared Spectroscopy (FTIR); (b) an amide-II band between approximately 1522 $cm^{-1}$ and 1560 $cm^{-1}$, as determined by solid state FTIR; (c) two prominent 1° amide N—H stretch absorption bands centered at about 3200 $cm^{-1}$ and at about 3300 $cm^{-1}$, as determined by solid state FTIR; (d) a prominent cluster of protonated nitrogen nuclei defined by $^{15}N$ chemical shift boundaries at about 94 ppm and at about 100 ppm, and $^1H$ chemical shift boundaries at about 7.6 ppm and at about 8.1 ppm, as determined by solution state, two-dimensional proton-nitrogen coupled NMR; (e) an average molecular weight of between about 600 and about 2,500 Daltons; (f) an inability to stabilize an oil-in-water emulsion, wherein, when an aqueous solution comprising 14 parts by weight of protein dissolved or dispersed in 86 parts by weight of water is admixed with 14 parts by weight of PMDI, the aqueous solution and the PMDI produce an unstable suspension that macroscopically phase separates under static conditions within five minutes after mixing.

A variety of formaldehyde scavenging agents are described in the literature and are contemplated to be amenable to the present invention. Different formaldehyde scavenging agents have different reactivity profiles, and a particular formaldehyde scavenging agent (e.g., $H_2NC(O)NH_2$, $Me_2NC(O)NH_2$, or $CH_3CH_2NH_2$) can be selected to optimize the performance properties of the adhesive composition and/or binder composition formed by the adhesive. Various formaldehyde scavenging agents are contemplated and described herein, such as where the formaldehyde scavenging agent has the formula $RNH_2$, $R_2NH$, $RC(O)NH_2$, $RN(H)C(O)NH_2$, $R_2NC(O)NH_2$, or $RN(H)C(O)N(H)R$, wherein R represents independently for each occurrence H, alkyl, aryl, or aralkyl; where the formaldehyde scavenging agent has the formula $RN(H)C(O)N(H)R$, wherein R represents independently for each occurrence H, alkyl, aryl, or aralkyl; and more specifically where the formaldehyde scavenging agent is $H_2NC(O)NH_2$.

The amount of formaldehyde scavenging agent in the adhesive formulation can adjusted to optimize the performance properties of the adhesive composition and/or binder composition formed by the adhesive. In certain embodiments, the mole ratio of formaldehyde scavenging agent to reactive prepolymer is at least about 0.05:1. In still other embodiments, the mole ratio of formaldehyde scavenging agent to reactive prepolymer is at least 5:1.

In certain embodiments, the adhesive composition is characterized in that, upon curing, the composition forms a solid binder composition comprising from about 1% to about 50% (w/w), from about 1% to about 30% (w/w), from about 1% to about 20% (w/w), from about 2% to about 50% (w/w), from about 2% to about 30% (w/w), from about 5% to about 50% (w/w), from about 5% to about 30% (w/w), from about 5% to about 20% (w/w), from about 10% to about 50% (w/w), from about 10% to about 30% (w/w), or from about 10% to about 20% (w/w) of formaldehyde scavenging agent. In certain other embodiments, the adhesive composition is characterized in that, upon curing, the composition forms a solid binder composition comprising from about 1% to about 50% (w/w) of formaldehyde scavenging agent. In still other embodiments, the adhesive composition is characterized in that, upon curing, the composition forms a solid binder composition comprising from about 2% to about 30% (w/w) of formaldehyde scavenging agent.

The quantity and chemical features of the prepolymer impact the performance properties of the adhesive composition. Thus, the amount and identity of the prepolymer can be selected in order to optimize performance properties of the adhesive composition for use in a particular application. For example, in certain embodiments and unless specified otherwise, the reactive prepolymer can be a polyisocyanate-based prepolymer, an epoxy-based prepolymer, a latex-based prepolymer, a latex prepolymer, or a combination thereof. In certain other embodiments, the reactive prepolymer is a polyisocyanate-based prepolymer. In certain embodiments, the polyisocyanate-based prepolymer is an organic polyisocyanate; or a reaction product between an organic polyisocyanate and, for example, a polypeptide, a polyol, an amine based polyol, an amine containing compound, a hydroxy containing compound, or a combination thereof. In still other embodiments, the polyisocyanate-based reactive prepolymer is a polymer comprising a terminal reactive isocyanate group.

The epoxy-based prepolymer can be an epoxide containing compound. Alternatively, the epoxy-based prepolymer can be a reaction product between an epoxy and, for example, a polypeptide, a polyol, an amine based polyol, an amine containing compound, a hydroxy containing compound, or a combination thereof. The epoxy can be selected from the group consisting of a diglycidyl ether of bisphenol-A, a diglycidyl ether of bisphenol-A alkoxylate, an epoxy novolac resin, expoxidized soy oil, epoxidized linseed oil, epichlorohydrin, a glycidyl ether-type epoxy resin derived from a polyphenol by reaction with epichlorohydrin, and a combination thereof.

The polyol in the prepolymer composition can be an amine alkoxylate, polyoxypropylene glycol, polyoxyethylene glycol, polytetramethylene glycol, polyethylene glycol, propylene glycol, propane diol, glycerin, or a mixture thereof.

In each of the foregoing aspects of the invention, the organic polyisocyanate can be selected from the group consisting of polymeric diphenylmethane diisocyanate (PMDI), 4,4'-methylenediphenyl, diisocyanate (4,4'-MDI), 2,4-methylenediphenyl, diisocyanate (2,4-MDI), and a combination of the foregoing.

The adhesive compositions may further comprise water. In certain embodiments, water is present in an amount from about 30% (w/w) to about 60% (w/w) of the adhesive composition. In certain other embodiments, water is present in an amount from about 20% (w/w) to about 35% (w/w) of the adhesive composition. The amount of water used in the adhesive composition may be characterized relative to the amount of wood in the final composite. For example, in certain embodiments, the total weight percent of water from the adhesive composition used to form a composite is from about 2% to about 18% by weight of the wood in the composite on an oven dried basis, or from about 2% to about 13% by weight of the wood in the composite on an oven dried basis, or from about 2% to about 8% by weight of the wood in the composite on an oven dried basis.

When the adhesive composition comprises a catalyst, the catalyst can be a primary amine, a secondary amine, a tertiary amine, an organometallic compound, or a combination thereof, as further described in the detailed description.

In each of the foregoing aspects of the invention, the isolated polypeptide composition can be further characterized according to its polydispersity index (PDI). For example, in certain embodiments the isolated polypeptide composition has a PDI of between about 1 and 1.15. In certain other embodiments, the isolated polypeptide composition has a polydispersity index (PDI) of between about 1 and 1.75, or between about 1 and 3.

In each of the foregoing aspects of the invention, the adhesive composition may further comprise an additive. Exemplary additives include glycerin, corn syrup, a poly($C_2$-$C_6$) alkylene, mineral oil, an ethylene/propylene/styrene copolymer, a butylene/ethylene/styrene copolymer, soy oil, castor oil, or a mixture of one or more of the foregoing. In certain embodiments, the additive is polybutene. In certain embodiments, the polybutene has a weight average molecular weight of from about 200 g/mol to about 20,000 g/mol, from about 200 g/mol to about 10,000 g/mol, from about 200 g/mol to about 5,000 g/mol, from about 200 g/mol to about 2,000 g/mol, from about 200 g/mol to about 1,000 g/mol, from about 500 g/mol to about 2,000 g/mol, or from about 500 g/mol to about 1,000 g/mol. In certain other embodiments, the additive is a polyol, such as glycerin, which permits less water to be used in the adhesive composition. In yet other embodiments, the additive is an agent that improves moisture-resistance, a composite-release promoter, a pH modulator, or an antimicrobial agent.

The invention embraces adhesive compositions that comprise (a) from about 1% to about 90% (w/w) of a reactive prepolymer; (b) from about 10% to about 98% (w/w) of an isolated polypeptide composition capable of dispersing the reactive prepolymer in an aqueous medium; and (c) an additive selected from the group consisting of an agent that improves moisture-resistance, a composite-release promoter, and a pH modulator. Further, the invention embraces two-part adhesive compositions that comprise: (a) a first part (Part A) comprising from about 0.1% to about 100% (w/w) of a reactive prepolymer, wherein the reactive prepolymer is a polyisocyanate-based prepolymer, an epoxy-based prepolymer, or a combination thereof; (b) a second part (Part B) comprising from about 10% to about 99% (w/w) of an isolated polypeptide composition capable of dispersing the reactive prepolymer in an aqueous medium; and wherein at least one of Part A or Part B comprises an additive selected from the group consisting of an agent that improves moisture-resistance, a composite-release promoter, and a pH modulator.

In certain embodiments, the additive in one of the adhesive compositions described herein is a polymer agent that improves moisture-resistance. In certain other embodiments, the additive is a wax agent that improves moisture-resistance. In certain other embodiments, the additive is a fluorinated polyol, a silicone, a siloxane, or wax agent that improves moisture-resistance. In certain other embodiments, the additive is a composite-release promoter. In certain other embodiments, the additive is a composite-release promoter selected from the group consisting of a $C_{10-25}$ alkanoic acid, a salt of a $C_{10-25}$ alkanoic acid, a $C_{10-25}$ alkenoic acid, a salt of an $C_{10-25}$ alkenoic acid, and a silicone. In certain other embodiments, the additive is a pH modulator.

The ground plant meal and isolated polypeptide composition (e.g., isolated water-insoluble/water-dispersible polypeptide fraction) described herein have a variety of applications, which include, for example, dispersing an oil-based prepolymer in the manufacture of an adhesive or binder, dispersing an oil or plasticizer in the manufacture of a thermoplastic or thermosetting material, dispersing an oil for use in cosmetics or pharmaceuticals, or dispersing oils after an oil spill or during tertiary oil recovery.

In another aspect, the invention provides a solid binder composition formed by curing an adhesive composition described herein.

In another aspect, the invention provides a method of bonding a first article to a second article. The method comprises the steps of (a) depositing on a surface of the first article any one of the foregoing adhesive compositions thereby to create a binding area; and (b) contacting the binding surface with a surface of the second article thereby to bond the first surface to the second surface. The method optionally also comprises the step of, after step (b), permitting the adhesive composition to cure, which can be facilitated by the application of pressure, heat or both pressure and heat.

In another aspect, the invention provides a method of producing a composite material. The method comprises the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

In certain embodiments, the first article, the second article or both the first and second articles are lignocellulosic materials, or composite materials containing lignocellulosic material. The first article, the second article or both the first and second articles can comprise a metal, a resin, a ceramic, a polymer, a glass or a combination thereof. The first article, the second article, or both the first article and the second article can be a composite. In addition, the invention provides an article produced by each of the foregoing methods of manufacture.

In addition, the invention provides an article comprising two or more components bonded together using one or more of the adhesive compositions described herein. The bonded components can be selected from the group consisting of paper, wood, glass, metal, fiberglass, wood fiber, ceramic, ceramic powder, plastic (for example, a thermoset plastic), and a combination thereof. In certain other embodiments, the bonded components can be selected from the group consisting of paper, wood, glass, metal, fiberglass, wood fiber, ceramic, ceramic powder, sand, plastic (for example, a thermoset plastic), and a combination thereof. The invention provides an article (for example, a composite material, laminate, or a laminate containing composite material) produced using one or more of the adhesive compositions described herein.

The composite material can be chip board, particle board, fiber board, plywood, laminated veneer lumber, glulam, laminated whole lumber, laminated composite lumber, composite wooden I-beams, medium density fiberboard, high density fiberboard, orientated strand board, extruded wood, or fiberglass. The composite can be a thermosetting composite or a thermoplastic composite.

In certain embodiments, the article is a composite, such as a random non-oriented homogeneous composite, an oriented composite, or a laminated composite.

In certain embodiments, the article comprises a lignocellulosic component. Furthermore, the article can comprise paper, wood, glass, fiberglass, wood fiber, ceramic, ceramic powder, or a combination thereof. In certain embodiments, the adhesive can comprise an organic polyisocyanate, for example, in an amount ranging from about 5% to about 30% (w/w), from about 5% to about 20% (w/w), from about 5% to about 15% (w/w), or from about 10% to about 20% (w/w) of the adhesive composition. In certain other embodiments, the adhesive can comprise from about 30% to about 70% (w/w) of an organic polyisocyanate.

The article can further comprise a polyurethane. In certain embodiments, the polyurethane comprises from about 1% to about 25% (w/w) of the article, from about 1% to about 15% (w/w), from about 5% to about 20% (w/w), from about 5% to about 15% (w/w), or from about 5% to about 10% (w/w) of the article. In certain embodiments, the polyurethane that comprises from about 1% to about 25% (w/w) of the article.

In certain embodiments, the article is a particle board composite. The amount of wood and adhesive composition used to prepare the particle board composite can be adjusted to optimize the performance properties of the particle board for different applications (e.g., outdoor use where increased water resistance is desirable). In certain embodiments, the composite comprises at least about 80% (w/w) wood, at least about 90% (w/w) wood, at least about 95% (w/w) wood, or at least about 98% (w/w) wood. In certain other embodiments, the composite has one or more of the following features: (i) it comprises from about 0.1% to about 15% (w/w) of ground plant meal or isolated polypeptide composition; (ii) it comprises from about 0.1% to about 10% (w/w) of a polymeric material formed by reaction of the prepolymer; (iii) it comprises from about 0.1% to about 10% (w/w) of formaldehyde scavenging agent; and (iv) it comprises from about 0.1% to about 10% (w/w) of a diluent.

Depending upon the adhesive used, the resulting article can have one or more of the following features: the article is moisture resistant; the article remains intact after boiling in water for 5 minutes; two or more components of the article remain bonded after boiling in water for 5 minutes; the article, when boiled in water for 5 minutes, displays less than a 20% increase in volume relative to the article prior to exposure to the water; and when the article (for example, a composite material, laminate, or a laminate containing a composite material) contains a lignocellulosic material in the composite material or laminate, the article exhibits no less than 50%, optionally no less than 75%, cohesive failure of the lignocellulosic component when the article is placed under a loading stress sufficient to break the article. In certain embodiments, the article exhibits no less than 50% cohesive failure of the lignocellulosic component when the article is placed under a loading stress sufficient to break the article.

These and other aspects and features of the invention are described in the following detailed description and claims.

BRIEF DESCRIPTION OF THE DRAWINGS

The foregoing and other objects, features and advantages of the invention will become apparent from the following description of preferred embodiments, as illustrated in the accompanying drawings. Like referenced elements identify common features in the corresponding drawings. The drawings are not necessarily to scale, with emphasis instead being placed on illustrating the principles of the present invention, in which.

DETAILED DESCRIPTION

Figure 1:
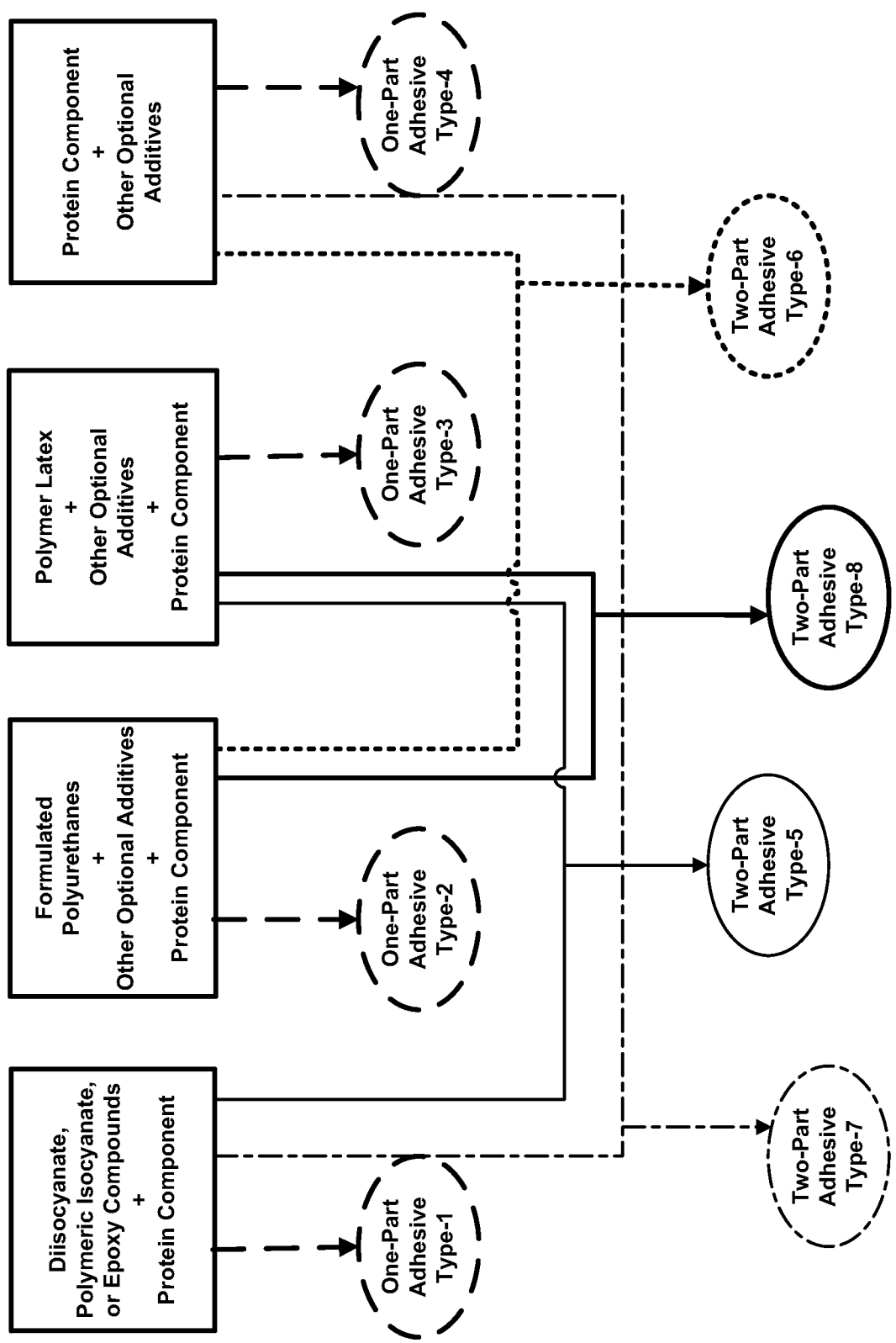
FIG. 1 is a flow chart showing adhesives that can be produced using the protein components (i.e., ground plant meal or isolated polypeptide composition) described herein.

The invention provides protein adhesive compositions and methods of making and using such adhesives. Also, the invention provides articles, such as wood composites, made using the protein adhesive compositions. The protein adhesive compositions described herein contain a prepolymer and a protein component. The protein component is obtained from a renewable feedstock and provides multiple advantages in the preparation of adhesive compositions. The protein component is preferably ground plant meal or an isolated polypeptide composition derived from plant meal. It has been found that ground plant meal and the particular isolated polypeptide compositions described herein provide advantages over other forms of plant-based protein, such as soy flour. One advantage is that the ground plant meal and the particular isolated polypeptide compositions described herein facilitate dispersion of the prepolymer. This feature reduces the amount of prepolymer necessary to form a strong binder composition, and it simplifies manufacturing procedures because the dispersion can be applied more easily over large surfaces. Another advantage is that the ground plant meal and the particular isolated polypeptide compositions described herein can protect the prepolymer from premature reaction with nucleophiles. The protein components are also environmentally friendly, in part because they can be obtained from a renewable feed that is generally a waste by-product of the agricultural industry. The isolated polypeptide composition can be, for example, a water-insoluble/water-dispersible protein fraction obtained by washing plant meal to remove certain water-soluble components, or the isolated polypeptide composition can be a water-insoluble/water-dispersible protein fraction obtained by the isolation procedures described in FIG. 2.

Another aspect of the invention is adhesive compositions that contain a formaldehyde scavenging agent. Formaldehyde is a volatile, toxic chemical released from wood particles during the formation of composite wood products. Because exposure to formaldehyde has been attributed to certain health problems, wood products used in human dwellings should desirably release little or no formaldehyde. The adhesive compositions described herein address this need by providing an adhesive composition that when used to prepare a composite wood product, reduces the amount of formaldehyde released from the composite wood product. Notably, the protein component described herein unexpectedly protects the prepolymer (e.g., PMDI) from undesirable reaction with the formaldehyde scavenging agent (e.g., urea).

Another aspect of the invention is adhesive compositions that contain an additive. Exemplary additives include those that improve moisture resistance of wood composites formed using the adhesive composition, those that promote release of the wood composite from a press used to make the wood composite, those that modulate the pH of an adhesive composition, those that provide an antimicrobial effect, and those that permit less water to be used in the adhesive composition.

As explained in more detail below, the invention provides both single-pot, one-part adhesives (a single mixture that, without the addition of other components, functions as an adhesive) or two- or multi-part adhesives (adhesives created by mixing together two or more parts, which when mixed together function as an adhesive). FIG. 1 illustrates multiple one-part and two-part adhesives that can be produced using the protein component described herein (i.e., ground plant meal or an isolated polypeptide composition described herein).

For example, a first type of one-part adhesive (denoted a Type-1 adhesive) can be produced by mixing the protein component (i.e., ground plant meal or an isolated polypeptide composition described herein) with a diisocyanate-based prepolymer, a polymeric isocyanate-based prepolymer, an epoxy-based prepolymer or a combination thereof in the presence of other optional additives (for example, a catalyst). When the protein component is an isolated polypeptide composition described herein, then the adhesive composition further comprises at least about 1% (w/w) of a formaldehyde scavenging agent. These one-part adhesives can further comprise a polyol that is co-reacted with PMDI and the protein component at the same time in one pot, or reacted in sequence by sequential addition into a single pot. Such compositions can serve as stand-alone one-part adhesives, or can be used as the Part-A component in a two-part system.

A second type of one-part adhesive (denoted a Type-2 adhesive) can be produced by mixing the protein component with a formulated polyurethane in the presence of other optional additives. A third type of one-part adhesive (denoted a Type-3 adhesive) can be produced by mixing the protein component with a latex polymer in the presence of other optional additives. A fourth type of one-part adhesive (denoted a Type-4 adhesive) can be produced by mixing the protein component with other optional additives. Similar to the Type-1 Adhesive, if the protein component in the Type-2, Type-3, or Type-4 adhesive is an isolated polypeptide composition, then the respective adhesive composition comprises at least about 1% (w/w) formaldehyde scavenging agent. Further, depending upon their composition, each of the one-part adhesives (i.e., each of the Type-1, Type-2, Type-3, or Type-4 adhesives) can be used as an adhesive without the addition of other components.

Two-part adhesives, for example, as shown in FIG. 1, can be prepared by mixing together two or more of the one-part adhesives. The one-part adhesives used in these applications are stable on their own but when mixed with second, different one-part adhesive, the resulting mixture creates an adhesive composition. Exemplary two-part adhesives, as shown in FIG. 1, can be created by combining (i) the Type 1 and Type 3 adhesives to produce a fifth type of adhesive (denoted Type-5 adhesive), (ii) the Type 2 and Type 4 adhesives to produce a sixth type of adhesive (denoted Type-6 adhesive); (iii) the Type 1 and Type 4 adhesives to produce a seventh type of adhesive (denoted Type-7 adhesive), and (iv) the Type 2 and Type 3 adhesives to produce an eight type of adhesive (denoted Type-8 adhesive).

As will be discussed in more detail below, the adhesives described herein can be used in the production of a variety of wood-based products including composite materials, laminates, and laminates that contain composite materials. For example, the adhesives can be used in the production of consolidated wood composites, for example, chipboard (also known as OSB), fiberboard, and related composite wood products, as well as in the production of engineered lumber composites, for example, I-beams (I-joists), laminated veneer lumber (LVL), and other types of structural lumber composites.

By way of example, the adhesives described herein, for example, the polyisocyanate containing adhesives, have a number of important advantages in the production of wood-based (lignocellulosic) composites relative to other commonly used wood adhesives. The advantages include higher moisture tolerance and the lack of formaldehyde emissions. Unfortunately, polyisocyanate-based resins generally are more expensive than formaldehyde-based resins. As a result, the cost penalty has limited the penetration of isocyanate-based adhesives into major sectors of the commodity wood products industry, which include the particle board sector, the plywood sector, or the fiberboard sector. The adhesives described herein, by including the protein component, provide an adhesive composition with adequate performance properties (e.g., sufficient bond strength when cured) while using a lower amount of polyisocyanate.

Furthermore, in addition to their use in adhesives, the protein component described herein can be used to disperse or emulsify oils during the clean up of oil spills or during tertiary oil recovery. In addition, the protein component can be used in the cosmetic, food and pharmaceutical industries in applications that require the emulsification or dispersion of oils.

The following sections describe the isolation and characterization of protein component useful in making emulsions, dispersions and adhesives, the choice of suitable prepolymers and other additives that can be combined with the polypeptide compositions, methods for making emulsions, dispersions and adhesives, as well as certain applications and uses of the emulsions, dispersions and adhesives described herein.

I. Ground Plant Meal

Plant meal can be obtained from commercial sources or derived from corn, wheat, sunflower, cotton, rapeseed, canola, castor, soy, camelina, flax, jatropha, mallow, peanuts, algae, sugarcane bagasse, tobacco, whey, or a combination thereof. Plant meal can be ground using techniques known in the art, such as hammer mill (cryogenic or ambient) or ball mill. In certain embodiments, the plant meal is ground and screened to isolate plant meal particles having a particle size in the range of from about 1 µm to about 400 µm, from about 1 µm to about 350 µm, from about 1 µm to about 300 µm, from about 1 µm to about 250 µm, from about 1 µm to about 200 µm, from about 1 µm to about 100 µm, from about 1 µm to about 50 µm, from about 5 µm to about 250 µm, from about 5 µm to about 200 µm, from about 5 µm to about 150 µm, from about 5 µm to about 100 µm, from about 5 µm to about 50 µm, from about 10 µm to about 250 µm, from about 10 µm to about 100 µm, from about 10 µm to about 90 µm, from about 10 µm to about 70 µm, from about 10 µm to about 50 µm, from about 20 µm to about 150 µm, from about 20 µm to about 100 µm, from about 20 µm to about 80 µm, from about 20 µm to about 70 µm, from about 20 µm to about 60 µm, from about 25 µm to about 150 µm, from about 25 µm to about 100 µm, from about 25 µm to about 50 µm, from about 50 µm to about 150 µm, or from about 50 µm to about 100 µm.

An additive may be added to the plant meal prior to grinding to aid in the grinding process or produce a ground plant meal with superior physical properties for use in manufacturing an adhesive composition, e.g., providing a ground plant meal with improved flow properties, superior packing density, reduced tendency to cake, reduced tendency to bridge, superior particle dispersibility in aqueous mixtures, modulation of particle coupling and/or wetting characteristics with other materials in the adhesive composition, and the like. Alternatively, the additive may be added to the plant meal during the grinding process used to produce ground plant meal.

Additives that impart superior performance properties to the adhesive composition or the wood composite formed from the adhesive composition may be added to the plant meal before or during grinding or may be added to the ground plant meal produced from the grinding process. Exemplary additives includes those described in Sections IV and V below, and, in particular, include agents that improve moisture resistance of the wood composite, formaldehyde scavenging agents, and composite-release promoting agents. The additive may be in solid or liquid form, and the additive may be characterized according to whether it reacts with materials in the adhesive composition or does not react with materials in the adhesive composition.

Exemplary solid additives include (i) inorganic additives such as silica, pigments, catalysts, and the like, and (ii) organic compounds such as fatty acids (e.g., stearic acid, lauric acid) lignin, tannins, amine-containing compounds, urea, hydrocarbon waxes/liquids, and fluorocarbon waxes/liquids. Solid additives may be used in amounts ranging, for example, from about 0.001% w/w to 40% w/w of the ground plant meal mixture, from about 0.1% w/w to about 20% w/w of the ground plant meal mixture, or from about 0.5% w/w to about 15% w/w of the ground plant meal mixture.

Liquid additives may be dry blended with ground plant meal. The amount of liquid additive should be less than that which causes the ground plant meal to cake or bridge during a manufacturing process. Accordingly, in certain embodiments, the amount of liquid additive(s) is less than about 10% by weight of the ground plant meal mixture containing the additive(s). In certain other embodiments, the amount of liquid additive(s) is less than about 5% by weight, or even less than about 2% by weight, of the ground plant meal mixture containing the additive. The liquid additive may be characterized as reactive or non-reactive. Reactive liquid additives may include organosilanes, low molecular weight alcohols such as glycerin or propylene glycol, liquid polyol oligomers, liquid polyurethane oligomers, addition-polymerizable monomers, condensation-polymerizable monomers, and reactive oils such as epoxidized soy oil or castor oil.

Accordingly, one aspect of the invention provides a ground plant meal mixture comprising ground plant meal and one or more additives described herein, and use of such a mixture in an adhesive composition to form a wood composite.

II. Isolated Polypeptide Composition

The isolated polypeptide composition can be derived from renewable plant biomass, such as corn, wheat, sunflower, cotton, rapeseed, canola, castor, soy, camelina, flax, jatropha, mallow, peanuts, algae, sugarcane bagasse, tobacco, whey, or a combination thereof, using procedures described herein. The isolated polypeptide composition contains water-insoluble/water-dispersible protein fraction, optionally in combination with a water-soluble protein fraction. It is understood that the water-insoluble/water-dispersible protein fraction can disperse conventional oils (for example, reactive oils, or an organic polyisocyanate, which is a reactive prepolymer) that are used to make water and moisture resistant adhesives. Thus, in embodiments where the isolated polypeptide composition contains a mixture of i) water-insoluble/water-dispersible protein fraction and ii) water-soluble protein fraction, the ratio of i) water-insoluble/water-dispersible protein fraction to ii) water-soluble protein fraction is such that the isolated polypeptide composition is able to disperse the prepolymer in an aqueous medium. Moreover, when the adhesive composition contains an isolated polypeptide composition as the sole protein source, then, in certain embodiments, the adhesive composition comprises at least 1% (w/w) urea. The adhesive composition optionally further comprises an additive such as polymer latex to form moisture resistant adhesives (such as to adhere a paper label to a glass bottle or jar).

The terms "protein" and "polypeptide" are used synonymously and refer to polymers containing amino acids that are joined together, for example, via peptide bonds or other bonds, and may contain naturally occurring amino acids or modified amino acids. The polypeptides can be isolated from natural sources or synthesized using standard chemistries. The polypeptides may be modified or derivatized by either natural processes, such as post-translational processing, or by chemical modification techniques well known in the art. Modifications or derivatizations may occur anywhere in the polypeptide, including, for example, the peptide backbone, the amino acid side-chains and the amino or carboxyl termini. Modifications include, for example, cyclization, disulfide bond formation, demethylation, deamination, formation of covalent cross-links, formation of pyroglutamate, formylation, gamma-carboxylation, glycosylation, GPI anchor formation, hydroxylation, iodination, methylation, myristolyation, oxidation, pegylation, proteolytic digestion, phosphorylation, etc. As used throughout, the term "isolated" refers to material that is removed from its original environment (e.g., the natural environment if it is naturally occurring).

A. Preparation of Isolated Polypeptide Composition

The starting material for producing an isolated polypeptide composition can be derived from one or more of corn, wheat, sunflower, cotton, rapeseed, canola, castor, soy, camelina, flax, jatropha, mallow, peanuts, algae, sugarcane bagasse, tobacco, or whey. For example, the starting material for producing an isolated polypeptide composition can be plant meal or a protein isolate. Depending on the properties desired for the adhesive, the isolated polypeptide composition may contain a mixture of i) water-insoluble/water-dispersible protein fraction and ii) water-soluble protein fraction. The water-insoluble/water-dispersible protein fraction and the water-soluble protein fraction can be obtained from plant material using a Water Washing Method or an Acid Precipitation Method, such as those described in more detail below. In certain instances, the composition obtained from the Water Washing Method and or Acid Precipitation Method may be further modified by enzymatic digestion and/or chemical modification.

Water Washing Method

Water-insoluble/water-dispersible protein fraction can be isolated from plant meal (e.g., castor meal, soy meal, or canola meal) by washing with water to remove water-soluble proteins and water-soluble components. The residue left after the water wash is the water-insoluble/water-dispersible protein fraction. A water-soluble protein fraction can be isolated by concentrating aqueous extracts from the water washing. Plant meal used in the process can be ground to reduce particle size, which may, in certain instances, provide processing advantages.

Water-insoluble/water-dispersible protein fraction can also be isolated from, for example, soy protein isolate or from soy flour. The procedure involves washing the soy protein isolate or soy flour with water to remove water-soluble proteins and water-soluble components from the respective soy protein isolate or the water-flour mixture.

The water-insoluble/water-dispersible protein fraction described above may be used directly as a wet slurry in an adhesive composition, or it may be dried and optionally ground to form a particulate mixture.

In certain embodiments, the pH of the water used to wash the plant meal is about 7. In certain other embodiments, the pH of the water used to perform one or more of the washes may be alkaline. Conditions (e.g., number of water washes) for the Water Washing Method may be adjusted in order to maximize the performance properties of the water-insoluble/water-dispersible protein fraction, such as its ability to disperse an oil in water or water in oil.

The Water Washing Method is a simple and economical procedure for obtaining water-insoluble/water-dispersible protein fraction. Due to the simplicity of the method, it is contemplated that the Water Washing Method can be used to provide large quantities of water-insoluble/water-dispersible protein fraction for manufacture of adhesive compositions.

It is appreciated that the water-insoluble/water-dispersible protein fraction obtained using the Water Washing Method may, in certain instances, contain water-insoluble components in addition to water-insoluble protein. If the performance requirements of an adhesive require a water-insoluble/water-dispersible protein fraction having a larger amount of water-insoluble protein, then the Acid Precipitation Method can be used to prepare the water-insoluble/water-dispersible protein fraction.

Acid Precipitation Method

Water-insoluble/water-dispersible protein fraction comprising a relatively higher quantity of water-insoluble protein can be prepared using the Acid Precipitation Method. The Acid Precipitation Method is shown schematically in FIG. 2. This method can also be used to obtain water-soluble protein fraction.

Figure 2:
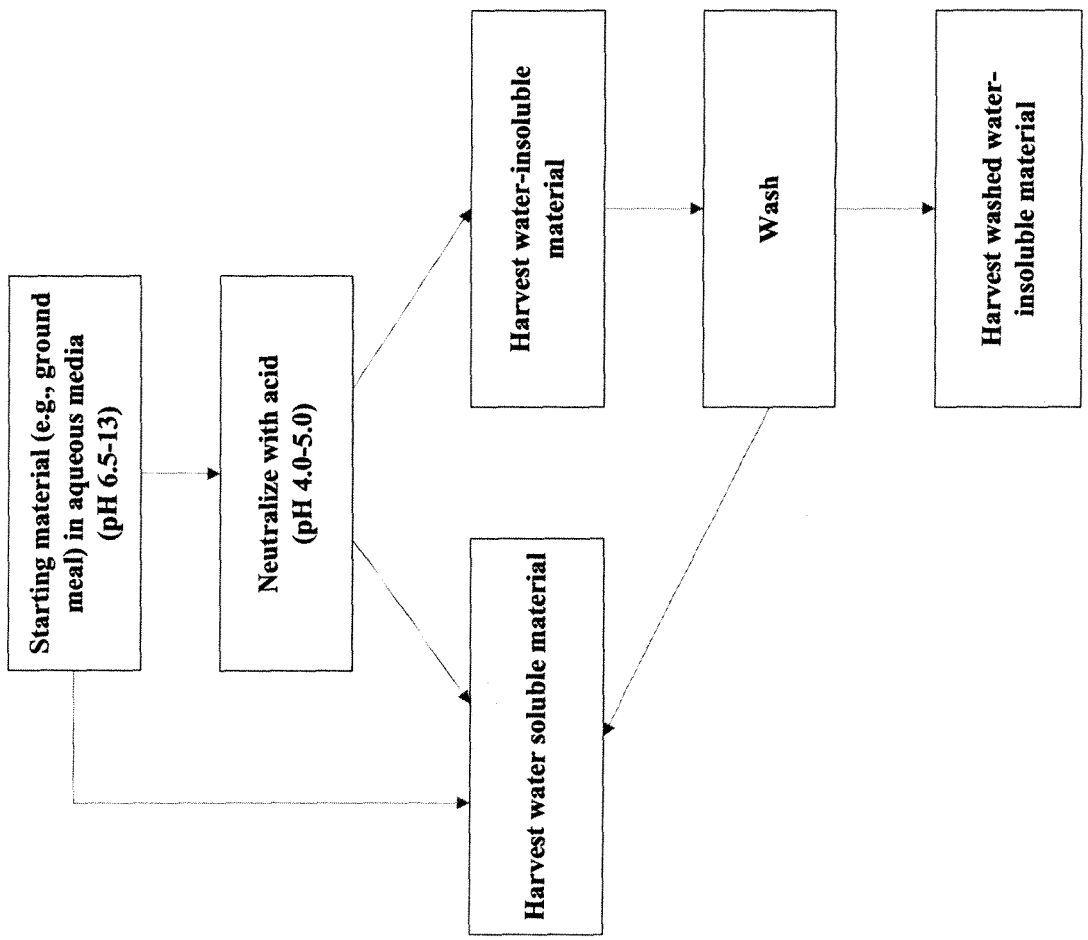
FIG. 2 is a flow chart showing the steps of an exemplary method for producing isolated polypeptide compositions useful in the practice of the invention.

As shown in FIG. 2, the starting material (for example, ground meal) is dispersed in alkaline, aqueous media at pH 6.5-13 for at least 5 minutes, at least 20 minutes, at least 40 minutes or at least 1 hour, to form a mixture. Starting materials include, for example, canola meal, canola protein isolate, castor meal, castor protein isolate, soy meal, or soy protein isolate, or a combination thereof. Then, the pH of the mixture is lowered by the addition of acid (to provide a mixture with a pH in the range of, for example, 4.0-5.0) to precipitate both a portion of water-soluble proteins and water-insoluble proteins. Then, the water-insoluble material (i.e., the precipitate) is harvested. The harvested material is washed with water and the remaining water-insoluble/water-dispersible material is harvested. The resulting water-insoluble/water-dispersible material can be used as is or dried using drying techniques known in the art.

Further, as shown in FIG. 2, the water-soluble proteins can be harvested at a number of places. For example, water-soluble proteins can be harvested after the starting material is mixed in aqueous media, after neutralization, and as a supernatant from the washing steps. The resulting protein can be used as is or dried using drying techniques known in the art.

The water-insoluble/water-dispersible material produced according to the method in FIG. 2 can disperse or emulsify oil in water or water in oil. The physical and chemical properties of the water-soluble/water-dispersible fraction are described in more detail below. In addition, the physical and chemical properties of the water-soluble protein fraction are described in more detail below.

Enzymatic Digestion/Chemical Hydrolysis

The Water Washing Method and Acid Precipitation Method can include one or more enzyme digestion and/or chemical hydrolysis steps. Digestion can be facilitated using one or more enzymes, and hydrolysis can be facilitated using one or more chemicals, for example, acid- or alkali-based hydrolysis. For example, in the Acid Precipitation Method, the starting material (for example, the ground meal) can be exposed to enzymatic digestion before or after, or both before and after the incubation of the starting material in the alkaline aqueous media. Alternatively, or in addition, an enzymatic digestion step can be performed on the material following addition of acid to provide a mixture with a pH in the range of 4.0 to 5.0. Alternatively, or in addition, the harvested water-insoluble/water-dispersible material can be exposed to enzymatic digestion prior to washing. Alternatively, or in addition, the material harvested after washing can be exposed to enzymatic digestion. Chemical hydrolysis, however, can occur with or replace the enzymatic digestion steps noted above.

Under certain circumstances residual basic species and alkali metals present in chemically digested proteins are not compatible with polyisocyanates and can cause trimerization of the isocyanate groups, leading to stability problems in the final polyisocyanate compositions. Enzymatic digestion, however, can be used to avoid or reduce isocyanate stability problems associated with some chemical hydrolysis steps.

It is understood that enzymes useful in the digestion of the protein fractions include endo- or exo-protease of bacterial, fungal, animal or vegetable origin or a mixture of thereof. Useful enzymes include, for example, a serine-, leucine-, lysine-, or arginine-specific protease. Exemplary enzymes include trypsin, chymotrypsins A, B and C, pepsin, rennin, microbial alkaline proteases, papain, ficin, bromelain, cathepsin B, collagenase, microbial neutral proteases, carboxypeptidases A, B and C, camosinase, anserinase, V8 protease from *Staphylococcus aureus* and many more known in the art. Also combinations of these proteases may be used.

Also commercially available enzyme preparations such as, for example, Alcase®, Chymotrypsine 800s, Savinase®, Kannase®, Everlase®, Neutrase®, Flavourzyme® (all available from Novo Nordisk, Denmark), Protex 6.0 L, Peptidase FP, Purafect®, Purastar OxAm®, Properase® (available from Genencor, USA), Corolase L10 (Rohm, Germany), Pepsin (Merck, Germany), papain, pancreatin, proleather N and Protease N (Amano, Japan), BLAP and BLAP variants available from Henkel, K-16-like proteases available from KAO, or combinations thereof. Table 1 describes the amino acid specificity of certain useful endonucleases.

TABLE 1

| No. | Amino Acid | Notation | Commercial Endopeptidase(s) |
|---|---|---|---|
| 1 | Alanine | A | Pronase ®; Neutrase ®: |
| 2 | Cysteine | C | Papain |
| 3 | Aspartic | D | Fromase ®; |
| 4 | Glutamic | E | Alcalase ®; |
| 5 | Phenylalanine | F | Neutrase ®: Fromase ® |
| 6 | Glycine | G | Flavorzyme ®; Neutrase ®: |
| 7 | Histidine | H | Properase ®; |
| 8 | Isoleucine | I | Neutrase ®: |
| 9 | Lysine | K | Alcalase ®; Trypsin; Properase ® |
| 10 | Leucine | L | Alcalase ®; Esperase ®; Neutrase ®: |
| 11 | Methionine | M | Alcalase ®; Neutrase ®: |
| 12 | Asparigine | N | Savinase ®; Flavourzyme ®; Duralase ®; |
| 13 | Proline | P | Pronase ®; Neutrase ®: |
| 14 | Glutamine | Q | Alcalase ® |
| 15 | Arginine | R | Trypsin; Properase ®; |
| 16 | Serine | S | Savinase ®; Flavourzyme ®; Duralase ®; |
| 17 | Threonine | T | Savinase ®; Flavourzyme ®; Duralase ®; |
| 18 | Valine | V | Neutrase ®: |
| 19 | Tryptophan | W | Neutrase ®: Fromase ® |
| 20 | Tyrosine | Y | Alcalase ®; Esperase ®; Fromase ® |

Depending upon the choice enzyme(s), enzymatic digestion usually is conducted under aqueous conditions at the appropriate pH conditions (for example, depending upon the enzyme or enzyme mixture at neutral or at low pH). In certain digestion systems, the digestion optimally occurs at a pH less than 9, or less than 8. For certain applications the pH of the aqueous protein digestion system is in the range of 3-9, 4-8 or 5-7.5.

Once digestion has proceeded to the desired extent, the resulting product optionally is washed and used as is or dried to form a powder. The drying can be performed by techniques known in the art, including spray drying, freeze drying, oven drying, vacuum drying, or exposure to desiccating salts (such as phosphorous pentoxide or lithium chloride).

Chemical Modification of Proteins

In certain embodiments, the proteins in the isolated protein fractions are further derivatized. Suitable processes for derivatization of the polypeptide fractions are provided in the literature. The nature and extent of modification will depend in large part on the composition of the starting material. The derivative can be produced by, for example, replacing at least a portion of primary amine groups of said isolated protein with hydroxyl groups, deaminating the protein, or replacing a portion of amide groups of the protein with carboxyl groups, etc. In other embodiments, the isolated polypeptide compositions described herein are obtained by reacting the protein with protein modifying agents, for example, nitrous oxide, nitrous acid, salts of nitrous acid, or a combination thereof.

B. Characterization of the Water-Insoluble/Water-Dispersible Protein Fraction

The water-insoluble/water-dispersible protein fraction can be characterized accordingly to multiple physical properties. For example, the water-insoluble/water-dispersible protein fraction can be characterized according to its capacity to disperse oil in water or water in oil (see Example 5). The water-insoluble/water-dispersible protein fraction should, at a minimum, disperse at least some oil in water or water in oil. The amount of oil that can be dispersed in water or the amount of water that can be dispersed in oil is a physical property that characterizes a water-insoluble/water-dispersible protein fraction.

The water-insoluble/water-dispersible protein fraction can also be characterized according to i) absorption band(s) observed by solid state FTIR, ii) molecular weight range of the proteins in the fraction, and iii) features in a solution state, two-dimensional proton-nitrogen coupled NMR spectrum of the fraction.

Accordingly, in certain embodiments, the water-insoluble/water-dispersible fraction is characterized by one or more of the following features: (i) a prominent amide-I absorption band between about 1620 $cm^{-1}$ and 1645 $cm^{-1}$, (ii) an amide-II band between approximately 1514 $cm^{-1}$ and 1545 $cm^{-1}$, as determined by solid state FTIR, and (iii) is capable of dispersing an oil-in-water or water-in-oil to produce a homogeneous emulsion that is stable for least 5 minutes.

In certain other embodiments, the water-insoluble/water-dispersible fraction is characterized by one or more of the following features: (i) an amide-I absorption band between about 1620 $cm^{-1}$ and 1642 $cm^{-1}$ and an amide-II band between approximately 1514 $cm^{-1}$ and 1540 $cm^{-1}$, as determined by solid state FTIR, (ii) a prominent 2° amide N—H stretch absorption band centered at about 3272 $cm^{-1}$, as determined by solid state FTIR, and (iii) is capable of dispersing an oil-in-water or water-in-oil to produce a homogeneous emulsion that is stable for least 5 minutes.

In certain other embodiments, the water-insoluble/water-dispersible fraction is characterized by one or more of the following features: (i) an amide-I absorption band between about 1620 $cm^{-1}$ and 1632 $cm^{-1}$ and an amide-II band between approximately 1514 $cm^{-1}$ and 1521 $cm^{-1}$, as determined by solid state FTIR, (ii) a prominent 2° amide N—H stretch absorption band centered at about 3272 $cm^{-1}$, as determined by solid state FTIR, (iii) an average molecular weight of between about 600 and about 2,500 Daltons (determined using, for example, MALDI mass spectrometry), (iv) two protonated nitrogen clusters defined by $^{15}N$ chemical shift boundaries at about 86.2 ppm and about 87.3 ppm, and $^1H$ chemical shift boundaries at about 7.14 ppm and 7.29 ppm for the first cluster, and $^1H$ chemical shift boundaries at about 6.66 ppm and 6.81 ppm for the second cluster, as determined by solution state, two-dimensional proton-nitrogen coupled NMR.

As described above, water-insoluble/water-dispersible fraction is capable of suspending or emulsifying oil in water or water in oil to produce a homogeneous suspension or emulsion stable, by visual inspection, for least 5 minutes. In certain embodiments, the dispersion or emulsion exhibits substantially no phase separation by visual inspection for at least 10, 15, 20, 25, or 30 minutes, or even 1, 2, 3, 4, 5, 6, 9, 12, 18, 24 hours after mixing the polypeptide composition with the oil. As shown in Example 5, the water-insoluble/water-dispersible fraction is capable of emulsifying or dispersing a wide selection of oils, including, for example, an organic polyisocyanate (for example, PMDI) mineral oil, soybean oil, derivatized soybean oil, motor oil, castor oil, derivatized castor oil, dibutyl phthalate, epoxidized soybean oil, corn oil, vegetable oil, caprylic triglyceride, Eucalyptus oil, and tributyl o-acetylcitrate. In an exemplary assay, 14 parts (by weight) of a protein sample of interest is mixed with 86 parts (by weight) of water and the resulting solution or dispersion is mixed with 14 parts (by weight) of oil, for example, PMDI. Under these conditions, the water-insoluble/water-dispersible protein fraction produces a dispersion or emulsion exhibits substantially no phase separation by visual inspection for at least 5 minutes after mixing the polypeptide composition with the oil. The assay can be performed with the other oils.

In certain other embodiments, the water-insoluble/water-dispersible fraction is further characterized by its ability to emulsify or disperse, in water, one or more of the following hydrophobic liquids and hydrophobic solids: a silicone (e.g., a silicone oil or a silicone gel), a fluorocarbon (e.g., a solid wax fluorocarbon or a liquid oil fluorocarbon), a fluorinated polyol, a wax (e.g., a solid carboxylic acid ester (e.g., an ester of stearic acid), a salt of a carboxylic acid (e.g., a salt of stearic acid, e.g., zinc stearate), a hydrocarbon wax, and a fluorinated hydrocarbon wax), a liquid carboxylic acid ester that is hydrophobic, and a liquid hydrocarbon.

In yet other embodiments, the water-insoluble/water-dispersible fraction is further characterized by its ability to emulsify or disperse one or more of the following agents in water: BE Square 165 Amber Petroleum Microcrystalline Wax from Baker Hughes, Inc.; FluoroLink D-10 Fluorinated polyol from Solvay Solexis, Inc; Tego Protect-5000 functionalized silicone fluid from Evonik Tego Chemie GmbH; Soy Lecithin; Castor Oil; Zinc Stearate; Dow Corning FS-1265 Fluid, 300 cST (Trifluoropropyl Methicone) from Dow Corning; and T-Sil-80, hydroxy terminated polydimethylsiloxane from Siovation, Inc. In yet other embodiments, the water-insoluble/water-dispersible fraction is further characterized by its ability to emulsify or disperse a melted wax in water. In certain embodiments, the dispersion or emulsion exhibits substantially no phase separation by visual inspection for at least 10, 15, 20, 25, or 30 minutes, or even 1, 2, 3, 4, 5, 6, 9, 12, 18, 24 hours after mixing the polypeptide composition with the agent.

In certain embodiments, the water-insoluble/water-dispersible fraction is substantially free of primary amines, carboxylic acids, amine salts, and carboxylate salts.

The water-insoluble/water-dispersible protein fraction can act as a surfactant to an organic polyisocyanate (e.g., PMDI), lowering interfacial tension to the point where the water insoluble organic polyisocyante is readily emulsified with minimal energy input, creating an oil-in-water or water-in-oil emulsion. When the source material is a whole meal or a protein isolate derived from soy, castor or canola, a stable emulsion can be obtained using undigested substantially insoluble (fractionated) protein. In certain embodiments, a stable emulsion of polyisocyanate (e.g., PMDI) in water can be achieved when the isolated fractionated polypeptide is comprised of a water-insoluble/water-dispersible fraction, either alone, or in combination with a water soluble component. The acceptable level of the water-soluble component will depend in large part upon the adhesive performance characteristics that are needed for the end-use application. The best overall combination of adhesive performance properties (in terms of PMDI emulsification, bond strength, and water resistance) is achieved when the level of the water-soluble fraction is minimized, and when the level of the water-insoluble dispersible fraction is maximized. For example, where high bond strengths and high degrees of moisture resistance are simultaneously desired from an adhesive formulation as provided herein, the water-insoluble/water-dispersible fraction comprises between about 50%-100%, 50%-80%, 60%-100%, or 60%-90% (w/w) of the entire isolated polypeptide composition that is incorporated into the adhesive formulation.

In applications where achieving high bond strengths and oil (e.g., PMDI) dispersibility in water are more important than maximizing moisture resistance, the water-insoluble/water-dispersible fraction optionally comprises no less than about 45% of the isolated polypeptide composition that is incorporated into the adhesive formulation. Under certain circumstances, for example, an adhesive prepared with digested castor protein extracted from castor meal, the process of isolating and digesting a protein can lead to a polypeptide composition that implicitly contains both water-soluble and water-insoluble fractions at ratios sufficient to simultaneously disperse oil in water while yielding high bond strength adhesives. The process of digesting a whole meal can lead to a mixture that includes a polypeptide composition that implicitly contains both water-soluble and water-insoluble fractions at ratios sufficient to simultaneously disperse oil in water while yielding high bond strength adhesives (an example includes adhesives prepared with digested whole castor meal). Where the process of digestion or extraction does not lead to a polypeptide composition that implicitly comprises both water-soluble and water-insoluble fractions at ratios which are sufficient to simultaneously disperse oil in water while yielding high bond strength adhesives, an additional fractionation step can be used to isolate sufficient levels of the water-insoluble/water-dispersible fraction from the polypeptide composition, so that the ratio of the water-insoluble fraction to the water-soluble fraction can be adjusted in the formulated adhesive for the purpose of achieving the desired combination of end-use properties. In certain embodiments, it may be desirable to obtain an isolated polypeptide composition containing very little or no water-soluble protein fraction, such as through water washing of plant meal, optimization of the Acid Precipitation Method, or enzymatic digestion to reduce the amount of water-soluble protein.

The isolated polypeptide composition obtained using the Water Washing Method may contain a mixture of i) water-insoluble/water-dispersible protein fraction and ii) water-soluble protein fraction. Depending on the composition of the protein source material (e.g., soy meal, soy meal, or canola meal), the isolated polypeptide composition obtained using the Water Washing Method may contain a sufficient amount of water-insoluble/water-dispersible protein fraction to disperse oil or water. If, however, the isolated polypeptide composition obtained using the Water Washing Method contains insufficient water-insoluble/water-dispersible protein fraction, then higher purity water-insoluble/water-dispersible protein fraction obtained from the Acid Precipitation Method can be added to the isolated polypeptide composition in order to increase the relative amount of water-insoluble/water-dispersible protein fraction.

In certain embodiments, the polypeptide fractions used in the compositions and methods provided herein, can have a weight average molecular weight of between about 500 and 25,000 Daltons. Useful polypeptide fractions can have a weight average molecular weight of between about 500 and 2,500 Daltons, between about 700 and 2,300 Da., between about 900 and 2,100 Da., between about 1,100 and 1,900 Da., between about 1,300 and 1,700 Da., or between about 1,000 and 1,300 Da., between about 2,000 and 2,500 Da., or between about 1,000 and 2,500 Da.

The isolated polypeptide composition can be used to make adhesive compositions, as described herein, by combining them with a reactive prepolymer. Reactive prepolymers can be selected from the group consisting of an organic polyisocyanate; a reaction product between an organic polyisocyanate and a polypeptide, a polyol, an amine based polyol, an amine containing compound, a hydroxy containing compound, or a combination thereof; an epoxy containing compound; a reaction product between an epoxy containing compound and a polypeptide, a polyol, an amine based polyol, an amine containing compound, a hydroxy containing compound, or a combination thereof an organosilane; a polymer latex; a polyurethane; and a mixture thereof.

When making the adhesives, the isolated polypeptide composition, in certain embodiments, is capable of dispersing the reactive prepolymer in the aqueous medium to produce a stable dispersion or a stable emulsion. The dispersion or emulsion exhibits substantially no phase separation by visual inspection for at least 5 minutes after mixing the isolated polypeptide composition with the reactive prepolymer. In certain embodiments, the dispersion or emulsion exhibits substantially no phase separation by visual inspection for at least 10, 15, 20, 25, or 30 minutes, or even 1, 2, 3, 4, 5, 6, 9, 12, 18, 24 hours after mixing the isolated polypeptide composition with the reactive prepolymer.

In certain embodiments, the water-insoluble/water-dispersible protein fraction provides a stable emulsion, dispersion or suspension, for example, an aqueous emulsion, dispersion or suspension, comprising from about 1% to about 90% (w/w) of an oil and from about 1% to about 99% (w/w) of an isolated polypeptide composition, wherein the isolated polypeptide composition produces a stable emulsion or dispersion of the oil in an aqueous medium. The aqueous emulsion, dispersion or suspension optionally comprises from about 1% to about 50% (w/w) of oil and from about 1% to about 99% (w/w) of the isolated polypeptide composition. The term "stable" when used in reference to the emulsions, suspensions and dispersions refers to the ability of the polypeptide fraction described herein to create a kinetically stable emulsion for the duration of the intended application of the dispersion or emulsion. The terms "emulsion," "dispersion," and "suspension" are used interchangeably herein.

In certain embodiments, the polypeptide composition has a polydispersity index (PDI) of between about 1 and 1.15. In certain embodiments, the PDI of the adhesives provided created using the polypeptides described herein is between about 1 and about 3, between 1 and 1.5, between 1.5 and 2, between 2 and 2.5, between 2.5 and 3, between 1 and 2, between 1.5 and 2.5, or between 2 and 3.

C. Characterization of Water-Soluble Protein Fraction

The water-soluble protein fractions, for example, the water-soluble protein fractions isolated pursuant to the protocol set forth in FIG. 2, are substantially or completely soluble in water.

The water-soluble protein fractions have one or more of the following six features. (i) An amide-I absorption band between about 1633 $cm^{-1}$ and 1680 $cm^{-1}$, as determined by solid state FTIR. (ii) An amide-II band between approximately 1522 $cm^{-1}$ and 1580 $cm^{-1}$, as determined by solid state FTIR. (iii) Two prominent 1° amide N—H stretch absorption bands in the range of from about 3100-3200 $cm^{-1}$, and in the range of from about 3300-3400 $cm^{-1}$, as determined by solid state FTIR. (iv) A prominent cluster of protonated nitrogen nuclei defined by $^{15}N$ chemical shift boundaries at about 94 ppm and about 100 ppm, and $^1H$ chemical shift boundaries at about 7.6 ppm and 8.1 ppm, as determined by solution state, two-dimensional proton-nitrogen coupled NMR. (v) An average molecular weight of between about 600 and about 2,500 Daltons, for example, as determined by MALDI. (vi) An inability to stabilize an oil-in-water or water-in-oil dispersion or emulsion, where the water and oil components of the mixture form an unstable suspension that macroscopically phase separates under static conditions within five minutes after mixing. This can be tested by dissolving or dispersing 14 parts (by weight) of a protein sample of interest in 86 parts (by weight) of water and then mixing the resulting solution with 14 parts (by weight) of oil, for example, PMDI. Under these conditions, a water-soluble protein is characterized by an inability to stabilize an oil-in-water emulsion, where the oil and water components form an unstable suspension that macroscopically phase separates under static conditions within five minutes after mixing.

III. Prepolymer Considerations

When making suitable emulsions, dispersions, and adhesives, the protein component (i.e., ground plant meal or isolated protein composition) described hereinabove can be combined with a reactive prepolymer. The term "prepolymer" is understood to mean a compound, material or mixture that is capable of reacting with a protein component described herein to form an adhesive polymer. Exemplary prepolymers include, for example, isocyanate-based prepolymers, epoxy-based prepolymers, and latex prepolymers. Further, for illustration, the term "prepolymer" includes full prepolymers and partial prepolymers (referred to as semiprepolymers, pseudoprepolymers, or quasiprepolymers in certain embodiments). One example of a quasi prepolymer is a NCO-terminated product prepared from a diisocyanate and polyol in which the prepolymer is a mixture of (i) a product prepared from the diisocyanate and polyol, and (ii) unreacted diisocyanate. On the other hand, an example of a full prepolymer is the product formed by reacting an isocyanate with a particular polyol blend so that there are substantially no residual monomeric isocyanates in the finished product.

An isocyanate-based prepolymer can be an organic polyisocyanate, which can be (i) a polyisocyanate (or monomeric diisocyanate) that has not been reacted with another compound, (ii) a polyisocyanate modified by various known self-condensation reactions of polyisocyanates, such as carbodiimide modification, uretonimine modification, trimer (isocyanurate) modification or a combination thereof, so long as the modified polyisocyanate still contains free isocyanate groups available for further reaction, or (iii) the product formed by reaction of a polyisocyanate base with a compound having nucleophilic functional groups capable of reacting with an isocyanate group. Exemplary compounds containing a nucleophilic functional group capable of reacting with an isocyanate group include a polypeptide (for example, one or more of the protein fractions described herein), a polyol, an amine based polyol, an amine containing compound, a hydroxy containing compound, carboxylic acid containing compound, carboxylate salt containing compound, or a combination thereof. The term "polyisocyanate" refers to difunctional isocyanate species, higher functionality isocyanate species, and mixtures thereof.

One desirable feature of an isocyanate-based prepolymer is that the prepolymer remain stable enough for storage and use, desirably liquid and of reasonable viscosity at ambient temperatures (25° C.), and contains free isocyanate (—NCO) groups which can participate in forming adhesive bonds.

As noted above, the organic polyisocyanate can be prepared from a "base polyisocyanate." The term "base isocyanate" as used herein refers to a monomeric or polymeric compound containing at least two isocyanate groups. The particular compound used as the base polyisocyanate can be selected so as to provide an adhesive having certain desired properties. For example, base polyisocyanate can be selected based on the number-average isocyanate functionality of the compound. For example, in certain embodiments, the base polyisocyanate can have a number-average isocyanate functionality of 2.0 or greater, or greater than 2.1, 2.3 or 2.4. In certain embodiments, the reactive group functionality of the polyisocyanate component ranges from greater than 1 to several hundred, 2 to 20, or 2 to 10. In certain other embodiments, the reactive group functionality of the polyisocyanate component is at least 1.9. In certain other embodiments, the reactive group functionality of the polyisocyanate component is about 2. Typical commercial polyisocyanates (having an isocyanate group functionality in the range of 2 to 3) may be pure compounds, mixtures of pure compounds, oligomeric mixtures (an important example being polymeric MDI), and mixtures of these.

Useful base polyisocyanates have, in one embodiment, a number average molecular weight of from about 100 to about 5,000 g/mol, from about 120 to about 1,800 g/mol, from about 150 to about 1,000 g/mol, from about 170 to about 700 g/mol, from about 180 to about 500 g/mol, or from about 200 to about 400 g/mol. In certain other embodiments, at least 80 mole percent or, greater than 95 mole percent of the isocyanate groups of the base polyisocyanate composition are bonded directly to an aromatic group. In certain embodiments, the adhesives described herein have a concentration of free organically bound isocyanate (—NCO) groups in the range of from about 5% to 35% (wt/wt), about 7% to 31% (wt/wt), 10% to 25% (wt/wt), 10% to 20% (wt/wt), 15% to 27% (wt/wt).

In certain embodiments, the base polyisocyanate is an aromatic polyisocyanate, such as p-phenylene diisocyanate; m-phenylene diisocyanate; 2,4-toluene diisocyanate; 2,6-toluene diisocyanate; naphthalene diisocyanates; dianisidine diisocyanate; polymethylene polyphenyl polyisocyanates; 2,4'-diphenylmethane diisocyanate (2,4'-MDI); 4,4'-diphenylmethane diisocyanate (4,4'-MDI); 2,2'-diphenylmethane diisocyanate (2,2'-MDI); 3,3'-dimethyl-4,4'-biphenylenediisocyanate; mixtures of these; and the like. In certain embodiments, polymethylene polyphenyl polyisocyanates (MDI series polyisocyanates) having a number averaged functionality greater than 2 are utilized as the base polyisocyanate.

In certain embodiments, the MDI base polyisocyanate comprises a combined 2,4'-MDI and 2,2'-MDI content of less than 18.0%, less than 15.0%, less than 10.0%, or less than 5.0%.

In certain other embodiments, the MDI diisocyanate isomers, mixtures of these isomers with tri- and higher functionality polymethylene polyphenyl polyisocyanates, the tri- or higher functionality polymethylene polyphenyl polyisocyanates themselves, and non-prepolymer derivatives of MDI series polyisocyanates (such as the carbodiimide, uretonimine, and/or isocyanurate modified derivatives) are utilized as polyisocyanates for use as the base polyisocyanate. In certain other embodiments, the base polyisocyanate composition comprises an aliphatic polyisocyanate (e.g., in a minor amount), e.g., an aliphatic polyisocyanate comprising an isophorone diisocyanate, 1,6-hexamethylene diisocyanate, 1,4-cyclohexyl diisocyanate, or saturated analogues of the above-mentioned aromatic polyisocyanates, or mixtures thereof.

In certain other embodiments, the base polyisocyanate comprises a polymeric polyisocyanate, e.g., a polymeric diphenylmethane diisocyanate (polymethylene polyphenyl polyisocyanate) species of functionality 3, 4, 5, or greater. In certain embodiments, the polymeric polyisocyanates of the MDI series comprise RUBINATE-M® polyisocyanate, or a mixture of MDI diisocyanate isomers and higher functionality oligomers of the MDI series. In certain embodiments, the base polyisocyanate product has a free —NCO content of about 31.5% by weight and a number averaged functionality of about 2.7.

In certain embodiments, the isocyanate group terminated prepolymers are urethane prepolymers. These can be produced by reaction of a hydroxyl-functional compound with an isocyanate functional compound. In certain other embodiments, allophanate prepolymers are utilized. Allophanate prepolymers typically require higher temperatures (or allophanate catalysts) to facilitate reaction of the polyol with the polyisocyanate to form the allophanate prepolymer.

Polyisocyanates used in the compositions described can have the formula $R(NCO)_n$, where n is 2 and R can be an aromatic, a cycloaliphatic, an aliphatic, each having from 2 to about 20 carbon atoms. Examples of polyisocyanates include, but are not limited to, diphenylmethane-4,4'-diisoeyanate (MDI), toluene-2,4-diisocyanate (TDI), toluene-2,6-diisocyanate (TDI), methylene bis(4-cyclohexylisocyanate (CHMDI), 3-isocyanatomethyl-3,5,5-trimethyl-cyclohexyl isocyanate (IPDI), 1,6-hexane diisocyanate (HDI), naphthalene-1,5-diisocyanate (NDI), 1,3- and 1,4-phenylenediisocyanate, triphenylmethane-4,4',4"-triisocyanatc, polymeric diphenylmethane diisocyanate (PMDI), m-xylene diisocyanate (XDI), 1,4-cyclohexyl diisocyanate (CHDl), isophorone diisocyanate, isomers, dimers, trimers and mixtures or combinations of two or more thereof. The term "PMDI" encompasses PMDI mixtures in which monomeric MDI, for example 4,4'-, 2,2'- and/or 2,4'-MDI, is present. PMDI is, in one embodiment, prepared by phosgenation of the corresponding PMDA in the presence of an inert organic solvent. PMDA is in turn obtained by means of an acid aniline-formaldehyde condensation which can be carried out industrially either continuously or batchwise. The proportions of diphenylmethanediamines and the homologous polyphenylpolymethylenepolyamines and their positional isomerism in the PMDA are controlled by selection of the ratios of aniline, formaldehyde and acid catalyst and also by means of a suitable temperature and residence time profile. High contents of 4,4'-diphenylmethanediamine together with a simultaneously low proportion of the 2,4' isomer of diphenylmethanediamine are obtained on an industrial scale by the use of strong mineral acids such as hydrochloric acid as catalyst in the aniline-formaldehyde condensation.

The epoxy-based prepolymer can be an epoxide containing compound. Alternatively, the epoxy-based prepolymer can be a reaction product between an epoxy and a polypeptide, a polyol, an amine based polyol, an amine containing compound, a hydroxy containing compound, or a combination thereof.

In certain embodiments, the composition is an epoxy resin comprising free epoxy groups. Alternatively, the epoxy resin composition is prepared by combining a precursor epoxy resin composition with the isolated and fractionated polypeptide compositions described herein. The epoxy resin composition can comprise derivatives of digested proteins as described herein.

Epoxy resins refer to molecular species comprising two or more epoxide (oxirane) groups per molecule. Epoxy resins can contain mono-epoxides as reactive diluents, but the main constituents by weight of such resins are still di and/or higher functionality species (containing two or more epoxide groups per molecule).

Epoxy resins useful as precursor epoxy resins can include those which comprise difunctional epoxide and/or higher functionality polyepoxide species. Precursor epoxy resins include but are not limited to diglycidyl ether of bisphenol-A, diglycidyl ethers of bisphenol-A alkoxylates, epoxy novolac resins, expoxidized soy oil, epoxidized linseed oil, epichlorohydrin, a glycidyl ether type epoxy resin derived from a polyphenol by reaction with epichlorohydrin, and combinations thereof. In another embodiment, precursor epoxy resins are modified by combining them with the polypeptide compositions described herein, either in bulk or in aqueous suspension.

The modified epoxy resins can be used in multi-part mixing-activated adhesive formulations. Alternatively, multi-part formulations can comprise polyisocyanates and/or known amine based epoxy curatives as additional components. Alternatively, modified epoxy resins can be used with any cure catalysts or other additives known in the epoxy resin art. The polypeptide compositions described herein contain functional groups which react with epoxide groups in the epoxy resin. The extent of this reaction depends upon the preparative conditions, use or non-use of catalysts, the specific resins and protein component described herein selected, etc.

An important subset of epoxy resins can be made by reacting a precursor polyol with an epihalohydrin, such as epichlorohydrin. The products of the reaction are called glycidyl ethers (or sometimes as polyglycidyl ethers or diglycidyl ethers). In certain embodiments, all the hydroxyl groups in the precursor polyols are converted to the corresponding glycidyl ethers.

An important class of glycidyl ether type epoxy resins are derived from polyphenols, by reaction with epichlorohydrin. The starting polyphenols are di- or higher functionality phenols. Industrially important examples of this type of epoxy resin comprise, for example, diglycidyl ether of bisphenol-A (also known as DGEB-A); diglycidyl ether of 2,6,2',6'-tetrachloro bisphenol A; diglycidyl ether of bisphenol-F (DGEB-F); epoxidized novolac resins; mixtures of these, and the like.

Partially or fully saturated (hydrogenated) analogs of these epoxy resins may also be used. A non limiting example of a known saturated epoxy resin of this type is DGEB-H, which is the fully hydrogenated (ring saturated) aliphatic analog of DGEB-A.

Amines, which contain active hydrogen atoms may also be reacted with epichlorohydrin to form epoxy resins. Examples of these types of resins include, for example, N,N,N',N'-tetraglycidyl diphenylmethane diamine (such as the 4,4' isomer); p-glycidyloxy-N,N-diglycidylaniline; N,N-diglycidylaniline; mixtures of these; and the like.

Heterocyclic nitrogen compounds that contain active hydrogen atoms may likewise be converted into the corresponding epoxy resins by reaction with epichlorohydrin. Non limiting examples of such resins include, for example, N,N', N"-triglycidyl isocyanurate; N,N'-diglycidyl-5,5-dimethylhydantoin; mixtures of these; and the like.

Many other kinds of epoxy resins are known which are not made by reaction of an active hydrogen precursor with an epihalohydrin. Non-limiting examples of these types of epoxy resins, known in the art, include, for example, dicyclopentadiene diepoxide (also known as DCPD dioxide), vinycyclohexene diepoxide (dioxide), epoxidized polyunsaturated vegetable oils (such as epoxidized linseed oil, epoxidized soy oil, etc.), epoxidized polydiene resins (such as epoxidized polybutadienes), 3,4-epoxy-6-methyl cyclohexylmethyl-3,4-epoxy-6-methyl cyclohexane carboxylate, mixtures of these, and the like. In principle, any precursor molecule which contains two or more units of reactive aliphatic "C=C" unsaturation per molecule might be converted into an epoxy resin.

It should be understood that any of the base epoxy resins known in the art, such as those listed above, are frequently modified with diluents, flexibilizers, and/or other additives. The optional possibility of using one or more known art modifiers or additives, in addition to the required protein derivatives, is within the level of skill in the art. Those skilled in the art of formulating adhesive systems using epoxy resins will appreciate how and when to use known optional additives and modifiers.

In addition, the prepolymers can include one, two or more polyol compounds. Exemplary polyol compounds include an amine alkoxylate, polyoxypropylene glycol, propylene glycol, polyoxyethylene glycol, polytetramethylene glycol, polyethylene glycol, propane diol, glycerin, or a mixture thereof.

Polyols useful in preparing the adhesives described herein include all known polyols, for example, polyols used in the polyurethanes art. In certain embodiments, the polyol comprises primary and/or secondary hydroxyl (i.e., —OH) groups. In certain other embodiments, the polyol comprises at least two primary and/or secondary hydroxyl (i.e., —OH) groups per molecule. Mono functional alcohols (such as aliphatic alcohols, aromatic alcohols, or hydroxyl functional monomers such as hydroxyl functional acrylates (to yield UV or thermally curable materials) can be used to cap an isocyanate group. In certain other embodiments, the polyol comprises a hydroxyl (i.e., —OH) group functionality between 1.6 and 10, between 1.7 to 6, between 2 to 4, or between 2 to 3. In certain other embodiments, the weight average molecular weight range for the optional polyols is from 100 to 10,000 g/mol, from 400 to 6,000 g/mol, or from 800 to 6,000 g/mol.

In certain other embodiments, useful polyols are polyester polyols or polyether polyols, such as an aliphatic polyether polyol. One exemplary aliphatic polyether polyol is polyoxypropylene glycol, with a number average molecular weight in the range of from 1,500 to 2,500 g/mol.

In certain embodiments, the total amount of all polyol, or polyols, in the isocyanate reactive component is from 1% to 80%, or from 3% to 70%, or from 5% to 60% by weight of the total.

In certain other embodiments, alkanolamines comprising primary, secondary, and/or tertiary amine groups can be used.

In certain embodiments, useful water-dispersible polymer latexes can include latexes of polymethylmethacrylate and its copolymers, latexes of polymethacrylate and its copolymers, latexes of polyvinylchloride and its copolymers, latexes of polyvinylacetate and its copolymers, polyvinyl alcohol and its copolymers, etc.

Further, as discussed above, the prepolymer species can comprise a terminated isocyanate. Here, for example, a polyol is reacted with the base polyisocyanate composition prior to or during mixing with the polypeptide fractions herein. Those skilled in the art will recognize many variations on the use of optional prepolymers in preparing wood adhesive compositions.

The amount of reactive prepolymer used in the adhesive compositions can be selected based on the desired properties of the adhesive composition. For example, when optimizing the viscosity of a one-part adhesive, the ratio of prepolymer (e.g., PMDI, Epoxy and the like) to protein component (i.e., ground plant meal or isolated polypeptide composition) can be from about 10:1 and 4:1 in order to form an adhesive composition that is relatively less viscous. Alternatively, for a two-part adhesive, the ratio of prepolymer (e.g., PMDI, Epoxy and the like) to protein component can be from about 1:20 to 3:2.

IV. Formaldehyde Scavenging Agent

A variety of formaldehyde scavenging agents are described in the literature and are contemplated to be amenable to the present invention. Different formaldehyde scavenging agents have different reactivity profiles, and a particular formaldehyde scavenging agent (e.g., $H_2NC(O)NH_2$, $Me_2NC(O)NH_2$, or $CH_3CH_2NH_2$) can be selected to optimize the performance properties of the adhesive composition and/or binder composition formed by the adhesive. Accordingly, in certain embodiments, the formaldehyde scavenging agent has the formula $RNH_2$, $R_2NH$, $RC(O)NH_2$, $RN(H)C(O)NH_2$, $R_2NC(O)NH_2$, or $RN(H)C(O)N(H)R$, wherein R represents independently for each occurrence H, alkyl, aryl, or aralkyl. In certain embodiments, the formaldehyde scavenging agent has the formula $RN(H)C(O)N(H)R$, wherein R represents independently for each occurrence H, alkyl, aryl, or aralkyl. In certain other embodiments, the formaldehyde scavenging agent is $H_2NC(O)NH_2$, $H_2NC(O)N(H)Me$, $MeN(H)C(O)N(H)Me$, $H_2NC(O)N(CH_3)_2$, $CH_3C(O)NH_2$, $CH_3CH_2C(O)NH_2$, $CH_3NH_2$, $CH_3CH_2NH_2$, $(CH_3)_2NH$, or $(CH_3CH_2)_2NH$. In still other embodiments, the formaldehyde scavenging agent is $H_2NC(O)NH_2$.

The term "alkyl" as used herein refers to a saturated straight or branched hydrocarbon, such as a straight or branched group of 1-12, 1-10, or 1-6 carbon atoms, referred to herein as $C_1$-$C_{12}$alkyl, $C_1$-$C_{10}$alkyl, and $C_1$-$C_6$alkyl, respectively. Exemplary alkyl groups include, but are not limited to, methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl, octyl, etc.

The term "aryl" as used herein refers to refers to a mono-, bi-, or other multi-carbocyclic, aromatic ring system. Unless specified otherwise, the aromatic ring is optionally substituted at one or more ring positions with substituents selected from alkanoyl, alkoxy, alkyl, alkenyl, alkynyl, amido, amidino, amino, aryl, arylalkyl, azido, carbamate, carbonate, carboxy, cyano, cycloalkyl, ester, ether, formyl, halogen, haloalkyl, heteroaryl, heterocyclyl, hydroxyl, imino, ketone, nitro, phosphate, phosphonato, phosphinato, sulfate, sulfide, sulfonamido, sulfonyl and thiocarbonyl. The term "aryl" also includes polycyclic ring systems having two or more cyclic rings in which two or more carbons are common to two adjoining rings (the rings are "fused rings") wherein at least one of the rings is aromatic, e.g., the other cyclic rings may be cycloalkyls, cycloalkenyls, cycloalkynyls, and/or aryls. Exemplary aryl groups include, but are not limited to, phenyl, tolyl, anthracenyl, fluorenyl, indenyl, azulenyl, and naphthyl, as well as benzo-fused carbocyclic moieties such as 5,6,7,8-tetrahydronaphthyl. In certain embodiments, the aryl group is not substituted, i.e., it is unsubstituted.

The term "aralkyl" as used herein refers to an aryl group having at least one alkyl substituent, e.g. -aryl-alkyl-. Exemplary aralkyl groups include, but are not limited to, arylalkyls having a monocyclic aromatic ring system, wherein the ring comprises 6 carbon atoms. For example, "phenylalkyl" includes phenyl$C_4$alkyl, benzyl, 1-phenylethyl, 2-phenylethyl, etc.

The amount of formaldehyde scavenging agent in the adhesive formulation can adjusted to optimize the performance properties of the adhesive composition and/or binder composition formed by the adhesive. In certain embodiments, the mole ratio of formaldehyde scavenging agent to reactive prepolymer is at least about 0.1:1, at least about 0.5:1, at least about 1:1, at least about 2:1, at least about 3:1, at least about 4:1 or at least about 5:1. In certain embodiments, the mole ratio of formaldehyde scavenging agent to reactive prepolymer is in the range of from about 0.01: to about 0.5:1, from about 0.5:1 to about 5:1, or from about 1:1 to about 4:1. In still other embodiments, the mole ratio of formaldehyde scavenging agent to reactive prepolymer is at least 0.05:1. In still other embodiments, the mole ratio of formaldehyde scavenging agent to reactive prepolymer is at least 5:1.

In certain embodiments, the formaldehyde scavenging agent is present in an amount from about 1% to about 50% (w/w), from about 1% to about 30% (w/w), from about 1% to about 20% (w/w), from about 5% to about 50% (w/w), from about 5% to about 30% (w/w), from about 5% to about 20% (w/w), from about 10% to about 50% (w/w), from about 10% to about 30% (w/w), or from about 10% to about 20% (w/w) of the adhesive composition. In certain other embodiments, the formaldehyde scavenging agent is present in an amount from about 1% to about 50% (w/w) of the adhesive composition. In still other embodiments, the formaldehyde scavenging agent is present in an amount from about 2% to about 30% (w/w) of the adhesive composition.

V. Additional Additives

It is understood that the polypeptide fraction, the prepolymer, or mixtures formed from these components can be mixed with one or more additives depending upon the intended use. Exemplary additives include catalysts, tacking agents, extenders, fillers, viscosifying agents, surfactants, adhesion promoters, antioxidants, antifoaming agents, antimicrobial agents, antibacterial agents, fungicides, pigments, inorganic particulates, gelling agents, cross-linking agents, agents that improve moisture resistance, pH modulators, and composite-release promoters.

In certain embodiments, the additive is a water-dispersible additive or a water-soluble additive. Water-soluble additives include hydroxyl-functional or amine-functional compounds (such as glycerin, propylene glycol, polypropylene glycol, polyethylene glycol, trimethylol propane and its adducts, phenols, polyphenols, etc.) capable of reacting with a polymeric isocyanate, e.g., PMDI. One benefit of using glycerin and various low-viscosity polyols is that they allow less water to be used in the adhesive composition. Reducing the amount of water, while retaining a low-viscosity adhesive composition, desirably reduces the risk that the composite formed therefrom is damaged by steam generated during formation of the composite at high temperature.

In certain other embodiments, the additive is a non-volatile (e.g., having a boiling point of greater than about 180° C. at 760 mmHg), inert viscosity-reducing diluent. In yet other embodiments, the additive is an antioxidant, antifoaming agent, anti-bacterial agent, fungicide, pigment, viscosifying agent, gelling agent, aereosolozing agent, inorganic particulate (e.g., titanium dioxide, yellow iron oxide, red iron oxide, black iron oxide, zinc oxide, aluminum oxide, aluminum trihydrate, calcium carbonate), clay such as montmorillonite, a wetting agent, and the like.

In certain embodiments, the additive is an agent that improves moisture-resistance. In certain other embodiments, the additive is a composite-release promoter (such as a composite-release promoter selected from the group consisting of a $C_{10-25}$ alkanoic acid, a salt of a $C_{10-25}$ alkanoic acid, a $C_{10-25}$ alkenoic acid, a salt of an $C_{10-25}$ alkenoic acid, and a silicone). In certain other embodiments, the additive is a pH modulator.

Exemplary classes of additives are described in more detail in the sections below.

Catalyst

Exemplary catalysts include, for example, a primary amine, a secondary amine, a tertiary amine, an organometallic compound, or a combination thereof. Exemplary primary amines include, for example, methylamine, ethylamine, propylamine, cyclohexylamine, and benzylamine. Exemplary secondary amines include, for example, dimethylamine, diethylamine, and diisopropylamine. Exemplary tertiary amines include, for example, diazabicyclooctane (Dabco), triethylamine, dimethyl benzylamine, bis-dimethylaminoethyl ether, tetramethyl guanidine, bis-dimethylaminomethyl phenol, 2,2'-dimorpholinodiethyl ether, 2-(2-dimethylamino-ethoxy)-ethanol, 2-dimethylaminoethyl-3-dimethylamino-propyl ether, bis-(2-diaminoethyl)-ether, N,N-dimethyl piperazine, N-(2-hydroxyethoxyethyl)-2-azanorbornane, Tacat DP-914 (Texaco Chemical), Jeffcat®, N,N,N,N-tetramethyl butane-1,3-diamine, N,N,N,N-tetramethyl propane-1,3-diamine, N,N,N,N-tetramethyl hexane-1,6-diamine, 2,2'-dimorpholinodiethyl ether (DMDEE), or a mixture thereof. Exemplary organometallic compounds include, for example, di-n-octyl tin mercaptide, dibutyl tin maleate, diacetate, dilaurate, dichloride, bis-dodecyl mercaptide, tin(II) acetate, ethyl hexoate and diethyl hexoate, $Fe^{+3}$ 2,4-pentanedionate (FeAcAc), or lead phenyl ethyl dithiocarbamate.

In certain other embodiments, the catalyst is a transition metal acetylacetonates, e.g., an acetylacetonate compound comprising iron, copper, or nickel. In certain embodiments, the transition metal acetylacetonate comprises a tertiary amine, e.g., 2,2'-dimorpholino diethyl ether.

The amount of catalyst used in the adhesive composition can be varied in order to optimize the features of the adhesive. In certain embodiments, the catalyst is present in less than 1% (wt/wt), 0.5% (wt/wt), or 0.1% (wt/wt) of the adhesive composition. In certain other embodiments, the catalyst is present in a range from 0.001% (wt/wt) to 0.75% (wt/wt), 0.001% (wt/wt) to 0.01% (wt/wt), 0.01% (wt/wt) to 0.05% (wt/wt), or 0.05% (wt/wt) to 0.5% (wt/wt) of the adhesive composition.

Tacking Agent

Exemplary tacking agents include, for example, glycerin, corn syrup, soy oil, a poly($C_2$-$C_6$)alkylene, mineral oil, an ethylene/propylene/styrene copolymer, a butylene/ethylene/styrene copolymer, or a mixture of one or more of the foregoing. In certain embodiments, the additive is polybutene. In certain embodiments, the polybutene has a weight average molecular weight of from about 200 g/mol to about 20,000 g/mol, from about 200 g/mol to about 10,000 g/mol, from about 200 g/mol to about 5,000 g/mol, from about 200 g/mol to about 2,000 g/mol, from about 200 g/mol to about 1,000 g/mol, from about 500 g/mol to about 2,000 g/mol, or from about 500 g/mol to about 1,000 g/mol. Other tacking agents include a solid selected from the group consisting of a terpene resin, a rosin ester derivative, and a hydrocarbon-based derivative. When the tacking agent is a solid, the tacking agent may optionally be pre-dissolved in an oil-phase of the adhesive composition (e.g., in PMDI). Alternatively, the solid tacking agent can be pre-melted and dispersed in water by means of the protein component, or the solid tacking agent can be ground and dispersed as fine particulates directly into the adhesive composition.

Extender

Exemplary extenders include, for example, inert extenders or active extenders. In certain embodiments, the inert extender is vegetable particulate matter, vegetable oil, mineral oil, dibasic esters, propylene carbonate, non-reactive modified aromatic petroleum hydrocarbons, soy oil, castor oil, and in general any non-active hydrogen containing liquid that can be incorporated into an isocyanate based adhesive. Another inert extender is any non-active hydrogen containing solid that is soluble, e.g., soluble in oil or soluble in water. The active extender can be a pyrrolidone monomer or polymers, an oxizolidone monomer or polymers, an epoxidized oil, or an unsaturated oil, such as linseed oil. Another active extender is a vinyl monomer or mixture of vinyl monomers.

Surfactants & Adhesion Promoters

Exemplary surfactants include, for example, monomeric types, polymeric types, or mixtures thereof. Exemplary adhesion promoters include, for example, organosilanes and titanates.

Antimicrobial Agent

Antimicrobial agents known in the art that do not substantially react with PMDI are contemplated for use in the adhesive compositions and composites described herein. One exemplary antimicrobial agent is polyalkylene glycol polymers, such as polypropylene glycol.

Crosslinking Agent

In other embodiments, the additive can be a crosslinking agent, for example, a crosslinking agent that can be used to bond lignocellulosic material to glass. Exemplary crosslinking agents include an organosilane, such as dimethyldichlorosilane (DMDCS), alkyltrichlorosilane, methyltrichlorosilane (MTCS), N-(2-aminoethyl)-3-aminopropyl trimethoxysilane (AAPS), or a combination thereof. In other embodiments the polypeptide fractions are combined with an organosilane to form an adhesive for bonding one or more substrates together in any combination, said substrates including glass, paper, wood, ceramic, steel, aluminum, copper, brass, etc. The term "organosilane" refers to any group of molecules including monomers, hydrolyzed monomers, hydrolyzed dimers, oligomers, and condensation products of a trialkoxysilane having a general formula:

$(RO)_3Si-R'$ where R is preferably a propyl, ethyl, methyl, isopropyl, butyl, isobutyl, sec-butyl, t-butyl, or acetyl group, and R' is an organofunctional group where the functionality may include an aminopropyl group, an aminoethylaminopropyl group, an alkyl group, a vinyl group, a phenyl group, a mercapto group, a styrylamino group, a methacryloxypropyl group, a glycidoxy group, an isocyante group, or others.

Similarly, a bis-trialkoxysilane having the general formula $(RO)_3Si-R'-Si(OR)_3$ can also be employed as an "organosilane" either alone or in combination with a trialkoxysilane, where R is preferably a propyl, ethyl, methyl, isopropyl, butyl, isobutyl, sec-butyl, t-butyl, or acetyl group, and R' is a bridging organofunctional residue which may contain functionality selected from the group consisting of amino groups, alky groups, vinyl groups, phenyl groups, mercapto groups, and others. Similarly, a tetraalkoxysilane having the general formula $(RO)_4Si$ can also be employed as an "organosilane" either alone or in combination with a trialkoxysilane, or a bis-trialkoxysilane, where R is preferably a propyl, ethyl, methyl, isopropyl, butyl, isobutyl, sec-butyl, t-butyl, or acetyl group.

Agent that Improves Moisture-Resistance

Agents that improve moisture-resistance refer to those materials that, when added to adhesive compositions described herein, improve the ability of a wood composite formed from the adhesive to be resistant to water, i.e., not absorb water. Exemplary types of agents that improve moisture resistance include fluorinated polyol compounds, silicones, siloxanes (including functionalized siloxane polymers, such as hydroxy-terminated siloxane polymers or hydroxyl alkyl siloxane polymers), polyolefin polymers, wax (e.g., fatty acids (such as an alkyl carboxylic acid), salts of a fatty acid (e.g., an alkali metal salt of an alkyl carboxylic acid), esters of a fatty acid (e.g., an alkyl ester of a carboxylic acid, an aryl ester of a carboxylic acid, an alkyl ester of an alkanoic acid, or an aryl ester of an alkanoic acid), fatty alcohols, mixtures of hydrophobic hydrocarbons, water-based emulsions containing hydrophobic hydrocarbons dispersed therein, a hydrocarbon wax, a fluoroalkylphosphate wax, a fluorinated hydrocarbon wax, and a fluoroalkyl functionalized wax), and hydrophobic oils. Another agent that improves moisture-resistance is a fluorinated silicone. When an agent that improves moisture-resistance is present in an adhesive composition, it is desirably present in an amount effective to increase moisture resistance (e.g., an increase in moisture resistance of at least about 2%, 5%, 10%, or 20% compared to the moisture resistance of a composite formed from an adhesive composition lacking the agent that improves moisture-resistance).

Agents that improve moisture-resistance may be present in the final composite at a weight percent in the range of about 0.01% (w/w) to about 5% (w/w), about 0.01% (w/w) to about 2% (w/w), about 0.01% (w/w) to about 1% (w/w), about 0.01% (w/w) to about 0.5%, about 0.1% (w/w) to about 2% (w/w), (w/w), about 0.1% (w/w) to about 1% (w/w), (w/w), about or 0.5% (w/w) to about 1% (w/w).

One exemplary fluorinated polyol compound is FluoroLink D-10 fluorinated polyol that is commercially available from Solvay Solexis, Inc. Exemplary silicones include Dow Corning FS-1265 Fluid, 300 cST (Trifluoropropyl Methicone) from Dow Corning), and T-Sil-6011 SE Emulsion (60% Solids), from Siovation, Inc. which is a emulsion containing 60% w/w silicones. The silicone may be organically modified, such as $C_{20-24}$ Alkyl Methicone, $C_{24-28}$ Alkyl Methicone, $C_{30-45}$ Alkyl Methicone, Stearyl Dimethicone, Biphenyl Dimethicone, Stearoxy Dimethicone, $C_{20-24}$ Alkyl Dimethicone, or $C_{24-28}$ Alkyl Dimethicone.

Exemplary types of functionalized siloxane polymers include (1) a hydroxy-terminated siloxane polymer such as hydroxy-terminated polydimethylsiloxane (e.g., T-Sil-80, a linear hydroxy terminated polydimethylsiloxane from Siovation, Inc.), (2) a hydroxyl alkyl polydimethylsiloxane (e.g., Tego Protect-5000 functionalized silicone fluid commercially available from Evonik Tego Chemie GmbH), and (3) a fluorinated siloxane. Exemplary waxes include Hexion EW-58H; BE Square 165 Amber Petroleum Microcrystalline Wax commercially available from Baker Hughes, Inc., which is a mixture comprising paraffinic, isoparaffinic, and naphthenic hydrocarbons; Masurf FS 115 Emulsion (a fluoroalkylphosphate wax dispersion in water—28% Solids) commercially available from Mason Chemical Company; carnauba wax; candelilla wax; japan wax; beeswax; rice bran wax; montan wax; paraffin; ceresin; lanolin; ozokerita; slack wax (which is semi-refined wax having an oil content up to about 30 mass percent, and often produced by chilling and solvent filter-pressing wax distillate); polyethylene wax; a fatty acid or salt thereof (e.g., $C_{10-25}$ alkanoic acid, a salt of a $C_{10-25}$ alkanoic acid, a $C_{10-25}$ alkenoic acid, a salt of an $C_{10-25}$ alkenoic acid; such as stearic acid, zinc stearate, or lauric acid), a fatty ester (e.g., an ester of an $C_{10-25}$ alkanoic acid or $C_{10-25}$ alkenoic acid); or fatty alcohol (e.g., $C_{10-25}$ hydroxy alkane or $C_{10-25}$ hydroxy alkene).

Exemplary hydrophobic polymers include a polyolefin (e.g., polyethylene, polypropylene, polybutylene, polystyrene, copolymers of the foregoing, polyethylene/polyvinyl acetate copolymer, and polyethylene/polyacrylic acid copolymer).

Exemplary hydrophobic oils include soy lecithin, caster oil, and a fluorinated hydrocarbon liquid.

In certain embodiments, the agent that improves moisture-resistance is a polymer agent that improves moisture-resistance, a wax agent that improves moisture-resistance, or a mixture thereof. In certain other embodiments, the agent that improves moisture-resistance is a silicone, a siloxane, a fluorinated polyol, a fluoroalkyl phosphate ester, a fluoroalkyl carboxylic ester, a salt of a fluoroalkanoic acid, a wax that improves moisture-resistance, or a mixture thereof. In certain other embodiments, the agent that improves moisture-resistance is a wax that improves moisture-resistance, such as a mixture of hydrophobic hydrocarbons, water-based emulsions containing hydrophobic hydrocarbons dispersed therein, a fluoroalkylphosphate wax, a fluorinated hydrocarbon wax, or a fluoroalkyl functionalized wax. In certain other embodiments, the agent that improves moisture-resistance is a silicone, a siloxane, a fluorinated polyol, a fluoroalkyl phosphate ester, or a fluoroalkyl carboxylic ester. In certain other embodiments, the agent that improves moisture-resistance is a silicone, a siloxane, a fluorinated polyol, a fluoroalkyl phosphate ester, a fluoroalkyl carboxylic ester, a salt of a fluoroalkanoic acid, or a mixture thereof. In certain other embodiments, the agent that improves moisture-resistance is a silicone, a siloxane, a fluorinated polyol, a fluoroalkyl phosphate ester, a fluoroalkyl carboxylic ester, or a wax that improves moisture-resistance. In certain other embodiments, the agent that improves moisture-resistance is a fluorinated polyol, a silicone, a siloxane, or wax that improves moisture-resistance. In yet other embodiments, the agent that improves moisture-resistance is a mixture comprising hydrophobic hydrocarbons.

The term "fluoroalkyl phosphate ester" as used herein refers to a compound comprising a phosphate group bonded to at least one fluoroalkyl group, such as represented by $P(O)(OR^1)(OR^2)_2$, wherein $R^1$ is a fluoroalkyl group, and $R^2$ represents independently for each occurrence hydrogen, alkyl, fluoroalkyl, aryl, aralkyl, heteroalkyl, heteroaryl, heteroaralkyl, an alkali metal, ammonium, or a quaternary amine, or two occurrences of $R^2$ are taken together to form an alkaline earth metal.

pH Modulator

The pH modulator can be an acid or base. In certain embodiments, the pH modulator is an alkali metal hydroxide (e.g., sodium hydroxide) or an alkali metal salt of a carboxylate organic compound (e.g., an alkali metal salt of citrate, such as di-sodium citrate).

Composite-Release Promoter

The composite-release promoter acts to facilitate release of the wood composite from the press apparatus used to make the composite. In the absence of a composite-release promoter, certain composites may stick to the press apparatus, making it difficult to separate the composite from the press apparatus. The composite-release promoter solves this problem by facilitating release of the wood composite. Exemplary composite-release promoters include silicones (e.g., silicones described above), fatty acids, a salt of a fatty acid, waxes, and amide compounds. Exemplary fatty acids or salts thereof include a $C_{10-25}$ alkanoic acid, a salt of a $C_{10-25}$ alkanoic acid, a $C_{10-25}$ alkenoic acid, a salt of an $C_{10-25}$ alkenoic acid; e.g., stearic acid, zinc stearate, lauric acid, oleic acid or a salt thereof (such as an alkali metal salt of oleic acid, such as potassium oleate). It is understood that a mixture of two or more of the aforementioned exemplary composite-release promoters can also be used in the adhesive compositions herein. An exemplary amide compound is N,N'-ethylenebisstearamide. Exemplary waxes include those described above for the agent that improves moisture resistance, and in particular, Hexion EW-58H; E Square 165 Amber Petroleum Microcrystalline Wax commercially available from Baker Hughes, Inc.; and Masurf FS 115 Emulsion (28% Solids) commercially available from Mason Chemical Company. One additional advantage of the protein component in the adhesive composition is that it can facilitate dispersion of the composite-release promoter—this feature allows less composite-release promoter to be used in the adhesive composition and final composite product. Reducing the amount of composite-release promoter is advantageous for agents that are relatively more expensive, such as certain silicone composite-release promoters.

In certain embodiments, the composite-release promoter is a silicone.

Further, in certain embodiments, a composite-release promoter is present in the final composite at a weight percent in the range of about 0.01% (w/w) to about 5% (w/w), about 0.01% (w/w) to about 2% (w/w), or about 0.01% (w/w) to about 1% (w/w).

VI. Adhesive Compositions

It is understood that a variety of adhesives can be prepared using the methods and compositions described herein. The adhesives can be one-part adhesives or two-part adhesives, as shown in FIG. 1.

A. One-Part Adhesives

The invention provides a variety of stand alone or one-part adhesives, as shown in FIG. 1. The one-part adhesives can be produced using the protein components, prepolymers and additives discussed hereinabove. In their simplest form, the one-part adhesives do not require any additional additives to cure and form an adhesive material.

In one embodiment, the invention provides an adhesive composition comprising: (a) from about 1% to about 90% (w/w) of a reactive prepolymer; (b) ground plant meal in an amount sufficient to disperse the reaction prepolymer in an aqueous medium, and (c) an optional formaldehyde scavenging agent. In another embodiment, the invention provides an adhesive composition comprising: (a) from about 1% to about 90% (w/w) of a reactive prepolymer; (b) from about 10% to about 98% (w/w) of an isolated polypeptide composition capable of dispersing the reactive prepolymer in an aqueous medium; and (c) at least about 1% (w/w) of a formaldehyde scavenging agent. In certain embodiments, the adhesive composition comprises from about 5% to about 90% (w/w) of a reactive prepolymer. In certain other embodiments, the adhesive composition contains 10% to 99.9% (w/w), or 10% to 98% (w/w), of the protein component (i.e., ground plant meal or isolated polypeptide composition), and is free of reactive isocyanate compounds. Such compositions optionally further comprise one or more additives, e.g., a water-soluble polymer, water-dispersible latex polymer, organosilane, or other water-soluble or water-dispersible material.

In another embodiment, the invention provides an adhesive compositions that comprise (a) from about 1% to about 90% (w/w) of a reactive prepolymer; (b) from about 10% to about 98% (w/w) of an isolated polypeptide composition capable of dispersing the reactive prepolymer in an aqueous medium; and (c) an additive selected from the group consisting of an agent that improves moisture-resistance, a composite-release promoter, and a pH modulator.

In certain embodiments, isocyanate reactive component formulations are one-part adhesives. The one-part adhesives desirably are a liquid at 25° C. and stable to storage for at least one week (7 days) at 25° C., at least two weeks at 25° C., at least one month at 25° C., or at least three months at 25° C.

The adhesives can be cured by allowing the adhesive to stand under ambient conditions, or the adhesive may be cured by exposing the adhesive to heat, pressure, or both. Furthermore, in certain embodiments, these adhesives are stable but can cure when exposed to the moisture in air.

In certain embodiments, the one-part adhesive composition comprises no less than about 2%, 5%, 10%, 15%, 20%, 25%, or 30% by weight of the protein component (i.e., ground plant meal or isolated polypeptide composition) described herein (based on the dry weight of the protein component), relative to the total polyisocyanate composition weight. The maximum loading of the protein component can be based on the amount of free isocyanate (—NCO) groups in the final composition, as well as optimizing stability and viscosity sufficiently. In certain embodiments, the total concentration of protein component may be of up to 35% (wt/wt). Higher viscosity compositions formed from higher weight percentages of the protein component described herein can be beneficial in applications where it is desirable for the uncured adhesive to exhibit cold-tack, flow resistance, sag resistance, and gap-filling characteristics.

B. Two- or Multi-Part Adhesives

In addition, the invention provides a variety of two- or multi-part adhesives as shown in FIG. 1. The two-part adhesives can be formed using the protein component (i.e., ground plant meal or isolated polypeptide composition), prepolymers and additives discussed above.

The two-part adhesives require mixing two or more stable materials (mixtures) that upon mixing together produce an adhesive material. Such compositions are generally used within a short time period after mixing because the components may begin to react upon mixing. In one embodiment, the invention provides a two-part adhesive composition comprising: (a) a first part (Part A) comprising from about 0.1% to about 100% (w/w) of a reactive prepolymer, wherein the reactive prepolymer is a polyisocyanate-based prepolymer, an epoxy-based prepolymer, or a combination thereof; (b) a second part (Part B) comprising from about 10% to about 99% (w/w) of an isolated polypeptide composition capable of dispersing the reactive prepolymer in an aqueous medium; and wherein at least one of Part A or Part B comprises at least about 1% (w/w) of a formaldehyde scavenging agent. In another embodiment, the invention provides a two-part adhesive composition comprising: (a) a first part (Part A) comprising from about 5% to about 90% (w/w) of a reactive prepolymer, wherein the reactive prepolymer is a polyisocyanate-based prepolymer, an epoxy-based prepolymer, or a combination thereof; (b) a second part (Part B) comprising from about 10% to about 99% (w/w) of an isolated polypeptide composition capable of dispersing the reactive prepolymer in an aqueous medium; and wherein at least one of Part A or Part B comprises at least about 1% (w/w) of a formaldehyde scavenging agent. In certain other embodiments, the two-part adhesive comprises a first part (Part A) comprising from about 1% to about 10% (w/w) of a reactive prepolymer, from about 5% to about 50% (w/w) of a reactive prepolymer, from about 5% to about 90% (w/w) of a reactive prepolymer, from about 75% to about 100% (w/w) of a reactive prepolymer, or from about 95% to about 100% (w/w) of a reactive prepolymer.

In another embodiment, the invention provides a two-part adhesive composition comprising: (a) a first part (Part A) comprising from about 0.1% to about 100% (w/w) of a reactive prepolymer, wherein the reactive prepolymer is a polyisocyanate-based prepolymer, an epoxy-based prepolymer, or a combination thereof; (b) a second part (Part B) comprising from about 10% to about 99% (w/w) of a ground plant meal capable of dispersing the reactive prepolymer in an aqueous medium. In another embodiment, the invention provides a two-part adhesive composition comprising: (a) a first part (Part A) comprising from about 5% to about 90% (w/w) of a reactive prepolymer, wherein the reactive prepolymer is a polyisocyanate-based prepolymer, an epoxy-based prepolymer, or a combination thereof; (b) a second part (Part B) comprising from about 10% to about 99% (w/w) of a ground plant meal capable of dispersing the reactive prepolymer in an aqueous medium. In certain other embodiments, the two-part adhesive comprises a first part (Part A) comprising from about 1% to about 10% (w/w) of a reactive prepolymer, from about 5% to about 50% (w/w) of a reactive prepolymer, from about 5% to about 90% (w/w) of a reactive prepolymer, from about 75% to about 100% (w/w) of a reactive prepolymer, or from about 95% to about 100% (w/w) of a reactive prepolymer.

In another embodiment, the invention provides a two-part adhesive composition that comprises: (a) a first part (Part A) comprising from about 0.1% to about 100% (w/w) of a reactive prepolymer, wherein the reactive prepolymer is a polyisocyanate-based prepolymer, an epoxy-based prepolymer, or a combination thereof; (b) a second part (Part B) comprising from about 10% to about 99% (w/w) of an isolated polypeptide composition capable of dispersing the reactive prepolymer in an aqueous medium; and wherein at least one of Part A or Part B comprises an additive selected from the group consisting of an agent that improves moisture-resistance, a composite-release promoter, and a pH modulator. In certain embodiments, the two-part adhesive comprises a first part (Part A) comprising from about 0.1% to about 5% (w/w) of a reactive prepolymer, from about 1% to about 10% (w/w) of a reactive prepolymer, from about 5% to about 50% (w/w) of a reactive prepolymer, from about 5% to about 90% (w/w) of a reactive prepolymer, from about 75% to about 100% (w/w) of a reactive prepolymer, or from about 95% to about 100% (w/w) of a reactive prepolymer.

Depending upon the composition of Part A and Part B, Parts A and B are mixed immediately prior to use. In one embodiment, the adhesive, when cured, comprises from about 1% to about 95% (w/w) of non-volatile moieties of Part A and from about 5% to about 99% (w/w) of non-volatile moieties of Part B. In certain embodiments, Part A comprises PMDI together with a catalyst. In certain other embodiments, part of the diphenylmethane 4,4'-diisocyanate, known as MMDI, present in the PMDI is recovered by means of a suitable technological operation such as distillation or crystallization.

Figure 3:
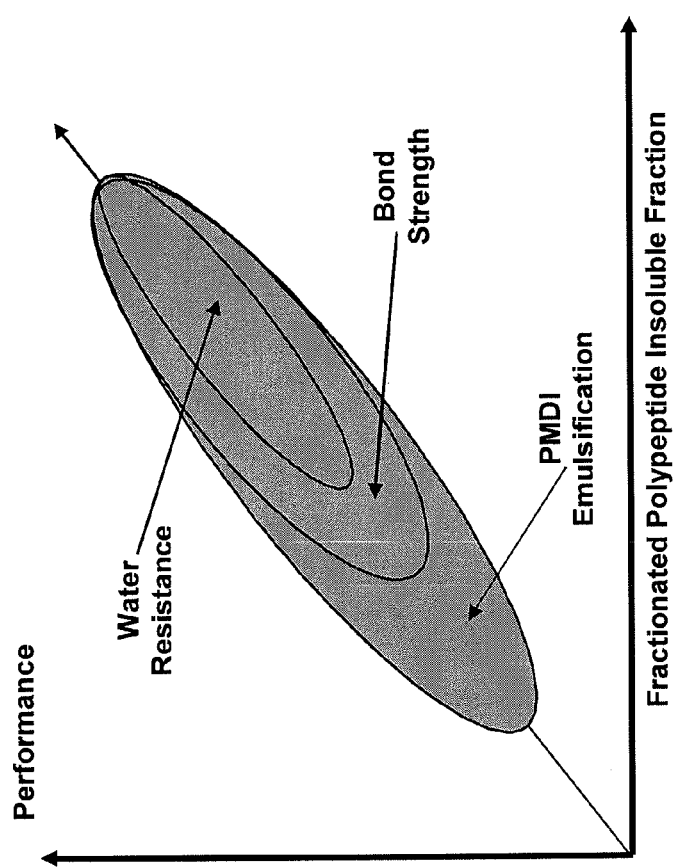
FIG. 3 is a graph showing the relationship between the concentration of the water-insoluble/water-dispersible protein and the performance of an adhesive (or binder) produced using the protein.

The qualitative impact of the relative level of the isolated polypeptide composition (or ground plant meal) on the performance characteristics of a two-part adhesive like those described herein is set forth in FIG. 3. It is understood that the amount of isolated polypeptide composition (and the type of isolated polypeptide composition) or ground plant meal can be adjusted to optimize properties of the adhesive composition, e.g., viscosity, bond-strength, gap-filing capability, pot life, moisture resistance, and cost. To illustrate, adhesive compositions formed from certain whey protein derivatives have a short pot life, whereas adhesive compositions formed from certain castor protein have a longer pot life. To optimize the viscosity of the adhesive composition, the skilled artisan can adjusted the amount of solid protein in the adhesive composition. For example, higher levels of solid protein in the adhesive composition can provide an adhesive composition having a higher viscosity. Such higher viscosity adhesive compositions can be used for gap filing applications. To optimize the moisture resistance of the adhesive, the skilled artisan can adjust the amount of water-insoluble/water-dispersible protein relative to the amount of water-soluble protein used to form the adhesive composition. In certain instances, the adhesive compositions contain a larger percentage by weight of the water-insoluble/water-dispersible protein than to the amount of water-soluble protein.

Various components of the activatable multi-part adhesive systems can include, for example, a polypeptide containing compound; and an isocyanate reactive composition as a separate component. The isocyanate reactive component can optionally comprise a protein that contains residual peptide linkages.

In certain embodiments, the multi-part system further comprises either an ethylene copolymer resin, a hydroxyl functionalized polymer, or mixtures thereof. Non limiting examples of suitable ethylene copolymer resins include ethylene vinyl acetate (EVA), ethylene-co-vinylacetate-co-acrylic acid, ethylene-co-vinylacetate-co-methacrylic acid, ethylene-co-vinylacetate-co-vinylalcohol, carboxylated vinyl acetate-ethylene copolymers, and ethylene vinyl alcohol (EVOH) resins. Non-limiting examples of hydroxyl functionalized polymers include water soluble or partially water soluble polymers such as polyvinylalcohol, polyvinylbutyral-co-vinylalcohol, polyvinylacetate-co-vinylalcohol and the like; and carbohydrates such as carboxymethylcellulose, ethylmethylcellulose, etc.

The ethylene copolymer can be used as a water dispersion agent (i.e., an EVA latex). The dispersion agent can be a polymer latex containing a carboxylated vinyl acetate-ethylene terpolymer stabilized with poly-(vinyl alcohol), commercially known as AIRFLEX 426® from Air Products, Inc. (63% solids by weight). In certain other embodiments, the dispersion agent is Wacker VINNAPAS® 426, which is a carboxylated, high solids vinyl acetate-ethylene (VAE) copolymer dispersion with a glass transition temperature (Tg) of 0° C., sold by Wacker Chemie, AG. The ethylene copolymer can be used at a level of from 5% to 50% by weight, from 10% to 40% by weight, or from 15% or 30% by weight of the total isocyanate reactive component (the level of ethylene copolymer is expressed on a solids basis, and does not include the level of water in the latex).

It is understood that the isocyanate reactive compositions (Part-B) of a two-part adhesive kit can contain other optional ingredients, including hydroxy-functional compounds (examples including amine-functional compounds, e.g., polyols such as polyethylene glycol, glycerin, polypropylene glycol, carbohydrates, starches, polyvinyl alcohol and copolymers thereof, trimethylolpropane, branched polyols such as trimethylolpropane ethoxylate, aromatic alcohols or polyols, pentaerythritol and its polyol adducts, etc.). These types of optional hydroxy-functional compounds can either be blended together with the proteins and the other ingredients during the preparation of the Part-B component, or they can be optionally added to the proteins themselves during or after any of the process steps that are used to prepare and isolate the proteins (e.g., during protein isolation or extraction from meal, during digestion, during derivatization, etc; or after spray drying, after freeze drying, after isolation of a water-based paste of water-insoluble/water-dispersible protein, etc.). When the optional hydroxyl-functional compounds are used in this way, the preferred range of addition spans from about 0.1% to 10% by weight of the protein, and more preferably, from about 0.5% to 2% by weight of the protein.

In certain embodiments, the isocyanate reactive composition further comprises water. In certain embodiments, water is present in an amount from about 10% (w/w) to about 60% (w/w), from about 10% (w/w) to about 50% (w/w), from about 10% (w/w) to about 40% (w/w), from about 20% (w/w) to about 60% (w/w), from about 20% (w/w) to about 50% (w/w), from about 20% (w/w) to about 40% (w/w), from about 30% (w/w) to about 75% (w/w), from about 30% (w/w) to about 60% (w/w), from about 30% (w/w) to about 50% (w/w), from about 30% (w/w) to about 40% (w/w), from about 40% to about 70% (w/w), from about 50% to about 60% (w/w), from about 5% (w/w) to about 85% (w/w), or from about 15% (w/w) to about 35% (w/w) of the adhesive composition. In still other embodiments, water is present in an amount from about 25% (w/w) to about 55% (w/w), from about 35% (w/w) to about 55% (w/w), or from about 45% (w/w) to about 55% (w/w) of the adhesive composition. In still other embodiments, water is present in an amount from about 30% (w/w) to about 60% (w/w) of the adhesive composition. In certain embodiments, the adhesive composition has a pH in the range of from about 4 to about 9, from about 5 to about 8, or about 6 to about 8.

In certain other embodiments, the isocyanate reactive composition further comprises from about 1% to 30% (wt/wt), about 10 to 30% (wt/wt), about 10% to 20% (wt/wt), about 1% to 10% (wt/wt), or about 3% to 10% (wt/wt) polyol.

In embodiments where the isocyanate reactive composition comprises at least 20% (wt/wt), 25%, or 27% (wt/wt) isolated polypeptide composition. The polypeptides in the isolated polypeptide composition can be an enzyme digested native protein, derivatized enzyme digested protein, or mixture thereof. In certain embodiments, the isocyanate reactive composition comprises derivatized enzyme digested protein. In certain embodiments, the derivatized enzyme digested protein is at least 50% (wt/wt), 60% (wt/wt), or 70% (wt/wt) of the isolated polypeptide composition contained in the isocyanate reactive composition. In certain embodiments, the polypeptides contained in the isocyanate reactive composition are obtained from the same native protein source, or from different native protein sources. In certain embodiments, the isocyanate reactive composition remains a liquid and homogeneous upon storage or processing.

In another embodiment, a multi-part is created by mixing two or more liquid streams, which are stable by themselves, and convert quickly into a cured polymer under relatively mild conditions (relative to one-part adhesive systems). The two-part adhesives can cure by standing at ambient conditions, or can be cured by exposure to heat, pressure, or both.

It is understood that, for certain applications, the adhesive compositions, in addition to containing a water-insoluble protein fraction can also include a water-soluble polypeptide fraction. Depending upon the composition of the adhesive, the ratio of the water-soluble polypeptide fraction to the water-insoluble polypeptide fraction ranges from 0:1 to 3:2 (w/w). Alternatively, the weight ratio of the water-insoluble polypeptide fraction to the water-soluble polypeptide fraction can be at least 1:1. More particularly, when the protein fractions are obtained by washing plant meal with water to separate a water-insoluble protein fraction and a water-soluble protein fraction, then the ratio of the water-soluble protein fraction to water-insoluble protein fraction can be in the range of from 0:1 to 3:2 (w/w). Alternatively, when the protein fractions are obtained by washing plant meal with water to separate a water-insoluble protein fraction and a water-soluble protein fraction, then the ratio of the water-soluble protein fraction to water-insoluble protein fraction can be at least 1:1 (w/w).

With regard to the two-part adhesives, the percent of solids in Part B can range from about 5% to about 60%, from about 5% to about 30%, from about 8% to about 20%, or from about 10% to about 20% by weight of solids. Furthermore, depending upon the application, the weight ratio of solids in Part B to the prepolymer can range from 100:0.1 to 0.1:100, from 50:1 to 1:50, from 20:1 to about 1:20 or from 10:1 to about 1:10.

General Considerations

It is understood that varying the reaction between the protein component (i.e., ground plant meal or isolated polypeptide composition) and the reactive prepolymers can be done to optimize stability, shelf life, viscosity, and bonding performance that is necessary for the final application.

In certain embodiments, the viscosity of all the types of polyisocyanate compositions as described herein, is no more than (NMT) 500,000 cps, NMT 300,000 cps, NMT 200,000 cps, or NMT 100,000 cps, NMR 50,000 cps, NMT 25,000 cps, NMT 10,000 cps, or NMT 5,000 cps as measured at 25° C. until the polyisocyanate composition is cured.

Furthermore, the viscosity of the adhesive can be designed with a particular application in mind. In one embodiment, where gap filling adhesives are required, the minimum viscosity of the adhesive (polyisocyanate composition) should be no less than (NLT) 2000 cps, 3000 cps, or NLT 4000 cps, as measured at 25° C. The viscosity of the polyisocyanate compositions can be optimized by adjusting the amount of protein component (i.e., ground plant meal or isolated polypeptide composition) described herein and/or the conditions used for preparing the composition. Typical conditions are in the range from 25 to 100° C. at ambient pressure, with agitation of the mixture until a sufficiently homogeneous composition is achieved.

In order to optimize the viscosity of the adhesive composition, the adhesive composition may contain ground plant meal in an amount such that the viscosity of the adhesive formulation increases by no more than about 25% within about 20 minutes, or no more than about 50% within about 20 minutes, after mixing the prepolymer and ground plant meal with a nucleophile. In certain other embodiments, the ground plant meal is present in an amount such that the viscosity of the adhesive formulation increases by no more than about 40% within about 30 minutes (or no more than about 40% with about 100 minutes) after mixing the prepolymer and ground plant meal with a nucleophile. In certain other embodiments, the ground plant meal is present in an amount such that the viscosity of the adhesive formulation remains less than about 1100 cps within about 150 minutes after mixing, less than about 1100 cps within about 200 minutes after mixing, less than about 1500 cps within about 150 minutes after mixing, less than about 1500 cps within about 225 minutes after mixing, less than about 50,000 cps within about 150 minutes after mixing, less than about 50,000 cps within about 20 minutes after mixing, less than about 30,000 cps within about 20 minutes after mixing, less than about 300,000 cps within about 60 minutes after mixing, or less than about 100,000 cps within about 60 minutes after mixing the prepolymer and ground plant meal with a nucleophile.

Certain of the adhesives described herein are liquids having viscosities low enough to render them pourable, sprayable, or curtain-coatable. For pourable or sprayable adhesive compositions, the viscosity of the adhesive composition is desirably no more than (NMT) 500 cps, NMT 1000 cps, NMT 2000 cps, or NMT 5000 cps, as measured at 25° C. The viscosity of the adhesive composition can be optimized by adjusting the amount of protein component (i.e., ground plant meal or isolated polypeptide composition) described herein and/or the conditions used for preparing the composition. Alternatively, certain of the adhesives described herein are non-pourable, extrudable, spreadable gels or pastes. Non-pourable, extrudable, spreadable gels, or pastes may become pourable, sprayable, or curtain-coatable liquids at elevated temperature, and may optionally revert to non-pourable, extrudable or spreadable gels or pastes upon cooling.

The adhesive composition can be also characterized according to the weight percent of the ground plant meal in the composition. In certain embodiments, the ground plant meal is present in an amount from about 1% to about 90% (w/w), from about 1% to about 70% (w/w), from about 1% to about 50% (w/w), from about 1% to about 30% (w/w), from about 10% to about 90% (w/w), from about 10% to about 70% (w/w), from about 10% to about 50% (w/w), from about 10% to about 30% (w/w), from about 20% to about 90% (w/w), from about 20% to about 70% (w/w), from about 20% to about 50% (w/w), or from about 20% to about 30% (w/w) of the adhesive composition. In certain other embodiments, the ground plant meal is present in an amount from about 5% to about 35% (w/w), or from about 5% to about 50% (w/w), of the adhesive composition. In still other embodiments, the ground plant meal is present in an amount from about 15% to about 25% (w/w) of the adhesive composition.

In certain other embodiments, the polypeptide containing adhesives described herein are liquids, gels, or pastes stable enough to be stored for at least one week, at least two weeks, at least one month, or at least three months at ambient temperature (25° C.), and protected from moisture. The term "stable" in connection with the viscosity of the polyisocyanate composition refers to a viscosity that does not increase by more than 10%, 25%, or 30%, from its initial value.

In addition, the isolated polypeptide composition and the adhesive composition can be designed to have a polydispersity index. The term "polydispersity index" refers to the ratio between the weight average molecular weight and the number average molecular weight (i.e., PDI=Mw/Mn).

The terms "number average molecular weight," denoted by the symbol Mn and "weight average molecular weight," denoted by the symbol Mw, are used in accordance with their conventional definitions as can be found in the open literature. The weight average molecular weight and number average molecular weight can be determined using analytical procedures described in the art, e.g., chromatography techniques, sedimentation techniques, light scattering techniques, solution viscosity techniques, functional group analysis techniques, and mass spectroscopy techniques (e.g., MALDI mass spectroscopy). For instance, as illustrated in Example 3, average molecular weight and number average molecular weight of the polypeptide composition was determined by MALDI mass spectroscopy.

Further, it is contemplated that isolated polypeptide compositions having different molecular weights may provide adhesive compositions having different properties. As such, the weight average molecular weight, number average molecular weight, and polydispersity index can be an important indicator when optimizing the features of the adhesive composition. In particular, it is contemplated that the ability to optimize the molecular weight characteristics of the isolated polypeptide compositions provides advantages when preparing an adhesive composition for a particular use. Further advantages include obtaining adhesive compositions with similar properties even though the isolated polypeptide composition may be obtained from a different source (e.g., soy vs. castor) or when similar protein sources are harvested during different seasons, over varying periods of time, or from different parts of the world. For example, proteins isolated from soy and castor (each having different molecular weight distributions) can be made to have similar molecular weight distributions through digestion and fractionation processes described herein (see Example 3). Accordingly, the ability to measure and control the consistency of molecular weight distributions is contemplated to be beneficial when optimizing various features of the adhesive composition, e.g., long-term reproducibility of physical properties and process characteristics of formulated adhesives. The molecular weight characteristics of the ground plant meal or isolated polypeptide composition can be altered by subjecting the proteins therein to enzymatic digestion or fractionation according to the procedures described herein.

In certain embodiments, the PDI of the adhesives provided herein is from about 1 to about 3, from 1 to 1.5, from 1.5 to 2, from 2 to 2.5, from 2.5 to 3, from 1 to 2, from 1.5 to 2.5, or from 2 to 3.

Furthermore, a moisture-resistant adhesive can be prepared by using the water-insoluble/water-dispersible extract alone, or optionally including a plasticizer (for example, a water insoluble plasticizer), an organosilane, and/or together with a lower-$T_g$ polymer. The term "plasticizer" refers to any substance capable of increasing the free volume (i.e., the molecular volume not occupied by the polypeptide molecules or their bonds) of the water-insoluble/water-dispersible extract. The term "Tg" refers to the glass transition temperature of the polymer, i.e., the temperature at which free volume of the polymer is large enough to allow translational relaxation and self diffusion of the minimal critical segment length of the polymer or molecule. In addition, moisture resistance can be imparted by means of crosslinking using a broad variety of crosslinking agents, for example, amine compounds, organosilane compounds, epoxy compounds, or epichlorhydrin-type materials. A moisture-resistant pressure-sensitive adhesive can be prepared by using the water-insoluble/water-dispersible extract blended in combination with a plasticizer, optionally together with a low-$T_g$ polymer or a high-Tg polymer.

Furthermore, the tack or bond strength of the pressure sensitive adhesives (PSA) can be controlled through a number of means, such as shifting the glass transition ($T_g$) to higher or lower temperatures (by controlling the levels of monomeric and/or polymeric plasticizers) or incorporating flatting agents such as silicas, glass spheres, clays, and the like; by adjusting the crosslink density to higher or lower levels; by increasing or decreasing the plasticizer concentration; by blending with higher or lower molecular weight polymers; or by employing some combination of these techniques.

It is understood that when evaluating the tack or bond strength of a composite formed using an adhesive, the maximum achievable strength of the composite is dictated by the cohesive strength of the wood itself. To illustrate, if the adhesive is cohesively stronger than the wood, then wood failure will be the outcome. Further, it is contemplated that the adhesive composition may be tailored to provide a bond strength appropriate for particular applications by selecting particular polypeptide fractions, prepolymers, catalysts, and/or other additives.

Depending upon the application, the resulting adhesives may comprise from about 20% to about 80%, from about 30% to about 70%, from about 40% to about 60% (w/w) of prepolymer in the total adhesive (binder) composition.

Furthermore, depending upon the application, the resulting cured article can comprise from about 0.05% to about 10%, from about 0.05% to about 5.0%, from about 0.1% to about 4.0%, from about 0.2% to about 3.0%, or from about 0.3% to about 2.0% (w/w) of prepolymer. In certain embodiments, the cured article can comprise from about 0.05% to about 2.5% (w/w) of prepolymer.

Furthermore, an article fabricated from one or more of the adhesives described herein can contain from about 1% to about 15%, or from about 2% to about 10%, or from about 3% to about 8%, or from about 4% to about 7%, or from about 3% to about 6% (w/w) of binder (adhesive) per cured article. In certain embodiments, the article fabricated from the adhesive may contain greater than 5% (w/w) of binder per cured article. In certain other embodiments, the article comprises from about 1.5% to about 2.5% of binder per cured article.

Composite materials can contain from about 5% to about 85% (w/w), about 15% to about 75% (w/w), about 30% to about 65% (w/w), about 1% to about 10%, about 10% to about 20%, or about 20% to about 70% (w/w) binder. Laminate materials can contain from about 0.1% to about 10% (w/w), about 0.5% to about 5%, about 1% to about 3% (w/w), about 1% to about 10%, about 20% to about 30%, or about 30% to about 70% (w/w) binder.

In certain embodiments, the adhesives described herein can be used in the manufacture of particle board. With regard to the preparation of moisture-resistant cured particle board composites, the composites can comprise a total binder level ranging from about 1.5% to about 11% (w/w), or from about 2.5% to about 4.5% (w/w), of the cured composite, wherein the binder includes a protein component (i.e., ground plant meal or isolated polypeptide composition) and a PMDI fraction with an optional catalyst. The amount of PMDI can range from about 5% to about 30%, or from about 30% to about 70%, by weight of the cured binder. The PMDI fraction can comprise from about 0.8% to about 10% (w/w), from about 0.8% to about 4% (w/w), or from about 1.3% to about 2.3% (w/w), of the cured composite.

In another embodiment, a moisture resistant composites can be prepared with a total binder level ranging from about 1.5% to about 11% (w/w), or from about 1.5% to about 2.5% (w/w), of the cured composite, wherein the binder includes a protein component (i.e., ground plant meal or isolated polypeptide composition) and a PMDI fraction with an optional catalyst. The PMDI fraction can comprise from about 0.1% to about 10% (w/w), from about 0.1% to about 5% (w/w), from about 0.2% to about 2.5% (w/w), or from about 0.3% to about 1.4% (w/w) of the cured composite.

In another embodiment, a moisture-resistant cured particle board composite can be prepared containing a total binder level ranging from about 1.5% to about 15%, from about 1.5% to about 11%, or from about 2.5% to about 3.1%, by weight of the cured composite, wherein the binder comprises a protein component (i.e., ground plant meal or isolated polypeptide composition), an optional polymer latex fraction, and a PMDI fraction with optional catalyst. The PMDI comprises from about 5% to about 65% by weight of the cured binder and from about 0.1% to 10%, from about 0.1% to about 5%, from about 0.2% to about 2.5%, or from about 0.3% to about 2% by weight of the cured composite. The optional polymer latex is an EVA latex polymer comprising from about 0% to about 45% by weight of the cured binder and from about 0% to about 1.2% by weight of the cured composite.

In another embodiment, a moisture-resistant cured particle board composite can be prepared with a total binder level ranging from about 1.5% to about 15%, from about 1.5% to about 11%, or from about 1.2% to about 2.5%, by weight of the cured composite. The binder comprises a protein component (i.e., ground plant meal or isolated polypeptide composition), an optional polymer latex fraction, and a PMDI fraction with optional catalyst. The PMDI fraction comprises from about 0.1% to about 10%, from about 1.5% to about 5%, or from about 0.1% to about 1.1% by weight of the cured composite.

In the event that moisture-resistance is not a requirement for the end-use application, cured composites can also be prepared with a total binder level of less than approximately 5% by weight of the cured composite, wherein the binder comprises a protein component (i.e., ground plant meal or isolated polypeptide composition) and a PMDI fraction with an optional catalyst. The PMDI fraction can comprise from about 0.05% to about 2.5% (w/w) of the cured composite. Depending upon the level of water that can be tolerated during the manufacture of the composite, binder levels of greater than 5% can also be employed, wherein the PMDI fraction comprises at least 0.05% by weight of the cured composite.

With regard to the two-part adhesives, the level of water that can be used to disperse the ingredients and to fabricate a composite can be adjusted for the specific application by virtue of controlling the % solids in the Part-B component, the weight ratio of the Part-B solids ingredients to PMDI, and the total binder level in the finished composite (on a solids basis). Depending on the level of water that is required to fabricate the composite, the percent solids in the Part-B component will preferably range from about 5% to 45% by weight solids, or more preferably from about 9% to 30% by weight solids. Similarly, the Part-B solids to PMDI weight ratio preferably ranges from approximately 20:1 to 1:20, and more preferably from about 10:1 to 1:10. The total percentage of binder in the cured composite (on a solids basis) preferably ranges from approximately 1% to 15% by weight of the cured composite, and more preferably from about 2% to 10% by weight.

Similar formulation considerations apply to the fabrication and manufacture of plywood composites. For example, moisture-resistant cured plywood assemblies can be laminated with bondline adhesive levels ranging from approximately 0.008 pounds/ft.$^2$ up to approximately 0.056 pounds/ft.$^2$, wherein the adhesive includes a protein component (i.e., ground plant meal or isolated polypeptide composition), an optional polymer latex fraction, and a PMDI fraction with an optional catalyst. The PMDI can comprise from about 10% to about 80% (w/w), or from about 20% to about 70% (w/w), of the cured adhesive. The optional polymer latex can be an EVA polymer latex comprising between about 0% and 45% of the cured binder. It is contemplated that plywood composites prepared with these types of adhesive compositions will be capable of withstanding boiling water and hence will be extremely moisture resistant.

In the event that moisture-resistance is not a requirement for the end-use application, cured plywood composites can also be prepared with bondline adhesive levels of less than approximately 0.056 pounds/ft.$^2$, wherein the adhesive includes a protein component (i.e., ground plant meal or isolated polypeptide composition) and a PMDI fraction with an optional catalyst. The PMDI fraction comprises less than approximately 20% by weight of the cured adhesive.

The level of water that may be used to disperse the ingredients and to fabricate a plywood composite can be adjusted for the specific application by virtue of controlling the % solids in the Part-B component, the weight ratio of the Part-B solids ingredients to PMDI, and the total bondline application level in the finished composite (on a solids basis). Depending on the level of water that is required to fabricate the composite, the % solids in the Part-B component will preferably range from approximately 5% to 45% by weight solids, and more preferably from about 8% to 30% by weight solids. Similarly, the Part-B solids to PMDI weight ratio preferably ranges from approximately 20:1 to 1:20, and more preferably from about 10:1 to 1:10.

In certain embodiments, both the one-part, the two-part and the multi-part type adhesives are cold curable. In certain embodiments, the adhesives include a cure catalyst (for example, DMDEE in the case of adhesives containing a polyisocyanate) that facilitates curing in the absence of applied heat. In certain embodiments, the adhesives (for example, the polyisocyanate containing adhesives) are cured in the presence of moisture at a temperature of about 10° C. to about the ambient temperature range (25° C., to as high as 30° C.). In certain other embodiments, the cold cure temperature ranges from 20° C. to 27° C. In other embodiments, the adhesives are hot cured, at temperatures greater than 30° C. Hot curing may at temperatures in the range from 50° C. to 300° C., or from 90° C. to 275° C., or from 110° C. to 250° C.

VII. Applications of Adhesive Compositions

The adhesive compositions described herein can be used in a variety of different applications, which include, for example, bonding together many different types of substrates and/or creating composite materials.

Accordingly, the invention provides a method of bonding a first article to a second article. The method comprises the steps of (a) depositing on a surface of the first article any one of the foregoing adhesive compositions thereby to create a binding area; and (b) contacting the binding surface with a surface of the second article thereby to bond the first surface to the second surface. The method optionally also comprises the step of, after step (b), permitting the adhesive composition to cure, which can be facilitated by the application of pressure, heat or both pressure and heat.

The adhesive compositions can be applied to the surfaces of substrates in any conventional manner. Alternatively, the surfaces can be coated with the composition by spraying, or brushing, doctor blading, wiping, dipping, pouring, ribbon coating, combinations of these different methods, and the like.

The invention also provides a method of producing a composite material. The method comprises the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

The terms "substrate", "adherend" and "article" are interchangeable and refer to the substances being joined, bonded together, or adhered using the methods and compositions described herein. In certain embodiments, the first article, the second article or both the first and second articles are lignocellulosic materials, or composite materials containing lignocellulosic material. Furthermore, the first article, the second article or both the first and second articles can comprise a metal, a resin, a ceramic, a polymer, a glass or a combination thereof. It is understood that the first article, the second article, or both the first article and the second article can be a composite.

The compositions can be used to bond multiple lignocellulosic materials (adherends) together to prepare composite wood products. Furthermore, it is understood that at least one of the adherends bonded together and/or included in the composite can be wood, wood fiber, paper, rice hulls, fiberglass, ceramic, ceramic powder, plastic (for example, thermoset plastic), cement, stone, cloth, glass, metal, corn husks, bagasse, nut shells, polymeric foam films or sheets, polymeric foams, fibrous materials, or combinations thereof.

The amount of adhesive composition applied to the adhesive bond between substrates may vary considerably from one end use application, or type of adhesive used, or type of substrate, to the next. The amount of adhesive should be sufficient to achieve the desired bond strength and bond durability under a given set of test conditions.

The amount of an adhesive composition applied may be in the range of from about 5 to about 50 grams per square foot, from about 8 to about 60 grams per square foot, from about 10 to about 30 grams per square foot, from about 20 to about 50 grams per square foot, from about 15 to about 40 grams per square foot, of bond surface area (i.e., the bond surface area being the area of overlap between the substrates to be bonded by the adhesive composition).

The adhesive compositions can be used to fabricate multi-substrate composites or laminates, particularly those comprising lignocellulosic or cellulosic materials, such as wood or paper. The adhesives can be used to prepare products such as plywood, laminated veneer lumber (LVL), waferboard (also known as chipboard or OSB), particle board, fiberboard, fiberglass, composite wooden I-beams (I-joists), and the like.

The adhesive compositions can also be used to fabricate composite materials, which include, for example, chip board, particle board, fiber board, plywood, laminated veneer lumber, glulam, laminated whole lumber, laminated composite lumber, composite wooden I-beams, medium density fiberboard, high density fiberboard, extruded wood, or fiberglass. The composite can be a thermosetting composite or a thermoplastic composite. As described above, the amount and identity of the components used to prepare the composite can be selected to optimize the performance properties of the composite. In one embodiment, the amount of protein component is selected in order to optimize the performance properties of the composite.

Accordingly, in certain other embodiments, the composite comprises from about 0.5% to about 10% (w/w), from about 0.5% to about 5% (w/w), from about 0.5% to about 3% (w/w), from about 1% to about 10% (w/w), from about 1% to about 5% (w/w), or from about 1% to about 3% (w/w) of ground plant meal or isolated polypeptide composition. In certain other embodiments, the composite comprises from about 0.1% to about 8% (w/w), from about 0.1% to about 5% (w/w), from about 0.1% to about 3% (w/w), from about 0.5% to about 5% (w/w), from about 0.5% to about 3% (w/w), or from about 1% to about 3% (w/w) of a polymeric material formed by reaction of the prepolymer. In certain other embodiments, the composite comprises from about 0.5% to about 10% (w/w), from about 0.5% to about 5% (w/w), from about 0.5% to about 3% (w/w), from about 1% to about 10% (w/w), from about 1% to about 5% (w/w), or from about 1% to about 3% (w/w) of formaldehyde scavenging agent (e.g., $H_2NC(O)NH_2$). In certain other embodiments, the composite comprises from about 0.5% to about 10% (w/w), from about 0.5% to about 5% (w/w), from about 0.5% to about 3% (w/w), from about 1% to about 10% (w/w), from about 1% to about 5% (w/w), or from about 1% to about 3% (w/w) of a diluent (e.g., glycerin, corn syrup, or a mixture thereof). In certain other embodiments, the composite comprises from about 0.001% to about 5% (w/w), from about 0.005% to about 4% (w/w), from about 0.005% to about 2% (w/w), from about 0.05% to about 1% (w/w), from about 0.05% to about 2% (w/w), or from about 0.05% to about 1% (w/w) of one or more additives, such as an agent that improves moisture resistance, a pH modulator, a composite-release promoter, or tacking agent.

In certain embodiments, the composite has an internal bond strength of at least about 25 PSI, 40 PSI, 50 PSI, 70 PSI, 100 PSI, 120 PSI, or 150 PSI.

In certain embodiments where two-part adhesives are used, Part-A and/or Part-B can be premixed with cellulosic components such as wood fiber, sawdust (sometimes referred to as "furnish"), or other components, and then mixed together and permitted to cured to create a composite material. Alternatively, Parts A and B can be mixed together before or during the addition of cellulosic components. The resulting mixture is then permitted to cure to create a composite material. Mixing can be accomplished using conventional mixers such as paddle mixers, static mixers and the like, currently known in the art.

Premixed components can be added to a sawdust cellulosic component via spraying application or dripping application, followed by rigorous mixing. Alternatively, each adhesive component can be added to the sawdust sequentially ("sequential addition"), simultaneously, in tandem ("tandem addition") without premixing, and then the mixture is rigorously blended. Blending can be achieved via any conventional mixing process including high speed paddle mixing (e.g., with a Littleford blender or a Henchel-type mixer), sigma-blade mixing, ribbon blending, etc. Additional materials can also blended concurrently or sequentially with the mixture including fillers such as calcium carbonate, aluminosilicates, clays fumed silica, nano-sized inorganic particulates, latex polymers, or antimicrobial compounds, etc.

Viscosity, sprayability, and/or spreadability of the adhesive components can be controlled by adjusting the amount of water added (or other liquid diluents such as glycerin and corn syrup) to the Part-B component before it is premixed with Part-A, or by adding water after the two components have been premixed. When premixing is not employed (e.g., if tandem or sequential mixing is employed), water can be added to the mixture as needed for the purpose of influencing viscosity and sawdust-particle surface coverage.

In another approach, for a two-part adhesive, Part-A and/or Part-B can be mixed together along with cellulosic components such as wood fiber, sawdust, or other components; blended with optional polymeric components (e.g., virgin or recycled) plasticizers, stabilizers, and other additives in liquid, pelletized, or powdered form; and then extruded via single screw or twin screw extrusion methods to create cured composite products such as rail ties, fencing posts, fining strips, decking, etc. The extrudate can be used to feed an injection molding machine for the purpose of fabricating molded parts such as garage door panels, car door panels, cabinet doors, toilet seats, and the like.

Adhesive compositions made using ground plant meal can provide advantages in certain situations because the use of ground plant meal allows for an adhesive composition comprising less water. It is often desirable to use an adhesive composition containing less water because cure of the adhesive may use elevated temperatures which converts the water to steam, partially complicating the procedures used to cure the adhesive. A related benefit of using an adhesive composition containing ground plant meal is that it permits more adhesive to be applied to the components being bound together. This helps ensure that the components being bound together are adequately coated with adhesive, which facilitates strong bonding between the components upon curing the adhesive.

Composite products can be prepared using a binder containing a formaldehyde scavenging agent, such as urea. The amount of urea can be adjusted based the on particular end-use application of the composite, such as interior use (where more formaldehyde scavenging agent is desired to minimize formaldehyde emissions) or exterior use (where less formaldehyde scavenging agent may be acceptable because the formaldehyde emission standards are less critical for exterior applications).

Under certain circumstances, pressure and/or heat can be used to facilitate curing. The amount of pressure and the time period for which the pressure is applied are not limited and specific pressures and times will be evident to one skilled in the art from the present disclosure (see the various Examples). In certain embodiments, a pressure of approximately 10 to 250 psi is applied from about 2 minutes to about 2 hours, from about 10 minutes to about 2 hours, from about 2 minutes to about 30 minutes, or from about 10 minutes to about 30 minutes (depending on the temperature). The pressure, heating, or application of both pressure and heat may decrease the viscosity adhesive compositions described herein, facilitating their flow in the contact area, such that a bonding region is created whereby there is a continuum between the adherends. The amount of pressure, heat time or their combination can be optimized to ensure such continuum and will depend on the adherends' physical or chemical properties as well as on the rate of the adhesive's viscosity-build throughout the cure cycle.

Depending upon the adhesive used, the resulting article can be moisture resistant. Furthermore, the article may remain intact after boiling in water for 5 minutes, 10 minutes, 30 minutes, 1 hour, 2 hours, or 3 hours. Furthermore, two or more components of the article may remain bonded after boiling in water for 5 minutes, 10 minutes, 30 minutes, 1 hour, 2 hours or 3 hours. Furthermore, the article when boiled in water for 5 minutes, 10 minutes or 30 minutes, may display less than a 20% increase, or less than a 10% increase in volume relative to the article prior to exposure to the water.

Furthermore, when the article (for example, a composite material, a laminate, or a laminate containing a composite material) contains a lignocellulosic material, the article exhibits no less than 75% cohesive failure of the lignocellulosic component when the article is placed under a loading stress sufficient to break the article. In certain embodiments, when an article (resulting product) contains a lignocellulosic material, the article has a block shear strength as measured under the D905 and D2559 ASTM standards of greater than 3,000 lbs., 4,000 lbs., 5,000 lbs. or 6,000 lbs.

VIII. Emulsions

In another aspect, the invention provides a stable emulsion or dispersion, for example, an aqueous emulsion or dispersion, comprising from about 1% to about 90% (w/w) of an oil and from about 1% to about 99% (w/w) of a protein composition selected from the group consisting of i) ground plant meal and ii) an isolated polypeptide composition, wherein the protein composition produces a stable emulsion or dispersion of the oil in an aqueous medium. The aqueous emulsion or dispersion optionally comprises from about 1% to about 50% (w/w) of oil and from about 1% to about 99% (w/w) of the protein composition.

In certain other embodiments, the stable emulsion or dispersion comprises an isolated protein composition capable of being dispersed in water and comprises one or more of the following features: (i) a prominent amide-I absorption band between about 1620 cm$^{-1}$ and 1645 cm$^{-1}$, (ii) an amide-II band between approximately 1514 cm$^{-1}$ and 1545 cm$^{-1}$, as determined by solid state FTIR, and (iii) is capable of dispersing an oil-in-water or water-in-oil to produce a homogeneous emulsion that is stable for least 5 minutes.

In still other embodiments, the stable emulsion or dispersion comprises an isolated protein composition capable of being dispersed in water and comprises one or more of the following features: (i) an amide-I absorption band between about 1620 cm$^{-1}$ and 1642 cm$^{-1}$ and an amide-II band between approximately 1514 cm$^{-1}$ and 1540 cm$^{-1}$, as determined by solid state FTIR, (ii) a prominent 2° amide N—H stretch absorption band centered at about 3275 cm$^{-1}$, as determined by solid state FTIR, and (iii) is capable of dispersing an oil-in-water or water-in-oil to produce a homogeneous emulsion that is stable for least 5 minutes.

In certain other embodiments, the stable emulsion or dispersion comprises an isolated protein composition capable of being dispersed in water and comprises one or more of the following features: (i) an amide-I absorption band between about 1620 cm$^{-1}$ and 1632 cm$^{-1}$ and an amide-II band between approximately 1514 cm$^{-1}$ and 1521 cm$^{-1}$, as determined by solid state FTIR, (ii) a prominent 2° amide N—H stretch absorption band centered at about 3272 cm$^{-1}$, as determined by solid state FTIR, (iii) an average molecular weight of between about 600 and about 2,500 Daltons (determined using, for example, MALDI mass spectrometry), (iv) two protonated nitrogen clusters defined by $^{15}$N chemical shift boundaries at about 86.2 ppm and about 87.3 ppm, and $^1$H chemical shift boundaries at about 7.14 ppm and 7.29 ppm for the first cluster, and $^1$H chemical shift boundaries at about 6.66 ppm and 6.81 ppm for the second duster, as determined by solution state, two-dimensional proton-nitrogen coupled NMR, and (v) is capable of dispersing an oil in water to produce a homogeneous emulsion that is stable for least 5 minutes.

The oil referenced above can be selected from the group consisting of an organic polyisocyanate (for example, PMDI, 4,4'-methylenediphenyl, diisocyanate (4,4'-MDI), 2,4-methylenediphenyl, diisocyanate (2,4-MDI), 2,2-methylenediphenyl, diisocyanate (2,2-MDI), monomeric MDI, or PMDI that has been reacted with a hydroxyl-functional compound such as a polyol), mineral oil, soybean oil, derivatized soybean oil, motor oil, castor oil, derivatized castor oil, dibutyl phthalate, epoxidized soybean oil, corn oil, vegetable oil, caprylic triglyceride, Eucalyptus oil, tributyl o-acetylcitrate, linseed oil, an adipate ester, a sebacate ester, a phthalate ester, and a citrate ester.

In certain other embodiments, the protein composition is used to provide a stable emulsion or dispersion, for example, an aqueous emulsion or dispersion, comprising a protein composition described herein and one or more of the following hydrophobic liquids and hydrophobic solids: a silicone (e.g., a silicone oil or a silicone gel), a fluorocarbon (e.g., a solid wax fluorocarbon (e.g., a fluoroalkyl wax) or a liquid oil fluorocarbon (e.g., a fluoroalkyl liquid)), a fluorinated polyol, a wax (e.g., a solid carboxylic acid ester (e.g., an ester of stearic acid), a salt of a carboxylic acid (e.g., a salt of stearic acid, e.g., zinc stearate), a hydrocarbon wax, and a fluorinated hydrocarbon wax), a liquid carboxylic acid ester that is hydrophobic, and a liquid hydrocarbon.

In certain other embodiments, the protein composition is used to provide a stable emulsion or dispersion, for example, an aqueous emulsion or dispersion, comprising a protein composition described herein and an agent selected from the group consisting of BE Square 165 Amber Petroleum Microcrystalline Wax from Baker Hughes, Inc.; FluoroLink D-10 Fluorinated polyol from Solvay Solexis, Inc; Tego Protect-5000 functionalized silicone fluid from Evonik Tego Chemie GmbH; Soy Lecithin; Castor Oil; Zinc Stearate; Dow Corning FS-1265 Fluid, 300 cST (Trifluoropropyl Methicone) from Dow Corning; and T-Sil-80, hydroxy terminated polydimethylsiloxane from Siovation, Inc.

Throughout the description, where compositions and articles are described as having, including, or comprising specific components, or where processes and methods are described as having, including, or comprising specific steps, it is contemplated that, additionally, there are compositions and articles of the present invention that consist essentially of, or consist of, the recited components, and that there are processes and methods according to the present invention that consist essentially of, or consist of, the recited processing steps.

Additional adhesive compositions, emulsions, methods of making adhesive compositions, methods of using adhesive compositions, and articles are described in U.S. patent application Ser. No. 12/719,521, filed on Mar. 8, 2010, the contents of which are hereby incorporated by reference.

Practice of the invention will be more fully understood from the foregoing examples, which are presented herein for illustrative purposes only, and should not be construed as limiting the invention in any way.

EXAMPLES

Example 1

Particle Board Prepared from Adhesive Comprising Ground Canola Meal or Ground Soy Meal Particle board was prepared using western pine wood particles and ground plant meal adhesive. Samples of particle board were tested for water resistance by placement in boiling water for one hour.

Preparation of Adhesive:

Multiple Adhesive Compositions were Prepared by Mixing ground plant meal (either ground canola meal or ground soy meal having a particle size range of from about 20 μm to about 70 μm, water, urea, and, in certain instances one or more of glycerin, corn syrup, and polybutene. Components used in the various adhesives are identified in Table 2 below. Except for sample nine, all adhesive compositions contained PMDI.

is appreciated that the viscosity, sprayability, and spreadability of the adhesive composition can be controlled by adjusting the amount or type of the components (e.g., the amount of water and/or presence of liquid additives).

Preparation of Particle Board:

Wet adhesive was added slowly to 600 grams of western pine wood particles (having a moisture content of approximately 4.5 percent) and mixed with a mechanical mixer. After adding the adhesive, the sample was further mixed and kneaded by hand to insure that the adhesive was efficiently mixed. A 9-inch×9-inch×9-inch wood forming box was centered on a 12-inch×12-inch×⅛-inch stainless steel plate, which was covered with aluminum foil. The wood/adhesive sample was added slowly into the forming box to achieve a uniform density of adhesive coated wood particles. After all the wood/adhesive sample was added, the sample was compressed by hand with a 8 and ⅞ inch×8 and ⅞ inch×¼ inch plywood board, and the wood forming box was carefully removed so that the particle board matte would not be disturbed. Then, the plywood board was removed, a piece of aluminum foil was placed on the particle board matte, and another 12-inch×12-inch×⅛-inch stainless steel plate was placed on top of the particle board matte. The particle board matte was then pressed to a thickness of ¾-inch using the following conditions: 117 psi for 10 minutes at a press platen temperature of 205° C. After pressing, the particle board was trimmed to 5 inches×5 inches. The density of the particle board samples was measured and recorded.

It is understood that the adhesive composition can be added to the wood using conventional means, such as spray or drip application, followed by mixing the adhesive/wood sample. Mixing of the adhesive/wood sample can be achieved using conventional mixing means, such as high speed paddle mixing (e.g., with a Littleford blender or a Henchel-type mixer), sigma-blade mixing, ribbon blending, and the like.

Results from Particle Board Preparation Procedure:

A strongly bound and densified particle board sample was produced. Table 3 below describes the amount of various components in the particle board products. This experiment illustrates that ground plant meal adhesive compositions can be used to prepare, for example, particle board and medium density fiber board.

TABLE 2

ADHESIVE COMPOSITIONS

| | | | Components of the Adhesive Composition | | | | | | |
|---|---|---|---|---|---|---|---|---|---|
| Sample | Meal Type | Wet Adhesive Added to Wood Particles (g) | Ground Meal (g) | Water (g) | Glycerin (g) | Urea (g) | PMDI (g) | Corn Syrup (g) | PBE* (g) |
| 1 | Soy | 72.70 | 12.63 | 41.12 | 0 | 9.47 | 9.47 | 0 | 0 |
| 2 | Soy | 63.58 | 10.19 | 34.48 | 0 | 11.64 | 7.27 | 0 | 0 |
| 3 | Soy | 75.69 | 12.58 | 38.14 | 0 | 9.47 | 9.47 | 6.04 | 0 |
| 4 | Soy | 98.10 | 14.80 | 38.30 | 11.0 | 9.47 | 13.73 | 10.80 | 0 |
| 5 | Canola | 85.34 | 19.05 | 41.91 | 0 | 15.24 | 9.14 | 0 | 0 |
| 6 | Canola | 96.85 | 17.38 | 42.55 | 3.80 | 24.44 | 8.69 | 0 | 0 |
| 7 | Canola | 96.85 | 17.38 | 42.55 | 0 | 24.44 | 8.69 | 3.80 | 0 |
| 8 | Canola | 96.85 | 17.38 | 42.55 | 0 | 24.44 | 8.69 | 0 | 3.80 |
| 9 | Canola | 109.44 | 27.15 | 55.13 | 0 | 27.15 | 0 | 0 | 0 |
| 10 | Canola | 85.71 | 13.04 | 33.54 | 0 | 23.48 | 7.83 | 0 | 7.83 |
| 11 | Canola | 115.34 | 19.05 | 41.91 | 30.0 | 15.24 | 9.14 | 0 | 0 |

*PBE refers to polybutene.

It is understood that mixing of the components to form the adhesive composition can be performed using conventional means, such as with a paddle mixer or static mixer. Further, it

TABLE 3

PARTICLE BOARD PRODUCTS

| | | | Components of the Cured Adhesive | | | | | |
|---|---|---|---|---|---|---|---|---|
| Sample | Wood (%) | Cured Adhesive (%) | Ground Plant Meal (%) | Glycerin (%) | Urea (%) | PMDI (%) | Corn Syrup (%) | PBE (%) |
| 1 | 95.000 | 5.000 | 2.000 | 0 | 1.500 | 1.500 | 0 | 0 |
| 2 | 95.375 | 4.625 | 1.619 | 0 | 1.850 | 1.156 | 0 | 0 |
| 3 | 94.110 | 5.890 | 1.973 | 0 | 1.485 | 1.485 | 0.947 | 0 |
| 4 | 90.937 | 9.063 | 2.243 | 1.667 | 1.435 | 2.081 | 1.637 | 0 |
| 5 | 93.250 | 6.750 | 2.961 | 0 | 2.368 | 1.421 | 0 | 0 |
| 6 | 91.700 | 8.300 | 2.656 | 0.581 | 3.735 | 1.328 | 0 | 0 |
| 7 | 91.700 | 8.300 | 2.656 | 0 | 3.735 | 1.328 | 0.581 | 0 |
| 8 | 91.700 | 8.300 | 2.656 | 0 | 3.735 | 1.328 | 0 | 0.581 |
| 9 | 91.700 | 8.300 | 4.150 | 0 | 4.150 | 0 | 0 | 0 |
| 10 | 92.000 | 8.000 | 2.000 | 0 | 3.600 | 1.200 | 0 | 1.200 |
| 11 | 89.096 | 10.904 | 2.829 | 4.455 | 2.263 | 1.357 | 0 | 0 |

*PBE refers to polybutene.

Density of the resulting particle board samples is provided in Table 4.

TABLE 4

PARTICLE BOARD DENSITY

| Sample | Meal Type | Board Density (lb/cu.ft.) |
|---|---|---|
| 1 | Soy | 30.00 |
| 2 | Soy | 34.27 |
| 3 | Soy | 31.21 |
| 4 | Soy | 37.58 |
| 5 | Canola | 38.05 |
| 6 | Canola | 38.43 |
| 7 | Canola | 38.31 |
| 8 | Canola | 37.77 |
| 9 | Canola | 37.81 |
| 10 | Canola | — |
| 11 | Canola | 38.39 |

Water Resistance Test:

Particle board samples were placed in boiling water for one hour, removed from the boiling water, and then inspected visually for evidence of dismemberment.

Results of Water Resistance Test:

All particle board samples prepared using adhesive containing PMDI were resistant to boiling water for one hour. That is, none of the particle board samples prepared using PMDI dismembered during the water resistance test. However, sample 9, which was prepared without PMDI, disintegrated when placed into boiling water. Results from the water resistant test are shown below in Table 5.

TABLE 5

PARTICLE BOARD BOIL TEST RESULTS

| Sample | Meal Type | Boil Result |
|---|---|---|
| 1 | Soy | Pass |
| 2 | Soy | Pass |
| 3 | Soy | Pass |
| 4 | Soy | Pass |
| 5 | Canola | Pass |
| 6 | Canola | Pass |
| 7 | Canola | Pass |
| 8 | Canola | Pass |
| 9 | Canola | Fail |
| 10 | Canola | Pass |
| 11 | Canola | Pass |

Example 2

Isolation of Polypeptide Compositions

Exemplary procedures for isolating and characterizing the water-insoluble polypeptide composition, water-soluble polypeptide composition, or a mixture thereof are described below.

Procedure A: Preparation of Water-Insoluble Polypeptide Composition and Preparation of Water-Soluble Polypeptide Composition.

Everlase digested protein from castor (experimental sample lot 5-90) was obtained from Prof. S. Braun at the Laboratory of the Department of Applied Biology at the Hebrew University of Jerusalem, Israel. Digested castor can be prepared as follows: castor meal protein is suspended in water at the ratio of about 1:10 w/w. Calcium chloride is added to an effective concentration of about 10 mM, and the pH of the suspension adjusted to pH 9 by the addition of 10 N NaOH. The reaction is then heated to 55° C. while stirring. Next, Everlase 16 L Type EX® (NOVOZYMES') is added at the ratio of 20 g per kg of castor meal protein, and the mixture is stirred at the same temperature for about 4 hours. Finally, the resulting mixture is brought to a pH 3.5 with citric acid and spray-dried to provide a powder.

The Everlase digested protein from castor (lot 5-90) was fractionated to yield a water-soluble fraction, and a water-insoluble, dispersible fraction. In the first step, 300 g of digested castor was slurried into 1 liter of distilled water. The mixture was shaken by hand, and was then placed into a sonicator bath for a period of 30 minutes. The slurry then was removed and was allowed to set idle for a period of up to two days to allow the insoluble portion to settle (in separate experiments, it was found that centrifuging was equally adequate). At that point, the clear yellow/amber supernatant was pipetted away and was retained for future use. Fresh distilled water was then added to the sediment to bring the total volume back to the 1-Liter mark on the container. The process of shaking, sonicating, settling, supernatant extracting, and replenishing with fresh distilled water (washing) then was repeated (6 times in total). In the final step, the water was pipetted from the top of the grayish-black sediment, and the sediment was then dried in a vacuum oven at 45° C. Based on the sediment's dry weight, the water-insoluble/water-dispersible polypeptide fraction was determined to comprise of approximately 50% by weight of the digested castor. Separately, the $1^{st}$ and $2^{nd}$ supernatants were combined and were then dried to yield a transparent yellow-colored, water-soluble polypeptide fraction.

After drying the fractions, it was verified that the grayish-black sediment (the water-insoluble and dispersible fraction) could not be re-dissolved in water. On the other hand, the dried supernatant fraction (clear/amber, glassy solid) was completely soluble in water.

Figure 4:
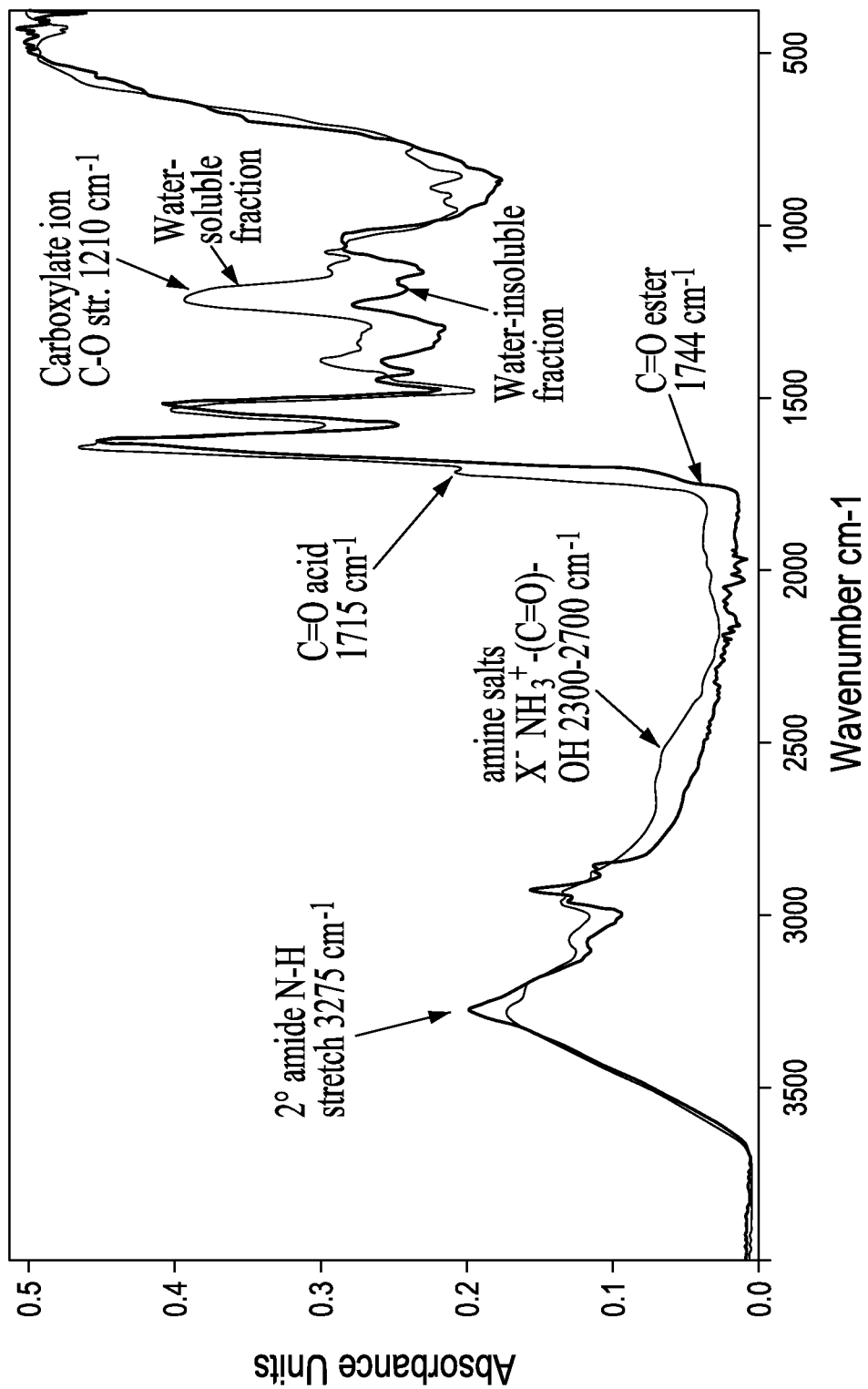
FIG. 4 shows overlaid solid state FTIR spectra for water-soluble and water-insoluble protein fractions isolated from digested castor lot 5-90.
Figure 5:
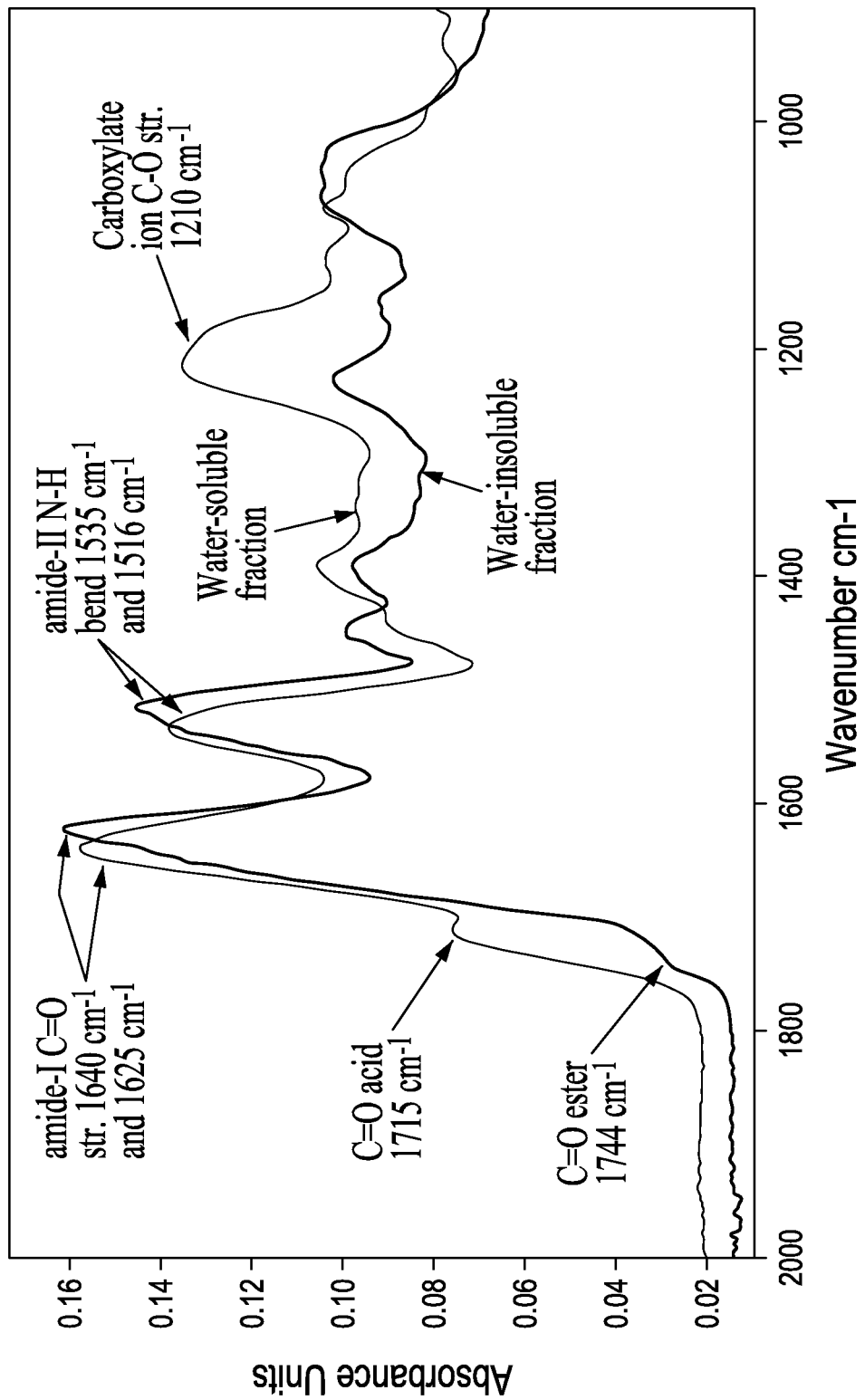
FIG. 5 shows solid state FTIR spectra of isolated water-soluble and water-insoluble fractions from digested castor, where the carbonyl amide region is expanded.
Figure 6:
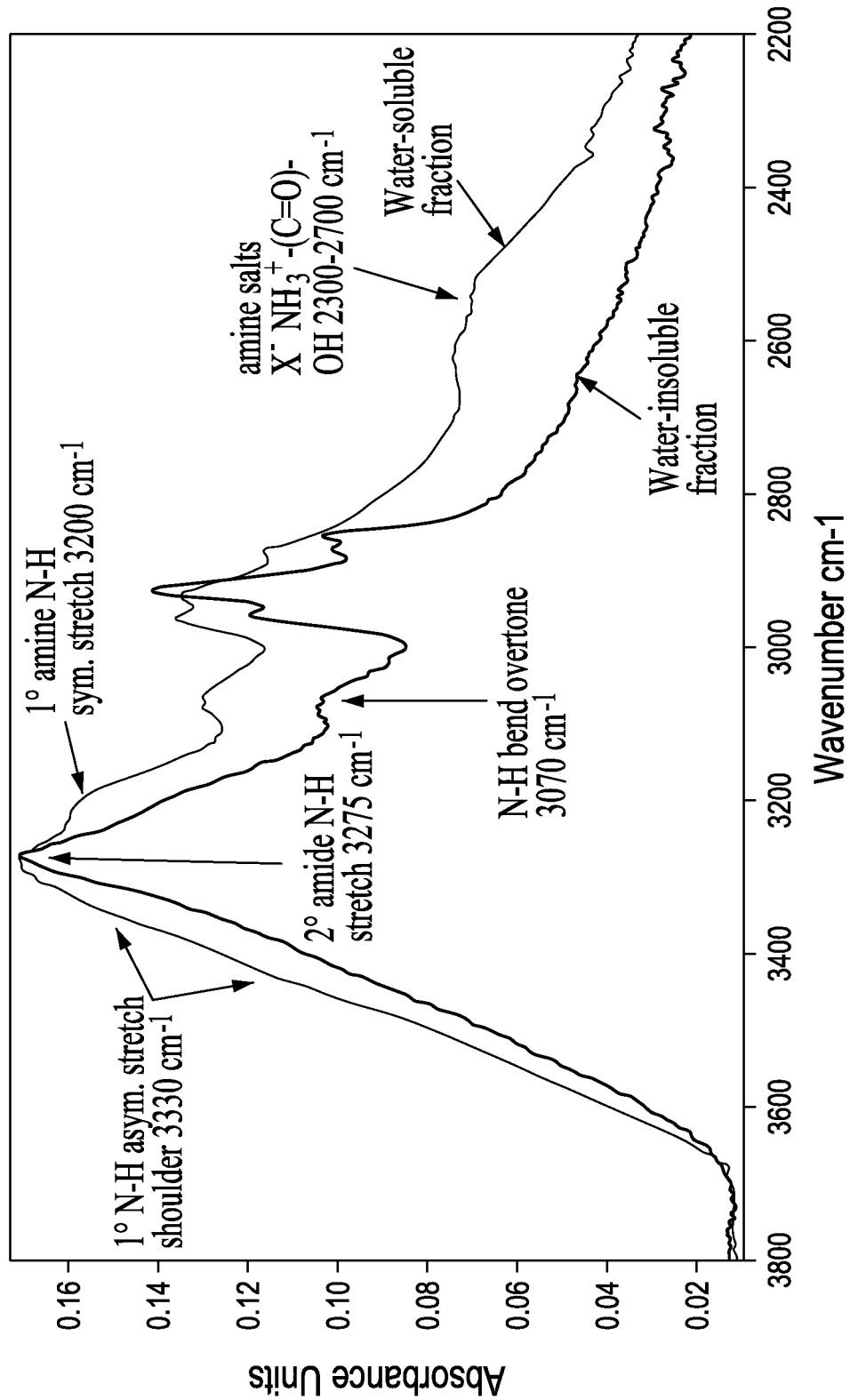
FIG. 6 shows solid state FTIR spectra of isolated water-soluble and water-insoluble fractions from digested castor where the N—H stretching region is expanded.

The two fractions were separately analyzed by solid state FTIR (see FIGS. 4-6). The spectra in FIG. 4 show that carboxylate and amine salt moieties are primarily associated with the water-soluble fraction. FIG. 5 shows that the amide carbonyl stretch band and the amide N—H bend bands are shifted to higher wavenumbers in the water-soluble polypeptide fraction. These components also appear to be present in the water-insoluble dispersible polypeptide fraction, but the predominant amide-I and amide-II bands are shifted to lower wavenumbers. Aside from hydrogen bonding effects, these differences also appear to be related to the presence of a higher fraction of primary amide groups in the water-soluble polypeptide fraction, and to a higher fraction of secondary amide groups in the water-dispersible polypeptide fraction (from the main-chain polypeptide chains). This is corroborated by the N—H stretching region depicted in FIG. 6.

FIG. 6 shows solid state FTIR spectra of isolated fraction from digested castor where the N—H stretching region from FIG. 4 is expanded. The spectra were vertically scaled to achieve equivalent absorbance intensities for the secondary amide N—H stretch band centered at 3275 $cm^{-1}$. FIG. 6 shows that the predominant type of amide in the water-dispersible fraction is the secondary main-chain amide as evidenced by the single, highly symmetric band centered at 3275 $cm^{-1}$. Although the water-soluble fraction also contains this type of amide, it also contains significantly higher fractions of primary amides as evidenced by the presence of the two primary N—H stretching bands at approximately 3200 $cm^{-1}$ (symmetric) and at approximately 3300 $cm^{-1}$ (asymmetric), respectively.

These spectra show that the water-soluble polypeptide fraction contained a relatively high concentration of primary amines, free carboxylic acids, acid salts, and amine salts. Conversely, the water-insoluble/water-dispersible polypeptide fraction had a higher fraction of secondary amides. In addition, the amide-I carbonyl absorption band for the water-insoluble/water-dispersible fraction was observed to appear at a wavenumber of approximately 1625 $cm^{-1}$, whereas that of the water-soluble fraction was observed at approximately 1640 $cm^{-1}$. As will be discussed elsewhere, this feature is one of the distinguishing differences between the water-soluble and water-insoluble polypeptide fractions; not only for castor proteins, but for soy proteins and canola proteins as well.

Procedure B: Additional Procedure for Preparation of Water-Insoluble Polypeptide Composition and Preparation of Water-Soluble Polypeptide Composition.

Digested soy protein was obtained as an experimental sample (lot 5-81) from Prof. S. Braun, the Laboratory of Applied Biology at the Hebrew University of Jerusalem, Israel. The digested soy protein was prepared as follows. Soy protein isolate (Soy protein isolate SOLPRO 958® Solbar Industries Ltd, POB 2230, Ashdod 77121, Israel) was suspended in water at a ratio of 1:10 (w/w). The pH of the suspension was adjusted to pH 7 with 10 N NaOH, and was then heated to 55° C. while stirring. Neutrase 0.8 L® (NOVOZYMES') then was added at a ratio of 20 g per kg of soy protein, and the mixture was stirred at the same temperature for 4 hours. The resulting mixture (pH 6.5) was spray-dried to yield a light tan powder.

Digested soy (lot 5-81) was fractionated to yield a water-soluble polypeptide fraction, and a water-insoluble/water-dispersible polypeptide fraction. In the first step, 300 g of digested soy was slurried into 1 liter of distilled water. The mixture was shaken by hand, and was then placed into a sonicator bath for a period of 30 minutes. Aliquots were placed into centrifuge tubes, and the tubes were then spun at 3,400 rpm for a period of approximately 35 minutes. The centrifuged supernatant, which contained the water-soluble fraction, was decanted off of the remaining water-insoluble sediment, and was poured into a separate container for later use (this clear yellow supernatant was placed into an open pan and was allowed to evaporate dry at a temperature of 37° C.). After the first washing step, fresh distilled water was then added to the tubes, and the remaining sediment was dispersed into the water by means of hand-stirring with a spatula. The combined centrifugation, decanting, and re-dispersion procedures were performed for a total of 5 cycles. After the final cycle, the free liquid containing residual water-soluble protein was decanted from the residual paste-like dispersion (yellowish-peach in color). The resulting dispersion (gravimetrically determined to be 16.24% solids by weight) contained the water-insoluble/water-dispersible proteins.

The paste-like dispersion was observed to be stable for a period of several weeks. It was also discovered that the dispersion could be readily combined with water-soluble polymers, and with water-dispersible polymer latexes. Moreover, the dispersion was readily compatible with PMDI (a stable dispersion was formed when PMDI was added to the slurry, and there was no evidence of PMDI phase separation, even after 24 hours). By contrast, neither the water soluble extract from the digested soy, nor the digested soy itself was capable of stabilizing a dispersion of PMDI in water.

After drying aliquots of both fractions, it was verified that the yellow sediment (the water-insoluble/water-dispersible extract) could not be re-dissolved in water. On the other hand, the dried supernatant fraction (clear/yellow solid) was completely soluble in water. The two dried extracts were separately analyzed by solid state FTIR (see FIGS. 7-10). FIG. 8 shows overlaid solid state FTIR spectra of isolated fractions from digested soy, where the N—H region is expanded. The spectra were vertically scaled to achieve equivalent absorbance intensities for the secondary amide N—H stretch band centered at 3275 $cm^{-1}$. FIG. 8 shows that the predominant type of amide in the water-dispersible fraction is the secondary main-chain amide as evidenced by the single, highly symmetric band centered at 3275 $cm^{-1}$. Although the water-soluble polypeptide fraction also contains this type of amide, it also contains significantly higher fractions of primary amides as evidenced by the presence of the two primary N—H stretching bands at approximately 3200 $cm^{-1}$ (symmetric) and at approximately 3300 $cm^{-1}$ (asymmetric), respectively. Collectively, these spectra revealed that the water-soluble polypeptide fraction was comprised of a relatively high concentration of primary amines. Conversely, the water-insoluble, dispersible polypeptide fraction was comprised of a higher fraction of secondary amines.

Figure 7:
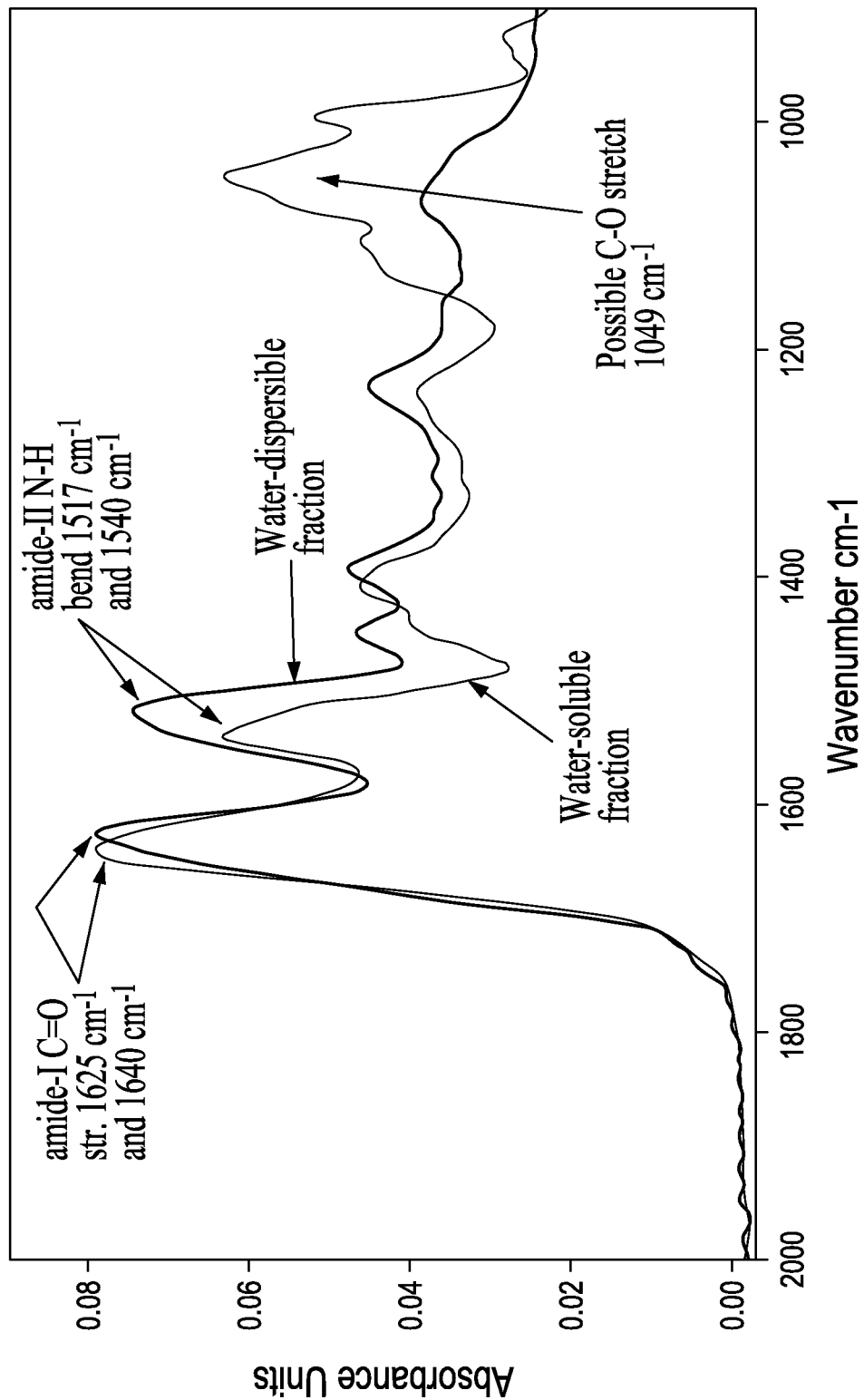
FIG. 7 shows overlaid solid state FTIR spectra of isolated fractions from castor protein (lot 5-94), showing an expansion of the carbonyl amide region (water-soluble fraction, and water-insoluble/water-dispersible fraction)
Figure 8:
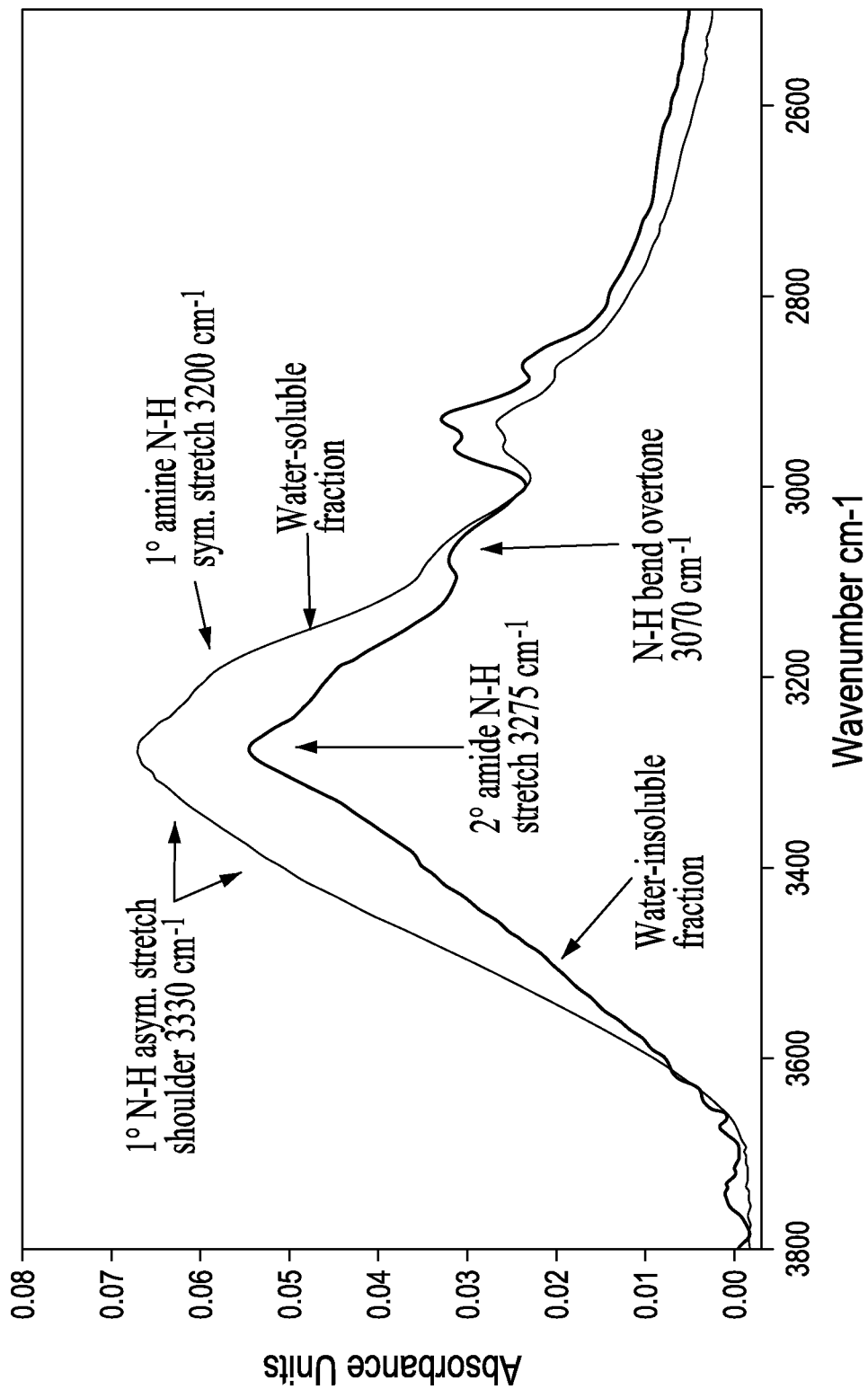
FIG. 8 shows the solid state FTIR spectra of isolated water-soluble and water-insoluble fractions from castor protein (lot 5-94), where the N—H and O—H stretch regions are expanded.
Figure 9:
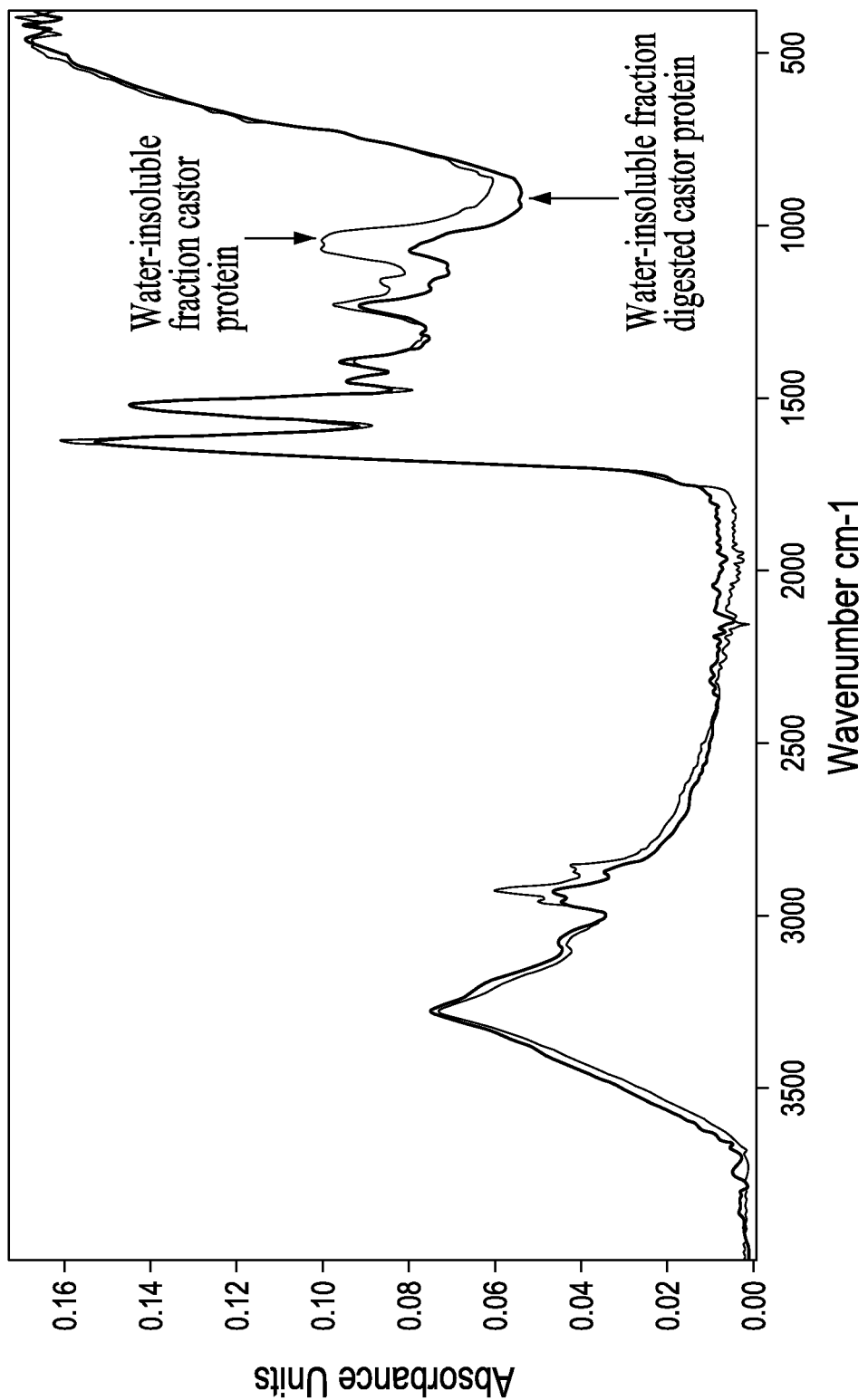
FIG. 9 shows overlaid solid state FTIR spectra of the isolated water-insoluble/water-dispersible fractions from castor protein (lot 5-94) and from enzyme digested castor (lot 5-90)
Figure 10:
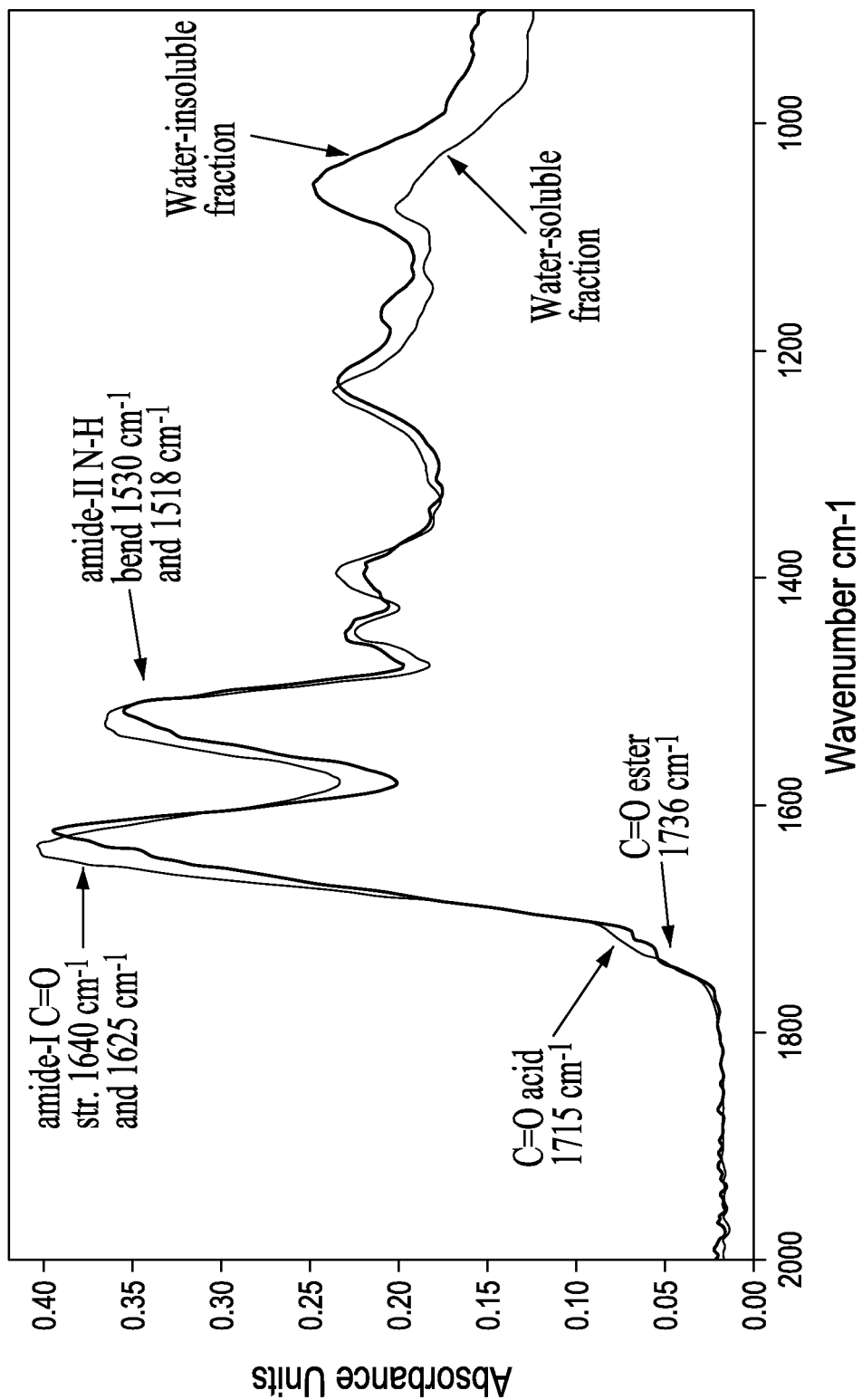
FIG. 10 shows overlaid solid state FTIR spectra of isolated water-soluble and water-insoluble fractions from digested soy, where the carbonyl amide region is expanded, where the spectra were vertically scaled to achieve equivalent absorbance intensities for the amide-I carbonyl stretch.
Figure 11:
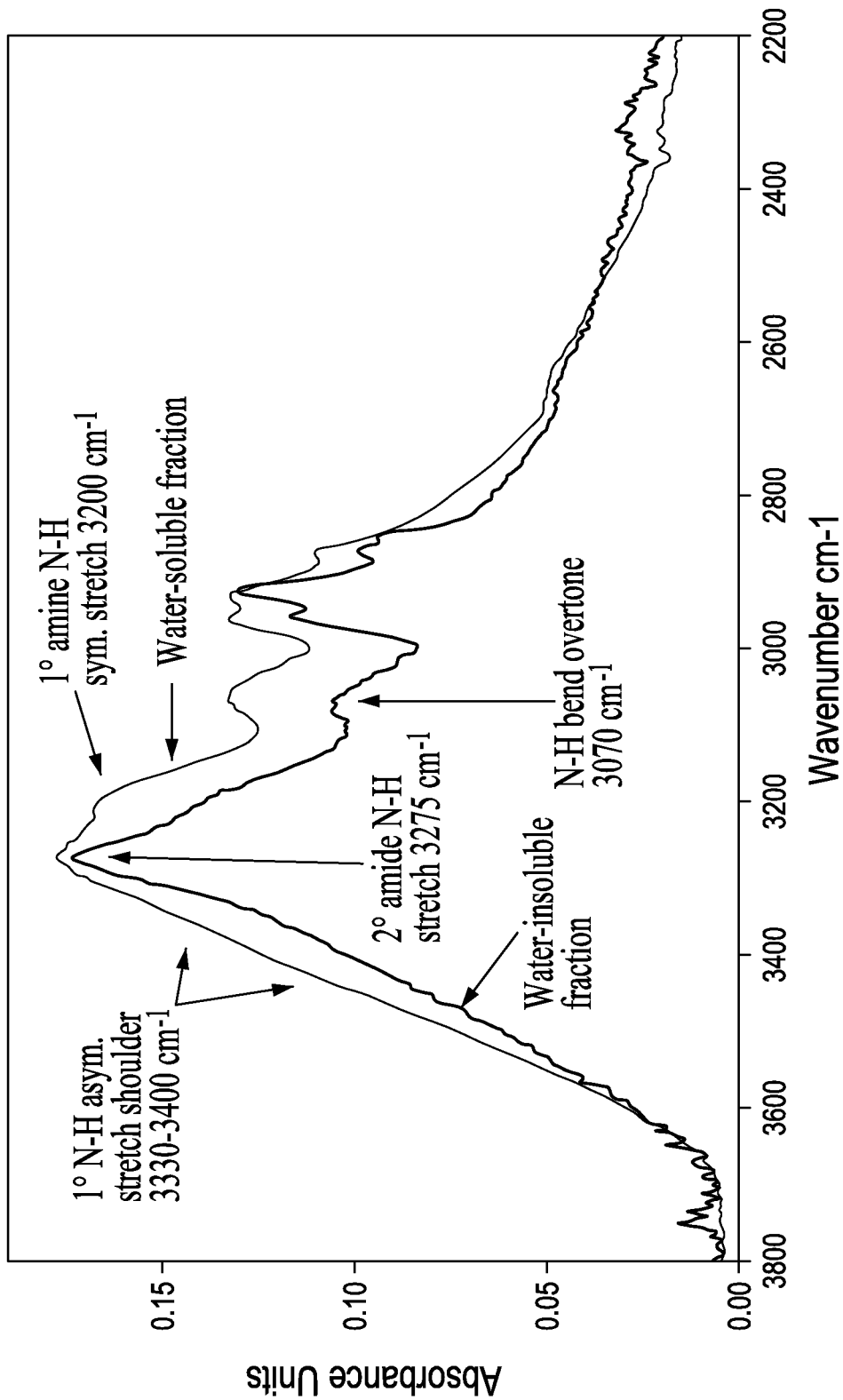
FIG. 11 shows overlaid solid state FTIR spectra of isolated water-soluble and water-insoluble fractions from digested soy, where the N—H stretching region is expanded.

As shown in FIG. 7, the amide carbonyl stretch band and the amide N—H bend band are shifted to higher wavenumbers in the water-soluble fraction. These components also appear to be present in the water-insoluble dispersible fraction, but the predominant amide-I and amide-II bands are shifted to lower wavenumbers. Aside from hydrogen bonding effects, these differences appear to be related to the presence of a higher fraction of primary amide groups (and/or primary amines) in the water-soluble polypeptide fraction (from lower molecular weight amino acid fragments), and to a higher fraction of secondary amide groups in the water-dispersible polypeptide fraction (from the main-chain polypeptide chains). This is supported by the N—H stretching region depicted in FIG. 6.

FIG. 8 shows that the predominant type of amide in the water-dispersible fraction is the secondary main-chain amide as evidenced by the single, highly symmetric band centered at 3275 cm$^{-1}$. Although the water-soluble fraction also contains this type of amide, it also contains significantly higher fractions of primary amines as evidenced by the presence of the two primary N—H stretching bands at 3200 cm$^{-1}$ (symmetric) and at approximately 3300 cm$^{-1}$ (asymmetric), respectively.

Figure 12:
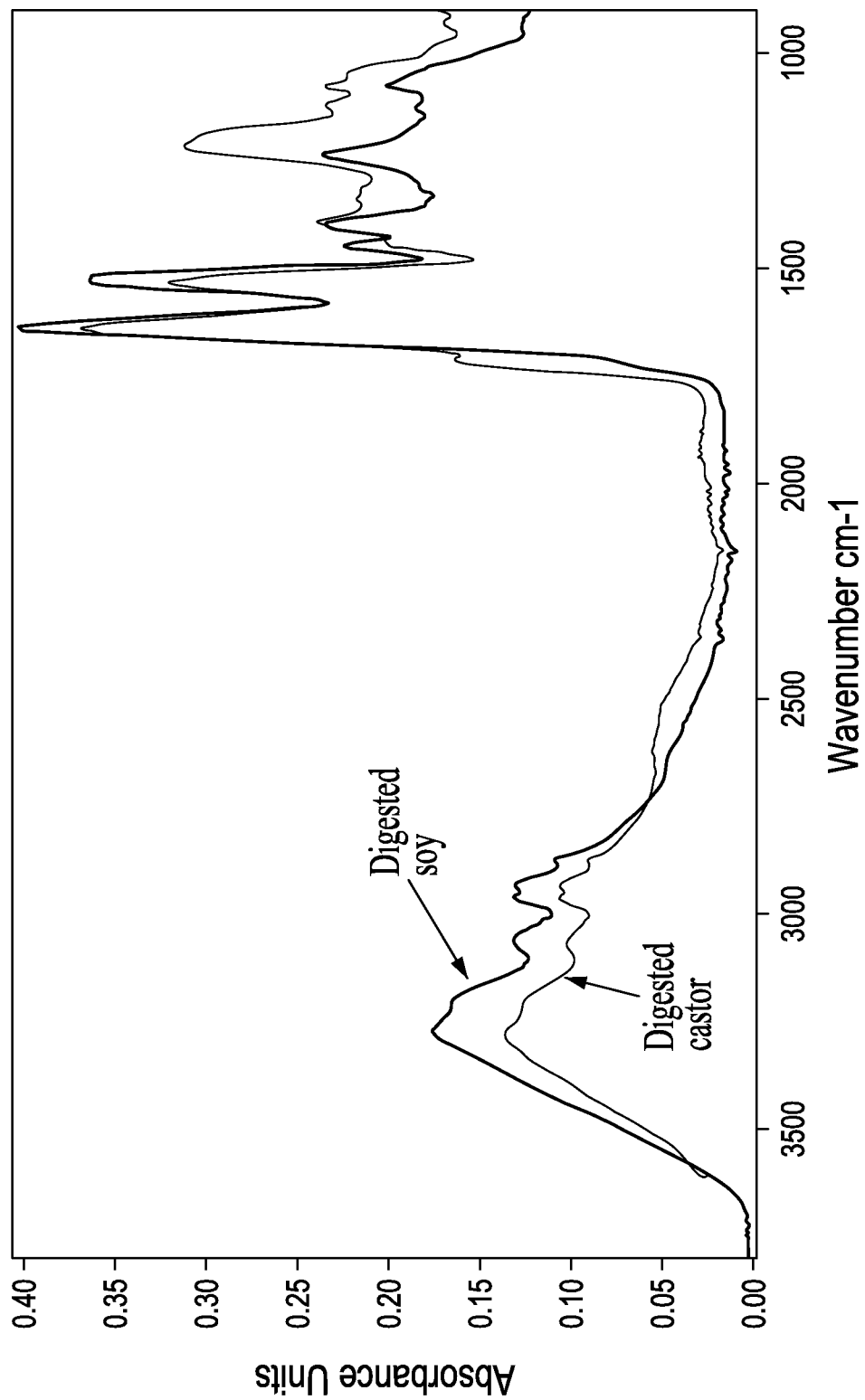
FIG. 12 shows overlaid solid state FTIR spectra of isolated water-soluble polypeptide fractions from digested soy and digested castor.
Figure 13:
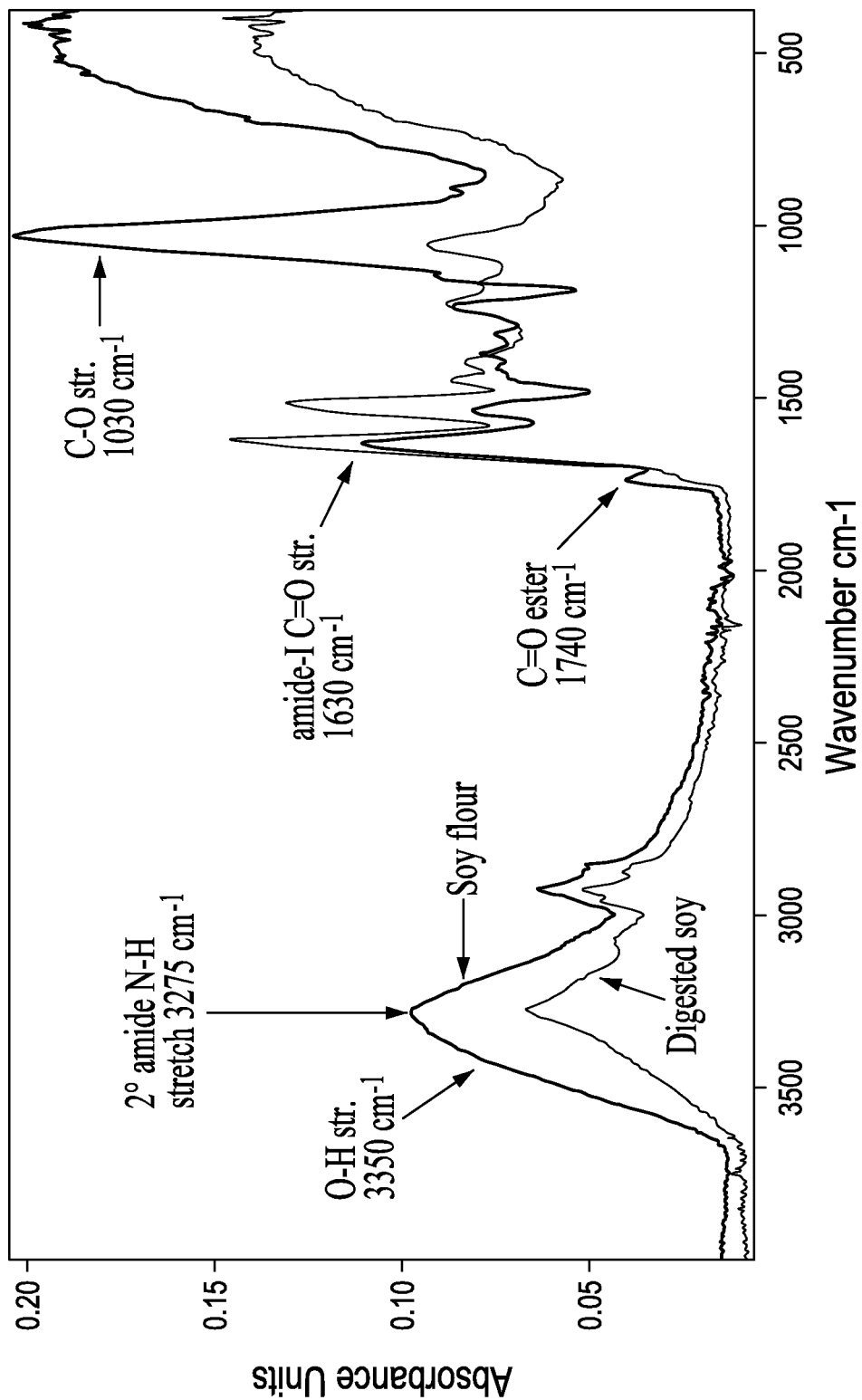
FIG. 13 shows overlaid solid state FTIR spectra of isolated water-insoluble fractions from digested soy and soy flour.
Figure 14:
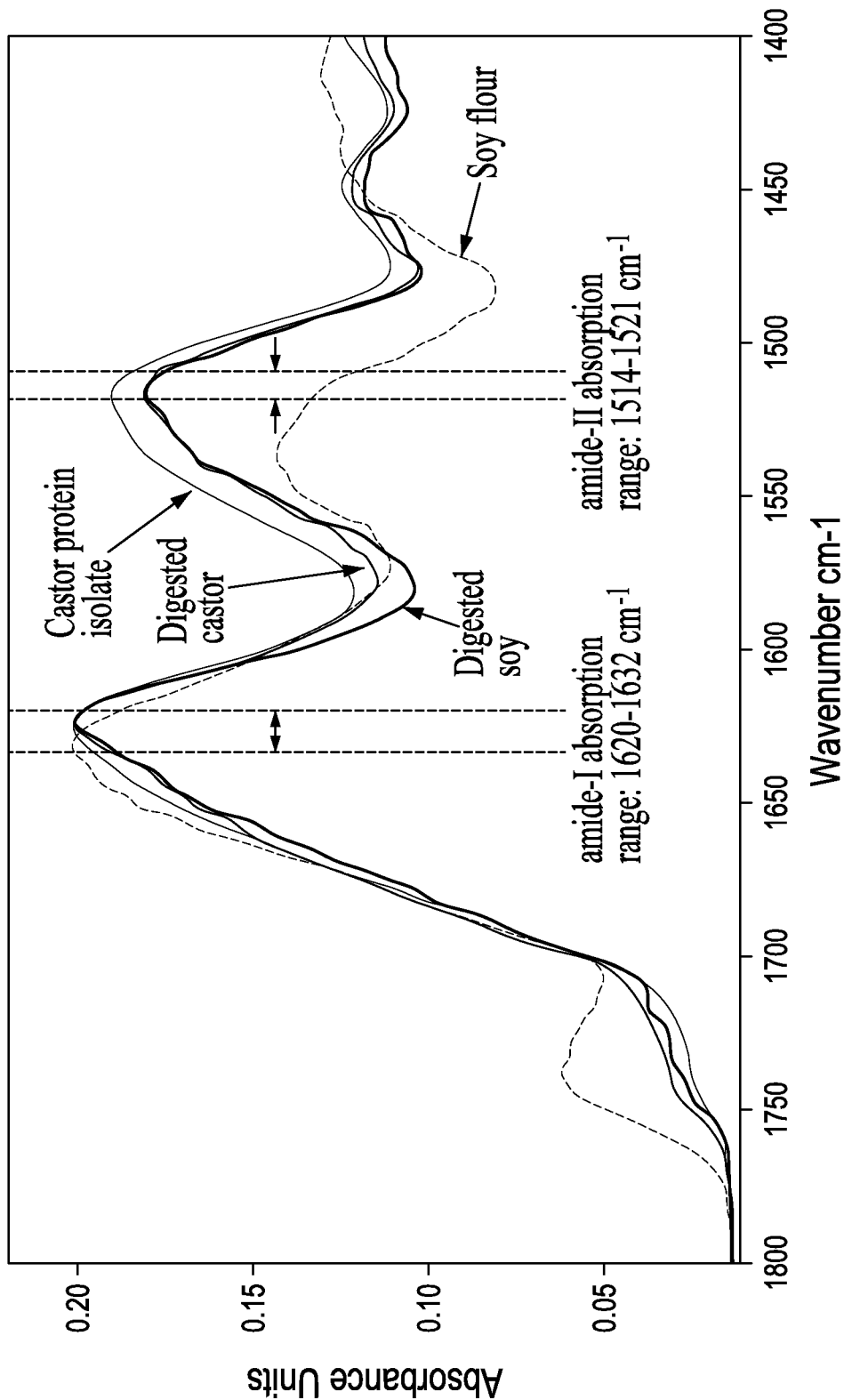
FIG. 14 shows overlaid solid state FTIR surface ATR spectra of the isolated water-insoluble/water-dispersible fractions from multiple protein samples (digested soy lot 5-81, soy flour, castor protein isolate lot 5-94, digested castor lot 5-90) where the carbonyl amide region is expanded.

In spite of being derived from different plant sources, the water-insoluble dispersible fractions from digested soy and digested castor are spectrally similar to one another (see FIG. 14). Conversely, the water-soluble polypeptide fractions appear to have different FTIR spectral characteristics (see FIG. 12). Further, MALDI mass spectroscopic indicates the water-soluble polypeptide fractions from digested soy and digested castor have different molecular weight characteristics. The commonality between the two types of water-soluble fractions is that they both appear to contain primary amines/amides.

Procedure C: Additional Procedure for Preparation of Water-Insoluble Polypeptide Composition and Preparation of Water-Soluble Polypeptide Composition Castor meal (4.0 kg containing 24.8% protein) was suspended in 0.1 M NaOH at a 10:1 w/w meal to alkali ratio. The suspension was stirred for 18 hours at ambient temperature and the solids were then removed by centrifugation. The supernatant (about 32 liters) was acidified to pH 4.5 with 10 N HCl. The protein was allowed to sediment at about 10° C. for 12 hours, the clear supernatant solution was decanted, and the heavy precipitate (about 2 kg) was collected by centrifugation. The wet precipitate was freeze-dried yielding 670 g protein isolate.

The water-insoluble and water-soluble polypeptide fractions were obtained by means of extraction with water. In the first step, 10 g of the castor protein isolate (lot 5-94) was slurried into 50 g of distilled water. The mixture was dispersed via mechanical stirring for 2 hours. Aliquots then were placed into centrifuge tubes, and the tubes were then spun at 3,400 rpm for a period of approximately 35 minutes. The centrifuged supernatant, which contained the water-soluble fraction, was decanted from the remaining water-insoluble sediment, and was poured into a separate container (this clear yellow supernatant was saved and dried at 37° C. for subsequent dispersion experiments and solid state FTIR analyses). After the first washing step, fresh distilled water was then added to the tubes, and the remaining sediment was dispersed into the water by means of hand-stirring with a spatula. The combined centrifugation, decanting, and re-dispersion procedures were performed for a total of 13 cycles. After the final cycle, the free liquid was decanted from the residual paste-like dispersion (the water-insoluble polypeptide fraction from the starting castor protein). Upon drying, the paste was determined to contain 28.58% solids, and the total yield of the water-insoluble fraction was determined to be 62.87%. Thus, the starting castor protein itself contained 62.87% water-insoluble polypeptide material, and 37.12% water-soluble polypeptide material.

Procedure D: Preparation of Digested Whey Protein.

Digested whey protein (lot 5-72, referred to herein as digested whey protein pH 6.5) was obtained as an experimental sample from Prof. S. Braun, the Laboratory of Applied Biology at the Hebrew University of Jerusalem, Israel, and was prepared as follows; Whey protein (WPI-95° Whey Protein Isolate; Nutritteck, 24 Seguin Street, Rigaud, QC, Canada JOP 1P0) was suspended in water at a ratio of 1:6 (w/w). The pH of the suspension was adjusted to pH 7 with 5 N NaOH, and was heated to 55° C. while stirring. FLAVOURZYME 500 MG (from NOVOZYMES') then was added at a ratio of 20 g per kg of whey protein, and the mixture was stirred at the same temperature for 4 hours. The resulting aqueous mixture was pH 6.5. The resulting mixture then was spray-dried to yield digested whey protein as a pale yellow powder containing a mixture of water-soluble and water-insoluble polypeptide.

Procedure E: Preparation of Digested Castor Protein Reacted with Sodium Nitrite.

Castor meal protein was suspended in water at a ratio of 1:10 (w/w). Calcium chloride was added at an effective concentration of 10 mM, and the pH of the suspension was adjusted to pH 9 by the addition of 10 N NaOH. The reaction was heated to 55° C. while stirring. Everlase 16 L Type EX® (NOVOZYMES') then was added at a ratio of 10 g per kg of castor meal protein, and the mixture was stirred at the same temperature for 4 hours. L-lactic acid (90%, 120 g per kg castor protein) then was added to bring the mixture to pH 4.4 followed by gradual addition (over a 20 hour period) of sodium nitrite solution in water (0.4 kg/1, 0.4 liter per kg castor protein) while stirring. The reaction then was left to stand at ambient temperature for 40 hours. $Na_2S_2O_5$ (0.2 kg per kg castor protein) was then added, and the reaction was heated to 60° C. and stirred for 15 minutes. After cooling to ambient temperature, the reaction was brought to pH 2.0 with concentrated HCl. It was then left at 10° C. for 18 hours, and the resulting precipitate was separated by centrifugation for 15 minutes at 24,000×g. The precipitate was re-suspended in 10 mM citric acid (3 vol. per vol. precipitate), and then it was collected and subsequently freeze-dried to yield a tan powder containing a mixture of water-soluble and water-insoluble polypeptide.

Procedure F: Isolation of Water-Insoluble/Water-Dispersible Protein Fraction and Water-Soluble Protein Fraction by Washing Ground Soy Meal with Water, and Characterization of Same Part I: Isolation of Water-Insoluble/Water-Dispersible Protein Fraction and Water-Soluble Protein Fraction Soy meal (same as Example 1) having a particle size range of 20-70 μm was mixed with distilled water (pH approximately 7) to yield a 27.83% meal dispersion in water (w/w). In the first "wash" step, an aliquot of the dispersion was centrifuged for 60 minutes, and the clear supernatant containing a water-soluble protein fraction was decanted from the wet slurry that remained on the bottom of the centrifuged tube (in a separate experiment, this wet slurry was gravimetrically determined to contain approximately 33% solids in water (w/w); and the supernatant was gravimetrically determined to contain approximately 15% by weight solids (w/w)). The yield of the water-insoluble/water-dispersible protein fraction after the first "wash" step was determined to be approximately 80% of the starting meal weight.

In a second step, the 33% solids fraction from the first wash step was mixed and dispersed in fresh distilled water (pH approximately 7), and the dispersion was centrifuged for a second time. Again, the clear supernatant was decanted, and the remaining slurry was subjected to a third wash cycle (addition of fresh distilled water followed by centrifuging). After the third "wash" step and supernatant decanting, the resulting slurry of water-insoluble/water-dispersible protein fraction was gravimetrically determined to contain approximately 24% solids, and the yield was determined to be approximately 53% of the starting meal weight. Thus, the ground soy meal itself was comprised of approximately 53% of a water-insoluble/water-dispersible protein fraction, and approximately 47% of a water-soluble protein fraction.

Part II: Dispersion Analysis for Water-Insoluble/Water-Dispersible Protein Fraction, Water-Soluble Protein Fraction, and Ground Soy Meal An aliquot of the 24% solids dispersion of the isolated water-insoluble/water-dispersible protein fraction (washed 3 times as noted above) was blended with PMDI at a w/w ratio of 1 part PMDI to 1 part of protein fraction. The resulting mixture formed a stable dispersion, and remained stable during a 1 hour period of observation with no visual signs of phase separation.

In order to test dispersion ability of ground soy meal, a dispersion of 24% (w/w) ground soy meal in water was mixed with PMDI at a 1:1 w/w ratio of PMDI to soy meal solids. The soy meal comprised approximately 53% by weight of a water-insoluble/water-dispersible protein fraction and approximately 47% by weight of a water-soluble protein fraction. The mixture of ground meal and PMDI formed a stable dispersion which remained stable during a 1 hour period of observation with no visual signs of phase separation.

In order to test dispersion ability of water-soluble protein faction, water-soluble protein fraction obtained from the soy meal (by first washing the soy meal, then isolating the water-soluble fraction by drying the supernatant after centrifuging) was dissolved in water to yield a 24% solids solution (w/w). When PMDI was added to this solution (at a 1:1 weight ratio of PMDI to water-soluble protein fraction), the resulting mixture was unstable, and phase separation was visually evident—immediately after mixing.

The experimental results above demonstrate that water-emulsified PMDI-containing adhesive compositions can be prepared with i) water-insoluble/water-dispersible protein fractions obtained by washing ground plant meals, and ii) ground plant meal compositions that are comprised of both a water-insoluble/water-dispersible protein fraction and a water-soluble protein fraction. The water-soluble protein fraction does not facilitate dispersion, but the water-insoluble/water-dispersible protein fraction is present in an amount sufficient to facilitate dispersion.

Various commercially available compositions derived from plant meals, such as soy flour, are solvent-extracted which result in removal of water-insoluble protein components. Such compositions are unable to facilitate dispersion, and, thus, are less desirable for use making an adhesive.

Part III: FTIR Analysis of Water-Insoluble/Water-Dispersible Protein Fraction, Water-Soluble Protein Fraction, and Ground Soy Meal Solid state surface ATR FTIR experiments were performed on water-insoluble/water-dispersible protein fraction (this sample was collected after the third wash cycle and was allowed to dry at 23° C., and water-soluble protein fraction (this sample was collected from the clear supernatant after the third wash cycle, and was allowed to dry at 23° C. to yield a transparent amber solid) obtained by washing soy meal with water. Characteristics of the FTIR spectra are described below.

Figure 18:
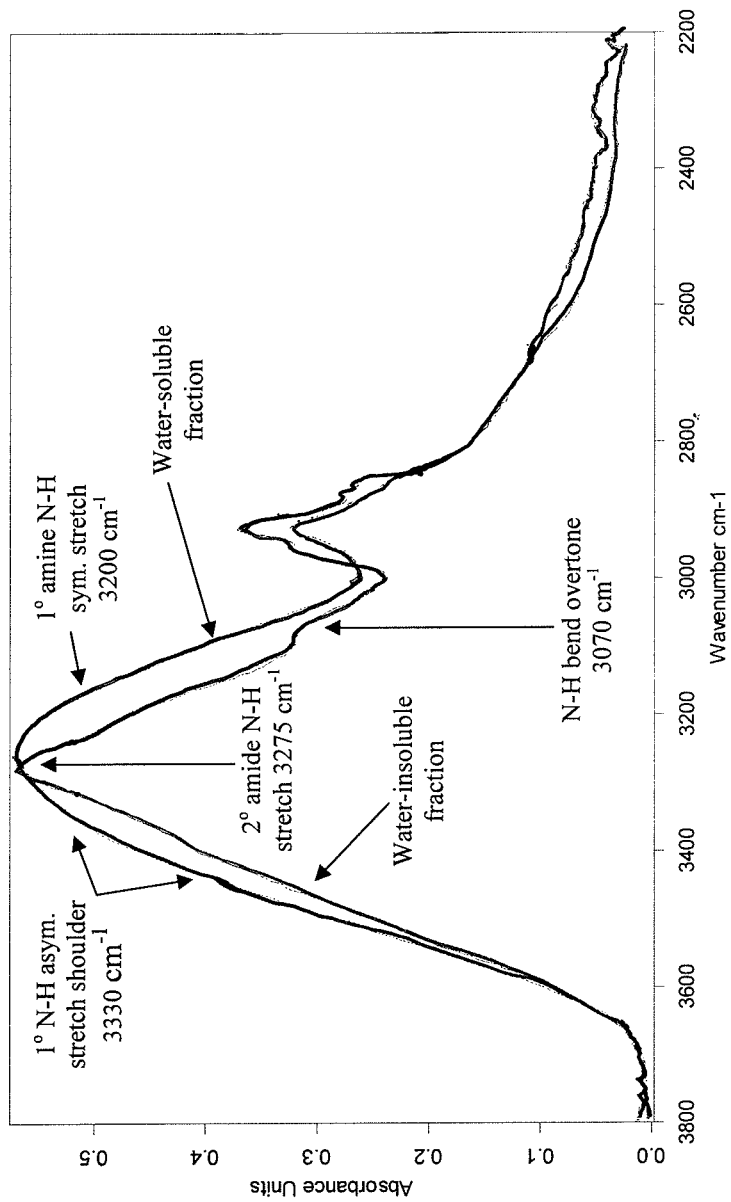
FIG. 18 shows solid state FTIR spectra of isolated water-soluble and water-insoluble fractions obtained from ground soy meal, where the N—H and O—H stretch regions are expanded.

FIG. 18 shows the solid state FTIR spectra for the isolated water-insoluble/water-dispersible protein fraction from soy meal together with the water-soluble protein fraction where the N—H stretching region has been expanded. The spectra were vertically scaled to achieve equivalent absorbance intensities for the secondary amide N—H stretch band centered at 3275 cm$^{-1}$. FIG. 18 shows that the predominant type of amide in the water-insoluble/water-dispersible protein fraction is the secondary main-chain amide as evidenced by the single, highly symmetric band centered near 3275 cm$^{-1}$. Although the water-soluble fraction also contains this type of amide, it also contains significantly higher fractions of primary amides as evidenced by the presence of the two primary N—H stretching bands at approximately 3200 cm$^{-1}$ (symmetric) and at approximately 3300 cm$^{-1}$ (asymmetric), respectively.

Figure 19:
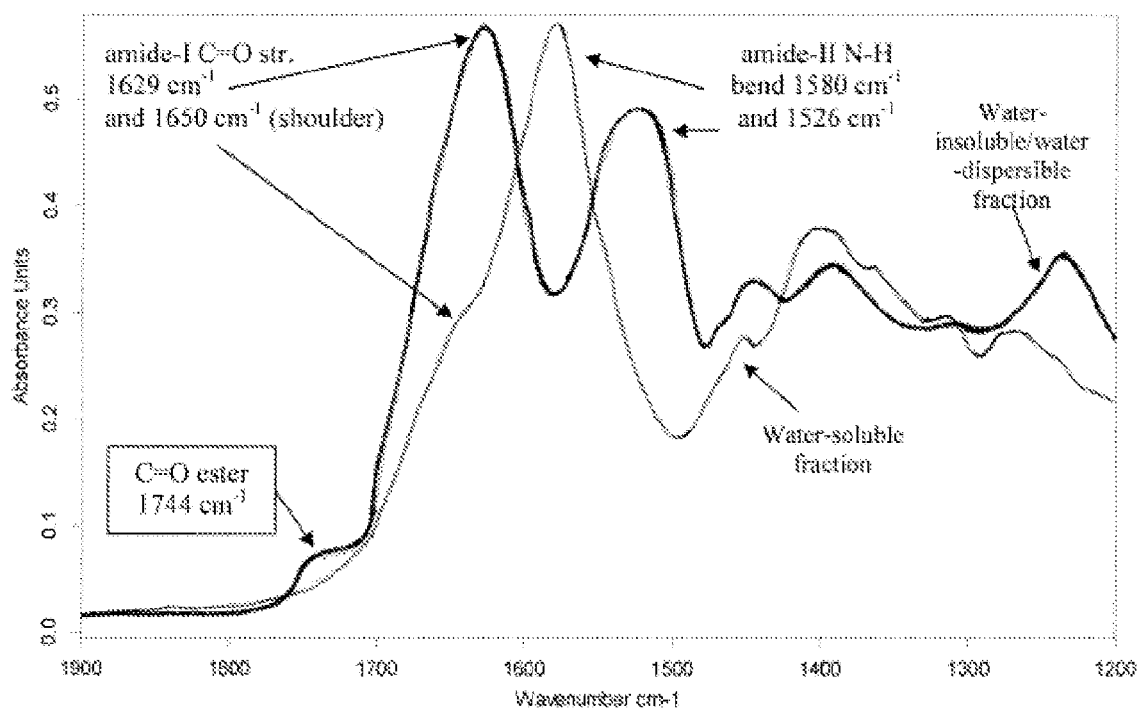
FIG. 19 shows overlaid solid state FTIR spectra of isolated water-soluble and water-insoluble fractions obtained from ground soy meal, where the carbonyl amide region is expanded and the spectra were vertically scaled to achieve equivalent absorbance intensities for the amide-I carbonyl stretch.

As shown in FIG. 19, the amide-I carbonyl absorption band for the water-insoluble/water-dispersible protein fraction was observed to appear at a wavenumber of approximately 1629 cm$^{-1}$, whereas that of the water-soluble protein fraction was observed to appear at approximately 1650 cm$^{-1}$. This feature is one of the distinguishing differences between the water-soluble protein fraction and water-insoluble/water-dispersible protein fraction, not only for isolated polypeptides from castor and soy proteins, but for protein-containing fractions that are isolated directly from plant meals like soy meal. Moreover, the amide-II band for the water-insoluble/water-dispersible protein fraction was observed to appear as a broad band centered at approximately 1526 cm$^{-1}$, whereas that of the water-soluble protein fraction was observed to appear at approximately 1580 cm$^{-1}$ together with a weak shoulder at approximately 1547 cm$^{-1}$.

Example 3

Characterization of Polypeptide Compositions by Mass Spectrometry

This Example describes characterization of the various protein samples via MALDI Mass Spectrometry using an Ultraflex III instrument from Bruker.

The instrument was set in positive mode, in order to detect positive ions generated during the ionization process. The voltage applied to accelerate the ion into the TOF analyzer was set at 25 KV. The analysis was carried out by using the instrument in reflection mode which improves the resolution. Solid samples were dissolved in DMSO at a concentration of 10 mg/mL. Water-soluble supernatant fractions which were solvated in water.

Each sample solution was mixed with a matrix solution (for analytical purposes). The matrix was an inert compound of low molecular weight which absorbs at the same wavelength of the laser, Nd:YAG 355 nm. The matrices used were: α-CHCA, alpha-cyano-4-hydroxycinnamic acid, dissolved in a solution of ACN/H$_2$O (70:30) with 0.1% of TFA at a concentration of 10 mg/mL; and DCTB, T-2-[3-(4-t-Butyl-phenyl)-2-methyl-2-propenylidene]malononitrile, dissolved in THF at a concentration of 10 mg/mL. The first matrix was mainly used for the analysis of peptides and proteins while the second one, DCTB, was suitable for the analysis of polymers.

The matrix solutions and the sample solutions were mixed at a 10:1 volume ratio respectively. For the analysis where DCTB was used as matrix, NaTFA (10 mg/mL in THF) was added to the solution matrix/sample as a cationizing agent at a ratio 10:2:1 by volume (matrix:sample:salt, respectively).

0.8 μL of the resulting solutions were spotted on a target plate made of polished steel, and only after the solvents were completely dried was the target loaded into the instrument. The spectra were collected and manipulated by using FlexAnalysis software released by Bruker Daltonics.

Relative fragment intensities were normalized and used to calculate number average (Mn), weight average (Mw), and z-average (Mz) molecular weight parameters for various samples. The results are summarized in Table 6.

TABLE 6

| Sample ID | Mn | Mw | Mz | Mw/Mn |
|---|---|---|---|---|
| Castor protein isolate lot 5-94[1] | 1149 | 1162 | 1179 | 1.01 |
| Digested castor lot 5-83[2] | 951 | 1081 | 1250 | 1.13 |
| Digested castor lot 5-108[3] | 897 | 1011 | 1169 | 1.12 |
| Digested castor Water-insoluble/dispersible fraction (lot 5-108)[3] | 1009 | 1371 | 1928 | 1.35 |
| Digested castor Water-soluble fraction (lot 5-108)[3] | 1532 | 1697 | 1894 | 1.10 |
| Soy Protein Isolate | 2023 | 2104 | 2161 | 1.03 |
| Digested Soy (lot 5-81)[4] | 894 | 989 | 1104 | 1.10 |
| Digested Soy Water-insoluble/dispersible fraction (lot 5-81)[4] | 910 | 1119 | 1512 | 1.22 |
| Digested Soy Water-soluble fraction (lot 5-81)[4] | 837 | 888 | 941 | 1.06 |

[1]see Example 2, Procedure C
[2]Castor meal protein digested with Everlast (Lot No. 5-83) was obtained from Prof. Sergei Braun of The Hebrew University of Jerusalem
[3]see Example 5
[4]see Example 2, Procedure B The results indicate that the molecular weight characteristics (as determined by MALDI mass spectroscopy) of the polypeptide composition can depend on the process used to obtain the polypeptide composition. For example, castor protein isolate was observed to have a higher number average molecular weight than its digested counterpart. Further, upon digestion, the number average molecular weight was observed to decrease while the polydispersity increased. The same trend was observed for the soy protein isolate and its digested counterpart.

Other experimental results indicate that proteins in the water-soluble polypeptide composition from digested castor have a higher number average molecular weight than its parent protein isolate. However, proteins in the water-soluble polypeptide composition from digested soy had a lower number average molecular weight than its parent soy protein isolate.

Collectively, these results indicate that it is possible to prepare compositions that both i) have particular molecular weight features, and ii) have the ability to disperse an oil in water or water in oil, by selecting a particular procedure for preparing the polypeptide composition.

Example 4

Characterization of Polypeptide Compositions by Two-Dimensional Proton-Nitrogen NMR Correlation Spectra and Characterization of a Water-Insoluble/Water-Dispersible Polypeptide Fraction The water-insoluble and water-soluble protein fractions were prepared as follows. Digested castor (lot 5-83) was suspended in water at the ratio of 1:10 w/w. Calcium chloride was added to the effective concentration of 10 mM, and the pH of the suspension was adjusted to pH 9 by the addition of 10 N NaOH. The reaction was heated to 55° C. while stirring. Everlase 16 L Type EX® (NOVOZYMES') then was added at the ratio of 10 g per kg of castor meal protein, and the mixture was stirred at the same temperature for 4 hours. The resulting mixture then was brought to a pH 3.5 with citric acid and was spray-dried to yield a tan powder. Then, the water-insoluble and water-soluble protein fractions were harvested as described in Example 1 (Procedure A) and were allowed to air-dry at 23° C.

The dried powder containing the water-insoluble protein fraction was dissolved in d6-DMSO (6.8% by weight) to yield a red homogeneous solution (Sample A). An aliquot of the as-made dried digested castor was also dissolved in d6-DMSO (6.8% solids by weight) to yield a comparative homogeneous red solution (Sample B). Solid-state FTIR analyses of the same dried powders revealed distinct differences in both the N—H stretching and carbonyl stretching regions of the solid state FTIR spectra. These spectral differences were attributed to differences in bonding environments for the polypeptide N—H moieties, possibly resulting from differences in secondary and tertiary structure. One of the specific differences involved a shift to lower wavenumbers for the amide-I carbonyl band in the water-insoluble/water-dispersible fraction. In order to further characterize these types of differences, a two-dimensional NMR technique was employed for the purpose of characterizing a very specific subset of bonded atomic nuclei; namely, protons bonded to nitrogens.

The samples were dissolved in DMSO-d6 and were placed into 5 mm NMR tubes. All $^1$H NMR spectra were recorded on a Varian INOVA 750 MHz spectrometer equipped with an HCN—PFG (pulsed field gradient) triple resonance Cryo Probe at 30° C. For one-dimensional (1D) $^1$H NMR spectra, a spectral window of 10000 Hz was used with an acquisition time of 3 seconds and relaxation delay of 5 seconds. The spectra were signal averaged for 16 transients using a proton 90° pulse width of 8.6 microseconds. The spectral data were zero filled to 132 k points and were processed with 1 Hz line broadening, then baseline corrected and referenced to an internal residual solvent DMSO-d6 peak at 2.50 ppm before integrating and making plots.

Phase sensitive two-dimensional (2D) $^1$H—$^{15}$N gradient-HSQC (heteronuclear single quantum coherence) data were collected with 2048 acquisition points in the F2 dimension and 768 points in the F1 dimension (90° pulse widths of 6.3 microseconds, and 33.5 microseconds were used for proton and nitrogen, respectively) 48 transients were collected for each increment, with a repetition delay of 1.2 seconds and acquisition time of 0.124 seconds with GARP decoupling during acquisition. The acquired data were processed with sine bell weighting and zero filled to 8196×8196 points in F2 and F1 dimensions before final transformation to produce the 2D correlation data.

Figure 15:
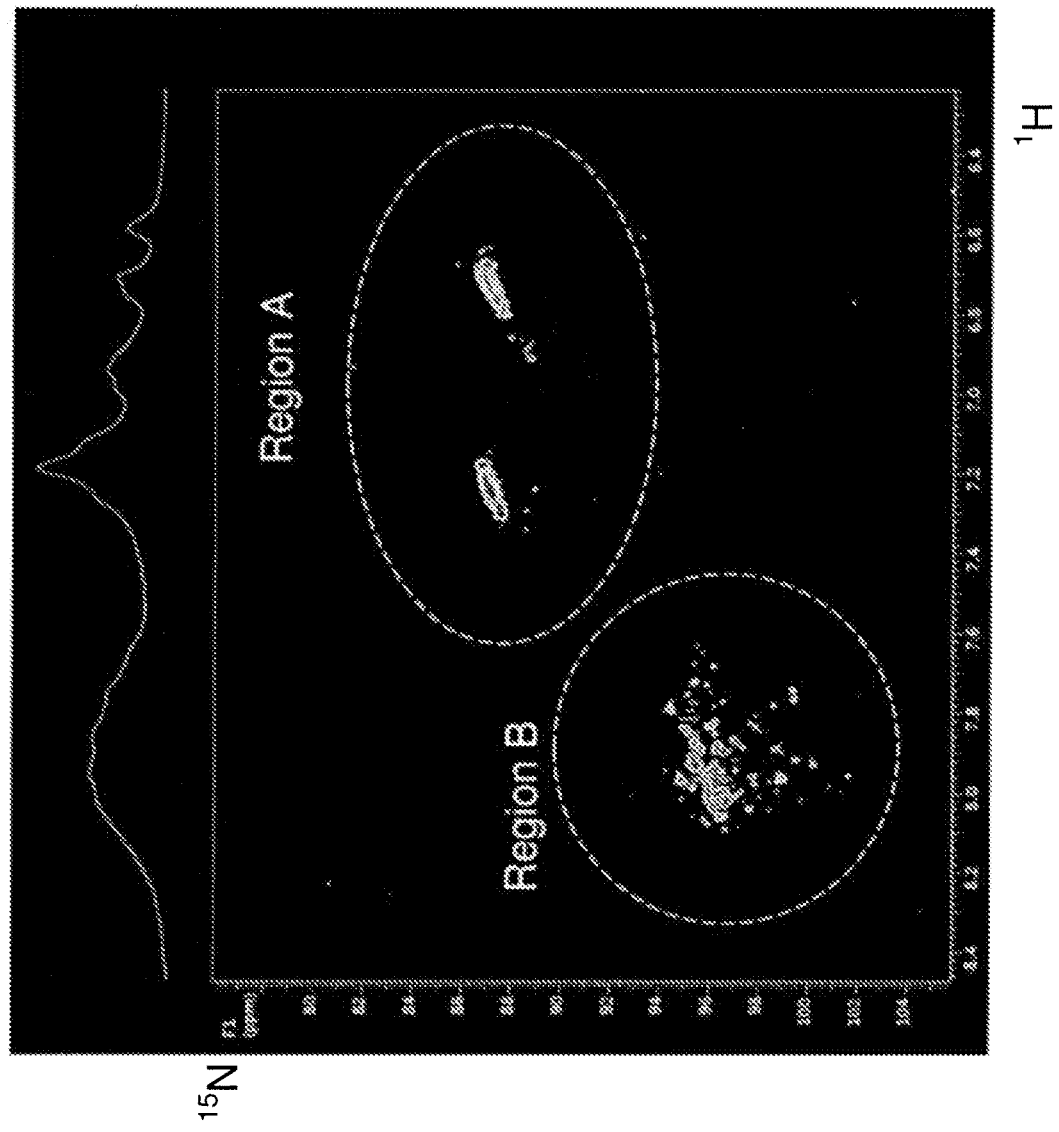
FIG. 15 is a two-dimensional HSQC $^1$H—$^{15}$N NMR spectrum for digested castor (lot 5-83) in d6-DMSO, showing two regions of interest denoted Region A and Region B.
Figure 16:
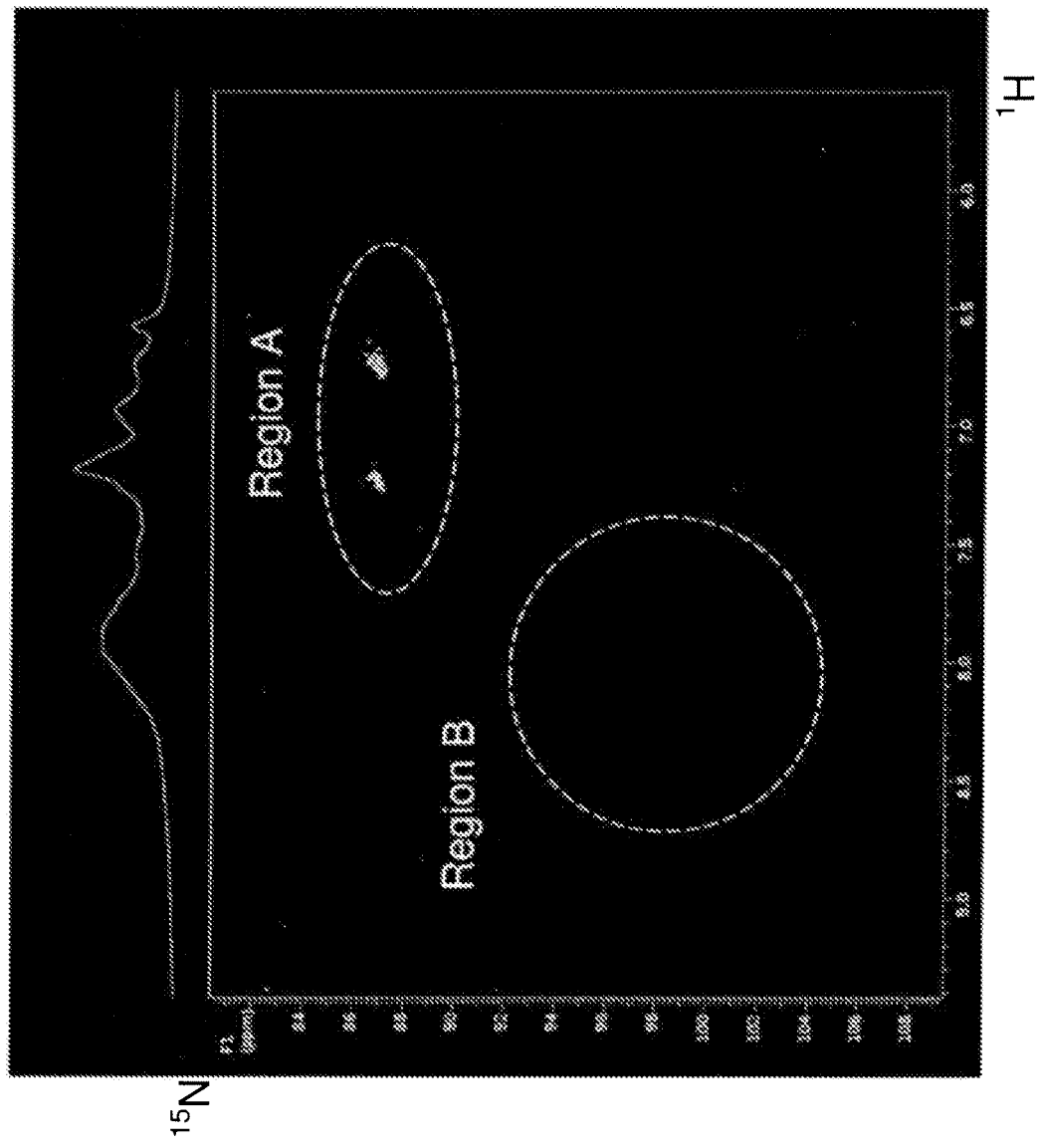
FIG. 16 is a two-dimensional HSQC $^1$H—$^{15}$N NMR spectrum for water-insoluble/water-dispersible polypeptide fraction derived from digested castor (lot 5-83) in d6-DMSO, again showing Region A and Region B.
Figure 17:
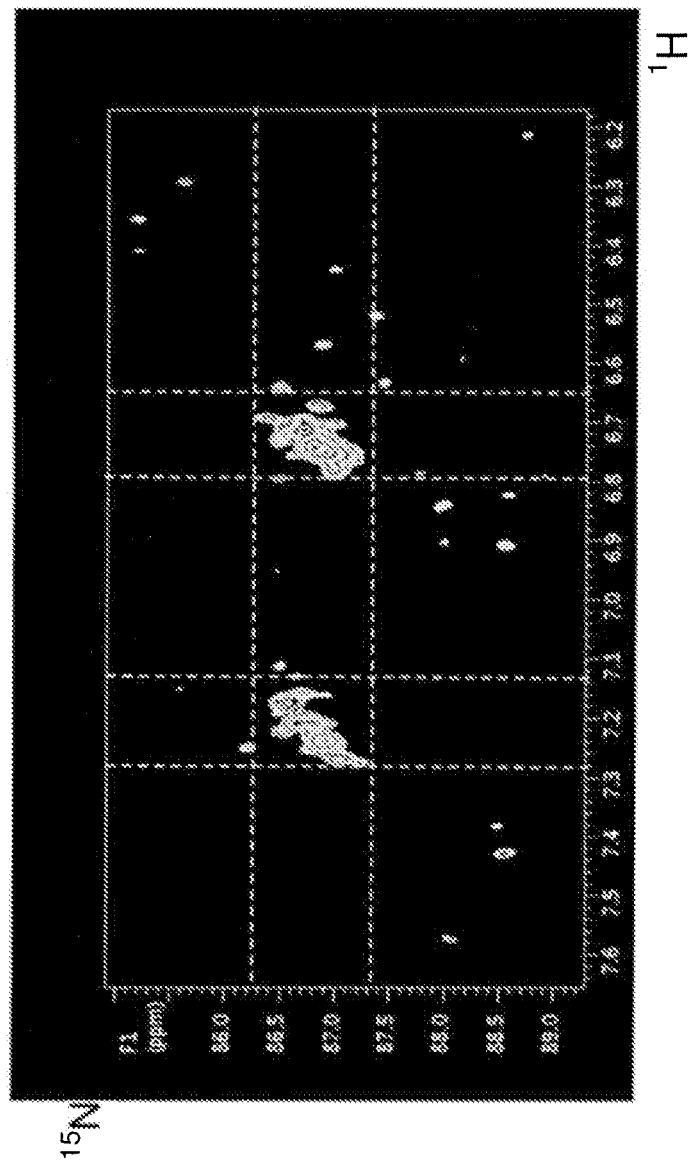
FIG. 17 is a two-dimensional HSQC $^1$H—$^{15}$N NMR spectrum, where Region A from FIG. 16 has been magnified.

The results are presented in FIGS. 15-17. FIG. 15 represents the two-dimensional HSQC $^1$H—$^{15}$N NMR spectrum for digested castor lot 5-83 in d6-DMSO. The y-axis represents $^{15}$N chemical shift scale (ppm), and the x-axis represents $^1$H chemical shift scale (ppm). The peaks within the spectrum represent protonated nitrogen atoms from all of the fractions that were present within the as-made digested castor (i.e., the water-insoluble/water-dispersible polypeptide fractions plus the water-soluble polypeptide fractions). The multiple peaks in region B were observed to disappear upon removal of the water-soluble fractions (see FIG. 16). This indicates that these protonated nitrogens are specific to the water-soluble polypeptide fractions, whereas at least a portion of the peaks in region A are specific to the water-insoluble/water-dispersible fraction.

FIG. 16 represents the two-dimensional HSQC $^1$H—$^{15}$N NMR spectrum for the water-insoluble/water-dispersible polypeptide extract from digested castor lot 5-83 in d6-DMSO. The y-axis represents $^{15}$N chemical shift scale (ppm), and the x-axis represents $^1$H chemical shift scale (ppm). The peaks within the spectrum represent protonated nitrogen atoms from the water-insoluble/water-dispersible polypeptide fraction. The peaks within Region B were observed to be very weak in comparison to the analogous peaks within the digested castor before extraction (see FIG. 15). Conversely, the remaining peaks were predominantly from the protonated nitrogens in Region A. This indicates that these particular protonated nitrogens are specific to the water-insoluble polypeptide fractions. A magnified view of this region is presented in FIG. 17.

As shown in FIG. 16, the peaks within the spectrum represent protonated nitrogen atoms that are specific to the water-insoluble/water-dispersible polypeptide fraction. Upon expansion, the two "peaks" appear as narrow clusters that can be readily defined by the $^{15}$N and $^1$H chemical shift boundaries that define them: the $^{15}$N boundaries for both clusters occur at approximately 86.2 ppm and 87.3 ppm; and the $^1$H boundaries occur at approximately 7.14 and 7.29 ppm for the first cluster; and at approximately 6.66 and 6.81 ppm for the second cluster.

The results of these studies revealed that while the water-soluble polypeptide fraction was composed of multiple types of protonated nitrogen atoms (see FIG. 15), the water-insoluble/water-dispersible fraction contained significantly fewer types of protonated nitrogens, and was predominantly characterized by the presence of two major proton-nitrogen cross peak clusters (see FIG. 16). These differences, like those as seen by solid state FTIR, illustrate that the chemical bonding environments within the water-soluble polypeptide fraction are distinctly different from those that exist within the water-insoluble/water-dispersible fraction.

Together, the solid state FTIR and NMR data characterize the water-insoluble/water-dispersible polypeptide fraction, where there is a solid-state infrared amide-I absorption band between 1620-1632 cm$^{-1}$; a solid-state infrared amide-II absorption band between 1514-1521 cm$^{-1}$ and a solution-state pair of protonated nitrogen clusters as determined by a $^1$H—$^{15}$N nuclear magnetic resonance correlation technique. More specifically, when the pair of protonated nitrogen clusters is observed by means of NMR with deuterated d6-DMSO as the solvent using a two-dimensional HSQC $^1$H—$^{15}$N NMR technique, the clusters are defined by the $^{15}$N and $^1$H chemical shift boundaries that define them: the $^{15}$N boundaries for both clusters occur at approximately 86.2 ppm and 87.3 ppm; and the $^1$H boundaries occur at approximately 7.14 and 7.29 ppm for the first cluster; and at approximately 6.66 and 6.81 ppm for the second cluster.

Together, the solid state FTIR and NMR data also characterize the water-soluble polypeptide fraction, where there is a solid-state infrared amide-I absorption band between about 1633-1680 cm$^{-1}$; a solid-state infrared amide-II absorption band between 1522-1560 cm$^{-1}$; two prominent 1° amide N—H stretch absorption bands centered at about 3200 cm$^{-1}$, and at about 3300 cm$^{-1}$, as determined by solid state FTIR, and a prominent cluster of protonated nitrogen nuclei defined by $^{15}$N chemical shift boundaries at about 94 ppm and at about 100 ppm, and $^1$H chemical shift boundaries at about 7.6 ppm and at about 8.1 ppm, as determined by solution state, two-dimensional proton-nitrogen coupled NMR.

Example 5

Oil Dispersion Characteristics of Water-Soluble and Water-Insoluble/Water-Dispersible Protein Fractions A water-insoluble/water-dispersible polypeptide fraction and a water-soluble polypeptide fraction were isolated from digested castor (lot 5-108) based on procedures described in Example 2 (Procedure A). The digested castor can be prepared as follows: castor meal protein is suspended in water at the ratio of about 1:10 w/w. Calcium chloride is added to an effective concentration of about 10 mM, and the pH of the suspension adjusted to pH 9 by the addition of 10 N NaOH. The reaction is then heated to 55° C. while stirring. Next, Everlase 16 L Type EX® (NOVOZYMES') is added at the ratio of 10 g per kg of castor meal protein, and the mixture is stirred at the same temperature for about 4 hours. Finally, the resulting mixture is brought to a pH 3.5 with citric acid and spray-dried to provide a powder.

The MALDI fragmentation molecular weight characteristics of the isolated fractions are provided in Example 3. The solid state FTIR spectroscopic absorption characteristics for the isolated water-insoluble/water-dispersible polypeptide fraction conform with those as described in FIGS. 4-6, 9, and 11-14 (amide-I absorption range: 1620-1632 cm$^{-1}$; amide-II absorption range: 1514-1521 cm$^{-1}$). Solution state two-dimensional proton-nitrogen coupled NMR on the isolated water-insoluble/water-dispersible polypeptide fraction show two protonated nitrogen clusters enveloped by $^{15}$N chemical shift boundaries at approximately 86.2 ppm and 87.3 ppm; and with $^1$H chemical shift boundaries at approximately 7.14 and 7.29 ppm for the first cluster; and at approximately 6.66 and 6.81 ppm for the second cluster. Solution state two-dimensional proton-nitrogen coupled NMR on the isolated water-soluble polypeptide fraction show a cluster of protonated nitrogen nuclei defined by $^{15}$N chemical shift boundaries at about 94 ppm and at about 100 ppm, and $^1$H chemical shift boundaries at about 7.6 ppm and at about 8.1 ppm.

The water-insoluble/water-dispersible polypeptide fractions with these spectral characteristics (unlike their water-soluble counterparts) exhibit the unique ability to emulsify and stabilize dispersions of oil in water and water in oil. This unique oil-dispersing capability is observed with water-insoluble/water-dispersible polypeptide compositions that are extracted and isolated from multiple sources, including but not limited to (1) whole meals or protein-isolates from either soy, canola, or castor that are extracted of their water-soluble polypeptide components at or near pH-neutral conditions; (2) whole meals or protein-isolates from soy, canola or castor that are subjected to base catalyzed hydrolysis followed by acid addition and subsequent extraction of water-soluble polypeptide components; (3) whole meals or protein-isolates from soy, canola or castor that are subjected to acid catalyzed hydrolysis followed by base addition and subsequent extraction of their water-soluble polypeptide components; (4) whole meals or protein-isolates from soy, castor, or canola that are subjected to combinations of base catalyzed hydrolysis with enzyme digestion followed by acid addition and subsequent extraction of water-soluble polypeptide components.

It is understood that the stabilization of an oil-in-water or water-in-oil emulsion/dispersion depends on several factors, including but not limited to the presence or absence of a stabilizing entity such as a surfactant or a dispersant; the nature of the oil (i.e., its polarity, hydrophilicity, hydrophobicity, solubility parameter, etc.); the nature of the surfactant or dispersant (i.e., HLB value, charge characteristics, molecular weight, water solubility, oil solubility, etc.); the ionic strength of the water-phase; the presence or absence of additives and impurities in either the oil or water phases; the concentration of the oil (i.e., its weight percent in water); and the concentration of the stabilizing entity. It is further understood that the efficiency of a stabilizing entity (a "stabilizing entity" being a dispersant, an emulsifier, a surfactant, or the water-insoluble/water-dispersible polypeptide composition of the present invention) is often judged according to its ability stabilize an emulsion for some specified period of time (i.e., to prevent the macroscopic phase separation of immiscible oil and water components under shear or under static conditions).

In order to further demonstrate the generality of this finding, several oil-in-water dispersions were prepared with a water-insoluble/water-dispersible polypeptide composition that was isolated from a digested castor protein. The water-insoluble/water-dispersible polypeptide fraction was isolated as a paste-like dispersion in water. The paste was diluted with water to 16% solids, and separately to 14% solids. In the next step, 3-gram aliquots of each paste were separately weighed into 15 mL plastic beakers. Next, aliquots of the oils shown in Table 7 were separately added to individual paste aliquots at a ratio of 1 part oil to 1 part solid water-insoluble/water-dispersible polypeptide composition on a weight basis (20 mixtures in total). The mixtures were stirred by hand with a spatula, and were observed to form homogenous creams. The creams remained homogeneous with no visible signs of macroscopic phase separation for prolonged periods of time after mixing including periods ranging from 1 minute after mixing, 5 minutes after mixing, 10 minutes after mixing, 15 minutes after mixing, 30 minutes after mixing, 1 hour after mixing, and 2 hours after mixing. By contrast, the analogous water-soluble extract from the digested castor was incapable of stabilizing dispersions of the oils in water.

TABLE 7

| Oil Type | Source |
|---|---|
| PMDI | Rubinate-M from Huntsman Corporation |
| Mineral oil | Drakeol 35 from Penreco |
| Soybean oil | RBD from ADM Processing Co. |
| Motor oil | Castrol Syntec, 5W-50 |
| Castor oil | Pale Pressed Castor Oil from Alnor Oil Company, Inc. |
| Dibutyl Phthalate | 99% from Acros |
| Epoxidized soybean oil | From Aldrich |
| Caprylic triglyceride | Neobee M-5 from Stepan Co. |
| Eucalyptus oil | From Aromas Unlimited |
| Tributyl o-acetylcitrate | 98% from Aldrich |

Protein compositions not enriched for the water-insoluble/water-dispersible fractions are unable to disperse oils. For example, a 16% solids dispersion of soy protein isolate, Lot 5-81, (Soy protein isolate SOLPRO 958® Solbar Industries Ltd, POB 2230, Ashdod 77121, Israel; protein content approximately 90%) was prepared by adding 32 grams of soy protein isolate to 168 grams of water at a pH of approximately 4 to 6 (JM-570-1). Seven 10 gram aliquots of JM-570-1 were weighed into 20 mL disposable beakers. A 10 gram aliquot contained 1.6 grams of soy protein isolate and 8.4 grams of water. Seven different oils (namely, PMDI, mineral oil, soybean oil, motor oil, castor oil, dibutyl phthalate and epoxidized soybean oil) were added separately at a w/w ratio of 1 part oil to 1 part protein solids (1.6 grams oil was added to each 10 gram aliquot). The mixtures were stirred by hand with a spatula. None of the oils was observed to be dispersible in the 16% solids dispersion of the soy protein isolate.

Example 6

Adhesive Composition Containing Canola Meal/Viscosity Analysis

Adhesive compositions containing ground canola meal were prepared and subjected to viscosity analysis. The experimental procedure and results of the analysis are described below.

General Experimental Procedure:

Adhesive compositions containing ground canola meal were prepared. The identity and abundance of components in the adhesive compositions are listed in Table 8. The ground canola meal had a particle size in the range of 20 μm to 70 μm. The following weight ratios were maintained as constants within each formula set: meal/water, PMDI/meal, and urea/water. Each of the formulas was qualitatively observed to form a stable dispersion upon mixing. That is, neither visible settling nor macroscopic phase separation of PMDI were observed over a 4.5 hour period of observation. Viscosity measurements were taken to observe how urea and PMDI affect viscosity and pot-life of the adhesive composition.

TABLE 8

WET FORMULA WEIGHT PERCENTAGES

| Sample | Ground Canola Meal (Weight Percent) | Water (Weight Percent) | Urea (Weight Percent) | PMDI (Weight Percent) | Ratio of Meal/Water by Weight | Ratio of PMDI/Meal by Weight | Ratio of Urea/Water by Weight |
|---|---|---|---|---|---|---|---|
| 67-1A | 31.250 | 68.750 | 0 | 0 | 0.45 | 0 | 0 |
| 67-1B | 27.175 | 59.786 | 0 | 13.039 | 0.45 | 0.48 | 0 |
| 686-1A | 25.000 | 55.000 | 20.000 | 0 | 0.45 | 0 | 0.36 |
| 686-1B | 22.322 | 49.110 | 17.858 | 10.710 | 0.45 | 0.48 | 0.36 |
| 70-1A | 24.799 | 75.201 | 0 | 0 | 0.33 | 0 | 0 |
| 70-1B | 20.911 | 63.410 | 0 | 15.679 | 0.33 | 0.75 | 0 |
| 70-2A | 20.911 | 63.410 | 15.679 | 0 | 0.33 | 0 | 0.75 |
| 70-2B | 18.077 | 54.815 | 13.554 | 13.554 | 0.33 | 0.75 | 0.75 |

Rheological studies were performed using a Brookfield Viscometer (model RVDVE) equipped with an RV spindle set. The wet adhesives were filled to the 100 mL mark (near the top) of 100 mL HDPE beakers for each measurement. The rotation speeds and spindle-types were chosen so that a single measurement could be used to cover the full range of viscosity values for the samples. This set up permits the viscosity of samples containing PMDI to be monitored as they cured over time. Samples without PMDI were blended and evaluated within 4 hours of mixing. Samples with PMDI were prepared by first blending all other ingredients together, and then mixing PMDI for a period of 2 minutes. Viscosity measurements were started within 5 minutes after mixing the PMDI. Table 9 provides the spindle numbers and rotation speeds (rpm) that were used for each sample. Viscosity measurements were conducted at approximately 25° C.

TABLE 11

SUMMARY OF VISCOSITY TRENDS

| Sample | Region A Duration (min) | Region A Relative Viscosity Range (cP) | Region B Relative Viscosity (cP) | Region C Onset (min) | Region C Relative Viscosity Range (cP) | Region D Onset (min) | Region D Relative Viscosity Range (cP) | Region E Onset (min) |
|---|---|---|---|---|---|---|---|---|
| 67-1A | 19 | 38,000 to 11,000 | — | 19 | 11,000 to 7,500 | — | — | — |
| 67-1B | 19 | 178,000 to 49,000 | 49,500 | — | — | 21 | 49,000 to 300,000 | 49 |
| 686-1A | 14 | 33,000 to 25,000 | 25,000 | 25 | 25,000 to 22,000 | — | — | — |
| 686-1B | 11 | 26,000 to 59,000 | 25,000 | — | — | 18 | 26,000 to 100,000 | 64 |
| 70-1A | 20 | 530 to 400 | 370 | — | — | — | — | — |
| 70-1B | 20 | 900 to 550 | 530 | — | — | 58 | 550 to 950 | 200 |
| 70-2A | 20 | 600 to 550 | 550 | — | — | — | — | — |
| 70-2B | 23 | 950 to 700 | 750 | — | — | 35 | 700 to 950 | 100 |

TABLE 9

RV SPINDLE NUMBER AND ROTATION SPEED

| Sample | Spindle Number | Rotation Speed (rpm) | Upper Limit of Viscosity (cP) |
|---|---|---|---|
| 67-1A | 04 | 5 | 40,000 |
| 67-1B | 07 | 5 | 800,000 |
| 686-1A | 04 | 5 | 40,000 |
| 686-1B | 06 | 5 | 200,000 |
| 70-1A | 04 | 50 | 4,000 |
| 70-1B | 04 | 50 | 4,000 |
| 70-2A | 04 | 50 | 4,000 |
| 70-2B | 04 | 50 | 4,000 |

Figure 20:
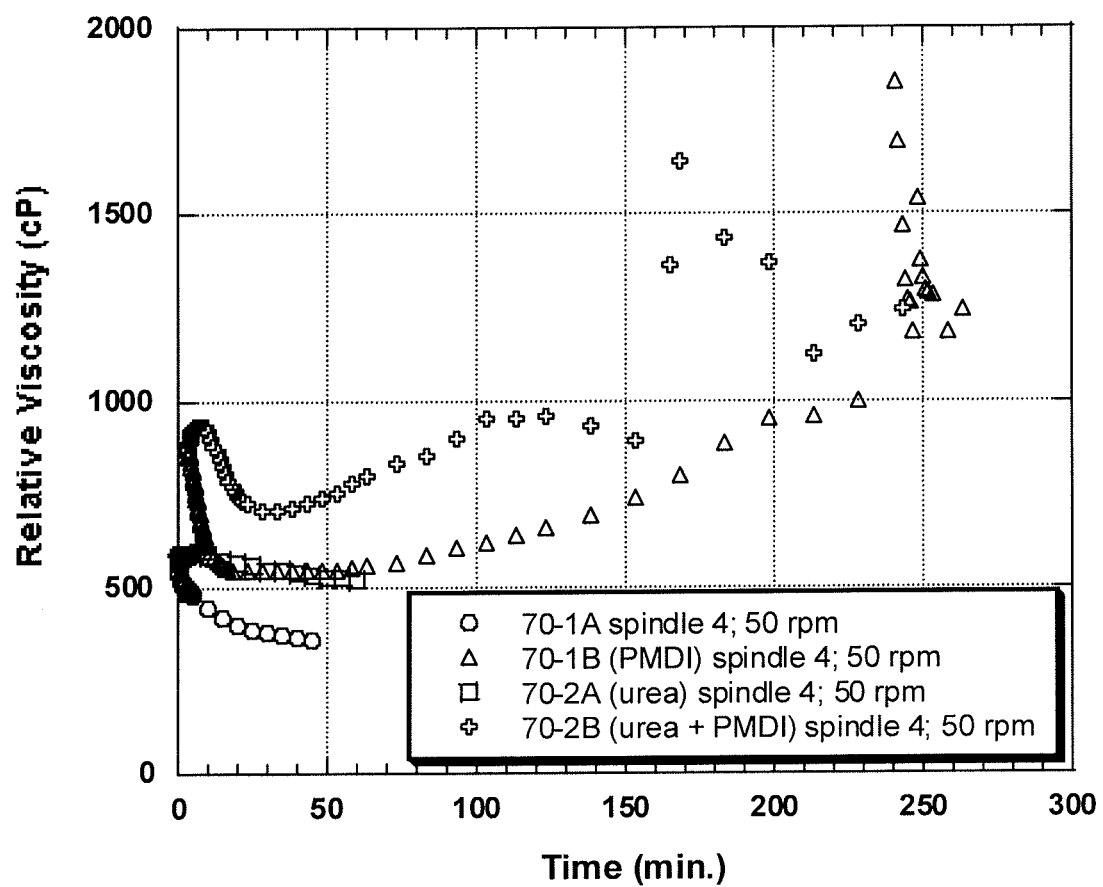
FIG. 20 is a graph showing the viscosity of a low-viscosity adhesive composition containing ground canola meal as a function of time, as described further in Example 6.
Figure 21:
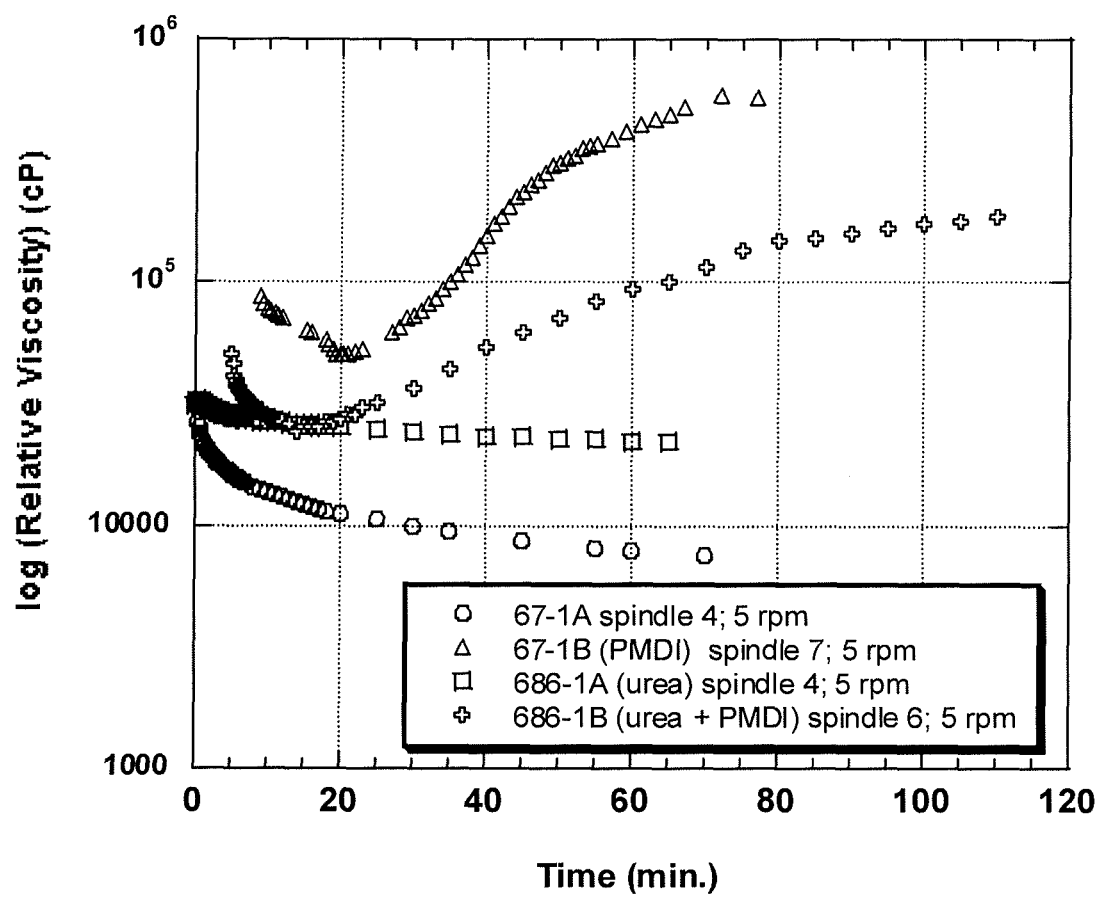
FIG. 21 is a graph showing the viscosity of a higher-viscosity adhesive composition containing ground canola meal as a function of time, as described further in Example 6.

Results:

Viscosity analysis of the adhesive compositions identified different regions of rheological behavior. Further, the rheological behavior of the adhesive depended on the components that formed the adhesive composition. General regions of rheological behavior are described in Table 10. FIGS. 20 and 21 show changes in rheological behavior for the low viscosity set (samples 70-1A, 70-1B, 70-2A, and 70-2B) and high viscosity formula set (samples 67-1A, 37-1B, 686-1A, and 686-1B). Table 11 provides comparative onset times and region-specific relative viscosities for each sample.

TABLE 10

DEFINITIONS OF RHEOLOGICAL REGIONS OF BEHAVIOR

| Region | Rheological Observations | Sample-Related Observations |
|---|---|---|
| A | initial thinning period; fast reduction in viscosity with time | occurs with all samples |
| B | minimum viscosity period (minimal rate of change) | relatively short in duration |
| C | thinning period; relatively slow and steady rate of viscosity reduction with time | occurs only in the absence of PMDI |
| D | thickening period; viscosity builds steadily with time | occurs only in the presence of PMDI |
| E | unstable thickening period; viscosity builds and fluctuates | occurs with the building of macroscopic structure due to the reaction of PMDI; structure can be mechanically broken, and mixture exhibits analogous, vertically shifted viscosity profile upon repeating measurements |

For samples containing PMDI, the viscosity of the sample was observed to increase with time, independent whether urea was present. In addition, samples with PMDI eventually reached a stage where macroscopic structure and voids began to develop (Stage E). This stage was accompanied by an increase in volume within the sample container and subsequent viscosity fluctuations due to random release and reformation of air pockets within the container and within the vicinity of the rotating spindle. It was observed that PMDI remained dispersed within the sample during Stage E; no macroscopic phase separation was observed.

For samples 70-1B, 70-2B, and 686-1B, the macroscopic structure could be broken by stirring, and the viscosity of the samples decreased once the dispersion was broken. In addition, when such samples were re-measured, they exhibited the same types of rheological profiles—shear thinning followed by a short plateau, and then followed by a viscosity building stage.

When defining the "pot-life" or "work time" for an adhesive, the rheological behavior of the adhesive as a function of time after mixing and the rheological restrictions imposed by engineering processes are important. For example, in industrial processes that make use of spray application methods (e.g., particle board and oriented strand board), it may be desirable to use mixed adhesives before they reach Stage D as defined in Table 10. For various adhesives, this equates to a usage time window of up to approximately 1 hour after mixing, independent of the presence or absence of urea. On the other hand, for applications that involve spreading or extruding, a build-up in viscosity may be desirable, and hence it may be advantageous to use adhesives that have already entered Stage D (this equates to a minimum adhesive staging time of approximately 1 hour or more prior to use). In applications where even thicker adhesives are desirable, it may be advantageous for the adhesives to reach Stage D or E before use.

Finally, in comparative experiments, mixtures containing water, urea, and PMDI were mixed together in the absence of canola meal at the same ratios as those used in the preparation of samples 686-1B and 70-2B. In the absence of canola meal, PMDI was observed to macroscopically phase separate. Qualitative evidence for the onset of a polymerization reaction was observed to occur within approximately 15 minutes because the viscosity of the phase-separated droplets began to build, and the material began to stick to the surface of the glass container that was used for mixing. However, formulations prepared with ground canola meal facilitated the dispersion of PMDI, even when urea was present at high levels within the formula. In one comparative case (67-1B vs. 686-1B), the presence of urea resulted in a lower overall viscosity profile with a longer time prior to the onset of Stage E.

Example 7

Preparation of Particle Board Using Adhesive Compositions Containing Water-Insoluble/Water-Dispersible Protein Fraction Extracted from Castor Meal Particle board was prepared using an adhesive composition containing water-insoluble/water-dispersible protein fraction extracted from castor meal according to the experimental procedure below. Density, modulus of rupture (MOR), and internal bond strength (IBS) were determined for the particle board samples.

General Experimental Procedure:

Part A:

Water-insoluble/water-dispersible protein fraction extracted from castor meal was delivered at 16% solids, and was diluted to 13% solids in water (w/w). Wet adhesive compositions were prepared by mixing the components listed in Table 12, which once combined with wood and cured, provided the particle board composites described in Table 13. Catalyst, when present, was Fe(AcAc) and was dissolved in PMDI prior to mixing the Part-A components (i.e., PMDI and catalyst) with the Part-B components (i.e., water, protein component, and urea).

TABLE 12

COMPONENTS IN WET ADHESIVE COMPOSITIONS

| Sample No. | Weight Percent Wet Protein Dispersion (13% [Protein Solids in Water] | Weight Percent Urea (Dissolved in Protein Dispersion) | Weight Percent PMDI | Weight Percent Catalyst |
|---|---|---|---|---|
| 1 | 83.68 | 0.00 | 16.32 | 0.00 |
| 2 | 83.66 | 0.00 | 16.33 | 0.01 |
| 3 | 83.65 | 0.00 | 16.34 | 0.02 |
| 4 | 80.78 | 2.97 | 16.24 | 0.01 |
| 5 | 80.77 | 2.97 | 16.24 | 0.02 |
| 6 | 80.80 | 2.97 | 16.23 | 0.00 |
| 7 | 76.21 | 8.41 | 15.36 | 0.02 |
| 8 | 76.25 | 8.40 | 15.34 | 0.00 |
| 9 | 76.23 | 8.41 | 15.35 | 0.01 |

TABLE 13

COMPOSITION OF CURED PARTICLE BOARD PREPARED USING ADHESIVE COMPOSITIONS FROM TABLE 12

| Sample No. | Weight Percent Wood | Weight Percent Binder | Weight Percent PMDI | Weight Percent Protein | Weight Percent Urea | Weight Percent Catalyst |
|---|---|---|---|---|---|---|
| 1 | 97.570 | 2.430 | 1.458 | 0.972 | 0.000 | 0.000 |
| 2 | 97.570 | 2.430 | 1.458 | 0.971 | 0.000 | 0.001 |
| 3 | 97.570 | 2.430 | 1.458 | 0.971 | 0.000 | 0.001 |
| 4 | 97.350 | 2.650 | 1.448 | 0.936 | 0.265 | 0.001 |
| 5 | 97.350 | 2.650 | 1.448 | 0.936 | 0.265 | 0.001 |
| 6 | 97.350 | 2.650 | 1.448 | 0.937 | 0.265 | 0.000 |
| 7 | 97.010 | 2.990 | 1.363 | 0.879 | 0.747 | 0.001 |
| 8 | 97.010 | 2.990 | 1.363 | 0.881 | 0.747 | 0.000 |
| 9 | 97.010 | 2.990 | 1.363 | 0.880 | 0.747 | 0.001 |

Part B:

Particle board was prepared by adding 10,000 grams of wood to a 4-foot diameter rotary blender. The wood was tumbled in the blender while the adhesive composition was sprayed onto the wood through a one-foot diameter porthole in the front of the blender using a hand held, pneumatic drywall sprayer with a hopper attachment. One and one-half of the amount of adhesive needed for 10,000 grams of wood was added to the hopper of the weight, tarred spray gun. The adhesive was applied to the wood and the spray gun was re-weighed to determine if the correct amount of adhesive had been applied. If more adhesive was applied to the wood than was required, additional wood was added to the blender to compensate for the additional weight of adhesive added. After adhesive addition, the adhesive coated wood was allowed to tumble for 5 minutes.

Next, adhesive coated wood was removed from the blender. Two boards per blend load were obtained. 4,800 grams of wood was used per board. The board size was 24"×24". The target thickness for the board was ¾" and the board density target was 45-46 lbs/ft$^3$ (after pressing). The boards were pressed in a 36"×36" hydraulic press and the internal gas pressure and temperature were monitored using a Pressman™ monitoring system. Surface platen temperature was approximately 152° C. during the pressing operation.

Conditions used in forming various particle board samples are described in Table 14. The Hold Time Segment refers to the duration of time the adhesive-coated wood was first subjected to press conditions. After the Hold Time Segment was complete, the pressure applied to the adhesive-coated wood was reduced and held for a duration of time characterized as Press Pressure Relief Segment 5. The composition of the cured binder for various samples is provided in Table 15.

TABLE 14

PRESS CONDITIONS USED TO FORM PARTICLE BOARD

| Sample No. | Binder Type | Hold Time Segment 4 (sec) | Catalyst (phr*) | Grain Type | Press Pressure Relief Segment 5 (sec) | Total Press Time (sec) |
|---|---|---|---|---|---|---|
| 1 | 619-1 (no urea) | 200.00 | 0.00 | castor | 30 | 270.00 |
| 2 | 619-1 (no urea) | 230.00 | 0.05 | castor | 45 | 315.00 |
| 3 | 619-1 (no urea) | 260.00 | 0.10 | castor | 60 | 360.00 |
| 4 | 637-2 (10% urea) | 200.00 | 0.05 | castor | 30 | 270.00 |
| 5 | 637-2 (10% urea) | 230.00 | 0.10 | castor | 45 | 315.00 |
| 6 | 637-2 (10% urea) | 260.00 | 0.00 | castor | 60 | 360.00 |
| 7 | 639-1 (25% urea) | 200.00 | 0.10 | castor | 30 | 270.00 |
| 8 | 639-1 (25% urea) | 230.00 | 0.00 | castor | 45 | 315.00 |
| 9 | 639-1 (25% urea) | 260.00 | 0.05 | castor | 60 | 360.00 |

*phr refers to parts per hundred resin.

TABLE 15

COMPONENTS IN CURED PARTICLE BOARD

| Sample No. | Weight Percent binder in Finished Composite | Weight Percent PMDI in Cured Binder | Weight Percent Protein Solids in Part-B | Weight Percent Urea in Cured Binder | Catalyst (phr* PMDI) |
|---|---|---|---|---|---|
| 1 | 2.4300 | 60.000000 | 13.0000 | 0.0000 | 0.0000 |
| 2 | 2.4300 | 60.000000 | 13.0000 | 0.0000 | 0.0500 |
| 3 | 2.4300 | 60.000000 | 13.0000 | 0.0000 | 0.1000 |
| 4 | 2.6500 | 54.634000 | 13.000 | 10.0000 | 0.0500 |
| 5 | 2.6500 | 54.634000 | 13.000 | 10.0000 | 0.1000 |
| 6 | 2.6500 | 54.634000 | 13.000 | 10.0000 | 0.0000 |
| 7 | 2.9900 | 45.580000 | 13.000 | 24.9700 | 0.1000 |
| 8 | 2.9900 | 45.580000 | 13.000 | 24.9700 | 0.0000 |
| 9 | 2.9900 | 45.580000 | 13.000 | 24.9700 | 0.0500 |

*phr refers to parts per hundred resin.

Results:

Particle board samples were prepared according to the above procedure. Physical properties of the particle board samples are described in Table 16.

TABLE 16

PHYSICAL PROPERTIES OF PARTICLE BOARD

| Sample No. | Density (pounds/ft³) | MOR (psi) | IBS (psi) |
|---|---|---|---|
| 1 | 45.93 | 1597 | 67.1 |
| 2 | 48.56 | 1964 | 89.9 |
| 3 | 48.11 | 1758 | 97.3 |
| 4 | 48.23 | 2003 | 84.4 |
| 5 | 46.88 | 1585 | 84.7 |
| 6 | 48.14 | 1761 | 91 |
| 7 | 46.59 | 1514 | 54.1 |
| 8 | 48.39 | 1783 | 79.7 |
| 9 | 46.73 | 1558 | 70.9 |

Analysis of the physical properties of the particle samples revealed a relationship between the binder-type and catalyst level. In the absence of urea, the best IBS and highest densities were achieved using a catalyst. Conversely, when urea was present (urea itself may function as a catalyst and reactant), the best properties were achieved when no additional catalyst was used. These results are consistent with the existence of an inter-dependence between cure rates (NCO conversion) and end-use properties. Thus, if the cure reaction occurs too quickly or too slowly, then the properties of the particle board may suffer.

Example 8

Preparation of Particle Board Using Adhesive Compositions Containing Water-Insoluble/Water-Dispersible Protein Fraction Extracted from Canola Meal Particle board was prepared using an adhesive composition containing water-insoluble/water-dispersible protein fraction extracted from canola meal according to the experimental procedure below. Density, modulus of rupture (MOR), and internal bond strength (IBS) were determined for the particle board samples.

General Experimental Procedure:

Part A:

Water-insoluble/water-dispersible protein fraction extracted from canola meal was delivered at 16% solids, and was diluted to 12% solids in water (w/w). Wet adhesive compositions were prepared by mixing the components listed in Table 17, which once combined with wood and cured, provided the particle board composites described in Table 18. Catalyst, when present, was Fe(AcAc) and was dissolved in PMDI prior to mixing the Part-A components (i.e., PMDI and catalyst) with the Part-B components (i.e., water, protein component, and urea).

TABLE 17

COMPONENTS IN WET ADHESIVE COMPOSITIONS

| Sample No. | Weight Percent Wet Protein Dispersion (13% [Protein Solids in Water] | Weight Percent Urea (Dissolved in Protein Dispersion) | Weight Percent PMDI | Weight Percent Catalyst |
|---|---|---|---|---|
| 1 | 84.75 | 0.00 | 15.25 | 0.00 |
| 2 | 84.73 | 0.00 | 15.26 | 0.01 |
| 3 | 84.71 | 0.00 | 15.27 | 0.02 |
| 4 | 82.00 | 2.78 | 15.21 | 0.01 |
| 5 | 81.98 | 2.79 | 15.22 | 0.02 |
| 6 | 82.01 | 2.78 | 15.20 | 0.00 |
| 7 | 77.63 | 7.91 | 14.44 | 0.01 |
| 8 | 77.67 | 7.90 | 14.43 | 0.00 |
| 9 | 77.65 | 7.91 | 14.43 | 0.01 |

TABLE 18

COMPOSITION OF CURED PARTICLE BOARD PREPARED
USING ADHESIVE COMPOSITIONS FROM TABLE 17

| Sample No. | Weight Percent Wood | Weight Percent Binder | Weight Percent PMDI | Weight Percent Protein | Weight Percent Urea | Weight Percent Catalyst |
|---|---|---|---|---|---|---|
| 1 | 97.570 | 2.430 | 1.458 | 0.972 | 0.000 | 0.000 |
| 2 | 97.570 | 2.430 | 1.458 | 0.971 | 0.000 | 0.001 |
| 3 | 97.570 | 2.430 | 1.458 | 0.971 | 0.000 | 0.001 |
| 4 | 97.350 | 2.650 | 1.448 | 0.936 | 0.265 | 0.001 |
| 5 | 97.350 | 2.650 | 1.448 | 0.936 | 0.265 | 0.001 |
| 6 | 97.350 | 2.650 | 1.448 | 0.937 | 0.265 | 0.001 |
| 7 | 97.010 | 2.990 | 1.363 | 0.879 | 0.747 | 0.001 |
| 8 | 97.010 | 2.990 | 1.363 | 0.881 | 0.747 | 0.000 |
| 9 | 97.010 | 2.990 | 1.363 | 0.880 | 0.747 | 0.001 |

Part B:

Particle board was prepared according to the general procedures in Example 7. Conditions used in forming various particle board samples are described in Table 19. The composition of the cured binder for various samples is provided in Table 20. The amount of wet adhesive added to the composite is shown in Table 21, along with the calculated amount of water in the adhesive composition used to form the particle board (the water-insoluble protein fraction was used as a mixture with water). Components of the particle board sample are shown in Table 22.

TABLE 19

PRESS CONDITIONS USED TO FORM PARTICLE BOARD

| Sample No. | Binder Type | Hold Time Segment 4 (sec) | Catalyst (phr*) | Grain Type | Press Pressure Relief Segment 5 | Total Press Time (sec) |
|---|---|---|---|---|---|---|
| 1 | 619-1 (no urea) | 200.00 | 0.00 | canola | 30 | 270.00 |
| 2 | 619-1 (no urea) | 230.00 | 0.05 | canola | 45 | 315.00 |
| 3 | 619-1 (no urea) | 260.00 | 0.10 | canola | 60 | 360.00 |
| 4 | 637-2 (10% urea) | 200.00 | 0.05 | canola | 30 | 270.00 |
| 5 | 637-2 (10% urea) | 230.00 | 0.10 | canola | 45 | 315.00 |
| 6 | 637-2 (10% urea) | 260.00 | 0.00 | canola | 60 | 360.00 |
| 7 | 639-1 (25% urea) | 200.00 | 0.10 | canola | 30 | 270.00 |
| 8 | 639-1 (25% urea) | 230.00 | 0.00 | canola | 45 | 315.00 |
| 9 | 639-1 (25% urea) | 260.00 | 0.05 | canola | 60 | 360.00 |

*phr refers to parts per hundred resin.

TABLE 20

COMPONENTS IN CURED PARTICLE BOARD

| Sample No. | Weight Percent Binder in Finished Composite | Weight Percent PMDI in Cured Binder | Weight Percent Protein Solids in Part-B | Weight Percent Urea in Cured Binder | Catalyst (phr* PMDI) |
|---|---|---|---|---|---|
| 1 | 2.4300 | 60.000000 | 12.0000 | 0.0000 | 0.0000 |
| 2 | 2.4300 | 60.000000 | 12.0000 | 0.0000 | 0.0500 |
| 3 | 2.4300 | 60.000000 | 12.0000 | 0.0000 | 0.1000 |
| 4 | 2.6500 | 54.634000 | 12.000 | 10.0000 | 0.0500 |
| 5 | 2.6500 | 54.634000 | 12.000 | 10.0000 | 0.1000 |
| 6 | 2.6500 | 54.634000 | 12.000 | 10.0000 | 0.0000 |
| 7 | 2.9900 | 45.580000 | 12.000 | 24.9700 | 0.1000 |
| 8 | 2.9900 | 45.580000 | 12.000 | 24.9700 | 0.0000 |
| 9 | 2.9900 | 45.580000 | 12.000 | 24.9700 | 0.0500 |

*phr refers to parts per hundred resin.

TABLE 21

WET ADHESIVE AND CALCULATED AMOUNT OF WATER
USED TO PREPARE PARTICLE BOARD

| Sample No. | Calculated Amount of Water Added to 100 Parts of Composite | Total Wet Adhesive Added to 100 Parts Wood (Part A + Part B) |
|---|---|---|
| 1 | 7.13 | 9.80 |
| 2 | 7.12 | 9.79 |
| 3 | 7.12 | 9.79 |
| 4 | 6.87 | 9.78 |
| 5 | 6.86 | 9.77 |
| 6 | 6.87 | 9.78 |
| 7 | 6.45 | 9.73 |
| 8 | 6.46 | 9.74 |
| 9 | 6.45 | 9.73 |

TABLE 22

COMPONENTS IN CURED PARTICLE BOARD

| Sample No. | Weight Percent Wood | Weight Percent Binder | Weight Percent PMDI | Weight Percent Protein | Weight Percent Urea | Weight Percent Catalyst |
|---|---|---|---|---|---|---|
| 1 | 97.570 | 2.430 | 1.458 | 0.972 | 0.000 | 0.000 |
| 2 | 97.570 | 2.430 | 1.458 | 0.971 | 0.000 | 0.001 |
| 3 | 97.570 | 2.430 | 1.458 | 0.971 | 0.000 | 0.001 |
| 4 | 97.350 | 2.650 | 1.448 | 0.936 | 0.265 | 0.001 |
| 5 | 97.350 | 2.650 | 1.448 | 0.936 | 0.265 | 0.001 |
| 6 | 97.350 | 2.650 | 1.448 | 0.937 | 0.265 | 0.000 |
| 7 | 97.010 | 2.990 | 1.363 | 0.879 | 0.747 | 0.001 |
| 8 | 97.010 | 2.990 | 1.363 | 0.881 | 0.747 | 0.000 |
| 9 | 97.010 | 2.990 | 1.363 | 0.880 | 0.747 | 0.001 |

Results:

Particle board samples were prepared according to the above procedure. Physical properties of the particle board samples are described in Table 23.

TABLE 23

PHYSICAL PROPERTIES OF PARTICLE BOARD

| Sample No. | Density (pounds/ft$^3$) | MOR (psi) | IBS (psi) |
|---|---|---|---|
| 1 | 45.65 | 1591 | 83.8 |
| 2 | 47.35 | 1739 | 107.3 |
| 3 | 47.38 | 1819 | 107.3 |
| 4 | 46.97 | 1625 | 86.2 |
| 5 | 43.69 | 1295 | 87.8 |
| 6 | 46.23 | 1645 | 93 |
| 7 | 44.23 | 1361 | 62.2 |
| 8 | 46.19 | 1534 | 88.2 |
| 9 | 47.48 | 1651 | 93.1 |

It was observed that IBS of the particle board is affected by hold time and type of binder. Neither MOR nor density values were affected by the hold time or type of binder.

Example 9

Preparation of Particle Board Using Adhesive Compositions Containing Water-Insoluble/Water-Dispersible Protein Fraction Extracted from Soy Meal Particle board was prepared using an adhesive composition containing water-insoluble/water-dispersible protein fraction extracted from soy meal according to the experimental procedure below. Density, modulus of rupture (MOR), and internal bond strength (IBS) were determined for the particle board samples.

General Experimental Procedure:

Part A:

Water-insoluble/water-dispersible protein fraction extracted from soy meal was delivered at 16% solids, and was diluted to 15% solids in water (w/w). Wet adhesive compositions were prepared by mixing the components listed in Table 24, which once combined with wood and cured, provided the particle board composites described in Table 25. Catalyst, when present, was Fe(AcAc) and was dissolved in PMDI prior to mixing the Part-A components (i.e., PMDI and catalyst) with the Part-B components (i.e., water, protein component, and urea).

TABLE 24

COMPONENTS IN WET ADHESIVE COMPOSITIONS

| Sample No. | Weight Percent Wet Protein Dispersion (13% [Protein Solids in Water] | Weight Percent Urea (Dissolved in Protein Dispersion) | Weight Percent PMDI | Weight Percent Catalyst |
|---|---|---|---|---|
| 1 | 81.63 | 0.00 | 18.37 | 0.00 |
| 2 | 81.61 | 0.00 | 18.38 | 0.01 |
| 3 | 81.60 | 0.00 | 18.39 | 0.02 |
| 4 | 78.46 | 3.33 | 18.20 | 0.01 |
| 5 | 78.44 | 3.33 | 18.21 | 0.02 |
| 6 | 78.48 | 3.33 | 18.19 | 0.00 |
| 7 | 73.52 | 9.67 | 17.10 | 0.02 |
| 8 | 73.57 | 9.36 | 17.08 | 0.00 |
| 9 | 73.54 | 9.36 | 17.09 | 0.01 |

TABLE 25

COMPOSITION OF CURED PARTICLE BOARD PREPARED USING ADHESIVE COMPOSITIONS FROM TABLE 25

| Sample No. | Weight Percent Wood | Weight Percent Binder | Weight Percent PMDI | Weight Percent Protein | Weight Percent Urea | Weight Percent Catalyst |
|---|---|---|---|---|---|---|
| 1 | 97.370 | 2.630 | 1.578 | 1.052 | 0.000 | 0.000 |
| 2 | 97.370 | 2.630 | 1.578 | 1.051 | 0.000 | 0.001 |
| 3 | 97.370 | 2.630 | 1.578 | 1.050 | 0.000 | 0.002 |
| 4 | 97.090 | 2.910 | 1.590 | 1.028 | 0.291 | 0.001 |
| 5 | 97.090 | 2.910 | 1.590 | 1.028 | 0.291 | 0.002 |
| 6 | 97.090 | 2.910 | 1.590 | 1.029 | 0.291 | 0.000 |
| 7 | 96.810 | 3.190 | 1.454 | 0.938 | 0.797 | 0.001 |
| 8 | 96.810 | 3.190 | 1.454 | 0.939 | 0.797 | 0.000 |
| 9 | 96.810 | 3.190 | 1.454 | 0.939 | 0.797 | 0.001 |

Part B:

Particle board was prepared according to the general procedures in Example 7. Conditions used in forming particle board samples are further described in Table 26. The composition of the cured binder for various samples is provided in Table 27. The amount of wet adhesive added to the composite is shown in Table 28, along with the calculated amount of water in the adhesive composition used to form the particle board (the water-insoluble protein fraction was used as a mixture with water). Components of the particle board sample are shown in Table 29.

TABLE 26

PRESS CONDITIONS USED TO FORM PARTICLE BOARD

| Sample No. | Binder Type | Hold Time Segment 4 (sec) | Catalyst (phr*) | Grain Type | Press Pressure Relief Segment 5 (sec) | Total Press Time (sec) |
|---|---|---|---|---|---|---|
| 1 | 619-1 (no urea) | 200.00 | 0.00 | soy | 30 | 270.00 |
| 2 | 619-1 (no urea) | 230.00 | 0.05 | soy | 45 | 315.00 |
| 3 | 619-1 (no urea) | 260.00 | 0.10 | soy | 60 | 360.00 |
| 4 | 637-2 (10% urea) | 200.00 | 0.05 | soy | 30 | 270.00 |
| 5 | 637-2 (10% urea) | 230.00 | 0.10 | soy | 45 | 315.00 |
| 6 | 637-2 (10% urea) | 260.00 | 0.00 | soy | 60 | 360.00 |
| 7 | 639-1 (25% urea) | 200.00 | 0.10 | soy | 30 | 270.00 |
| 8 | 639-1 (25% urea) | 230.00 | 0.00 | soy | 45 | 315.00 |
| 9 | 639-1 (25% urea) | 260.00 | 0.05 | soy | 60 | 360.00 |

*phr refers to parts per hundred resin.

TABLE 27

COMPONENTS IN CURED PARTICLE BOARD

| Sample No. | Weight Percent Binder in Finished Composite | Weight Percent PMDI in Cured Binder | Weight Percent Protein Solids in Part-B | Weight Percent Urea in Cured Binder | Catalyst (phr PMDI) |
|---|---|---|---|---|---|
| 1 | 2.6300 | 60.000000 | 15.0000 | 0.0000 | 0.0000 |
| 2 | 2.6300 | 60.000000 | 15.0000 | 0.0000 | 0.0500 |
| 3 | 2.6300 | 60.000000 | 15.0000 | 0.0000 | 0.1000 |
| 4 | 2.9100 | 54.634000 | 15.000 | 10.0000 | 0.0500 |
| 5 | 2.9100 | 54.634000 | 15.000 | 10.0000 | 0.1000 |
| 6 | 2.9100 | 54.634000 | 15.000 | 10.0000 | 0.0000 |
| 7 | 3.1900 | 45.580000 | 15.000 | 24.9700 | 0.1000 |
| 8 | 3.1900 | 45.580000 | 15.000 | 24.9700 | 0.0000 |
| 9 | 3.1900 | 45.580000 | 15.000 | 24.9700 | 0.0500 |

TABLE 28

WET ADHESIVE AND CALCULATED AMOUNT OF WATER USED TO PREPARE PARTICLE BOARD

| Sample No. | Calculated Amount of Water Added to 100 Parts of Composite | Total Wet Adhesive Added to 100 Parts Wood (Part A + Part B) |
|---|---|---|
| 1 | 5.96 | 8.82 |
| 2 | 5.96 | 8.82 |
| 3 | 5.95 | 8.81 |
| 4 | 5.83 | 9.00 |
| 5 | 5.82 | 8.99 |
| 6 | 5.83 | 9.00 |
| 7 | 5.32 | 8.79 |
| 8 | 5.32 | 8.79 |
| 9 | 5.32 | 8.79 |

TABLE 29

COMPONENTS IN CURED PARTICLE BOARD

| Sample No. | Weight Percent Wood | Weight Percent Binder | Weight Percent PMDI | Weight Percent Protein | Weight Percent Urea | Weight Percent Catalyst |
|---|---|---|---|---|---|---|
| 1 | 97.370 | 2.630 | 1.578 | 1.052 | 0.000 | 0.000 |
| 2 | 97.370 | 2.630 | 1.578 | 1.051 | 0.000 | 0.001 |
| 3 | 97.370 | 2.630 | 1.578 | 1.050 | 0.000 | 0.002 |
| 4 | 97.090 | 2.910 | 1.590 | 1.028 | 0.291 | 0.001 |
| 5 | 97.090 | 2.910 | 1.590 | 1.028 | 0.291 | 0.002 |
| 6 | 97.090 | 2.910 | 1.590 | 1.029 | 0.291 | 0.000 |
| 7 | 97.010 | 3.190 | 1.454 | 0.938 | 0.797 | 0.001 |
| 8 | 97.010 | 3.190 | 1.454 | 0.939 | 0.797 | 0.000 |
| 9 | 97.010 | 3.190 | 1.454 | 0.939 | 0.797 | 0.001 |

Results:

Particle board samples were prepared according to the above procedure. Physical properties of the particle board samples are described in Table 30.

TABLE 30

PHYSICAL PROPERTIES OF PARTICLE BOARD

| Sample No. | Density (pounds/ft$^3$) | MOR (psi) | IBS (psi) |
|---|---|---|---|
| 1 | 49.38 | 1771 | 62.9 |
| 2 | 45.66 | 1348 | 69.8 |
| 3 | 47.19 | 1487 | 71.3 |
| 4 | 46.82 | 1479 | 49.8 |
| 5 | 46.88 | 1360 | 71.1 |
| 6 | 49.31 | 1859 | 94.9 |
| 7 | 46.04 | 1261 | 38.7 |
| 8 | 46.96 | 1231 | 53.3 |
| 9 | 48.49 | 1363 | 67.0 |

It was observed that IBS of the particle board is affected by high hold time and type of binder. Neither MOR nor density values were significantly affected by the hold time or type of binder. The relationship between binder-type and hold time was independent of additional catalyst. Generally, better IBS values were achieved with increasing hold time. The introduction of urea improved the properties of the system (e.g., at a loading of urea up to about 10% (w/w)). This trend occurred at longer hold times, whereas at short hold times urea deteriorated certain physical properties of the particle board.

Example 10

Physical Characterization by Gravimetric Analysis, FTIR Spectroscopy, and Oil-Dispersing Capacity of Ground Canola Meal, Water-Insoluble/Water-Dispersible Protein Fraction Extracted from Ground Canola Meal, and Water-Soluble Protein Fraction Extracted from Ground Canola Meal Ground canola meal, a water-insoluble/water-dispersible protein fraction that was extracted from ground canola meal, and a water-soluble protein fraction that was extracted from ground canola meal were subjected to physical characterization by gravimetric analysis, FTIR Spectroscopy, and ability to disperse oil. Experimental procedures and results are provided below.

General Experimental Procedure:

Water-insoluble/water-dispersible protein fraction and water-soluble protein fraction were isolated from ground canola meal (the same meal used in Example 6) using the isolation method described in Procedure F of Example 2. FTIR spectra were obtained using solid state FTIR procedures outlined in Part-III of Example 2. Ability of the ground plant meal and ability of the individual protein fractions (or a mixture of individual protein fractions) to disperse PMDI in water was tested using procedures described in Part-II of Example 2.

Gravimetric Solids Analysis:

After washing and supernatant decanting (3 cycles per the protocol in Procedure F of Example 2), the resulting slurry of water-insoluble/water-dispersible components (ca. 35% oven dried solids by weight) was gravimetrically adjusted to achieve a dispersion containing approximately 26% by weight solids (by adding water as necessary). The overall yield of water-insoluble/water-dispersible components was determined to be approximately 55% by weight of the starting meal weight. Thus, the ground canola meal contained (i) approximately 55% by weight of a water-insoluble/water-dispersible protein fraction, and (ii) approximately 45% by weight of a water-soluble fraction.

FTIR Spectroscopic Analysis:

To further characterize extracts from the ground canola meal, solid state surface ATR FTIR experiments were performed on the water-insoluble/water-dispersible protein fraction (this sample was collected after the third wash cycle and was allowed to dry at 23° C.), and on the water-soluble protein fraction (this sample was collected from the clear supernatant after the third wash cycle, and was allowed to dry at 23° C. to yield a transparent amber solid).

Figure 22:
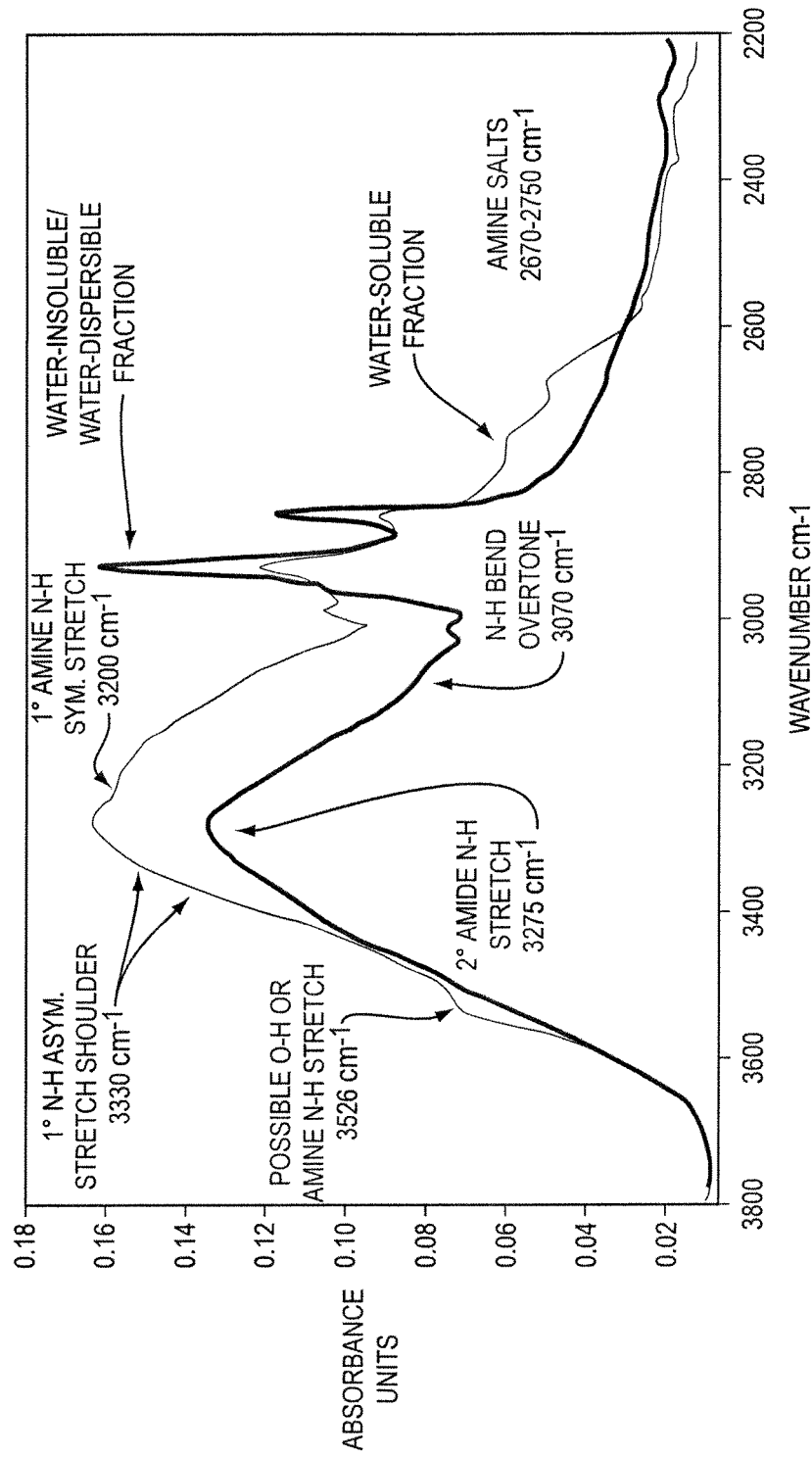
FIG. 22 shows overlaid solid state FTIR spectra of isolated water-soluble and water-insoluble/water-dispersible protein fractions obtained from ground cannola meal, where the N—H and O—H stretch regions are expanded, as described further in Example 10.

FIG. 22 shows the solid state FTIR spectra for the water-insoluble/water-dispersible protein fraction isolated from canola meal together with the water-soluble protein fraction where the N—H stretching region has been expanded. This figure shows that the predominant type of amide in the water-insoluble/water-dispersible protein fraction is the secondary main-chain amide as evidenced by the single, highly symmetric N—H stretch band centered near 3275 $cm^{-1}$. Although the water-soluble protein fraction also contains this type of amide, it contains a significantly higher amount of amine salts (as evidenced by absorption over the region spanning from approximately 2670-2750 $cm^{-1}$) and primary amides as evidenced by the presence of the two primary N—H stretching bands at approximately 3200 $cm^{-1}$ (symmetric) and at approximately 3330 $cm^{-1}$ (asymmetric), respectively. The spectra also reveal that both fractions contain the characteristic spectroscopic signatures of proteins, even though both fractions were isolated from raw meal (raw meal contains other residual water-soluble and water-insoluble components such as grain hulls, carbohydrates, sugars, and oils).

Figure 23:
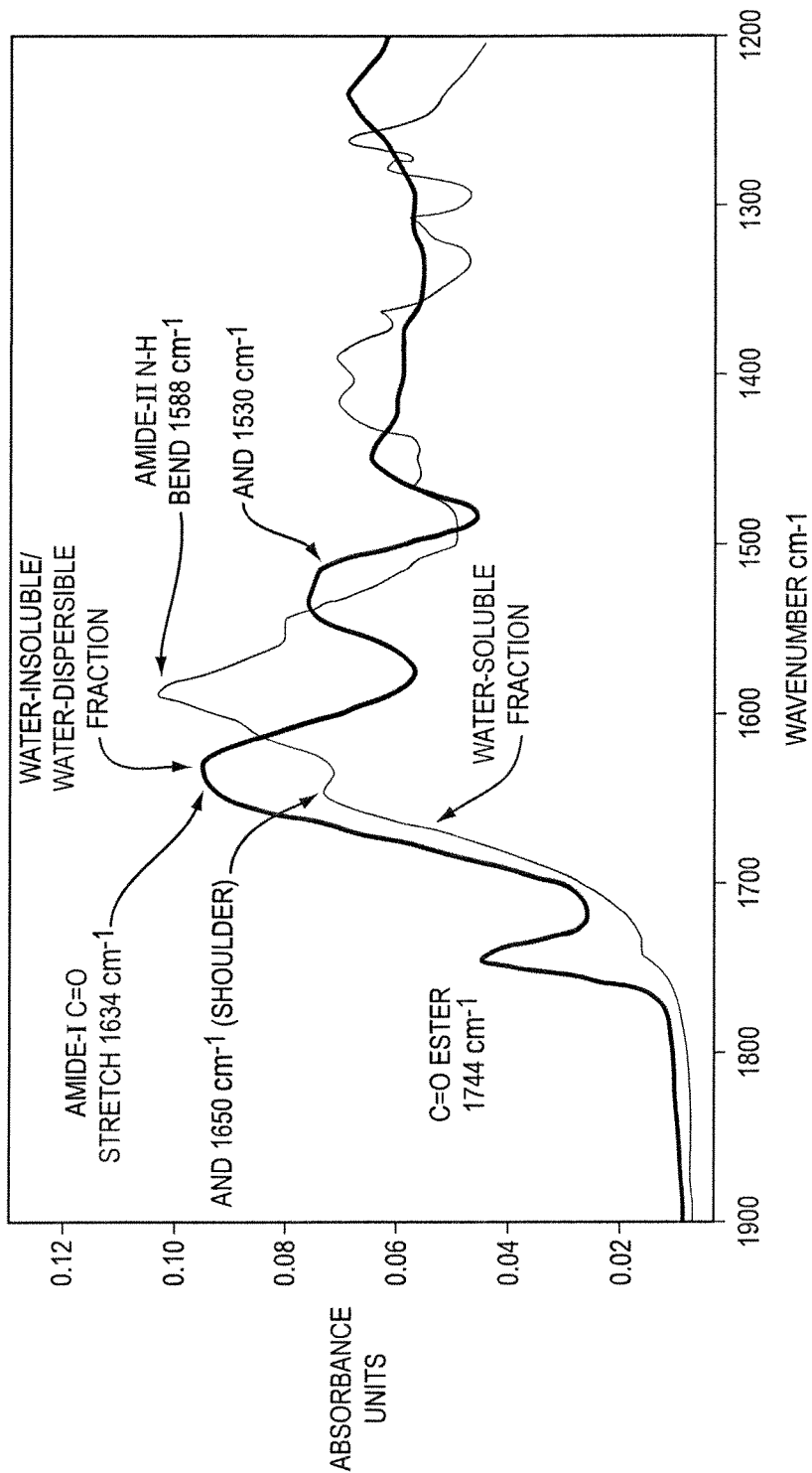
FIG. 23 shows overlaid solid state FTIR spectra of isolated water-soluble and water-insoluble/water-dispersible protein fractions obtained from ground cannola meal, where the carbonyl amide region is expanded and the spectra were vertically scaled to achieve equivalent absorbance intensities for the amide-I carbonyl stretch, as described further in Example 10.

Further, as shown in FIG. 23, the amide-I carbonyl absorption band for the water-insoluble/water-dispersible protein fraction was observed to appear as a predominant component at a wavenumber of approximately 1634 $cm^{-1}$, whereas that of the water-soluble protein fraction was observed to appear as a lower-intensity shoulder at approximately 1650 $cm^{-1}$. As discussed elsewhere, this feature distinguishes the water-insoluble/water-dispersible protein fraction from the water-soluble protein fraction, not only for isolated protein fractions from castor proteins and soy proteins, but for protein-containing fractions that are isolated directly from plant meals like soy meal and canola meal. Moreover, the amide-II band for the water-insoluble/water-dispersible protein fraction was observed to appear as a broad band centered at approximately 1530 $cm^{-1}$, whereas that of the water-soluble protein fraction was observed to appear at approximately 1588 $cm^{-1}$ together with a weak shoulder at approximately 1550 $cm^{-1}$.

Analysis of the Capacity of Ground Plant Meal and Isolated Protein Fractions to Disperse Oil:

A dispersion of 26% (w/w) ground whole canola meal in water was mixed with PMDI at a 1:1 w/w ratio of PMDI to canola meal solids. The canola meal contained (i) approximately 55% by weight water-insoluble/water-dispersible protein fraction and (ii) approximately 45% by weight water-soluble protein fraction. The dispersion of ground whole canola meal formed a stable dispersion, which remained stable during a 1 hour period of observation with no visual signs of phase separation.

An aliquot of 26% by weight solids dispersion of water-insoluble/water-dispersible protein fraction (obtained from canola plant meal by washing three times per the protocol described in Procedure F of Example 2) was blended with PMDI at a w/w ratio of 1 part PMDI to 1 part of the water-insoluble/water-dispersible protein fraction (on a w/w PMDI/protein fraction-solids basis). This resulting mixture formed a stable dispersion, which remained stable during a 1 hour period of observation with no visible signs of phase separation.

The water-soluble protein fraction (obtained by extracting the canola meal and drying the supernatant after centrifuging) was dissolved in water to yield a 26% (w/w) solids solution. When PMDI was added to this solution (at a 1:1 weight ratio of PMDI to water-soluble protein fraction solid material), the resulting mixture was unstable, and it phase separated immediately after mixing.

The results above illustrate that water-emulsified PMDI-containing adhesive compositions can be prepared using water-insoluble/water-dispersible protein fraction obtained from ground plant meal. In addition, the results above illustrate that water-emulsified PMDI-containing adhesive can be prepared using ground plant meal compositions (that contain a sufficient amount of water-insoluble/water-dispersible protein fraction; it is understood that the ground plant meal composition also comprises some water-soluble protein fraction). Although the water-soluble protein fraction did not facilitate dispersion by itself in these experiments, the dispersion of PMDI (and other oils) is understood to be achievable so long as a sufficient amount of water-insoluble/water-dispersible protein fraction is present in the adhesive composition (or the ground plant meal used in the adhesive composition).

To further illustrate the oil-dispersing ability of mixtures containing a sufficient amount of water-insoluble/water-dispersible protein fraction, the oil-dispersing characteristics of a meal containing a large amount of water-insoluble/water-dispersible protein fraction was compared to the oil-dispersing characteristics of a commercially available soy-flour product containing a relatively small amount of water-insoluble/water-dispersible protein fraction. The commercially available soy-flour product used was Prolia PDI-90, which is a de-fatted soy flour obtained from Cargill).

As is understood, various commercially available derivatives from plant meals are themselves solvent-extracted (e.g., soy flour), which results in the removal of a substantial amount of the water-insoluble/water-dispersible protein fraction. Such compositions have not been found to facilitate dispersion of oil, and, thus, are less desirable for use in making an adhesive. For example, when PMDI was added to a 26% by weight solids dispersion of soy flour in water at a 1/1 (w/w) of soy flour/PMDI, the PMDI was observed to immediately phase separate from the mixture. By contrast, soy meal was used under similar conditions in Example 2 produced a stable dispersion.

Figure 24:
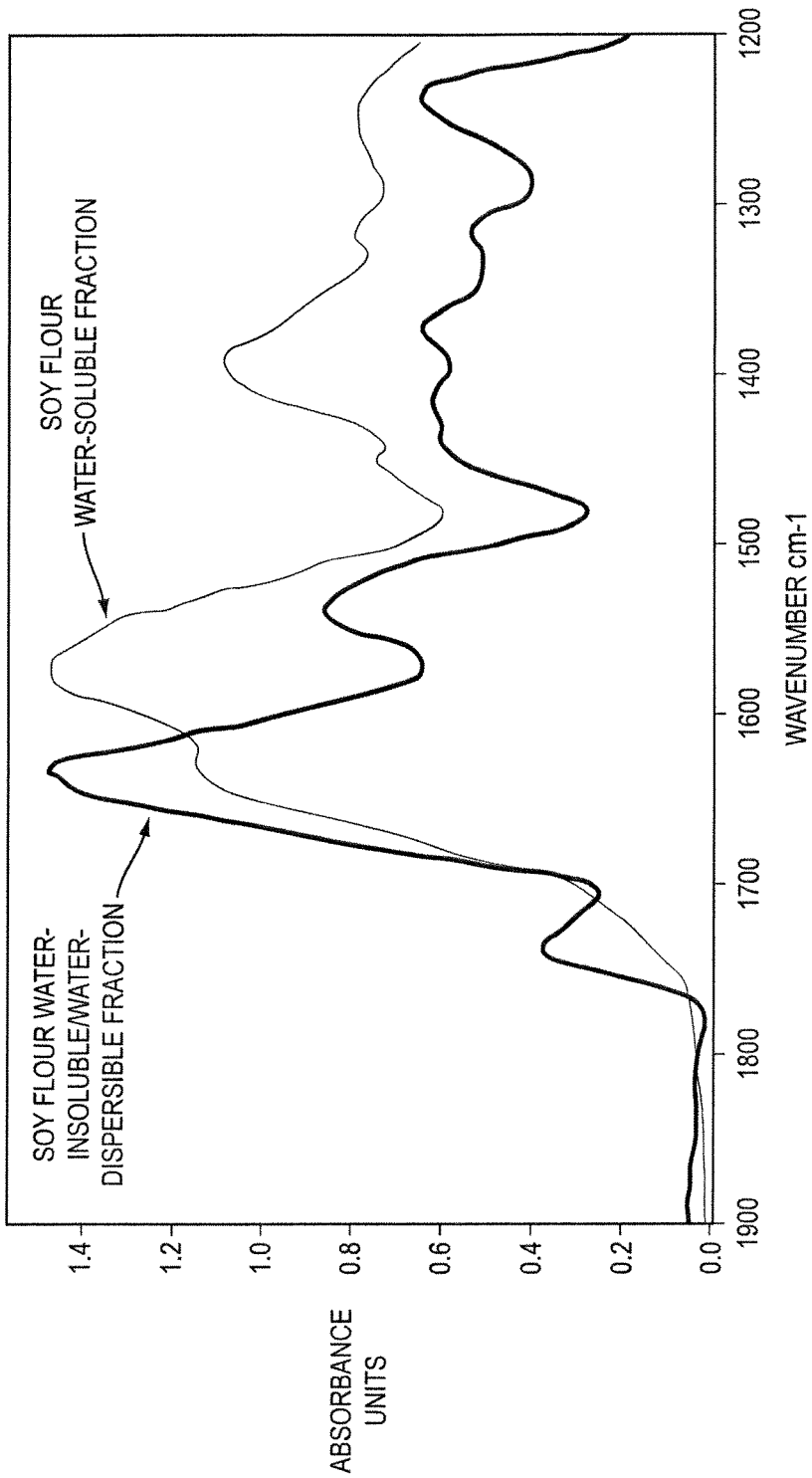
FIG. 24 shows overlaid solid state FTIR spectra of isolated water-soluble and water-insoluble/water-dispersible protein fractions obtained from soy flour, as described further in Example 10.

When soy flour was extracted using procedures discussed herein, the isolated water-insoluble/water-dispersible protein fraction was capable of dispersing PMDI in water. However, this fraction was gravimetrically determined to comprise only approximately 10% by weight of the starting soy flour mixture. Thus, the component needed for oil dispersion was present in the starting soy flour, but its effective concentration was too low for the soy flour disperse PMDI in water. FTIR spectra for the isolated water-insoluble/water-dispersible protein fraction and water-soluble protein fraction extracted from soy flour are provided in FIG. 24.

Figure 25:
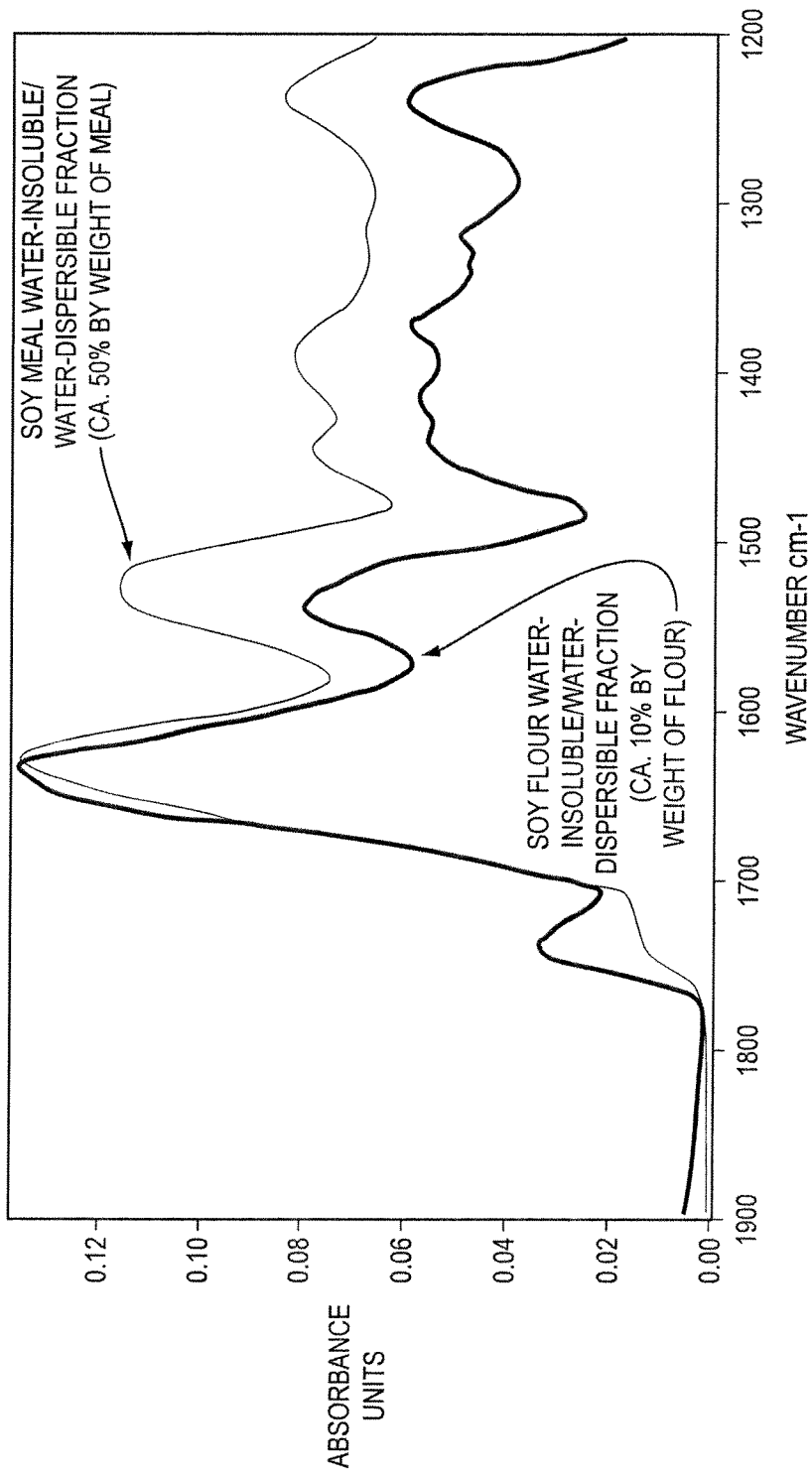
FIG. 25 shows overlaid solid state FTIR spectra of isolated water-insoluble/water-dispersible protein fractions obtained from soy meal and soy flour, as described further in Example 10.

In contrast to soy flour, the water-insoluble/water-dispersible protein fraction is a major component in soy meal (at a level of approximately 50% by weight), thus rendering the soy meal an effective dispersing agent for PMDI in water. Upon isolation, the water-insoluble/water-dispersible protein fraction extracted from both soy meal and soy flour (both of which were able to facilitate the dispersion of PMDI in water) were observed to contain similar spectral features as measured by FTIR. Solid state FTIR of the water-insoluble/water-dispersible protein fraction obtained from soy flour and soy meal are provided in FIG. 25.

Example 11

Adhesive Compositions Containing Urea and Their Use in Preparing Particle Board Composites Adhesive compositions containing urea were prepared and used to make particle board composites. The use of formaldehyde-sequestering compounds (e.g., urea) in adhesive compositions of the invention are contemplated to reduce formaldehyde emissions sometimes generated during composite manufacturing processes. Sequestration of formaldehyde is important because wood itself produces formaldehyde and wood products need to be in compliance with governmental formaldehyde emission regulations (e.g., The Airborne Toxic Control Measure enacted by the state of California, California Air Regulatory Board, CARB; and a similar United States national standard, The Formaldehyde Standards for Composite Wood Act, S-1660 which goes into effect on Jan. 1, 2013).

Water-insoluble/water-dispersible protein fraction is an important component of the adhesive composition because this protein fraction mitigates urea from being consumed by reaction with PMDI. In particular, PMDI can remain dispersed in water and can be made to co-exist with high levels of urea (and with other potential co-reactants such as stearic acid and glycerin) when formulas are prepared with (i) water-insoluble/water-dispersible protein fraction obtained by extraction from, for example, soy meal, canola meal, or castor meal, or (ii) ground plant meal comprising a sufficient amount of water-insoluble/water-dispersible protein fraction. In addition, the water-insoluble/water-dispersible protein fraction can help to disperse and/or stabilize reaction products that form in the adhesive composition over time (e.g., urea oligomers, polyureas, polyurethanes, and intermediates formed by reaction of the reactive prepolymer (e.g., PMDI) and a component of the adhesive composition)).

As shown herein, particleboard composites made with binder adhesives containing water-insoluble/water-dispersible protein fraction obtained from castor meal exhibit physical properties that are on par with boards made using traditional UF adhesives. In the present example, formulations containing urea were made for the purpose of enhancing formaldehyde-sequestering capacity. It is noted that urea is water-soluble and typically cannot be combined neat with isocyanate-functionalized compounds like PMDI without substantial reaction occurring between urea and the isocyanate-functionalized compound to produce a polyurea. The use of ground plant meal or water-insoluble/water-dispersible protein fraction provides a solution to the problem of pre-mature reaction of urea with isocyanate-functionalized compounds like PMDI. More generally, the use of ground plant meal or water-insoluble/water-dispersible protein fraction provides a solution to the problem of pre-mature reaction of formaldehyde-sequestering compounds (e.g., urea) with PMDI.

The use of ground plant meal or water-insoluble/water-dispersible protein fraction together with water also provides a solution to the problem of solubilizing components of the adhesive composition that, without the presence of ground plant meal or water-insoluble/water-dispersible protein fraction, would be immiscible. For example, the use of ground plant meal or water-insoluble/water-dispersible protein fraction together with water provides to a vehicle for formulating compatible dispersions of water-insoluble oils (e.g., PMDI) with water-soluble compounds (e.g., urea) that are otherwise immiscible with one another owing to solubility differences. Moreover, the use of ground plant meal or water-insoluble/water-dispersible protein fraction together with water provides a vehicle that can emulsify and stabilize immiscible reaction products (e.g., urea oligomers, or polyureas) that can sometimes form in between water-insoluble reactive oils (e.g., PMDI) and water-soluble compounds (e.g., urea).

Particleboard composites were prepared using water-insoluble/water-dispersible protein fractions obtained from castor meal, canola meal and soy meal. Adhesive compositions were also evaluated according to the weight percentage of urea in the adhesive composition (e.g., no urea, 10% urea, 25% urea, and 45% urea) and the level of FeAcAc catalyst (e.g., 0, 0.05, and 0.1 parts catalyst per hundred parts of PMDI).

Experimental Procedures:

Part I: Isolation of Water-Insoluble/Water-Dispersible Protein Fraction by Extraction from Castor Meal, Canola Meal, and Soy Meal Water-insoluble/water-dispersible protein fraction was obtained by extraction from castor meal, canola meal, and soy meal based on procedures described in U.S. Patent Application Publication No. 2010/0310877, which is hereby incorporated by reference.

A aqueous solution containing one percent (1%) sodium hydroxide (NaOH) was prepared. One part meal (by weight) was dispersed into five parts (by weight) of the 1% NaOH solution while stirring. The caustic meal mixture was mixed at room temperature for 1 hour. The mixture was then neutralized with dilute hydrochloric acid (1 Normal HCl) solution to achieve a pH of 4. This process resulted in the formation of a mixture with a layer containing water-soluble protein components (supernatant) and a precipitate containing water-insoluble/water-dispersible protein fraction. The water-insoluble sediment settled easily and the supernatant was decanted. The sediment was washed with tap water (pH approximately 6-7) and was then centrifuged until the resulting supernatant was clear. The supernatant was then discarded. This process of washing with tap water was performed for the purpose of removing residual water-soluble protein fractions. The residual wet paste (containing water-insoluble/water-dispersible protein fraction) was comprised of approximately 15-20% solids.

PPG-400 (polypropylene glycol, molecular weight 400 amu) was added to the residual wet paste to provide the PPG-400 at a concentration of 1.0% by weight of the oven dried sediment solids. The PPG-400 acts as an anti-microbial agent, and is reactive with PMDI. The resulting dispersion was then diluted with water to the desired solids content and was used in formulating Part-B components for several two-component adhesive systems. The Part-B components were mixed with Part-A components to yield the adhesive compositions as described in Tables 31 and 32. The mixed compositions were used within approximately 1 hour after mixing.

Particleboard composites were prepared by adding 10,000 grams of wood (Western Pine particleboard furnish; 5-8% moisture content) to a 4-foot diameter rotary blender. The wood was tumbled in the blender while the experimental adhesive compositions were sprayed onto the wood through via a pneumatic sprayer.

After addition of adhesive, the adhesive-coated wood was allowed to tumble for 5 minutes, and was then removed from the blender. Two boards per blend load were obtained. 4,800 grams of wood was used per board. The board size was 24"×24". The target thickness for the board was ¾ of an inch and the board density target was 45-46 lbs/ft$^3$ (after pressing). The resulting compositions of the boards are provided in Table 33.

The boards were pressed in a 36"×36" hydraulic press, and the internal gas pressure and temperature were monitored using a Pressman™ monitoring system. The boards were pressed using a surface platen temperature of 305° F. (152° C.) for a hold time of approximately 260 seconds (after which the board reached its target thickness), and for a total cycle time of approximately 300 seconds. Polymeric methylene diphenyl diisocyanate (PMDI) used in the adhesive formulations was Rubinate-M from Huntsman Polyurethanes, Woodlands, Tex. Comparative boards were also made using GP 736 A-61 Urea Formaldehyde (UF) adhesive from Georgia Pacific Resins, Decatur Ga. The targeted UF adhesive loading was 9% adhesive solids in the cured composite. Formaldehyde emissions from the particleboards were tested using the ASTM D5582 standard. Formaldehyde emissions data are provided in Table 34, together with allowable levels as dictated by the CARB standard.

Results:

Adhesive compositions and particle board composites were prepared according to the procedures described above. Results are provided in Tables 31-35 are provided below.

Components of wet adhesive compositions are provided in Table 31 by weight percent. The Part-A and Part-B components were premixed separately, and then both parts were mixed together to yield the compositions reported below (Part-A+Part-B). The table also includes the type of meal that was used as the precursor for preparing the respective water-insoluble/dispersible fraction for each formulation.

TABLE 31

COMPONENTS OF THE WET ADHESIVE COMPOSITIONS (WEIGHT PERCENT)

| Sample No. & Meal Type (Precursor) | Percent Water (PART-B Component) | Percent Water-Insoluble/Dispersible Meal-Derivative (PART-B Component) | Percent Urea (PART-B Component) | Percent PMDI (PART-A Component) | Percent Catalyst (PART-A Component) | Total Percent |
|---|---|---|---|---|---|---|
| TP-56-3B (castor) | 72.71 | 10.87 | 0.00 | 16.32 | 0.100 | 100 |
| TP-56-6A (castor) | 70.30 | 10.50 | 2.97 | 16.23 | 0.000 | 100 |
| TP-56-9A (castor) | 65.70 | 9.82 | 8.35 | 16.09 | 0.050 | 100 |
| JM-666-1B (castor) | 60.03 | 8.98 | 17.97 | 12.97 | 0.050 | 100 |
| TP-56-2B (castor) | 72.75 | 10.87 | 0.00 | 16.32 | 0.050 | 100 |
| TP-56-2A (castor) | 72.75 | 10.87 | 0.00 | 16.32 | 0.050 | 100 |
| JM-663-9B (soy) | 62.49 | 11.02 | 9.36 | 17.08 | 0.050 | 100 |
| JM-666-2A (soy) | 55.98 | 9.89 | 19.79 | 14.29 | 0.050 | 100 |
| JM-657-9A (canola) | 68.35 | 9.33 | 7.89 | 14.39 | 0.050 | 100 |

The composition of dry-cured adhesives by weight percent is provided in Table 32. The Part-A and Part-B components described in Table 31 were premixed separately, and then both parts were mixed together. The resulting compositions are reported below on a solids basis (i.e., upon cure and volatilization of water). The compositions of cured particle board composites on a dry weight percentage basis is provided in Table 33.

TABLE 32

DRY-CURED ADHESIVE COMPOSITIONS (WEIGHT PERCENT)

| Sample No. | Percent Water-Insoluble/Dispersible Meal-Derivative | Percent Urea | Percent PMDI | Percent Catalyst | Total |
|---|---|---|---|---|---|
| TP-56-3B | 39.82 | 0.00 | 59.81 | 0.37 | 100.00 |
| TP-56-6A | 35.35 | 10.00 | 54.65 | 0.00 | 100.00 |
| TP-56-9A | 28.61 | 24.33 | 46.91 | 0.15 | 100.00 |
| JM-666-1B | 22.46 | 44.96 | 32.46 | 0.13 | 100.00 |
| TP-56-2B | 39.91 | 0.00 | 59.90 | 0.18 | 100.00 |
| TP-56-2A | 39.91 | 0.00 | 59.90 | 0.18 | 100.00 |
| JM-663-9B | 29.39 | 24.94 | 45.54 | 0.13 | 100.00 |
| JM-666-2A | 22.46 | 44.96 | 32.47 | 0.11 | 100.00 |
| JM-657-9A | 29.46 | 24.91 | 45.47 | 0.16 | 100.00 |

TABLE 33

COMPOSITIONS OF CURED PARTICLE BOARD COMPOSITES
(DRY WEIGHT PERCENTAGE BASIS)

| Sample No. | Percent Wood in Composite | Percent Binder in Composite | Percent PMDI in Composite | Percent Water-Insoluble/ Dispersible Meal-Derivative in Composite | Percent Urea in Composite | Percent Catalyst in Composite |
|---|---|---|---|---|---|---|
| TP-56-3B | 97.57 | 2.43 | 1.45 | 0.97 | 0.00 | 0.009 |
| TP-56-6A | 97.35 | 2.65 | 1.45 | 0.94 | 0.27 | 0.000 |
| TP-56-9A | 97.01 | 2.99 | 1.40 | 0.86 | 0.73 | 0.004 |
| JM-666-1B | 97.01 | 2.99 | 0.97 | 0.67 | 1.34 | 0.004 |
| TP-56-2B | 97.57 | 2.43 | 1.46 | 0.97 | 0.00 | 0.004 |
| TP-56-2A | 97.57 | 2.43 | 1.46 | 0.97 | 0.00 | 0.004 |
| JM-663-9B | 97.01 | 2.99 | 1.36 | 0.88 | 0.75 | 0.004 |
| JM-666-2A | 97.01 | 2.99 | 0.97 | 0.67 | 1.34 | 0.003 |
| JM-657-9A | 97.01 | 2.99 | 1.36 | 0.88 | 0.74 | 0.005 |

Formaldehyde emission levels were determined for composites using method ASTM D5582. Results of the formaldehyde emissions test are provided in Table 34. Also, emission levels were compared to the emission thresholds as required by The Airborne Toxic Control Measure (ATCM) enacted by the state of California (California Air Regulatory Board, CARB) to control formaldehyde emissions from composite wood products. It can be seen from these data that all of the adhesive compositions met the CARB regulations, and performed better than the urea-formaldehyde (UF) control.

TABLE 34

FORMALDEHYDE EMISSION LEVELS OF COMPOSITES

| Sample No. | Percent Urea in the Cured Adhesive Binder | Percent Urea in the Cured Composite | Formaldehyde Emissions (ppm) |
|---|---|---|---|
| TP-56-3B | 0% | 0.00 | 0.122 |
| TP-56-6A | 10% | 0.27 | 0.076 |
| TP-56-9A | 25% | 0.73 | 0.046 |
| JM-666-1B | 45% | 1.34 | 0.027 |
| TP-56-2B | 0% | 0.00 | 0.074 |
| TP-56-2A | 0% | 0.00 | 0.081 |
| JM-663-9B | 25% | 0.75 | 0.041 |
| JM-666-2A | 45% | 1.34 | 0.017 |
| JM-657-9A | 25% | 0.74 | 0.039 |
| JM-667-2B (UF Board) | — | — | 0.177 |
| 2008 allowable CARB level | — | — | 0.160 |
| 2011 allowable CARB level | — | — | 0.090 |

The density, modulus of rupture (MOR), and internal bond strength (IBS) were measured for the particleboard composites. Data for these physical properties are provided in Table 35. Physical properties of particle board composites prepared with the adhesive compositions containing water-insoluble/ water-dispersible protein fraction were comparable or better than those made with a traditional UF binder formulation.

TABLE 35

PHYSICAL PROPERTIES OF PARTICLE BOARD COMPOSITES

| Sample No. | Sample Description | Density (lb/ft$^3$) | Avg. MOR (psi) | Avg. IB (psi) |
|---|---|---|---|---|
| JM-667-1 | 9% UF Control | 45.46 | 1371 | 74.0 |
| TP-56-3 DOE-1B | Castor, No Urea, 0.1% Cat. PMDI | 48.11 | 1758 | 97.3 |
| TP-56-6 DOE-1B | Castor, 10% Urea, Neat PMDI | 48.14 | 1761 | 91.0 |
| TP-56-9 DOE-1B | Castor, 25% Urea, 0.05% Cat. PMDI | 46.73 | 1558 | 70.9 |
| JM-657-3 DOE-2 | Canola, No Urea, 0.1% Cat. PMDI | 47.38 | 1819 | 107.3 |
| JM-657-6 DOE-2 | Canola, 10% Urea, Neat PMDI | 46.23 | 1645 | 93.0 |
| JM-657-9 DOE-2 | Canola, 25% Urea, 0.05% Cat. PMDI | 47.48 | 1651 | 93.1 |
| JM-663-3 DOE-2 | Soy, No Urea, 0.1% Cat. PMDI | 47.19 | 1487 | 71.3 |
| JM-663-6 DOE-2 | Soy, 10% Urea, Neat PMDI | 49.31 | 1859 | 94.9 |
| JM-663-9 DOE-2 | Soy, 25% Urea, 0.05% Cat. PMDI | 48.48 | 1363 | 67.1 |
| JM-666-1 High Urea | Castor, 45% Urea, 0.05% Cat. PMDI | 45.75 | 1202 | 74.5 |
| JM-666-2 High Urea | Soy, 45% Urea, 0.05% Cat. PMDI | 48.54 | 1272 | 52.8 |

Example 12

Particle Board Prepared from Adhesive Comprising Ground Canola Meal

Particle board was prepared using an adhesive comprising ground canola meal. This example is analogous to Example 11, except that whole ground canola meal was used in the adhesive binder formulations because of its unique ability to disperse PMDI in water.

Experimental Procedures:

The objective was to manufacture and test single-layer particleboard (¾"×24"×24") panels. These panels were then cut up into subsamples and were tested for flexure properties (MOE and MOR), and internal bond strength (IB). Three replicates of each standard particle board were made.

Approximately 300 lbs of particleboard furnish was sent from Flakeboard's mill in St. Stephen, N.B. The moisture content (MC) was checked on the day of the trial, with two samples measuring 6.9 and 7.8%. The MC used for all resin loading calculations was 7.0%. A total of 6803.89 grams of wood were used per blend load. The wood was blended in a 3'×6' diameter Coil rotary blender spinning at 15 rpm. The adhesive was applied using a Spaying Systems Co. air atomizer, model ¼ JBC SS with an SU-22 tip and with the air pressure set at 15 psi.

Mats were pressed in a 34"×34" 450 ton Dieffenbacher hydraulic hot press. The target thickness was 0.750" or 0.719" at a target density 48 lbs/ft$^3$. The platens were heated to 300° F. A temperature/gas pressure probe was inserted into each panel at its mid-plane, allowing for the monitoring and recording of core temperature and gas pressure.

Polymeric methylenediphenyl diisocyanate (PMDI) used in the adhesive formulations was Rubinate-M obtained from Huntsman Polyurethanes, Woodlands, Tex. Canola Meal was obtained from Viterra Canola Processing Step. Agathe, Manitoba, Canada. The meal was ground using a Rotormill from International Process Equipment Company, Pennsauken, N.J., to a particle size in the range of approximately 20 μm to 70 μm.

Results:

Wet adhesive formulations are described in Table 36 below (the actual weights used per blend load are provided in Table 37). The resulting cured particle board composite compositions are described in Table 38.

TABLE 36

WET ADHESIVE COMPOSITIONS (WEIGHT PERCENTAGE BASIS)

| Sample No. | Part-B Wet Protein Dispersion Weight (25% Canola Meal in Water w/w) | Part-B Urea Weight (Added to Protein Dispersion) | Part-A PMDI Weight | Total |
|---|---|---|---|---|
| JM-736-1 | 84.67% (63.50% water + 21.18% meal) | 1.82% | 13.50% | 100.00% |
| JM-736-2 | 81.55% (61.16% water + 20.40% meal) | 2.91% | 15.53% | 100.00% |
| JM-736-3 | 83.30% (62.47% water + 20.84% meal) | 2.81% | 13.88% | 100.00% |
| JM-736-4 | 83.02% (62.26% water + 20.76% meal) | 1.89% | 15.09% | 100.00% |

TABLE 37

WEIGHT OF INGREDIENTS ADDED TO THE PARTICLE BOARD BATCHES DURING BATCH BLENDING

| Sample No. | Weight Water (grams) | Weight Canola Meal (grams) | Weight Urea (grams) | Weight PMDI (grams) | Weight of Mixed Adhesive Added to Wood (grams) |
|---|---|---|---|---|---|
| JM-736-1 | 461.25 | 153.75 | 13.25 | 98.08 | 726.34 |
| JM-736-2 | 417.51 | 139.17 | 19.88 | 106.03 | 682.60 |
| JM-736-3 | 472.02 | 157.34 | 21.26 | 104.89 | 755.51 |
| JM-736-4 | 467.77 | 155.92 | 14.17 | 113.40 | 751.26 |

TABLE 38

COMPOSITIONS OF CURED COMPOSITES PREPARED WITH CANOLA MEAL-BASED BINDER FORMULATIONS (WEIGHT PERCENTAGE BASIS)

| Sample No. | Percent Wood in Finished Composite | Percent Binder in Finished Composite | Percent PMDI in Finished Composite | Percent Protein in Finished Composite | Percent Urea in Finished Composite |
|---|---|---|---|---|---|
| JM-736-1 | 96.250 | 3.750 | 1.388 | 2.175 | 0.188 |
| JM-736-2 | 96.250 | 3.750 | 1.500 | 1.969 | 0.281 |
| JM-736-3 | 96.000 | 4.000 | 1.480 | 2.220 | 0.300 |
| JM-736-4 | 96.000 | 4.000 | 1.600 | 2.200 | 0.200 |

Formaldehyde emissions from the particleboards were tested using the ASTM D5582 procedure. The formaldehyde emissions data are provided in Table 39. The emissions values were compared to the threshold emission levels as required by The Airborne Toxic Control Measure (ATCM) enacted by the state of California to control formaldehyde emissions from composite wood products (California Air Regulatory Board, CARB). Formaldehyde emissions of the prepared composites met CARB regulations.

TABLE 39

FORMALDEHYDE EMISSIONS AS MEASURED BY ASTM D5582

| Sample No. | Urea Percentage (Percent by Weight in the Cured Composite) | Formaldehyde Emissions (ppm) |
|---|---|---|
| JM-736-1 | 0.186 | 0.052 |
| JM-736-2 | 0.281 | 0.014 |
| JM-736-3 | 0.300 | 0.037 |
| JM-736-4 | 0.200 | 0.027 |
| 2011 allowable CARB level | — | 0.090 |

Density, modulus of rupture (MOR), modulus of elasticity (MOE), and internal bond strength (IB) were determined for the composites prepared with adhesive compositions containing canola meal. Data are shown in Table 40. Each of the composites exceeded the target properties of MOE=300,000 psi, MOR=2100 psi, and IB=65 psi.

TABLE 40

PHYSICAL PROPERTIES OF PARTICLE BOARD COMPOSITES PREPARED WITH CANOLA MEAL-BASED BINDER COMPOSITIONS

| Sample No. | Board Density (lb/ft$^3$) | MOR (psi) | MOE (psi) | IB (psi) |
|---|---|---|---|---|
| JM-736-1 | 47.5 | 2,382 | 316,884 | 95.3 |
| JM-736-2 | 47.8 | 2,279 | 326,914 | 104.2 |
| JM-736-3 | 47.2 | 2,261 | 317,964 | 93.6 |
| JM-736-4 | 47.0 | 2,344 | 307,902 | 96.1 |

Example 13

Preparation of Oriented Strand Boards (OSB) Using Canola Meal-Based Adhesives

Aspen wood strand oriented strand board (OSB) panels (23/32"×24"×24") were prepared using adhesive compositions containing ground canola meal. A total of nine canola meal-based adhesive compositions were prepared as part of a Taguchi experimental design. OSB panels were prepared and tested for flexure properties (MOE and MOR), water absorption/thickness swell properties (WAITS), and internal bond strength (IB). Two replicates of each experimental OSB panel were made from each individual blend load. In addition, for comparative purposes, two OSB panels were also made using neat PMDI as a binder. Experimental procedures and results are provided below.

Experimental Procedures:

Aspen (*Populus* spp.) strands in the amount of 500 pounds were produced using a Carmanah 12/48 ring strander from 16 locally harvested logs. Moisture content (MC) of the logs was approximately 100% (on a dry basis, where MC=the weight of the water divided by the oven dry weight of the wood×100). Logs were debarked by hand using a draw shave, and they were then stranded. Target strand dimensions were 0.028" thick×4" long with widths varying from approximately ½" to 3", and with an average near approximately 2 inches. Strands were then screened using an Acrowood Trillium/Diamond Roll combination screen. Only the largest of the three screened fractions was retained for use. The strands were then dried; at first on a Koch Bros. conveyor dryer at 300° F. to achieve ~6-12% MC, and then by placing them within mesh racks, and equilibrating them to 8% MC using a dehumidification dry kiln (at dry and wet bulb temperatures of 115° F. and 95° F., respectively). The strands were then placed within plastic-lined Gaylord boxes to maintain the wood MC.

PMDI (polymeric methylenediphenyl di-isocyanate) for this study was Rubinate-M, obtained from Huntsman Polyurethanes, Woodlands, Tex. The wax that was used in these experiments was Hexion EW-58H, a 58% solids wax emulsion. Canola meal was obtained from Viterra Canola Processing Step. Agathe, Manitoba, Canada. The canola meal was ground using a Rotormill from International Process Equipment Company, Pennsauken, N.J., to a particle size in the range of approximately 20 μm to 70 μm. The Taguchi designed experiment (DOE) consisted of nine formulations with four factors studied over 3 levels: (1) the percent adhesive binder in the cured composite, (2) the percent PMDI in the cured binder, (3) the percent of urea in the cured adhesive binder, and (4) the percent wax in the cured composite.

The Taguchi design is presented in Table 41. The composition of the wet adhesive is provided in Table 42, and the composition of the dry-cured OSB composite is provided in Table 43.

TABLE 41

TAGUCHI EXPERIMENTAL DESIGN FOR OSB FORMULATIONS

| Sample No. | Precent Adhesive Binder in the Cured Composite | Percent PMDI in Cured Adhesive Binder | Percent Urea in Cured Adhesive Binder | Percent Additional Wax in the Cured Composite |
|---|---|---|---|---|
| 1 | 2.7 | 35.0 | 0 | 0 |
| 2 | 2.7 | 37.5 | 5.0 | 0.375 |
| 3 | 2.7 | 40.0 | 10.0 | 0.75 |
| 4 | 2.85 | 35.0 | 5.0 | 0.75 |
| 5 | 2.85 | 37.5 | 10.0 | 0 |
| 6 | 2.85 | 40.0 | 0 | 0.375 |
| 7 | 3.0 | 35.0 | 10.0 | 0.375 |
| 8 | 3.0 | 37.5 | 0 | 0.75 |
| 9 | 3.0 | 40.0 | 5.0 | 0 |
| PMDI Control | 2.0 | 100.0 | 0 | 0.75 |

TABLE 42

COMPOSITION OF THE WET ADHESIVES (WEIGHT PERCENT)

| Sample No. | Percent Water (PART-B Component) | Percent Canola Meal (PART-B Component) | Percent Urea (PART-B Component) | Percent PMDI (PART-A Component) | Total Percent |
|---|---|---|---|---|---|
| 1 | 66.10 | 22.03 | 0.00 | 11.86 | 100 |
| 2 | 63.30 | 21.10 | 1.83 | 13.76 | 100 |
| 3 | 60.00 | 20.00 | 4.00 | 16.00 | 100 |
| 4 | 64.29 | 21.43 | 1.79 | 12.50 | 100 |
| 5 | 61.17 | 20.39 | 3.88 | 14.56 | 100 |
| 6 | 64.29 | 21.43 | 0.00 | 14.29 | 100 |
| 7 | 62.26 | 20.75 | 3.77 | 13.21 | 100 |
| 8 | 65.22 | 21.74 | 0.00 | 13.04 | 100 |
| 9 | 62.26 | 20.75 | 1.89 | 15.09 | 100 |

A pre-weighed amount of wood sufficient to produce two OSB panels (42 lbs. or 19,050.88 grams) was placed within a 3'×6' Coil spinning disk (atomizing resin blender). The blender drum was spun at 15 rpm. The resins were weighed out and pumped to the blender using a Masterflex peristaltic pump using #24 Tygon tubing. All OSB resins were introduced through the spinning disk atomizer (model EL-4) set to 9,500 rpm. Following resin introduction, the e-wax (i.e., the water-emulsified Hexion wax) was applied using the air atomizer, again set at 15 psi. The wet adhesives were introduced at a rate of 300 mL/min over a time span of approximately 5-6 minutes. The e-wax was introduced at a rate of 230 mL/min over a span of approximately 1-2 minutes.

A wire-mesh screen (lightly sprayed with Stoner E497 thermosetting mold release) was placed on top of a ball-transfer lay-up table. Two stacked 34"×34" forming boxes were then laid on top of the screen. A quantity of adhesive-treated strands sufficient to form a single mat were weighed, and a single-layer, randomly-oriented loose mat was formed by hand. The forming boxes were then carefully removed; excess strands from along the edges were placed back on top of the mat, and a second matching wire-mesh screen was placed on top.

The OSB mats were pressed in a 34"×34" 450 ton Dieffenbacher hydraulic hot press to achieve a target thickness of 0.750" or 0.719", and a target density of approximately 39 lbs/ft$^3$. The platens were heated at a temperature of 400° F., and the press time was approximately 300 seconds. A temperature/gas pressure probe was inserted into each panel at its mid-plane, allowing for the monitoring and recording of core temperature and gas pressure.

Results:

Compositions of the particle board composites are provided in Table 43 on a weight percentage basis. Density, modulus of rupture (MOR), modulus of elasticity (MOE), internal bond strength (IB), and moisture resistance were determined for the composites and are provided in Table 44.

TABLE 43

COMPOSITIONS OF CURED PARTICLE BOARD COMPOSITES (WEIGHT PERCENTAGE BASIS)

| Sample No. | Percent Wood in Composite | Percent Binder in Composite | Percent PMDI in Composite | Percent Canola Meal in Composite | Percent Urea in Composite | Percent Wax in Composite |
|---|---|---|---|---|---|---|
| 1 | 97.30 | 2.700 | 0.95 | 1.76 | 0.00 | 0 |
| 2 | 96.92 | 2.700 | 1.01 | 1.55 | 0.14 | 0.375 |
| 3 | 96.55 | 2.700 | 1.08 | 1.35 | 0.27 | 0.75 |
| 4 | 96.40 | 2.850 | 1.00 | 1.71 | 0.14 | 0.75 |
| 5 | 97.15 | 2.850 | 1.07 | 1.50 | 0.29 | 0 |
| 6 | 96.78 | 2.850 | 1.14 | 1.71 | 0.00 | 0.375 |
| 7 | 96.63 | 3.000 | 1.05 | 1.65 | 0.30 | 0.375 |
| 8 | 96.25 | 3.000 | 1.13 | 1.88 | 0.00 | 0.75 |
| 9 | 97.00 | 3.000 | 1.20 | 1.65 | 0.15 | 0 |
| PMDI | 97.25 | 2.000 | 2.00 | 0.00 | 0.00 | 0.75 |

TABLE 44

PHYSICAL PROPERTY (MOE, MOR, IB) AND MOISTURE RESISTANCE MEASUREMENTS

| Sample No. | Density (lbs./ft.$^3$) | MOE (psi) | MOR (psi) | IB (psi) | Percent Water Absorption ("WA" by Volume) | Percent Water Absorption ("WA" by Weight) | Percent Thickness Swell from Water Absorption |
|---|---|---|---|---|---|---|---|
| 1 | 33.1 | 539,502 | 3123 | 31.7 | 43.3 | 102.1 | 42.2 |
| 2 | 45.0 | 603,513 | 4492 | 45 | 14.7 | 63.4 | 24.2 |
| 3 | 50.6 | 694,514 | 5181 | 50.6 | 16 | 42.7 | 15.2 |
| 4 | 50.2 | 514,264 | 3952 | 50.2 | 14 | 38.9 | 13.3 |
| 5 | 65.0 | 657,824 | 5002 | 65 | 37 | 94.6 | 36.1 |
| 6 | 52.5 | 642,110 | 4496 | 52.5 | 17.2 | 51.5 | 16.5 |
| 7 | 41.1 | 625,393 | 4584 | 41.1 | 23.7 | 64.6 | 23 |
| 8 | 45.0 | 704,997 | 5279 | 45 | 12.3 | 38.5 | 11.6 |
| 9 | 50.8 | 722,412 | 5183 | 50.8 | 35.7 | 93.8 | 34.7 |
| PMDI | 46.8 | 625,803 | 4537 | 46.8 | 16.7 | 47.1 | 16.1 |

OSB compositions of the design space exhibited a range of physical properties, which included those of the composite made with neat PMDI. In two experiments (Experiments 3 and 8), all measured properties were either equivalent to or better than those of the composite made with neat PMDI, in spite of the fact that the PMDI levels were effectively cut in half.

Analysis of variance (ANOVA) revealed that several of the physical properties were significantly affected by one or more of the controlled factors. See Table 45.

TABLE 45

ANALYSIS OF VARIANCE (ANOVA) OF THE DESIGNED EXPERIMENT FACTORS, AND THEIR IMPACT ON THE PHYSICAL PROPERTY RESPONSES*

| Response | Factor-A Percent Binder | Factor-B Percent PMDI | Factor-C Percent Urea | Factor-D Percent Wax | Interaction Term & Significance |
|---|---|---|---|---|---|
| MOE | S (+) | VS (+) | NS | NS | None |
| MOR | VS (+) | S (+) | VS (+) | NS | A × C, VS (−) |
| IB | NS | NS | NS | NS | None |
| Percent Water Absorption (by volume) | NS | VS (−) | NS | VS (−) | B × C, VS (+) |
| Percent Water Absorption (by weight) | NS | S (−) | NS | VS (−) | B × C, VS (+) |
| Percent Thickness Swell from Water Absorption | NS | VS (−) | NS | VS (−) | B × C, VS (+) |

*VS = very significant at the 95% confidence level with p < 0.05;
S = significant at the 90% confidence level with p < 0.1; and
NS = not significant.
A designation of "+" indicates that the response increased as the level of a given factor was increased. Conversely, a designation of "−" indicates that the response decreased as the level of a given factor was increased.

The modulus of elasticity (MOE) was positively affected (increased) with increasing levels of binder and with increasing levels of PMDI in the composite. Consequently, these results show that it is possible to achieve a balanced response by leveraging these two factors against one another. For example, lowering the PMDI level while simultaneously increasing the meal level to achieve a higher overall binder level can have a similar effect to that which would be realized by raising the PMDI level and lowering the meal level to achieve a lower overall binder level. This capability can translate to the use of lower levels of PMDI to achieve properties that are equivalent to those of conventional composites made with higher levels of neat PMDI.

Analysis of the modulus of rupture (MOR) revealed similar trends, but with an additional caveat: the level of urea was determined to be a significant factor. Overall, the MOR was observed to increase with increasing levels of urea. However, owing to an interaction between the urea level and the total binder level, the degree of urea's positive impact was attenuated with increasing binder levels. More specifically, at lower binder levels, an increase in the level of urea was observed to significantly increase the MOR. At higher binder levels, the positive impact of urea was diminished. These results demonstrate that urea can be used in the protein-containing adhesive compositions to positively impact physical properties (in addition to its formaldehyde-sequestering benefits), but its impact will depend on the overall level of other formulation ingredients.

Unlike the MOR and MOE measurements, the internal bond strength (IB) was not significantly affected by the factors. However, all three of the moisture absorption measurements were significantly and consistently affected by (1) the amount of PMDI, (2) the amount of wax, and (3) by an interaction between the amount of PMDI and urea. Specifically, moisture resistance was improved with increasing the amount of PMDI and wax. However, the positive impact of increasing the amount of PMDI was attenuated by increasing the amount of urea. Generally, when the amount of PMDI was highest, the best moisture resistance was achieved at lower amounts of urea. By contrast, as the amount of PMDI was lowered, the best moisture resistance was achieved with higher amounts of urea.

The interaction between urea and other factors (PMDI level and Binder level), and the effect of this interaction on physical properties (MOR, water absorption) is suggestive of the potential for a chemical interaction between two or more of the various components. Although not to be bound by a particular theory, one possibility is a chemical reaction between urea and PMDI. Another possibility may involve a chemical interaction between the protein components and urea, or the modulation (by urea) of a potential reaction between protein components and PMDI. Regardless of the exact chemical mechanism, these interactions provide sufficient latitude for making adhesive compositions that have physical properties that are as good or better than those that can be achieved when composites are made with higher levels of neat PMDI.

Results from Statistical Modeling:

A statistical modeling program (Design Ease 7.1.6 by Stat-Ease, Inc., Minneapolis, Minn.) was used to model the physical properties of composites (listed in Table 44) as a function of the primary factors and interactions listed in Table 45. These models were then used to navigate a fraction of the design space that would be expected to exhibit better physical properties than those exhibited by the composite made with the higher level of neat PMDI.

In order to accomplish this, the lower thresholds for MOR and MOE were set at higher levels than those exhibited by the neat PMDI composite. Similarly, the upper thresholds for all of the moisture resistance properties were set at levels that were equivalent to those of the neat PMDI composite. In addition, the factor limits were set to those of the design space at hand. The objective of the modeling was to search for compositions that would simultaneously exhibit higher MOR and MOE values, and lower moisture absorption values than the neat PMDI composite. Results of the analysis are shown in Table 46 show, and several adhesive compositions were predicted to achieve higher MOR and/or MOE values.

TABLE 46

PREDICTED COMPOSITIONS AND PROPERTIES FOR COMPOSITES THAT WOULD BE EXPECTED TO EXHIBIT BETTER PHYSICAL PROPERTIES AND MOISTURE RESISTANCE THAN THE NEAT PMDI COMPOSITE

| Exp. No. | Percent Binder in Composite | Percent PMDI in Binder | Percent Urea in Binder | Percent Wax in Composite | MOE (psi) | MOR (psi) | Percent WA (Volume) | Percent WA (wt) | Percent Water Thickness Swell |
|---|---|---|---|---|---|---|---|---|---|
| 1 | 3.00 | 39.73 | 0.80 | 0.64 | 722,537 | 5,343 | 10.4 | 36.3 | 9.7 |
| 2 | 3.00 | 39.78 | 0.25 | 0.70 | 724,273 | 5,375 | 7.9 | 30.9 | 7.3 |
| 3 | 2.99 | 39.93 | 1.22 | 0.68 | 726,322 | 5,331 | 9.2 | 33.7 | 8.6 |
| 4 | 2.98 | 39.94 | 0.13 | 0.59 | 723,751 | 5,297 | 11.0 | 38.4 | 10.3 |
| 5 | 3.00 | 39.89 | 2.11 | 0.64 | 727,218 | 5,339 | 11.4 | 38.0 | 10.7 |
| 6 | 3.00 | 39.91 | 1.55 | 0.65 | 726,851 | 5,341 | 10.6 | 36.6 | 9.9 |
| 7 | 2.99 | 39.90 | 0.64 | 0.62 | 725,267 | 5,336 | 10.5 | 36.9 | 9.8 |
| 8 | 3.00 | 39.91 | 3.12 | 0.69 | 727,204 | 5,302 | 10.9 | 36.3 | 10.2 |
| 9 | 2.98 | 39.94 | 0.36 | 0.73 | 724,015 | 5,298 | 6.6 | 28.3 | 6.0 |
| 10 | 3.00 | 39.75 | 1.83 | 0.73 | 723,025 | 5,317 | 8.3 | 30.8 | 7.6 |
| 11 | 3.00 | 39.97 | 3.17 | 0.72 | 728,440 | 5,304 | 9.8 | 33.9 | 9.2 |
| 12 | 3.00 | 39.98 | 4.39 | 0.73 | 729,460 | 5,280 | 10.6 | 34.9 | 9.9 |
| 13 | 2.99 | 39.77 | 2.93 | 0.72 | 722,895 | 5,280 | 9.8 | 33.7 | 9.1 |
| 14 | 3.00 | 39.94 | 3.81 | 0.73 | 728,104 | 5,288 | 10.1 | 34.0 | 9.4 |
| 15 | 3.00 | 39.72 | 3.15 | 0.75 | 722,867 | 5,286 | 9.1 | 32.0 | 8.5 |
| 16 | 2.99 | 39.96 | 1.90 | 0.70 | 727,186 | 5,320 | 9.0 | 32.8 | 8.4 |
| 17 | 3.00 | 40.00 | 5.01 | 0.70 | 729,759 | 5,263 | 12.3 | 38.4 | 11.6 |
| 18 | 2.97 | 40.00 | 2.88 | 0.75 | 723,985 | 5,233 | 8.4 | 30.9 | 7.8 |
| 19 | 3.00 | 40.00 | 6.12 | 0.75 | 730,029 | 5,233 | 11.9 | 36.7 | 11.1 |
| 20 | 3.00 | 40.00 | 6.41 | 0.74 | 730,008 | 5,224 | 12.3 | 37.5 | 11.6 |
| 21 | 2.97 | 39.99 | 3.51 | 0.67 | 723,364 | 5,219 | 11.8 | 38.3 | 11.1 |
| 22 | 2.98 | 40.00 | 6.45 | 0.74 | 725,523 | 5,192 | 12.3 | 37.5 | 11.6 |
| 23 | 3.00 | 39.20 | 1.33 | 0.75 | 709,814 | 5,279 | 8.5 | 30.7 | 7.8 |
| 24 | 3.00 | 40.00 | 0.01 | 0.54 | 730,030 | 5,415 | 12.3 | 41.8 | 11.7 |
| 25 | 3.00 | 39.59 | 7.30 | 0.75 | 719,762 | 5,148 | 13.0 | 38.5 | 12.3 |

TABLE 46-continued

PREDICTED COMPOSITIONS AND PROPERTIES FOR COMPOSITES
THAT WOULD BE EXPECTED TO EXHIBIT BETTER PHYSICAL PROPERTIES
AND MOISTURE RESISTANCE THAN THE NEAT PMDI COMPOSITE

| Exp. No. | Percent Binder in Composite | Percent PMDI in Binder | Percent Urea in Binder | Percent Wax in Composite | MOE (psi) | MOR (psi) | Percent WA (Volume) | Percent WA (wt) | Percent Water Thickness Swell |
|---|---|---|---|---|---|---|---|---|---|
| 26 | 2.90 | 40.00 | 6.77 | 0.75 | 706,978 | 5,077 | 12.5 | 37.6 | 11.7 |
| 27 | 2.96 | 39.03 | 0.00 | 0.75 | 695,835 | 5,072 | 7.9 | 29.6 | 7.3 |
| 28 | 3.00 | 38.87 | 7.40 | 0.75 | 701,449 | 5,058 | 13.0 | 38.5 | 12.3 |
| 29 | 2.81 | 40.00 | 6.62 | 0.75 | 685,136 | 4,935 | 12.3 | 37.4 | 11.6 |
| 30 | 3.00 | 38.96 | 9.85 | 0.75 | 703,647 | 4,995 | 14.7 | 41.4 | 13.9 |
| 31 | 3.00 | 38.43 | 10.00 | 0.75 | 690,266 | 4,926 | 14.2 | 40.6 | 13.5 |

Example 14

Characterization of Ability of Ground Canola Meal to Disperse Hydrophobic Additives Compositions containing ground canola meal were prepared to demonstrate the diversity of hydrophobic chemical additives that can be dispersed in water. As discussed previously, the capacity for a meal to disperse such additives is a surprising result of the presence of a water-insoluble/water-dispersible protein fraction within the meal.

One of the important benefits of this feature is that adhesive compositions can be prepared with mixtures of ingredients that would otherwise be incompatible with one another in the absence of meal, but can be made to co-exist in water-based dispersions with the use of a plant meal, or with a water-insoluble/water-dispersible protein fraction derived therefrom. The ability to disperse various additives can be used to prepare adhesive binders with the capacity to impart unique properties during end-use, such as improved moisture resistance (i.e., with silicones, fluorinated compounds, waxes, oils), composite release characteristics (i.e., with waxes, amides, fatty acids, metal salts), and even enhanced adhesion characteristics (i.e., with organosilanes, and epoxy-functionalized compounds). More specifically, certain hydrophobic additives allow for the preparation of adhesive binder compositions with polymeric methylenediphenyl dissocyanate (PMDI) that impart enhanced moisture resistance to composites, including wood composites like Particleboard (PB), Medium Density Fiberboard (MDF), High Density Fiber Board (HDF), and Oriented Strand Board (OSB).

The experimental procedure and results below illustrate the unique dispersion capability of ground canola meal.

Experimental Procedure:

Compositions containing ground (Viterra) canola meal were prepared as follows. The identity and abundance of components in the compositions are given in Table 47. The ground canola meal had a particle size in the range of 20 μm to 70 μm. A master-batch of a 27% (w/w) dispersion of ground canola meal in water was prepared by adding 108 grams of ground canola meal to 292 grams of distilled water. The mixture was mixed with a hand held spatula to yield low viscosity dispersion. This 27% (w/w) canola meal solids master-batch was then used to test how well various hydrophobic additives were dispersed in water. Each of the formulas was qualitatively observed to form a stable dispersion upon mixing. That is, neither visible settling nor macroscopic phase separation of the additive were observed within a 72 hour period of observation. For comparative purposes, each of the dispersed ingredients was separately tested in the absence of the meal to verify that none of the ingredients was dispersible on its own (i.e., each ingredient was inherently incompatible with water and was observed to immediately phase separate upon mixing with water).

TABLE 47

ADHESIVE COMPOSITIONS CONTAINING AN ADDITIVE

| Sample No. | Weight of 27% Solids Canola Meal Dispersion (grams) | Weight Additive (grams) | Weight of Water (grams) | Weight Percent Additive Added to 27% Canola Solids Dispersion | Weight Percent Additive in Water | Additive Description |
|---|---|---|---|---|---|---|
| JM848-1 | 100 | 2.7 | 0 | 2.63 | 3.7 | BE Square 165 Amber Petroleum Microcrystalline Wax from Baker Hughes, Inc. |
| JM-849-1 | 9.5 | 0.5 | 0 | 5.0 | 7.21 | FluoroLink D-10 Fluorinated polyol from Solvay Solexis, Inc. |
| JM-849-2 | 8.0 | 2.0 | 0 | 20.0 | 34.25 | FluoroLink D-10 Fluorinated polyol from Solvay Solexis, Inc. |
| JM-849-3 | 0 | 2.0 | 8.0 | 0 | 25.0 | FluoroLink D-10 Fluorinated polyol |

TABLE 47-continued

ADHESIVE COMPOSITIONS CONTAINING AN ADDITIVE

| Sample No. | Weight of 27% Solids Canola Meal Dispersion (grams) | Weight Additive (grams) | Weight of Water (grams) | Weight Percent Additive Added to 27% Canola Solids Dispersion | Weight Percent Additive in Water | Additive Description |
|---|---|---|---|---|---|---|
| JM-850-1 | 8.0 | 2.0 | 0 | 20.0 | 34.25 | from Solvay Solexis, Inc. Tego Protect-5000 functionalized silicone fluid from Evonik Tego Chemie GmbH |
| JM-850-2 | 0 | 2.0 | 8.0 | 0 | 25.0 | Tego Protect-5000 functionalized silicone fluid from Evonik Tego Chemie GmbH |
| JM-851-1 | 8.0 | 2.0 | 0 | 20 | 34.25 | Soy Lecithin from Stakich, Inc. |
| JM-851-2 | 0 | 2.0 | 8.0 | 0 | 25.0 | Soy Lecithin from Stakich, Inc. |
| JM-852-1 | 8.0 | 2.0 | 0 | 20 | 34.25 | Castor Oil from Sigma-Aldrich |
| JM-852-2 | 0 | 2.0 | 8.0 | 0 | 25.0 | Castor Oil from Sigma-Aldrich |
| JM-855-1 | 9.5 | 0.5 | 0 | 20 | 7.21 | Zinc Stearate from Sigma-Aldrich, Inc. |
| JM-855-2 | 0 | 0.5 | 9.5 | 5 | 5.26 | Zinc Stearate from Sigma-Aldrich, Inc. |
| JM-855-3 | 8.0 | 2.0 | 0 | 20 | 34.25 | Dow Corning FS-1265 Fluid, 300 cST (Trifluoropropyl Methicone) from Dow Corning |
| JM-855-4 | 0 | 2.0 | 8 | 0 | 25.0 | T-Sil-80, hydroxy terminated polydimethylsiloxane from Siovation, Inc. |
| JM-855-5 | 8.0 | 2.0 | 0 | 20 | 34.25 | T-Sil-80, hydroxy terminated polydimethylsiloxane from Siovation, Inc. |
| JM-855-6 | 0 | 2.0 | 8 | 0 | 25.0 | T-Sil-80, hydroxy terminated polydimethylsiloxane from Siovation, Inc. |

Sample JM-848-1 was prepared by weighing 100 grams of the 27% by weight canola meal dispersion into a small wide mouth jar with a metal screw cap lid and placing the jar in a gravity oven set to a temperature of 90° C. The BE Square-165™ wax (a solid at 23° C.) was separately melted at 90° C. After approximately 1 hour, the jar was removed from the oven and 2.7 grams of the molten wax was added to the 90° C. canola meal/water dispersion while mixing. The molten wax was observed to mix and disperse with ease. As the mixture cooled, the viscosity increased slightly but the dispersion remained homogenous. No change in viscosity or homogeneity of the dispersion was observed after 1 hour, 6 hours, 24 hours, 48 hours, or even after 72 hours of observation. This example demonstrates that a meal or water-insoluble/water-dispersible protein fraction derived therefrom can be used to disperse solid additives (such as waxes) in water.

Sample JM-849-1 was prepared by weighing 9.5 grams of the 27% by weight solids canola meal master-batch into a 25 mL disposable, tri-pour beaker. An aliquot (0.5 grams) of Fluorolink D-10™ was added to the 27% by weight solids master-batch. The sample was mixed by hand using a laboratory spatula. The sample mixed easily and no change in viscosity or homogeneity of the dispersion was observed after 1 hour, 6 hours, 24 hours, 48 hours, or 72 hours. This example demonstrates that a meal or a water-insoluble/water-dispersible protein fraction derived therefrom can be used to disperse highly hydrophobic and lipophobic additives (such as fluorinated compounds) in water.

Sample JM-849-2 was prepared by weighing 8.0 grams of the 27% by weight solids canola meal master-batch into a 25 mL disposable, tri-pour beaker. An aliquot (2.0 grams) of Fluorolink D-10™ was added to the 27% by weight solids master-batch. The sample was mixed by hand using a laboratory spatula. The sample mixed easily and no change in viscosity or homogeneity of the dispersion was observed after 1 hour, 6 hours, 24 hours, 48 hours, or 72 hours.

Samples JM-849-1 and 849-2 were compared to sample JM-849-3, which was prepared by weighing 8.0 grams of distilled water into a 25 mL disposable, tri-pour beaker. 2.0 grams of Fluorolink D-10™ was added to the water. Sample JM-849-3 showed complete phase separation immediately.

Sample JM-850-1 was prepared by weighing 8.0 grams of the 27% by weight solids canola meal master-batch into a 25 ml disposable, tri-pour beaker. An aliquot (2.0 grams) of a silicone-based product, Tego Protect-5000™, was added to the 27% by weight solids master-batch. The sample was mixed by hand using a laboratory spatula. The sample mixed easily. The viscosity decreased slightly. No observable phase separation or change in homogeneity of the dispersion was observed after 1 hour, 6 hours, 24 hours, 48 hours, or 72 hours. This example demonstrates that a meal or a water-insoluble/water-dispersible protein fraction derived therefrom can be used to disperse highly hydrophobic and lipophobic additives (such as silicone-containing compounds) in water.

Sample JM-850-1 was compared to sample JM-850-2, which was prepared by weighing 8.0 grams of distilled water into a 25 mL disposable, tri-pour beaker. 2.0 grams of Tego Protect-5000™ was added to the water. Sample JM-850-2 showed complete phase separation immediately.

Sample JM-851-1 was prepared by weighing 8.0 grams of the 27% by weight solids canola meal master-batch into a 25 mL disposable, tri-pour beaker. An aliquot (2.0 grams) of soy lecithin was added to the 27% by weight solids master-batch. The sample was mixed by hand using a laboratory spatula. The sample mixed easily. There was a slight increase in viscosity. No observable phase separation or change in homogeneity of the dispersion was observed after 1 hour, 6 hours, 24 hours, 48 hours, or 72 hours.

Sample JM-851-1 was compared to sample JM-851-2, which was prepared by weighing 8.0 grams of distilled water into a 25 ml disposable, tri-pour beaker. 2.0 grams of soy lecithin was added to the water. Sample JM-851-2 took a long time to disperse and had the consistency of egg white. Its consistency was significantly different from JM-851-1, which was a pourable liquid dispersion.

Sample JM-852-1 was prepared by weighing 8.0 grams of the 27% by weight solids canola meal master-batch into a 25 mL disposable, tri-pour beaker. An aliquot (2.0 grams) of castor oil was added to the 27% solids master-batch. The sample was mixed by hand using a laboratory spatula. The sample mixed easily and no change in viscosity or homogeneity of the dispersion was observed after 1 hour, 6 hours, 24 hours, 48 hours, or 72 hours.

Sample JM-852-1 was compared to sample JM-852-2, which was prepared by weighing 8.0 grams of distilled water into a 25 mL disposable, tri-pour beaker. An aliquot (2.0 grams) of castor oil was added to the water. Sample JM-852-2 showed complete phase separation immediately.

Sample JM-855-1 was prepared by weighing 9.5 grams of the 27% by weight solids canola meal master-batch into a 25 mL disposable, tri-pour beaker. An aliquot (0.5 grams) of solid zinc stearate powder was added to the 27% by weight solids master-batch. The sample was mixed by hand using a laboratory spatula. The sample mixed easily. The viscosity of the mixture increased slightly, but no change in homogeneity of the dispersion was observed after 1 hour, 6 hours, 24 hours, 48 hours, or 72 hours.

Sample JM-855-1 was compared to sample JM-855-2, which was prepared by weighing 9.5 grams of distilled water into a 25 mL disposable, tri-pour beaker. An aliquot (0.5 grams) of solid zinc stearate powder was added to the water. Sample JM-855-2 showed complete phase separation immediately. The zinc stearate could not be dispersed in the water.

Sample JM-855-3 was prepared by weighing 8.0 grams of the 27% by weight solids canola meal master-batch into a 25 mL disposable, tri-pour beaker. An aliquot (2.0 grams) of Dow Corning FS-1265 Fluid™ (fluoro silicone fluid) was added to the 27% by weight solids master-batch. The sample was mixed by hand using a laboratory spatula. The sample mixed easily and no change in viscosity or homogeneity of the dispersion was observed after 1 hour, 6 hours, 24 hours, 48 hours, or 72 hours.

Sample JM-855-3 was compared to sample JM-855-4, which was prepared by weighing 8.0 grams of distilled water into a 25 mL disposable, tri-pour beaker. An aliquot (2.0 grams) of Dow Corning FS-1265 Fluid™ was added to the water. Sample JM-855-4 showed complete phase separation immediately.

Sample JM-855-5 was prepared by weighing 8.0 grams of the 27% by weight solids canola meal master-batch into a 25 mL disposable, tri-pour beaker. An aliquot (2.0 grams) of T-Sil-80™ (hydroxy functional polydimethyl siloxane) was added to the 27% by weight solids master-batch. The sample was mixed by hand using a laboratory spatula. The sample mixed easily and no change in viscosity or homogeneity of the dispersion was observed after 1 hour, 6 hours, 24 hours, 48 hours, or 72 hours.

Sample JM-855-5 was compared to sample JM-855-6, which was prepared by weighing 8.0 grams of distilled water into a 25 ml disposable, tri-pour beaker. 2.0 grams of T-Sil-80™ was added to the water. Sample JM-855-6 showed complete phase separation immediately.

The samples described in this example show that the canola meal dispersion allows for the incorporation of hydrophobic additives into an aqueous dispersion of canola meal. None of these additives was soluble or dispersible when mixed with water alone.

Example 15

Use of Sodium Hydroxide and Sodium Citrate to Modulate pH

Using the procedure described in Example 14 above, a 27% by weight solids dispersion of canola meal in water was prepared. The pH of the canola meal dispersion (in distilled water) was measured to be 5.35 at 24° C. Sodium hydroxide (NaOH) was added to aliquots of the dispersion in order to measure its effect on pH and dispersion characteristics. Similarly, sodium citrate dibasic sesquihydrate (CAS #6132-05-4; $C_6H_8Na_2O_8$; 254.1 amu) obtained from Sigma-Aldrich Corporation was also added to another series of aliquots of the 27% by weight solids dispersion to determine its effect on pH and dispersion characteristics. A description of the samples and the observations are provided in Table 48.

TABLE 48

| Sample | Weight of 27% Solids Canola Meal Master-Batch (grams) | Weight NaOH (grams) | Weight di-Na-Citrate (grams) | pH at 24° C. | Qualitative Observations |
| --- | --- | --- | --- | --- | --- |
| JM-856-1 | 24.75 | 0.25 | 0 | 12.24 | The dispersion turned a yellow/brown color and its viscosity increased |

TABLE 48-continued

| Sample | Weight of 27% Solids Canola Meal Master-Batch (grams) | Weight NaOH (grams) | Weight di-Na-Citrate (grams) | pH at 24° C. | Qualitative Observations |
|---|---|---|---|---|---|
| JM-856-2 | 24.875 | 0.125 | 0 | 9.76 | The dispersion turned a light brown color, and there was a slight increase in viscosity |
| JM-856-3 | 24.94 | 0.06 | 0 | 6.96 | No observable color change; a slight increase in viscosity was observed |
| JM-856-4 | 24.9 | 0.1 | 0 | 8.61 | The dispersion exhibited a slight color change, becoming a lighter brown color; and there was a slight increase in viscosity. |
| JM-857-1 | 24.75 | 0 | 0.25 | 5.09 | No observable color or viscosity change |
| JM-857-2 | 24.50 | 0 | 0.50 | 4.97 | No observable color or viscosity change |
| JM-857-3 | 24.0 | 0 | 1.01 | 4.81 | No color change but the viscosity appeared to decrease |
| JM-857-4 | 22.50 | 0 | 2.50 | 4.56 | No color change but the viscosity was observed to decrease |
| JM-858-1 | 24.44 | 0.06 | 0.5 | 5.5 | Na citrate was added first; no color change and little or no viscosity change was observed |
| JM-858-2 | 24.40 | 0.1 | 0.5 | 14 | Na citrate was added first; no color change and little or no viscosity change was observed |
| JM-858-3 | 24.40 | 0.1 | 0.5 | 6.3 | NaOH was added first; no color change was observed, but the viscosity was observed to increase slightly |

Data in Table 48 illustrate contrasting impact of two bases on dispersion and pH of the composition. Addition of di-sodium citrate resulted in a lowering of pH, and in a decrease in viscosity over the pH range of approximately 5.35 and 4.56. The use of di-sodium citrate alone resulted in a low viscosity composition. This is in contrast to what was observed for the incorporation of sodium hydroxide alone.

The order in which the base was added to the composition was observed to be important when both sodium hydroxide and di-sodium citrate were used together in the formulation. For example, when di-sodium citrate was added first, followed by sodium hydroxide, the resulting dispersion (JM-858-2) and pH characteristics were significantly different than where the order of addition was reversed (JM-858-3).

Results in Table 48 show that ground plant meal dispersions in water can be prepared with the addition of optional bases for the purpose of impacting properties like pH, protein structure, and dispersion viscosity. This feature can be useful in preparing adhesive binder formulations for wood composites, particularly when it is necessary to modulate properties like viscosity and pH.

Example 16

Preparation of Adhesive Compositions Containing Dispersed Additives to Enhance Moisture Resistance, and Composites Made Therefrom Multiple adhesive compositions containing dispersed additives were prepared in order to demonstrate the preparation of wood composites with better moisture resistance than analogous composites made with neat PMDI.

As shown in Example 14, multiple types of hydrophobic additives can be surprisingly dispersed in water by means of incorporating them together with either water-insoluble/water-dispersible protein fraction (isolated from meals) or with a ground plant meal that contains a sufficient amount of water-insoluble/water-dispersible protein fraction. The hydrophobic additives of Example 14 were also shown to be insoluble and non-dispersible in water (in the absence of ground plant meal). In addition, these same additives were observed to be insoluble and non-dispersible in polymeric methylenediphenyl diisocyanate (PMDI) alone.

Experimental procedures and results are provided below.

Part I—Preparation of Particleboard Composites

Experimental Procedure:

A description of additives used in the present example is provided in Table 49 together with the composition of the cured composites. Wet adhesive compositions used to disperse the additives and to make the composites are described in Table 50. Ground canola meal used in this example is the same as that used in Example 14.

Particleboard composites were prepared using the following procedure. Wet adhesive was slowly added to the wood particulate and the composition was mixed with a mechanical mixer. A 9-inch×9-inch×9-inch wood forming box was centered on a 12"×12"×⅛" stainless steel plate, which was covered with aluminum foil. The treated-wood was added slowly into the forming box to try to get a uniform density of adhesive coated wood particles. After all the treated-wood was added, the composition was compressed by hand with a 8⅞"× 8⅞"×¼" plywood board, and the forming box was carefully removed so that the treated particle board matte would not be disturbed. The board was removed from the top of the matte and a piece of aluminum foil was placed on top together with another 12"×12"×⅛" stainless steel plate. The particleboard matte was pressed and cured to a thickness of ¾" using the following conditions: 117 psi pressure for 10 minutes at a press platen temperature of 205° C.

The composites were cut into 6 inch by 4 inch samples. The measured densities of the boards are reported in Table 53.

Results:
Composites prepared according to the above procedures are described in Tables 49-53

TABLE 49

CURED COMPOSITE COMPOSITIONS AND ADDITIVE DESCRIPTIONS.

| Sample No. | Percent Wood in the Finished Composite | Weight Percent Canola Meal in the Finished Composite | Weight Percent Urea in the Finished Composite | Weight Percent Additive 1 in the Finished Composite | Weight Percent Additive 2 in the Finished Composite | Weight Percent PMDI in the Finished Composite | Additive Description |
|---|---|---|---|---|---|---|---|
| JM-930-1 | 96.83 | 1.17 | 0.09 | 0.16 | 0 | 1.75 | Additive-1 = Tego Protect-5000 functionalized silicone fluid from Evonik Tego Chemie GmbH |
| JM-930-2 | 96.83 | 1.17 | 0.09 | 0.16 | 0 | 1.75 | Additive-1 = T-Sil-80, hydroxy terminated polydimethylsiloxane from Siovation, Inc. |
| JM-930-3 | 96.5 | 1.57 | 0.09 | 0.09 | 0 | 1.75 | Additive-1 = T-Sil-80, hydroxy terminated polydimethylsiloxane from Siovation, Inc. |
| JM-930-4 | 96.83 | 0.93 | 0.09 | 0.08 | 0.32 | 1.75 | Additive-1 = T-Sil-80, from Siovation, Inc.; Additive-2 = Stearic Acid from Sigma Aldrich |
| JM-930-5 | 96.5 | 1.43 | 0.09 | 0.22 | 0 | 1.75 | Additive-1 = T-Sil-80, hydroxy terminated polydimethylsiloxane from Siovation, Inc. |
| JM-930-6 | 96.83 | 1.17 | 0.09 | 0.16 | 0 | 1.75 | Additive-1 = T-Sil-6011 SE Emulsion (60% Solids), from Siovation, Inc. |
| JM-930-7 | 96.83 | 1.17 | 0.09 | 0.16 | 0 | 1.75 | Additive-1 = Masurf FS 115 Emulsion (28% Solids), Mason Chemical Company |
| JM-930-8 | 97.74 | 0 | 0 | 0 | 0 | 2.26 | Rubinate-M from Huntsman Corporation |

TABLE 50

WET ADHESIVE COMPOSITIONS (WEIGHT PERCENT)

| Sample No. | Percent Water (Part B Component) | Percent Canola Meal (Part B Component) | Percent Urea (Part B Component) | Percent Additive-1 (Part B Component) | Percent Additive-2 (Part B Component) | Percent PMDI (Part A Component) | Total |
|---|---|---|---|---|---|---|---|
| JM-930-1 | 49.87 | 18.44 | 1.38 | 2.55 | 0 | 27.76 | 100 |
| JM-930-2 | 49.87 | 18.44 | 1.38 | 2.55 | 0 | 27.76 | 100 |
| JM-930-3 | 54.90 | 20.30 | 1.12 | 1.12 | 0 | 22.56 | 100 |
| JM-930-4 | 44.27 | 16.36 | 1.53 | 1.39 | 5.59 | 30.86 | 100 |

TABLE 50-continued

WET ADHESIVE COMPOSITIONS (WEIGHT PERCENT)

| Sample No. | Percent Water (Part B Component) | Percent Canola Meal (Part B Component) | Percent Urea (Part B Component) | Percent Additive-1 (Part B Component) | Percent Additive-2 (Part B Component) | Percent PMDI (Part A Component) | Total |
|---|---|---|---|---|---|---|---|
| JM-930-5 | 52.58 | 19.45 | 1.18 | 3.07 | 0 | 23.72 | 100 |
| JM-930-6 | 49.87 | 18.44 | 1.38 | 2.55 | 0 | 27.76 | 100 |
| JM-930-7 | 49.87 | 18.44 | 1.38 | 2.55 | 0 | 27.76 | 100 |
| JM-930-8 | 0 | 0 | 0 | 0 | 0 | 100 | 100 |

TABLE 51

PARTICLE BOARD COMPOSITE DENSITY

| Sample No. | Board Density (g/cm³) | Board Density (lb/ft³) |
|---|---|---|
| JM-930-1 | 0.536 | 33.45 |
| JM-930-2 | 0.545 | 34.02 |
| JM-930-3 | 0.547 | 34.17 |
| JM-930-4 | 0.543 | 33.92 |
| JM-930-5 | 0.545 | 34.05 |
| JM-930-6 | 0.546 | 34.06 |
| JM-930-7 | 0.539 | 33.63 |
| JM-930-8 | 0.524 | 32.73 |

Part II—Testing Particleboard Composites for Resistance to Moisture

Water-soak studies were performed to test moisture resistance of the cured composites. Experimental procedures and results are provided below.

Experimental Procedures:

The weight of each 6"×4" sample was measured prior to the soaking experiment. The boards were placed vertically in a 17"×11"×1" Teflon coated pan as depicted in FIGS. 22 and 23. One liter of distilled water (colored blue with food coloring) was slowly added to the pan. The percentage weight change of each composite (soaked weight/initial weight× 100%) was measured as a function of soaking time (Table 52). In addition, the distance that the colored water had migrated into the board was clearly visible and was also measured as a function of time.

Figure 26:
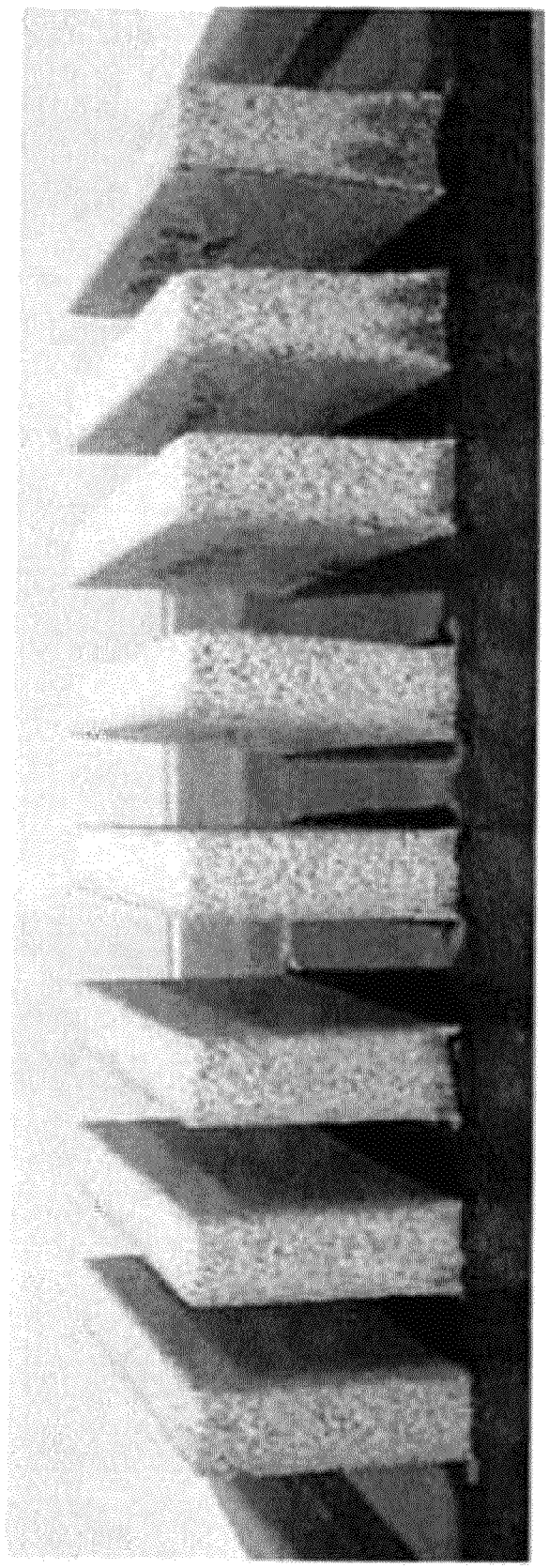
FIG. 26 shows particle board composites that have been soaked in water for 30 minutes, as described further in Example 16.
Figure 27:
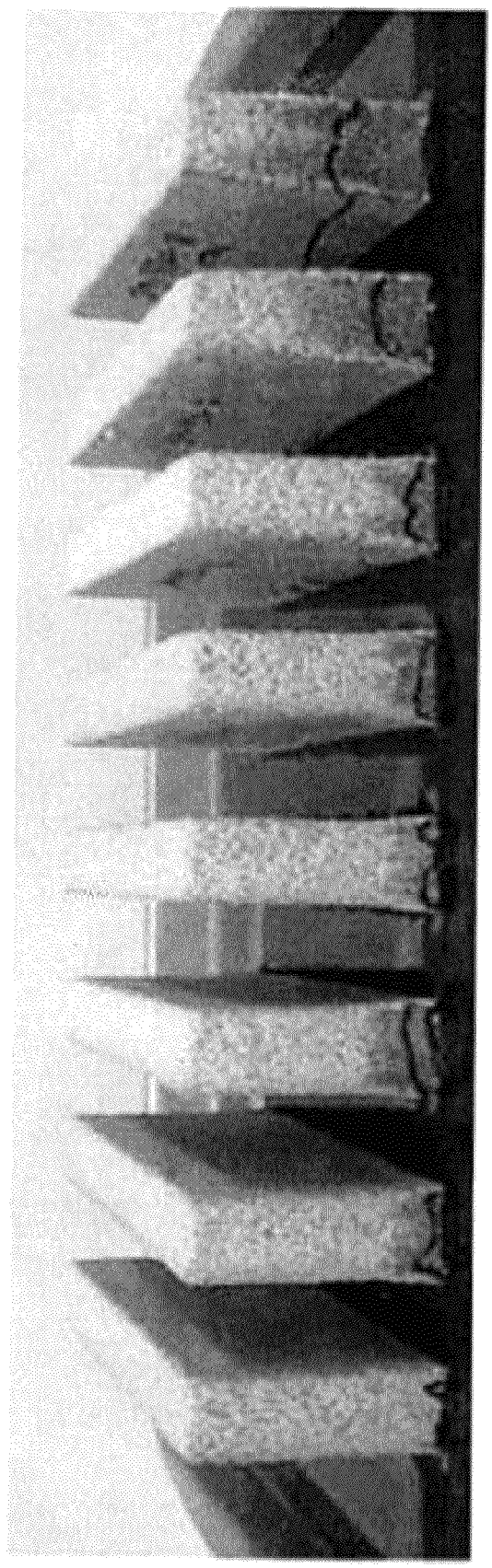
FIG. 27 shows particle board composites that have been soaked in water for 1 hour, as described further in Example 16.
Figure 28:
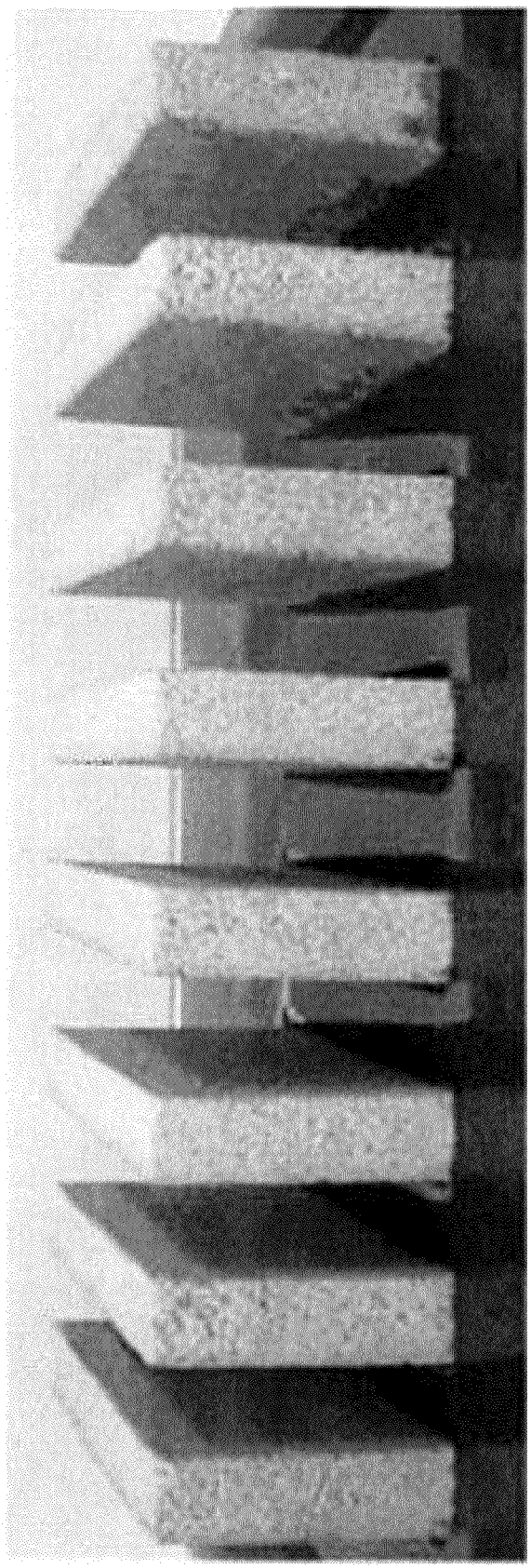
FIG. 28 shows particle board composites that have been soaked in water for 30 minutes, as described further in Example 17.
Figure 29:
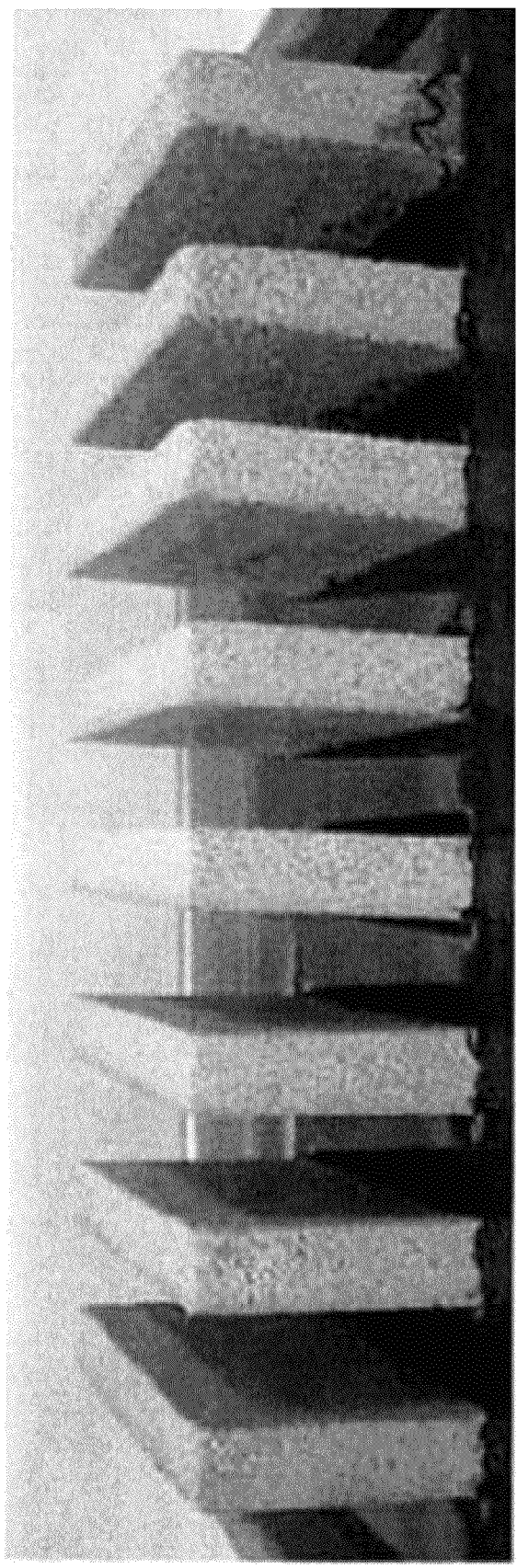
FIG. 29 shows particle board composites that have been soaked in water for 1 hour, as described further in Example 17.
Figure 30:
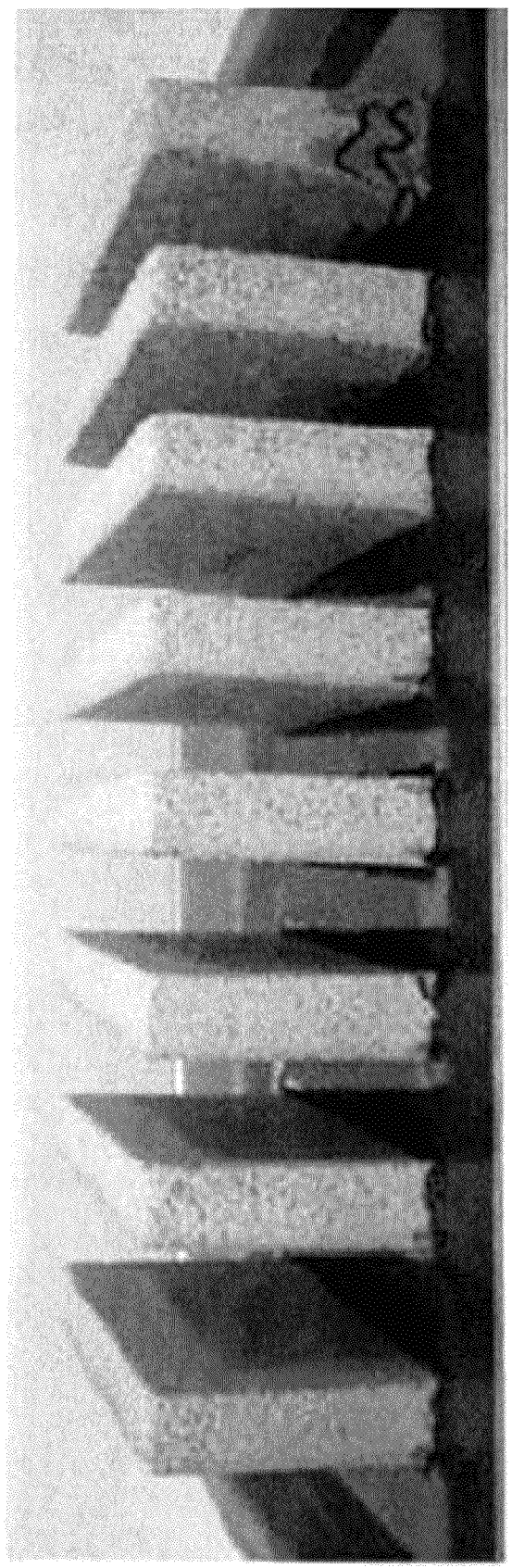
FIG. 30 shows particle board composites that have been soaked in water for 3 hours, as described further in Example 17.
Figure 31:
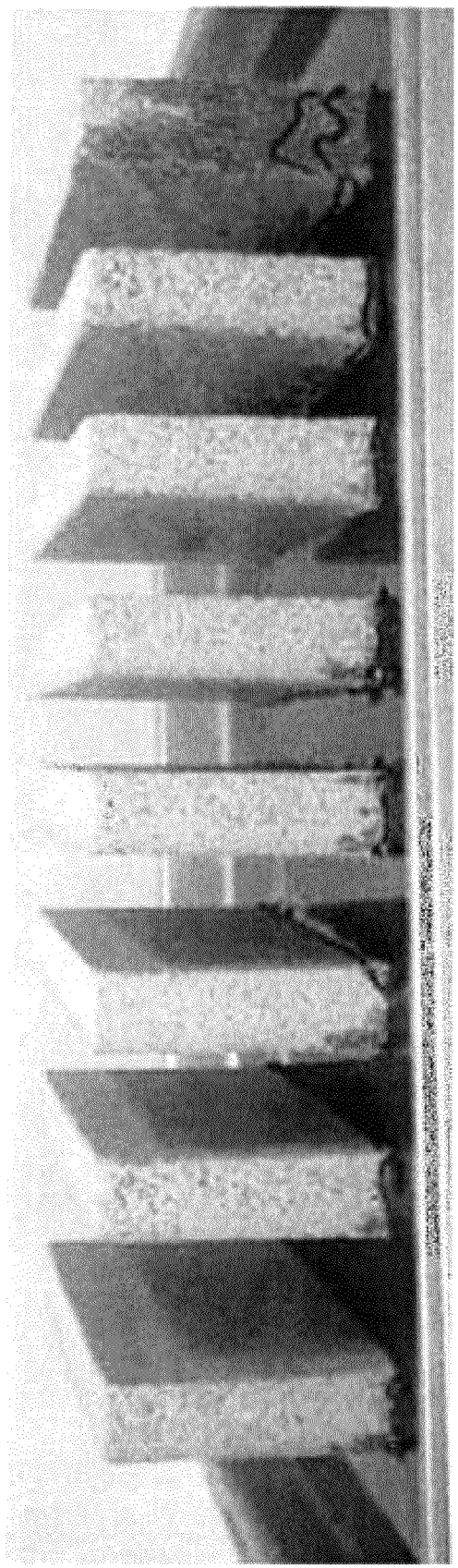
FIG. 31 shows particle board composites that have been soaked in water for 24 hours, as described further in Example 17.
Figure 32:
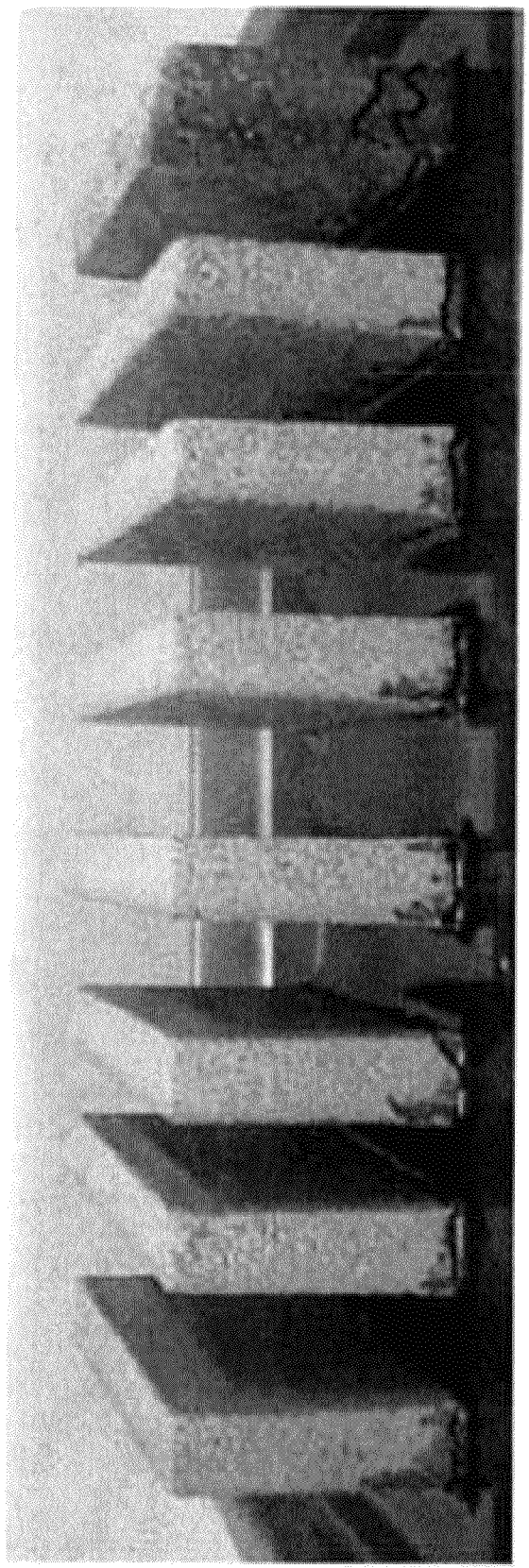
FIG. 32 shows particle board composites that have been soaked in water for 48 hours, as described further in Example 17.

Results:

As illustrated by FIGS. 26 and 27, sample JM-930-8 (the neat PMDI control) exhibited the greatest amount of water ingress into the particleboard. Other boards exhibited significantly less water ingress, in spite of being cured with less PMDI. Lines drawn on the boards in FIG. 27 depict the position of the water ingress after 30 minutes. Data in Table 52 show the increase in weight due to the ingress of water into the samples as a function of time. All of the protein-containing samples had a less water weight gain than the control sample (JM-930-8).

TABLE 52

PERCENT CHANGE IN SAMPLE WEIGHT AFTER SOAKING IN WATER

| Sample No. | Initial Weight (grams) | Percent Weight Change After Soaking 5 Minutes (grams) | Percent Weight Change After Soaking 30 Minutes (grams) | Percent Weight Change After Soaking 1 Hr (grams) |
|---|---|---|---|---|
| JM-930-1 | 107.05 | 0.635 | 1.794 | 3.167 |
| JM-930-2 | 110.58 | 1.212 | 6.574 | 19.343 |
| JM-930-3 | 111.06 | 1.171 | 7.636 | 23.375 |
| JM-930-4 | 112.52 | 0.907 | 5.199 | 17.046 |
| JM-930-5 | 111.23 | 1.187 | 7.489 | 22.791 |
| JM-930-6 | 110.16 | 1.244 | 8.125 | 24.147 |
| JM-930-7 | 109.88 | 1.893 | 21.733 | 48.981 |
| JM-930-8 | 108.02 | 2.740 | 36.614 | 78.319 |

Example 17

Evaluation of Moisture Resistance for Wood Composites Prepared from Adhesive Composition Comprising Ground Plant Meal and a Hydrophobic Additive Particleboard wood composites were prepared using adhesive compositions containing ground plant meal and a hydrophobic additive. In addition, certain compositions contained glycerin in place of a portion of the water that was used to prepare the adhesive composition. Wood composites were tested for moisture resistance.

Glycerin, because it can react with PMDI, can be considered a non-volatile component in the cured composite composition. Moreover, because glycerin is a water-compatible liquid, it can be used to replace a fraction of the water in a wet adhesive composition without significantly impacting the relative viscosity of the composition. Thus, an additive like glycerin can be used to reduce the amount of volatile water in a wet adhesive composition. One benefit of using glycerin in this way is that it can be desirable to minimize the weight percent of moisture that is added to a composite prior to and during a high temperature press-cure process—too much moisture can lead to steam-induced expansion and cohesive failure of the composite when pressure is relieved during opening of the press platens (i.e., while the composite is still hot and while the added-water is still in its vapor state). Minimization of added-water can reduce the probability of this type of in-process failure.

In this example, higher levels of PMDI were incorporated into the composites than those made in Example 16. In addition, for comparative purposes, a composite was prepared with a higher percentage of neat PMDI than that which was used in Example 16. Experimental procedures and results are provided below.

Experimental Procedures:

Experimental procedures were identical to those described in Example 16. The cured composite compositions are described in Table 53. Wet adhesive compositions are described in Table 54. Densities of the resulting composites are provided in Table 55. Additives used in the example are glycerin from Sigma Aldrich, stearic acid from Sigma Aldrich, and Tego Protect-5000 functionalized silicone fluid from Evonik Tego Chemie GmbH. The ground canola meal used in this example was the same as that used in Example 14.

Results:

Cured particleboard composite compositions are described in Table 53. Wet adhesive compositions are described in Table 54. Densities of the resulting composites are provided in Table 55. Moisture resistance properties are illustrated in Table 56 and FIGS. 28-32. As illustrated in FIGS. 28-32 and data in Table 56, composites made with the adhesives of the present invention exhibited less moisture ingress than the comparative composite prepared with neat PMDI, in spite of being cured with less PMDI (3.69% to 5.0% vs. 5.5%). In addition, the comparative wet adhesive compositions that were made with and without glycerin (26-14 & 26-14G; 28-14 & 28-14G; and 28-4 & 28-4 G, respectively) were qualitatively observed to exhibit similar rheological characteristics, independent of the use of glycerin in place of a fraction of the water. Moreover, glycerin had no significant impact on the moisture resistance of the cured composites.

Thus, the data demonstrates that by using the unique dispersing capability of ground plant meal, it is possible to prepare adhesive compositions that impart excellent moisture resistance. Moreover, as demonstrated here, the liquid vehicle for the wet adhesive composition can contain water alone, or it can be optionally comprised of other water-compatible liquids (reactive or non-reactive). In this case, the optional water-compatible liquid (glycerin) was known to be reactive with PMDI.

TABLE 53

CURED COMPOSITES

| Sample No. | Percent Wood in the Finished Composite | Weight Percent Canola Meal in the Finished Composite | Weight Percent Urea in the Finished Composite | Weight Percent Glycerin in the Finished Composite | Weight Percent Stearic Acid in the Finished Composite | Weight Percent Tego Protect 5000 in the Finished Composite | Weight Percent PMDI in the Finished Composite |
|---|---|---|---|---|---|---|---|
| JM-26-5 | 94.08 | 1.51 | 0.23 | 0 | 0 | 0.05 | 4.13 |
| JM-26-14 | 91.92 | 2.5 | 0.23 | 0 | 0.25 | 0.1 | 5.0 |
| JM-26-14G | 90.67 | 2.5 | 0.23 | 1.25 | 0.25 | 0.1 | 5.0 |
| JM-28-14 | 91.92 | 2.5 | 0.23 | 0 | 0.25 | 0.1 | 5.0 |
| JM-28-14G | 90.67 | 2.5 | 0.23 | 1.25 | 0.25 | 0.1 | 5.0 |
| JM-28-4 | 93.99 | 1.19 | 0.23 | 0 | 0.75 | 0.15 | 3.69 |
| JM-28-4G | 93.07 | 1.19 | 0.23 | 0.92 | 0.75 | 0.15 | 3.69 |
| PMDI Control | 94.5 | 0 | 0 | 0 | 0 | 0 | 5.5 |

TABLE 54

WET ADHESIVE COMPOSITIONS (WEIGHT PERCENT)

| Sample No. | Percent Water (Part-B Component) | Percent Canola Meal (Part-B Component) | Percent Meal Dispersed in Liquid Vehicle in Part-B (w/w) | Percent Urea (Part-B Component) | Percent Glycerin (Part-B Component) | Percent Stearic Acid (Part-B Component) | Percent Tego Protect 5000 (Part-B Component) | Percent PMDI (Part-A Component) |
|---|---|---|---|---|---|---|---|---|
| JM-26-5 | 42.0 | 14.77 | 26 | 2.28 | 0 | 0 | 0.53 | 40.42 |
| JM-26-14 | 46.75 | 16.45 | 26 | 1.54 | 0 | 1.66 | 0.71 | 32.90 |
| JM-26-14G | 35.82 | 16.45 | 26 | 1.54 | 10.92 | 1.66 | 0.71 | 32.90 |
| JM-28-14 | 44.24 | 17.24 | 28 | 1.61 | 0 | 1.72 | 0.74 | 34.45 |
| JM-28-14G | 32.77 | 17.24 | 28 | 1.61 | 11.47 | 1.72 | 0.74 | 34.45 |
| JM-28-4 | 33.73 | 13.10 | 28 | 2.58 | 0 | 8.33 | 1.59 | 40.67 |
| JM-28-4G | 21.23 | 13.10 | 28 | 2.58 | 13.55 | 8.33 | 1.59 | 40.67 |
| PMDI Control | 0 | 0 | 0 | 0 | 0 | 0 | 0 | 100 |

TABLE 55

PARTICLE BOARD DENSITY VALUES

| Sample No. | Board Density (g/cm$^3$) | Board Density (lb/ft$^3$) |
| --- | --- | --- |
| JM-26-5 | 0.55 | 34.34 |
| JM-26-14 | 0.55 | 34.34 |
| JM-26-14G | 0.60 | 37.46 |
| JM-28-14 | 0.57 | 35.58 |
| JM-28-14G | 0.61 | 38.08 |
| JM-28-4 | 0.57 | 35.58 |
| JM-28-4G | 0.54 | 33.71 |
| PMDI Control | 0.53 | 33.08 |

TABLE 56

PERCENTAGE CHANGE IN COMPOSITE SAMPLE WEIGHT AFTER SOAKING IN WATER

| Sample No. | Initial Weight (grams) | Percent Weight Change After Soaking 5 Minutes (grams) | Percent Weight Change After Soaking 30 Minutes (grams) | Percent Weight Change After Soaking 1 Hr (grams) | Percent Weight Change After Soaking 3 Hr (grams) | Percent Weight Change After Soaking 24 Hr (grams) | Percent Weight Change After Soaking 48 Hr (grams) |
| --- | --- | --- | --- | --- | --- | --- | --- |
| JM-26-5 | 117.49 | 0.740 | 1.787 | 2.673 | 3.881 | 7.711 | 10.469 |
| JM-26-14 | 116.17 | 0.758 | 1.575 | 2.298 | 3.202 | 5.965 | 7.842 |
| JM-26-14G | 128.94 | 0.853 | 1.660 | 2.435 | 3.428 | 6.615 | 8.787 |
| JM-28-14 | 121.67 | 0.510 | 1.405 | 2.178 | 3.156 | 6.296 | 8.186 |
| JM-28-14G | 130.41 | 0.736 | 1.633 | 2.392 | 3.366 | 6.618 | 8.864 |
| JM-28-4 | 122.09 | 0.278 | 1.048 | 1.851 | 2.760 | 5.668 | 7.609 |
| JM-28-4G | 116.63 | 0.300 | 1.295 | 2.152 | 3.181 | 6.748 | 9.149 |
| PMDI Control | 114.52 | 1.572 | 5.754 | 13.482 | 25.428 | 64.618 | 85.147 |

Example 18

Oriented Strand Board (OSB) Composites Having Improved Moisture Resistance Made from Adhesive Compositions Containing PMDI and Optional Additives Adhesive compositions comprising ground canola meal were used to make oriented strand board (OSB) composites, based on experimental procedures described in Example 13. Composites were prepared with higher effective levels of PMDI, and with one of the additives described in Examples 14, 16 or 17 (Tego Protect-5000™). More specifically, the objective was to manufacture aspen wood oriented strand board (OSB) panels (²³⁄₃₂"×24"×24") with canola meal-based adhesive compositions. A total of sixteen canola meal-based formulas were prepared as part of a Taguchi experimental design. OSB panels were prepared and tested for flexure properties (MOE and MOR), and the percent water absorption/thickness swell properties (% TS). Two replicates of each experimental OSB panel were made from each individual blend load. For comparative purposes, two OSB panels were also made using neat PMDI as a binder.

Experimental Procedures:

Aspen strands were used as received from J. M. Huber Corporation of Easton, Me. (average moisture content of approximately 6.5% on an oven dried basis). PMDI (polymeric methylenediphenyl di-isocyanate) used was Rubinate-M, obtained from Huntsman Polyurethanes, Woodlands, Tex. Wax used was Hexion EW-58H, a 58% solids wax emulsion. The hydrophobic additive was Tego Protect-5000™ functionalized silicon fluid from Evonik Tego Chemie GmbH. Canola meal was obtained from Viterra Canola Processing Step. Agathe, Manitoba, Canada. The meal was ground using a Rotormill from International Process Equipment Company, Pennsauken, N.J., to a particle size in the range of approximately 20 μm to 70 μm. The Taguchi designed experiment (DOE) consisted of 16 formulations with four factors studied over 4 levels: (1) the percent PMDI in the cured composite, (2) the percent Tego Protect-5000™ in the cured composite, (3) the weight ratio of PMDI/ground meal on a solids basis, and (4) the percent of urea in the cured composite. The Taguchi design is presented in Table 57. All experimental methods for mixing, wood treatment and composite preparation were the same as in Example 13. The composition of the wet adhesive is described in Table 58.

TABLE 57

TAGUCHI EXPERIMENTAL DESIGN FOR OSB FORMULATIONS

| Sample No. | Percent PMDI in the Cured OSB Composite (Oven Dried Basis) | Percent Tego Protect-5000 ™ in the Cured OSB Composite (Oven Dried Basis) | Weight Ratio of PMDI/Ground Meal (Solids Basis) | Percent Urea in the Cured OSB Composite (Oven Dried Basis) |
| --- | --- | --- | --- | --- |
| 1 | 3.69 | 0.00 | 2.00 | 0.06 |
| 2 | 3.69 | 0.05 | 2.40 | 0.12 |
| 3 | 3.69 | 0.10 | 2.80 | 0.17 |
| 4 | 3.69 | 0.15 | 3.20 | 0.23 |
| 5 | 4.00 | 0.05 | 2.80 | 0.23 |
| 6 | 4.00 | 0.00 | 3.20 | 0.17 |
| 7 | 4.00 | 0.15 | 2.00 | 0.12 |
| 8 | 4.00 | 0.10 | 2.40 | 0.06 |
| 9 | 4.30 | 0.10 | 3.20 | 0.12 |
| 10 | 4.30 | 0.15 | 2.80 | 0.06 |
| 11 | 4.30 | 0.00 | 2.40 | 0.23 |
| 12 | 4.30 | 0.05 | 2.00 | 0.17 |
| 13 | 4.61 | 0.15 | 2.40 | 0.17 |
| 14 | 4.61 | 0.10 | 2.00 | 0.23 |
| 15 | 4.61 | 0.05 | 3.20 | 0.06 |
| 16 | 4.61 | 0.00 | 2.80 | 0.12 |
| PMDI Control | 5.00 | 0.00 | — | 0.00 |

TABLE 58

COMPOSITION OF THE WET ADHESIVES (WEIGHT PERCENT)

| Sample No. | Percent Water (PART-B Component) | Percent Canola Meal (PART-B Component) | Percent Urea (PART-B Component) | Percent Tego Protect-5000 ™ (PART-B Component) | Percent PMDI (PART-A Component) | Total Percent |
|---|---|---|---|---|---|---|
| 1 | 48.42 | 17.01 | 0.55 | 0.00 | 34.02 | 100.00 |
| 2 | 44.37 | 15.86 | 1.20 | 0.51 | 38.06 | 100.00 |
| 3 | 40.70 | 14.80 | 1.94 | 1.11 | 41.44 | 100.00 |
| 4 | 37.38 | 13.83 | 2.75 | 1.80 | 44.24 | 100.00 |
| 5 | 40.77 | 14.82 | 2.39 | 0.51 | 41.51 | 100.00 |
| 6 | 38.39 | 14.20 | 1.97 | 0.00 | 45.44 | 100.00 |
| 7 | 47.60 | 16.72 | 0.97 | 1.25 | 33.45 | 100.00 |
| 8 | 44.45 | 15.89 | 0.56 | 0.95 | 38.14 | 100.00 |
| 9 | 38.27 | 14.16 | 1.23 | 1.05 | 45.30 | 100.00 |
| 10 | 41.13 | 14.96 | 0.58 | 1.46 | 41.88 | 100.00 |
| 11 | 44.22 | 15.81 | 2.03 | 0.00 | 37.94 | 100.00 |
| 12 | 47.84 | 16.81 | 1.35 | 0.39 | 33.62 | 100.00 |
| 13 | 43.95 | 15.71 | 1.41 | 1.23 | 37.70 | 100.00 |
| 14 | 47.52 | 16.70 | 1.66 | 0.72 | 33.40 | 100.00 |
| 15 | 38.74 | 14.33 | 0.59 | 0.49 | 45.85 | 100.00 |
| 16 | 41.54 | 15.10 | 1.07 | 0.00 | 42.29 | 100.00 |

Results:

Compositions of the dry-cured OSB composites are provided in Table 59. One additional version of composite #13 was made without wax—the wax was replaced with a proportional amount of the adhesive binder. Water absorption measurements for the OSB composites are provided in Table 60, which provides the percent thickness of OSB swell on the edge and 1-inch from the edge after 24-hours of soaking in water. Values for the modulus of rupture (MOR) and modulus of elasticity (MOE) are provided in Table 61.

TABLE 59

COMPOSITIONS OF CURED OSB COMPOSITES (WEIGHT PERCENTAGE BASIS)

| Sample No. | Percent Wood in Composite | Percent Total Binder in Composite (Wax + Adhesive) | Percent PMDI in Composite | Percent Canola Meal in Composite | Percent Urea in Composite | Percent Tego Protect-5000 ™ in the Composite | Percent Wax in Composite |
|---|---|---|---|---|---|---|---|
| 1 | 93.66 | 6.34 | 3.69 | 1.85 | 0.06 | 0.00 | 0.75 |
| 2 | 93.86 | 6.14 | 3.69 | 1.54 | 0.12 | 0.05 | 0.75 |
| 3 | 93.97 | 6.03 | 3.69 | 1.32 | 0.17 | 0.10 | 0.75 |
| 4 | 94.03 | 5.97 | 3.69 | 1.15 | 0.23 | 0.15 | 0.75 |
| 5 | 93.54 | 6.46 | 4.00 | 1.43 | 0.23 | 0.05 | 0.75 |
| 6 | 93.83 | 6.17 | 4.00 | 1.25 | 0.17 | 0.00 | 0.75 |
| 7 | 92.98 | 7.02 | 4.00 | 2.00 | 0.12 | 0.15 | 0.75 |
| 8 | 93.42 | 6.58 | 4.00 | 1.67 | 0.06 | 0.10 | 0.75 |
| 9 | 93.39 | 6.61 | 4.30 | 1.34 | 0.12 | 0.10 | 0.75 |
| 10 | 93.21 | 6.79 | 4.30 | 1.54 | 0.06 | 0.15 | 0.75 |
| 11 | 92.93 | 7.07 | 4.30 | 1.79 | 0.23 | 0.00 | 0.75 |
| 12 | 92.58 | 7.42 | 4.30 | 2.15 | 0.17 | 0.05 | 0.75 |
| 13 | 92.40 | 7.60 | 4.61 | 1.92 | 0.17 | 0.15 | 0.75 |
| 14 | 92.01 | 7.99 | 4.61 | 2.31 | 0.23 | 0.10 | 0.75 |
| 15 | 93.09 | 6.91 | 4.61 | 1.44 | 0.06 | 0.05 | 0.75 |
| 16 | 92.88 | 7.12 | 4.61 | 1.65 | 0.12 | 0.00 | 0.75 |
| 13-no wax | 92.40 | 7.60 | 5.11 | 2.13 | 0.19 | 0.17 | 0.00 |
| PMDI | 94.25 | 5.75 | 5.00 | 0.00 | 0.00 | 0.00 | 0.75 |

TABLE 60

MOISTURE RESISTANCE MEASUREMENTS FOR OSB COMPOSITES*

| Sample No. | Average Density (lbs./ft.$^3$) | Mean Percent Thickness Swell from Water Absorption (at the Sample Edge) | Standard Deviation of Percent Thickness Swell from Water Absorption (at the Sample Edge) | Student-\|t\| Value and Significance of Difference between the Sample Mean and the PMDI Sample Mean | Mean Percent Thickness Swell from Water Absorption (1-Inch from Edge) | Standard Deviation of Percent Thickness Swell from Water Absorption (1-Inch from Edge) | Student-\|t\| Value and Significance of Difference between the Sample Mean and the PMDI Sample Mean |
|---|---|---|---|---|---|---|---|
| 1 | 41.7 | 15.4 | 0.8 | 4.66; S | 5.1 | 0.5 | 0.05; NS |
| 2 | 41.6 | 16.4 | 1.0 | 6.56; S | 5.3 | 0.6 | 0.67; NS |
| 3 | 41.1 | 15.5 | 0.8 | 4.93; S | 5.7 | 0.7 | 1.76; NS |
| 4 | 41.8 | 15.8 | 0.6 | 6.34; S | 6.0 | 0.7 | 2.59; S |
| 5 | 40.9 | 14.7 | 1.2 | 2.35; S | 5.4 | 0.5 | 1.24; NS |
| 6 | 41.0 | 14.6 | 0.7 | 2.56; S | 5.2 | 0.7 | 0.59; NS |
| 7 | 42.0 | 14.0 | 0.9 | 0.71; NS | 4.9 | 0.6 | 0.26; NS |
| 8 | 41.2 | 14.7 | 1.0 | 2.58; S | 5.3 | 0.5 | 0.89; NS |
| 9 | 41.6 | 14.2 | 1.1 | 1.08; NS | 5.7 | 1.0 | 1.75; NS |
| 10 | 41.1 | 14.3 | 0.8 | 1.74; NS | 5.2 | 0.6 | 0.58; NS |
| 11 | 41.4 | 15.1 | 1.3 | 2.84; S | 5.5 | 0.6 | 1.33; NS |
| 12 | 41.0 | 14.3 | 0.8 | 1.60; NS | 5.4 | 1.0 | 0.97; NS |
| 13 | 41.3 | 14.3 | 0.8 | 1.53; NS | 5.0 | 0.7 | 0.21; NS |
| 14 | 41.2 | 13.5 | 0.7 | 0.67; NS | 5.0 | 0.6 | 0.02; NS |
| 15 | 39.7 | 14.3 | 0.9 | 1.45; NS | 5.4 | 0.7 | 1.19; NS |
| 16 | 40.5 | 14.5 | 0.7 | 2.22; S | 5.8 | 0.9 | 1.91; NS |
| 13-no wax | 40.2 | 13.4 | 0.7 | 0.75; NS | 5.9 | 0.6 | 2.40; S |
| PMDI | 41.0 | 13.7 | 0.9 | — | 5.0 | 1.0 | — |

*Resistance to moisture was measured by determining the percent thickness of swelling (at the sample edge and at a distance of 1-inch from the edge) after 24-hours of soaking the OSB composite in water. Each average and standard deviation was determined from n = 12 replicates. Student-t tests were used to compare the means of each sample set to that of the composite that was prepared with neat PMDI at a significance level of $\alpha = 0.05$ (n = 22 degrees of freedom, $t_{22,\alpha/2=0.025} = 2.074$).
A designation of "S" indicates that the means are significantly different at the 95% confidence level ($|t| > 2.074$), and a designation of "NS" indicates that the means are not significantly different at the 95% confidence level ($|t| < 2.074$).

TABLE 61

MODULUS OF ELASTICITY (MOE IN PSI) AND MODULUS OF RUPTURE (MOR IN PSI) FOR OSB COMPOSITES*

| Sample No. | Average Density (lbs./ft.$^3$) | Mean MOE (psi) | Standard Deviation of MOE (psi) | Student-\|t\| Value and Significance of Difference between the Sample Mean and the PMDI Sample Mean | Mean MOR (psi) | Standard Deviation of MOR (psi) | Student-\|t\| Value and Significance of Difference between the Sample Mean and the PMDI Sample Mean |
|---|---|---|---|---|---|---|---|
| 1 | 41.7 | 5.18E+05 | 5.E+04 | 0.97; NS | 4,068 | 664 | 1.05; NS |
| 2 | 41.6 | 5.34E+05 | 7.E+04 | 0.04; NS | 4,574 | 733 | 0.93; NS |
| 3 | 41.1 | 5.07E+05 | 6.E+04 | 1.44; NS | 4,319 | 478 | 0.04; NS |
| 4 | 41.8 | 5.67E+05 | 5.E+04 | 1.88; NS | 4,296 | 838 | 0.11; NS |
| 5 | 40.9 | 5.35E+05 | 5.E+04 | 0.01; NS | 3,858 | 552 | 2.12; S |
| 6 | 41.0 | 5.15E+05 | 7.E+04 | 0.83; NS | 4,147 | 766 | 0.67; NS |
| 7 | 42.0 | 5.04E+05 | 6.E+04 | 1.45; NS | 4,501 | 618 | 0.73; NS |
| 8 | 41.2 | 5.40E+05 | 5.E+04 | 0.31; NS | 4,400 | 527 | 0.33; NS |
| 9 | 41.6 | 5.47E+05 | 6.E+04 | 0.56; NS | 4,726 | 696 | 1.57; NS |
| 10 | 41.1 | 5.20E+05 | 5.E+04 | 0.80; NS | 4,223 | 580 | 0.46; NS |
| 11 | 41.4 | 5.33E+05 | 6.E+04 | 0.09; NS | 4,471 | 475 | 0.69; NS |
| 12 | 41.0 | 5.24E+05 | 5.E+04 | 0.60; NS | 4,153 | 805 | 0.63; NS |
| 13 | 41.3 | 5.62E+05 | 6.E+04 | 1.36; NS | 4,849 | 692 | 2.06; NS |
| 14 | 41.2 | 5.22E+05 | 5.E+04 | 0.74; NS | 4,178 | 564 | 0.67; NS |
| 15 | 39.7 | 5.02E+05 | 4.E+04 | 2.25; S | 4,358 | 639 | 0.12; NS |
| 16 | 40.5 | 5.32E+05 | 7.E+04 | 0.14; NS | 4,599 | 527 | 1.24; NS |
| 13-no wax | 40.2 | 5.33E+05 | 3.E+04 | 0.15; NS | 4,535 | 818 | 0.72; NS |
| PMDI | 41.0 | 5.35E+05 | 4.E+04 | — | 4,329 | 534 | — |

*Each average and standard deviation was determined from n = 12 replicates. Student-t tests were used to compare the means of each sample set to that of the composite that was prepared with neat PMDI at a significance level of $\alpha = 0.05$ (n = 22 degrees of freedom, $t_{22,\alpha/2=0.025} = 2.074$).
A designation of "S" indicates that the means are significantly different at the 95% confidence level ($|t| > 2.074$), and a designation of "NS" indicates that the means are not significantly different at the 95% confidence level ($|t| < 2.074$).

OSB composites exhibited a range of water absorption and physical property characteristics that generally encompassed those of the comparative composite that was made with neat PMDI. In most cases (15 out of 17 of the mean values), the percent thickness of swelling from moisture absorption 1-inch from the edge for the experimental composites was not significantly different from that of the neat PMDI composite at the 95% confidence level. In 8 out of 17 cases, the mean percent thickness of swelling at the edges of the experimental samples was not significantly different from that of the neat PMDI composite (at the 95% confidence level). In 16 out of 17 cases, the mean MOE and MOR values for the experimental samples were not significantly different from that of the neat PMDI composite (at the 95% confidence level).

Analysis of variance (ANOVA using Design Ease 7.1.6 by Stat-Ease, Inc., Minneapolis, Minn.) revealed that the MOR values, and the % TS values (at the edge of the composites, and 1-inch from the edge of the composites) were significantly affected by one or more of the controlled factors and/or by interactions between factors (Table 62). In contrast, the modulus of elasticity (MOE) was not significantly affected by the controlled factors. Consequently, the variances in the MOE values were attributed to random error.

The controlled factors and interactions described in Table 62 were used to model the physical properties of the composites (from Tables 60 and 61). To illustrate the effectiveness of the models (i.e., the relevance of the primary factors and interactions), the model-predicted MOR and % TS values were compared to the measured values as shown in Tables 63 and 64.

TABLE 62

SUMMARY OF RESULTS FOR ANALYSIS OF VARIANCE (ANOVA) IN TERMS OF THE DESIGNED EXPERIMENTAL FACTORS (USING THE MEAN RESPONSES AS LISTED IN TABLES 60 AND 61)*

| Response | Factor-A Percent PMDI | Factor-B Percent Tego Protect-5000 ™ | Factor-C PMDI/ Meal | Factor-D Percent Urea | Interaction Term & Significance | Interaction Term & Significance |
|---|---|---|---|---|---|---|
| MOE | NS | NS | NS | NS | — | — |
| MOR | NS | VS (+) | VS (+) | VS (−) | A × B; VS (−) | — |
| % Thickness Swell from Water Absorption (at the edge) | VS (−) | VS (−) | VS (−) | VS (−) | A × B; VS (−) | B × C; VS (+) |
| % Thickness Swell from Water Absorption (1-inch from edge) | NS | NS | VS (+) | VS (+) | — | B × C; VS (+) |

*VS = very significant at the 95% confidence level with $p < 0.05$; S = significant at the 90% confidence level with $p < 0.1$; and NS = not significant.
A designation of "+" indicates that the response increased as the level of a given factor or interaction was increased. Conversely, a designation of "−" indicates that the response decreased as the level of a given factor or interaction was increased.

TABLE 63

COMPARISON OF MEASURED MOR VERSUS MODEL-PREDICTED MOR*

| Exp. No. | Percent PMDI in the Cured OSB Composite (Oven Dried Basis) | Percent Tego Protect-5000 ™ in the Cured OSB Composite (Oven Dried Basis) | Weight Ratio of PMDI/ Ground Meal (Solids Basis) | Percent Urea in the Cured OSB Composite (Oven Dried Basis) | Measured MOR (psi) | Predicted MOR (psi) |
|---|---|---|---|---|---|---|
| 1 | 3.69 | 0.00 | 2.00 | 0.06 | 4,068 | 4,060 |
| 2 | 3.69 | 0.05 | 2.40 | 0.12 | 4,574 | 4,573 |
| 3 | 3.69 | 0.10 | 2.80 | 0.17 | 4,319 | 4,336 |
| 4 | 3.69 | 0.15 | 3.20 | 0.23 | 4,296 | 4,282 |
| 5 | 4.00 | 0.05 | 2.80 | 0.23 | 3,858 | 3,915 |
| 6 | 4.00 | 0.00 | 3.20 | 0.17 | 4,147 | 4,046 |
| 7 | 4.00 | 0.15 | 2.00 | 0.12 | 4,501 | 4,412 |
| 8 | 4.00 | 0.10 | 2.40 | 0.06 | 4,400 | 4,444 |
| 9 | 4.30 | 0.10 | 3.20 | 0.12 | 4,726 | 4,695 |
| 10 | 4.30 | 0.15 | 2.80 | 0.06 | 4,223 | 4,340 |
| 11 | 4.30 | 0.00 | 2.40 | 0.23 | 4,471 | 4,600 |
| 12 | 4.30 | 0.05 | 2.00 | 0.17 | 4,153 | 4,133 |
| 13 | 4.61 | 0.15 | 2.40 | 0.17 | 4,849 | 4,799 |
| 14 | 4.61 | 0.10 | 2.00 | 0.23 | 4,178 | 4,170 |
| 15 | 4.61 | 0.05 | 3.20 | 0.06 | 4,358 | 4,382 |
| 16 | 4.61 | 0.00 | 2.80 | 0.12 | 4,599 | 4,531 |

*The correlation coefficient for the predicted vs. actual measurements was 0.83 for the MOR responses.

TABLE 64

COMPARISON OF MEASURED MOR VERSUS MODEL-PREDICTED PERCENT TS (NEAR THE EDGE)*

| Exp. No. | Percent PMDI in the Cured OSB Composite (Oven Dried Basis) | Percent Tego Protect-5000 ™ in the Cured OSB Composite (Oven Dried Basis) | Weight Ratio of PMDI/ Ground Meal (Solids Basis) | Percent Urea in the Cured OSB Composite (Oven Dried Basis) | Measured Percent Water Thickness Swell | Predicted Percent Water Thickness Swell |
|---|---|---|---|---|---|---|
| 1 | 3.69 | 0.00 | 2.00 | 0.06 | 15.4 | 15.5 |
| 2 | 3.69 | 0.05 | 2.40 | 0.12 | 16.4 | 16.3 |
| 3 | 3.69 | 0.10 | 2.80 | 0.17 | 15.5 | 15.3 |
| 4 | 3.69 | 0.15 | 3.20 | 0.23 | 15.8 | 15.9 |
| 5 | 4.00 | 0.05 | 2.80 | 0.23 | 14.7 | 14.8 |
| 6 | 4.00 | 0.00 | 3.20 | 0.17 | 14.6 | 14.6 |
| 7 | 4.00 | 0.15 | 2.00 | 0.12 | 14.0 | 14.0 |
| 8 | 4.00 | 0.10 | 2.40 | 0.06 | 14.7 | 14.8 |
| 9 | 4.30 | 0.10 | 3.20 | 0.12 | 14.2 | 14.2 |
| 10 | 4.30 | 0.15 | 2.80 | 0.06 | 14.3 | 14.3 |
| 11 | 4.30 | 0.00 | 2.40 | 0.23 | 15.1 | 15.0 |
| 12 | 4.30 | 0.05 | 2.00 | 0.17 | 14.3 | 14.3 |
| 13 | 4.61 | 0.15 | 2.40 | 0.17 | 14.3 | 14.3 |
| 14 | 4.61 | 0.10 | 2.00 | 0.23 | 13.5 | 13.4 |
| 15 | 4.61 | 0.05 | 3.20 | 0.06 | 14.3 | 14.1 |
| 16 | 4.61 | 0.00 | 2.80 | 0.12 | 14.5 | 14.6 |

*The correlation coefficients for the predicted vs. actual measurements was 0.98 for the percent thickness swelling (TS) responses.

Figure 33:
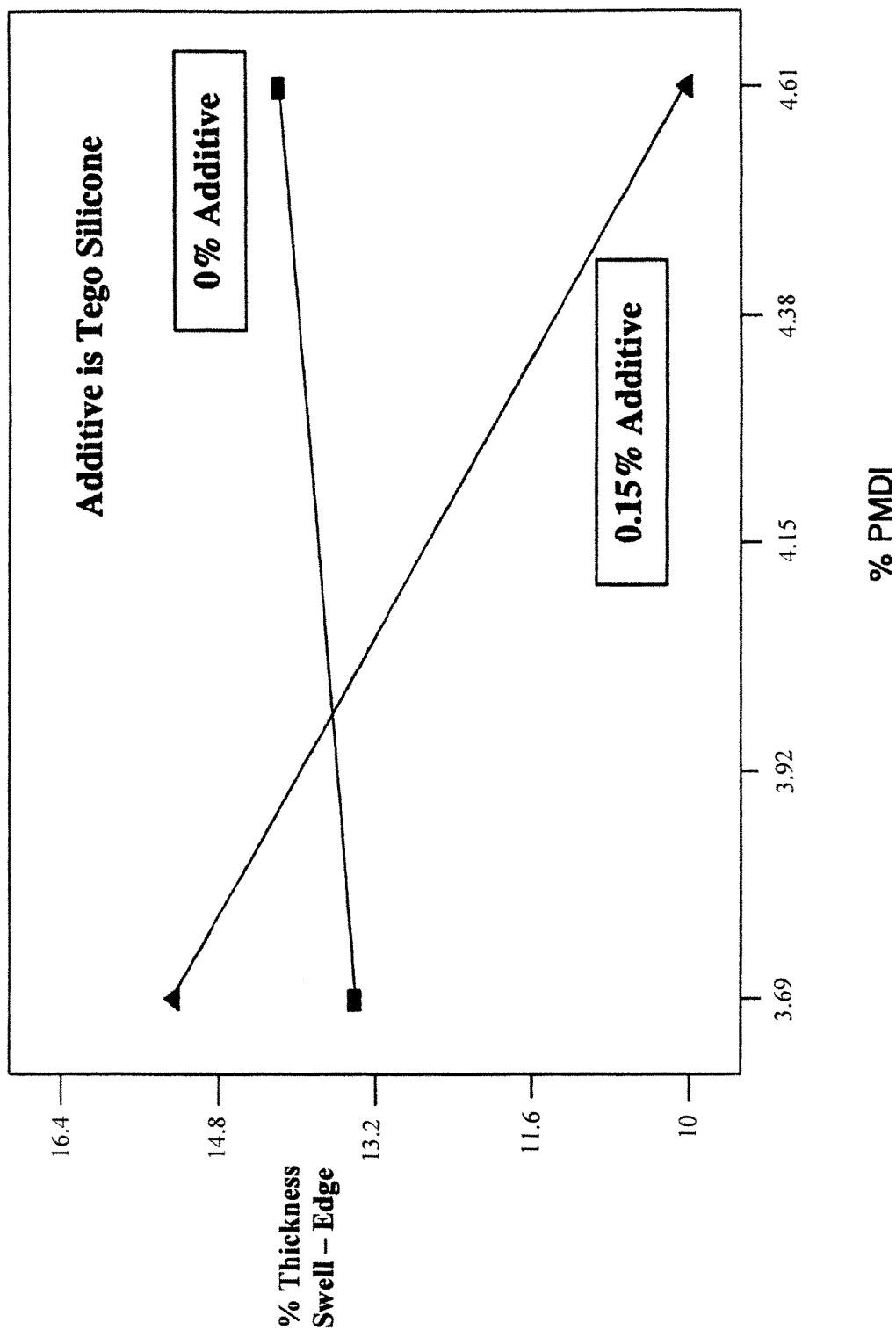
FIG. 33 is a graph showing how moisture resistance of a composite is affected by varying the amount of PMDI and Tego Protect-5000™ additive. Swell thickness of the composite after soaking in water for 24 hours is plotted against amount of PMDI used, as described further in Example 18.

An example of an interactive effect is shown graphically in FIG. 33 (interaction between the percent PMDI and the percent Tego Protect-5000™ and its effect on the percent thickness swelling near the edge of the composite after 24 hours of soaking the composite in water. In the presence of the silicone additive, the water resistance was observed to improve with increasing PMDI concentration. By contrast, in the absence of the additive, the PMDI concentration had little impact on moisture resistance (over the concentration range of the experiment). Water resistance near the edge of the composite improved when the PMDI to meal ratio was increased, and particularly when the silicone additive concentration was simultaneously increased (this was an interactive effect). Moreover, the water resistance improved when the urea concentration was increased.

These results show that it is possible to achieve a balanced response by leveraging two or more factors against one another. For example, lowering the PMDI level while simultaneously increasing the silicone additive level can have a similar effect to that which would be realized by raising the PMDI level and lowering the silicone additive level. Similarly, lowering the PMDI/protein ratio while simultaneously increasing the silicone additive level can have a similar effect to that which would be realized by raising the PMDI/protein ratio and lowering the silicone additive level. These relationships can collectively permit use of less PMDI to achieve properties that are equivalent to those of conventional composites made with higher levels of neat PMDI. In addition, the incorporation of a moisture resistant additive (i.e., a silicone additive) into the binder formula permits removal of secondary wax additives from the composite without sacrificing moisture resistance (compare formula 13 with and without wax in Table 60).

MOR response was also affected by an interaction between the concentration of PMDI and concentration of the silicone additive. For example, reducing the amount of PMDI while increasing the amount of silicone additive can have a similar effect to that which would be realized by increasing the amount of PMDI and reducing the amount of silicone additive. Collectively, these interactions provide sufficient latitude for designing adhesive compositions that are as good or better than those using neat PMDI.

INCORPORATION BY REFERENCE

The entire disclosure of each of the patent and scientific documents referred to herein is incorporated by reference for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

We claim:
1. An adhesive composition comprising:
   (a) from about 1% to about 90% (w/w) of a reactive prepolymer selected from the group consisting of a polyisocyanate-based prepolymer, an epoxy-based prepolymer, and a combination thereof;
   (b) water; and
   (c) ground plant meal in an amount sufficient to disperse the reactive prepolymer in the aqueous medium, wherein the ground plant meal is derived from corn, wheat, sunflower, rapeseed, canola, castor, camelina, jatropha, mallow, peanuts, sugarcane begasse, tobacco, whey, or a combination thereof; the ground plant meal being present in an amount ranging from about 1% (w/w) to about 50% (w/w) of the adhesive composition.
2. The composition of claim 1, wherein the ground plant meal has a particle size in the range of from about 1 µm to about 200 µm.

3. The composition of claim 1, wherein the ground plant meal has a particle size in the range of from about 10 μm to about 70 μm.

4. The composition of claim 1, wherein the ground plant meal is present in an amount sufficient to disperse the reactive prepolymer in an aqueous medium to form a dispersion or emulsion that exhibits no phase separation by visual inspection for at least 5 minutes after mixing the reactive prepolymer with the ground plant meal.

5. The composition of claim 1, wherein the ground plant meal is present in an amount such that the viscosity of the adhesive formulation increases by no more than about 50% within about 20 minutes after mixing the prepolymer and ground plant meal with a nucleophile.

6. The composition of claim 5, wherein the nucleophile is water, an urea, a hydroxyl-containing compound, an amine-containing compound, an amide-containing compound, a sulfhydryl-containing compound, or a mixture thereof.

7. The composition of claim 5, wherein the nucleophile is urea.

8. The composition of claim 1, wherein the ground plant meal is present in an amount from about 5% to about 35% (w/w) of the adhesive composition.

9. The composition of claim 1, wherein the ground plant meal is derived from corn, wheat, sunflower, rapeseed, canola, castor, camelina, whey, or a combination thereof.

10. The composition of claim 1, wherein the composition is in the form of a liquid.

11. The composition of claim 1, wherein upon curing the composition forms a solid binder composition.

12. The composition of claim 11, wherein the solid binder composition has one or more of the following features:
  i) comprises from about 5% to about 75% (w/w) of ground plant meal;
  ii) comprises from about 5% to about 75% (w/w) of a polymeric material formed from the reactive prepolymer; and
  iii) is a thermoset solid.

13. The composition of claim 1, further comprising a formaldehyde scavenging agent.

14. The composition of claim 13, wherein the formaldehyde scavenging agent has the formula $RNH_2$, $R_2NH$, $RC(O)NH_2$, $RN(H)C(O)NH_2$, $R_2NC(O)NH_2$, or $RN(H)C(O)N(H)R$, wherein R represents independently for each occurrence H, alkyl, aryl, or aralkyl.

15. The composition of claim 13, wherein the formaldehyde scavenging agent has the formula $RN(H)C(O)N(H)R$, wherein R represents independently for each occurrence H, alkyl, aryl, or aralkyl.

16. The composition of claim 13, wherein the formaldehyde scavenging agent is $H_2NC(O)NH_2$.

17. The composition of claim 13, wherein the mole ratio of formaldehyde scavenging agent to reactive prepolymer is at least 0.05:1.

18. The composition of claim 13, wherein the mole ratio of formaldehyde scavenging agent to reactive prepolymer is at least 5:1.

19. The composition of claim 13, wherein the formaldehyde scavenging agent is present in an amount from about 1% to about 50% (w/w) of the adhesive composition.

20. The composition of claim 13, wherein the formaldehyde scavenging agent is present in an amount from about 2% to about 30% (w/w) of the adhesive composition.

21. The composition of claim 13, wherein upon curing the composition forms a solid binder composition comprising from about 1% to about 50% (w/w) of formaldehyde scavenging agent.

22. The composition of claim 1, wherein the reactive prepolymer is an epoxy-based prepolymer.

23. The composition of claim 1, wherein the reactive prepolymer is a polyisocyanate-based prepolymer.

24. The composition of claim 23, wherein the polyisocyanate-based prepolymer is an organic polyisocyanate; or a reaction product between an organic polyisocyanate and a polypeptide, a polyol, an amine based polyol, an amine containing compound, a hydroxy containing compound, or a combination thereof.

25. The composition of claim 23, wherein the polyisocyanate-based reactive prepolymer is a polymer comprising a terminal reactive isocyanate group.

26. The composition of claim 22, wherein the epoxy-based prepolymer is an epoxide containing compound, or is a reaction product between an epoxy and a polypeptide, a polyol, an amine based polyol, an amine containing compound, a hydroxy containing compound, or a combination thereof.

27. The composition of claim 26, wherein the epoxy is selected from the group consisting of a diglycidyl ether of bisphenol-A, a diglycidyl ether of bisphenol-A alkoxylate, an epoxy novolac resin, expoxidized soy oil, epoxidized linseed oil, epichlorohydrin, a glycidyl ether-type epoxy resin derived from a polyphenol by reaction with epichlorohydrin, and a combination thereof.

28. The composition of claim 26, wherein the polyol is amine alkoxylate, polyoxypropylene glycol, propylene glycol, propane diol, glycerin, or a mixture thereof.

29. The composition of claim 1, wherein the reactive prepolymer is an organic polyisocyanate selected from the group consisting of polymeric diphenylmethane diisocyanate (PMDI), 4,4'-methylenediphenyl, diisocyanate (4,4'-MDI), 2,4-methylenediphenyl, diisocyanate (2,4-MDI), or a combination thereof.

30. The composition of any one of claims 1, 8, 9, 23, or 29, wherein the water is present in an amount from about 30% (w/w) to about 75% (w/w) of the adhesive composition.

31. The composition of claim 1, wherein the water is present in an amount from about 30% (w/w) to about 60% (w/w) of the adhesive composition.

32. The composition of claim 1, further comprising a catalyst.

33. The composition of claim 32, wherein the catalyst is a primary amine, a secondary amine, a tertiary amine, an organometallic compound, or a combination thereof.

34. The composition of claim 1, further comprising an additive.

35. The composition of claim 34, wherein the additive is glycerin, corn syrup, a poly($C_2$-$C_6$)alkylene, mineral oil, an ethylene/propylene/styrene copolymer, a butylene/ethylene/styrene copolymer, soy oil, castor oil, or a mixture of one or more of the foregoing.

36. The composition of claim 34, wherein the additive is glycerin or a polyol.

37. The composition of claim 34, wherein the additive is an agent that improves moisture-resistance, a composite-release promoter, a pH modulator, or an antimicrobial agent.

38. An adhesive composition comprising:
  (a) from about 1% to about 90% (w/w) of a reactive prepolymer selected from the group consisting of a polyisocyanate-based prepolymer, an epoxy-based prepolymer, and a combination thereof;
  (b) from about 10% to about 98% (w/w) of an isolated polypeptide composition capable of dispersing the reactive prepolymer in an aqueous medium, wherein the isolated polypeptide composition is derived from corn, wheat, sunflower, rapeseed, canola, castor, camelina, jatropha, mallow, peanuts, sugarcane begasse, tobacco, whey, or a combination thereof; and (c) an additive selected from the group consisting of an agent that improves moisture-resistance, a composite-release promoter, and a pH modulator and, (d) water.

39. A two-part adhesive composition comprising:
(a) a first part (Part A) comprising from about 0.1% to about 100% (w/w) of a reactive prepolymer, wherein the reactive prepolymer is a polyisocyanate-based prepolymer, an epoxy-based prepolymer, or a combination thereof;
(b) a second part (Part B) comprising from about 10% to about 99% (w/w) of an isolated polypeptide composition capable of dispersing the reactive prepolymer in an aqueous medium, wherein the isolated polypeptide composition is derived from corn, wheat, sunflower, rapeseed, canola, castor, camelina, jatropha, mallow, peanuts, sugarcane begasse, tobacco, whey, or a combination thereof; and
(c) wherein at least one of Part A or Part B comprises an additive selected from the group consisting of an agent that improves moisture-resistance, a composite-release promoter, and a pH modulator and, (d) water.

40. The composition of claim 34, wherein the additive is an agent that improves moisture-resistance.

41. The composition of claim 40, wherein the agent that improves moisture-resistance is a wax that improves moisture-resistance.

42. The composition of claim 40, wherein the agent that improves moisture-resistance is a silicone, a siloxane, a fluorinated polyol, a fluoroalkyl phosphate ester, or a fluoroalkyl carboxylic ester.

43. The composition of claim 40, wherein the agent that improves moisture-resistance is a mixture comprising hydrophobic hydrocarbons.

44. The composition of claim 34, wherein the additive is a composite-release promoter.

45. The composition of claim 34, wherein the additive is a composite-release promoter selected from the group consisting of a $C_{10-25}$ alkanoic acid, a salt of a $C_{10-25}$ alkanoic acid, a $C_{10-25}$ alkenoic acid, a salt of an $C_{10-25}$ alkenoic acid, and a silicone.

46. A solid binder composition formed by curing a composition of claim 1.

47. A method of bonding a first article to a second article comprising:

(a) depositing on a surface of the first article the adhesive composition of claim 1 thereby to create a binding area; and
(b) contacting the binding surface with a surface of the second article thereby to bond the first surface to the second surface.

48. A method of producing a composite material comprising:
(a) combining a first article and a second article with the adhesive composition of claim 1 to produce a mixture; and
(b) curing the mixture produced by step (a) to produce the composite material.

49. An article comprising two or more components bonded together using the adhesive composition of claim 1.

50. The adhesive composition of claim 1, wherein the ground plant meal is derived from canola, castor, or a combination thereof.

51. The adhesive composition of claim 1, wherein the isolated polypeptide composition is derived from corn, wheat, sunflower, cotton, rapeseed, canola, castor, soy, camelina, flax, whey, or a combination thereof.

52. The adhesive composition of claim 38, wherein the isolated polypeptide composition is derived from corn, wheat, sunflower, cotton, rapeseed, canola, castor, soy, camelina, flax, whey, or a combination thereof.

53. The adhesive composition of claim 50, wherein the reactive prepolymer comprises a polymeric polyisocyanate.

54. The adhesive composition of claim 50, wherein the reactive prepolymer comprises polymeric diphenylmethane diisocyanate.

55. The adhesive composition of claim 53, wherein the adhesive is in the form of a liquid.

56. The adhesive composition of claim 55, wherein the ground plant meal is present in an amount from about 5% to about 35% (w/w) of the adhesive composition.

57. The adhesive composition of claim 56, wherein the ground plant meal has a particle size in the range of from about 1 μm to about 200 μm.

58. The adhesive composition of claim 57, wherein the water is present in an amount from about 30% (w/w) to about 75% (w/w) of the adhesive composition.

* * * * *